US006636511B1

(12) United States Patent
Roy et al.

(10) Patent No.: US 6,636,511 B1
(45) Date of Patent: Oct. 21, 2003

(54) METHOD OF MULTICASTING DATA THROUGH A COMMUNICATIONS SWITCH

(75) Inventors: Subhash C. Roy, Lexington, MA (US); Michael M. Renault, Medway, MA (US); Frederick R. Carter, Lawrence, MA (US); David K. Toebes, Andover, MA (US); Rajen S. Ramchandani, Clinton, MA (US); Daniel C. Upp, Southbury, CT (US)

(73) Assignee: Transwitch Corporation, Shelton, CT (US)

( * ) Notice: Subject to any disclaimer, the term of this patent is extended or adjusted under 35 U.S.C. 154(b) by 129 days.

(21) Appl. No.: 09/717,472

(22) Filed: Nov. 21, 2000

(51) Int. Cl.[7] .......................... H04L 12/28; H04L 12/56

(52) U.S. Cl. ........................ 370/390; 370/388; 370/401

(58) Field of Search ................................ 370/390, 386, 370/388, 229, 235, 236, 242, 352, 353, 395.1, 396, 397, 395.41, 395.42, 395.52, 395.21, 465–467, 476, 442, 432, 907, 389, 400–401, 345, 347, 522

(56) References Cited

U.S. PATENT DOCUMENTS 5,412,651 A * 5/1995 Gorshe ....................... 370/412
5,430,716 A * 7/1995 Pawelski .................... 370/338
5,689,506 A * 11/1997 Chiussi et al. .............. 370/388
5,724,351 A * 3/1998 Chao et al. ............ 370/395.42
5,748,629 A 5/1998 Caldara et al. ............. 370/389
5,844,887 A * 12/1998 Oren et al. ................. 370/218
5,870,538 A 2/1999 Manning ............... 395/183.18
5,905,729 A 5/1999 Gaddis ....................... 370/399
5,909,427 A 6/1999 Manning et al. ............ 370/219
6,049,542 A * 4/2000 Prasad ........................ 370/386
6,148,349 A * 11/2000 CHow et al. ................. 710/33
6,292,486 B1 * 9/2001 Little ...................... 370/395.1

* cited by examiner

*Primary Examiner*—Douglas Olms
*Assistant Examiner*—Brian Nguyen
(74) *Attorney, Agent, or Firm*—Gordon & Jacobson, P.C.

(57) ABSTRACT

A network switch includes at least one port processor and at least one switch element. The port processor has an SONET OC-x interface (for TDM traffic), a UTOPIA interface (for ATM and packet traffic), and an interface to the switch element. In one embodiment, the port processor has a total I/O bandwidth equivalent to an OC-48, and the switch element has 12×12 ports for a total bandwidth of 30 Gbps. A typical switch includes multiple port processors and switch elements. A data frame of 9 rows by 1700 slots is used to transport ATM, TDM, and Packet data from a port processor through one or more switch elements to the same or another port processor. Each frame is transmitted in 125 microseconds; each row in 13.89 microseconds. Each slot includes a 4-bit tag plus a 4-byte payload. The slot bandwidth is 2.592 Mbps which is large enough to carry an E-1 signal with overhead. The 4-bit tag is a cross connect pointer which is setup when a TDM connection is provisioned. The last twenty slots of the frame are reserved for link overhead. Thus, the frame is capable of carrying the equivalent of 1,680 E-1 TDM signals. For ATM and packet data, a PDU (protocol data unit) of 16 slots is defined for a 64-byte payload. The PDUs are self-routed through the switch with a 28-bit routing tag which allows routing through seven switch stages using 4-bits per stage. Bandwidth is arbitrated among ATM and Packet connections while maintaining TDM timing.

36 Claims, 10 Drawing Sheets

| SLOT | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|---|---|---|---|
| 0 | PARITY | | | | PDU | | 0 | 0 | ROUTING TAG | | | | | | | | | | | | | | | | | | | | | | | | | | | |
| 1 | PARITY | | | | VER | | VALID BYTES | | | | | | VOQ ID | | | | | FRAG ID | | A | FFS | | | | | | | | | | | | SEQ # | | | |
| 2 | PARITY | | | | FFS | | | | | | | | | | | | | | | DEST FLOW ID | | | | | | | | | | | | | | | | |
| 3 | PARITY | | | | PAYLOAD BYTE 0 | | | | | | | | PAYLOAD BYTE 1 | | | | | | | | PAYLOAD BYTE 2 | | | | | | | | PAYLOAD BYTE 3 | | | | | | | |
| 4 | PARITY | | | | PAYLOAD BYTE 4 | | | | | | | | PAYLOAD BYTE 5 | | | | | | | | PAYLOAD BYTE 6 | | | | | | | | PAYLOAD BYTE 7 | | | | | | | |
| ⋮ | | | | | | | | | | | | | | | | | | | | | | | | | | | | | | | | | | | | |
| 15 | PARITY | | | | PAYLOAD BYTE 48 | | | | | | | | PAYLOAD BYTE 49 | | | | | | | | PAYLOAD BYTE 50 | | | | | | | | PAYLOAD BYTE 51 | | | | | | | |

FIG.3a

METHOD OF MULTICASTING DATA THROUGH A COMMUNICATIONS SWITCH

BACKGROUND OF THE INVENTION

1. Field of the Invention

The invention relates to telecommunications networks. More particularly, the invention relates to a method of multicasting data through a telecommunications network switch.

2. State of the Art

One of the earliest techniques for employing broadband telecommunications networks was called time division multiplexing (TDM). The basic operation of TDM is simple to understand. A high frequency signal is divided into multiple time slots within which multiple lower frequency signals can be carried from one point to another. The actual implementation of TDM is quite complex, however, requiring sophisticated framing techniques and buffers in order to accurately multiplex and demultiplex signals. The North American standard for TDM (known as T1 or DS1) utilizes twenty-four interleaved channels together having a rate of 1.544 Mbits/sec. The European standard for TDM is known as E-1 and utilizes thirty interleaved channels having a rate of 2.048 Mbits/sec. A hierarchy of multiplexing is based on multiples of the T1 or E-1 signal, one of the most common being T3 or DS3. A T3 signal has 672 channels, the equivalent of twenty-eight T1 signals. TDM was originally designed for voice channels. Today, however, it is used for both voice and data.

An early approach to broadband data communication was called packet switching. One of the differences between packet switching and TDM is that packet switching includes methods for error correction and retransmission of packets which become lost or damaged in transit. Another difference is that, unlike the channels in TDM, packets are not necessarily fixed in length. Further, packets are directed to their destination based on addressing information contained within the packet. In contrast, TDM channels are directed to their destination based on their location in the fixed frame. Today, a widely used packet switching protocol is known as IP (Internet Protocol).

More recently, broadband technologies known as ATM and SONET have been developed. The ATM network is based on fixed length packets (cells) of 53-bytes each (48-bytes payload with 5-bytes overhead). One of the characteristics of the ATM network is that users contract for a quality of service (QOS) level. Thus, ATM cells are assigned different priorities based on QOS. For example, constant bit rate (CBR) service is the highest priority service and is substantially equivalent to a provisioned TDM connection. Variable bit rate (VBR) service is an intermediate priority service which permits the loss of cells during periods of congestion. Unspecified bit rate (UBR) service is the lowest priority and is used for data transmission which can tolerate high latency such as e-mail transmissions.

The SONET network is based on a frame of 810-bytes within which a 783-byte synchronous payload envelope (SPE) floats. The payload envelope floats because of timing differences throughout the network. The exact location of the payload is determined through a relatively complex system of stuffs/destuffs and pointers. In North America, the basic SONET signal is referred to as STS-1 (or OC-1). The SONET network includes a hierarchy of SONET signals wherein up to 768 STS-1 signals are multiplexed together providing the capacity of 21,504 T1 signals (768 T3 signals). STS-1 signals have a frame rate of 51.84 Mbit/sec, with 8,000 frames per second, and 125 microseconds per frame. In Europe, the base (STM-1) rate is 155.520 Mbit/sec, equivalent to the North American STS-3 rate (3*51.84=155.520), and the payload portion is referred to as the virtual container (VC). To facilitate the transport of lower-rate digital signals, the SONET standard uses sub-STS payload mappings, referred to as Virtual Tributary (VT) structures. (The ITU calls these Tributary Units or TUs.) Four virtual tributary sizes are defined: VT-1.5, VT-2, VT-3 and VT-6. VT-1.5 has a data transmission rate of 1.728 Mbit/s and accommodates a T1 signal with overhead. VT-2 has a data transmission rate of 2.304 Mbit/s and accommodates an E1 signal with overhead. VT-3 has a data transmission rate of 3.456 Mbit/s and accommodates a T2 signal with overhead. VT-6 has a data transmission rate of 6.912 Mbit/s and accommodates a DS2 signal with overhead.

Each of the above described broadband technologies can be categorized as TDM, ATM, or Packet technologies, with SONET being a complex form of TDM. From the foregoing, it will be appreciated that TDM, ATM and Packet each have their own unique transmission requirements. Consequently, different kinds of switches are used to route these different kinds of signals. In particular, TDM requires careful time synchronization; ATM requires careful attention to the priority of cells and QOS; and packet (e.g. IP) requires the ability to deal with variable length packets. For these reasons, switching technologies for TDM, ATM, and variable length packet switching have evolved in different ways. Service providers and network designers have thus been forced to deal with these technologies separately, often providing overlapping networks with different sets of equipment which can only be used within a single network.

SUMMARY OF THE INVENTION

It is therefore an object of the invention to provide methods and apparatus whereby different kinds of broadband signals can be switched through a single switching fabric.

It is also an object of the invention to provide a network element which can switch TDM, ATM, and variable length packet traffic all through the same switch fabric.

It is another object of the invention to provide a network switch chipset which can be combined with identical chip sets to provide a scalable network switch fabric.

It is a further object of the invention to provide a network switch which allows flexible partitioning among TDM, ATM, and variable length packet traffic.

Another object of the invention is to provide a network switch with redundant switch planes so that the failure of switch elements or links does not immediately cause a connection failure.

A further object of the invention is to provide a network switch which handles multicast as well as unicast voice and data transmission.

An additional object of the invention to provide a network switch which supports Clos architectures as well as folded Clos architectures.

In accord with these objects which will be discussed in detail below, the network switch of the present invention includes at least one port processor (also referred to in the appendices as a "service processor") and at least one switch element. The port processor has a SONET OC-x (SONET/SDH STS-x/STM-y) interface (for TDM traffic), a UTOPIA and UTOPIA-frame based interface (for ATM and packet traffic), and an interface to the switch element. An exemplary port processor has a total I/O bandwidth equivalent to a SONET OC-48 signal. An exemplary switch element has 12×12 ports and supports a total bandwidth of 30 Gbps.

A typical switch according to the invention includes multiple port processors and multiple switch elements. For a 48×48 "folded" switch, 48 port processors are coupled (four each) to 12 (first and third stage) switch elements and each of these twelve switch elements is coupled to 8 (second stage) switch elements. A three stage non-blocking switch according to the invention provides a total bandwidth of 240 Gbps and a five stage non-blocking switch provides a total bandwidth of 1 Tbps. An exemplary three stage folded Clos architecture switch includes forty-eight port processors and twenty switch elements. Four port processors are coupled to each of twelve (first and third stage) switch elements. Each of the twelve (first and third stage) switch elements are coupled to eight (second stage) switch elements. According to the presently preferred embodiment, each port processor is provided with means for coupling to two ports of a switch element or one port of two switch elements thereby providing redundancy in the event of a link failure.

According to the invention, a data frame of 9 rows by 1700 slots is used to transport ATM, TDM, and Packet data from a port processor through one or more switch elements to the same or another port processor. Each frame is transmitted in 125 microseconds, each row in 13.89 microseconds. Each slot includes a four-bit tag plus a four-byte payload (i.e., thirty-six bits). The slot bandwidth (1/1700 of the total frame) is 2.592 Mbps which is large enough to carry an E-1 signal with overhead. The four-bit tag is a cross connect pointer which is set up when a TDM connection is provisioned. The last twenty slots of the frame are reserved for link overhead. Thus, the frame is capable of carrying the equivalent of 1,680 E-1 TDM signals even though an STM-16 frame has a capacity of only 1008 E-1 signals.

For ATM and packet data, a PDU (protocol data unit) of sixteen slots is defined for a sixty-four-byte payload (large enough to accommodate an ATM cell with switch overhead). A maximum of ninety-six PDUs per row is permitted. The sixteen four-bit tags of a PDU are not needed for PDU routing so they are used as parity bits to protect the ATM or variable length packet payload. Of the sixty-four-byte payload, twelve bytes (96 bits) are used by the switch for internal routing. This leaves fifty-two bytes for actual payload which is sufficient to carry an ATM cell (without the one-byte HEC) and sufficient for larger packets after fragmentation. The PDUs are self-routed through the switch with a twenty-eight-bit routing tag which allows routing through seven switch stages using four-bits per stage. The remaining sixty-eight bits of the PDU are used for various other addressing information such as indicating whether the PDU contains an ATM cell, a packet, or a control message, whether reassembly of the packet should be aborted, whether the payload is a first fragment, middle fragment or last fragment, how many payload bytes are in the last fragment, the fragment sequence count, and a destination flow identifier.

The link overhead (LOH) in the last twenty slots of the frame is analogous in function to the line and section overhead in a SONET frame. The LOH may contain a 36-bit frame alignment pattern which is used to delineate the byte and row boundaries from serial data streams, a 32-bit status register for each output link, a 32-bit switch and link identifier, and a 32-bit stuff pattern.

Since ATM and Packet traffic are typically not provisioned, bandwidth must be arbitrated among ATM and Packet connections as traffic enters the system. Moreover, since TDM traffic shares the same frame as ATM and Packet traffic, bandwidth must be arbitrated while maintaining TDM timing. According to the invention, bandwidth is arbitrated by a system of requests and grants which is implemented for each PDU in each row of the frame. The switch elements provide three channels per link, two of which are used to carry data and arbitration requests and one of which is used to carry arbitration grants. According to the presently preferred embodiment, a forty-eight-bit (1.5 slot) request element is generated for each PDU in the next row of the frame. Each switch element includes a single request parser and a separate request arbitration module for each output link. The request elements are generated by the port processors and include intra-switch "hop-by-hop" routing tags and priority level information. Request elements are buffered by the switch elements and low priority request elements are discarded by a switch element if the buffer fills. Each request element which is not discarded as it travels through the switch fabric is returned to the port processor from which it originated during one "row time", i.e. 13.89 microseconds. As suggested above, requests are made "in band" interleaved with data and grants (the returned request elements) are made "out of band" using the third channel in each link.

In order to maintain timing for TDM traffic, the V1–V4 bytes in the VT/VC frame are stripped off and the VC bytes are buffered at ingress to the switch by a port processor. The V1–V4 bytes are regenerated at the egress from the switch by a port processor. In rows having both PDU and TDM traffic, the PDUs are configured early and the TDM slots are configured late in the row.

According to the presently preferred embodiments, each switch element includes a multicast controller and a separate multicast PDU buffer. Two alternate embodiments are provided for multicasting. The first embodiment requires fewer gates and is best suited for an environment where multicasting is not a major portion of the traffic. The second embodiment requires many more gates to implement. However, it is better suited in an environment where multicasting is a frequent event. The second embodiment requires more latency in setting up a multicast path, but less latency in multicasting data. According to the first embodiment, multicast request elements flow through the switch in the same manner as standard unicast request elements. At the point where the message needs to be multicast, the hop-by-hop field's bit code for that switch stage indicates that the request is multicast. The request is forwarded to the multicast controller. On the grant path, the multicast controller sources a grant if there is room for the data in the multicast recirculating buffers. Once the data has been transmitted to the multicast buffer, the multicast controller examines the data header and determines on which output links it needs to be sent out. At this point, the multicast controller sources a number of request messages which are handled in the same manner as unicast requests. The process repeats with the sequence of send request, receive grant, transmit PDU. I.e, before each multicast PDU is transmitted, a request and a grant must traverse the switch. According to the second embodiment, a multicast path is reserved for a period of time by sending multiple requests (one for each hop) until all hops have been granted. Once the path is set up in this manner, PDUs are multicast one after the other with no latency until the reserved time expires or there are no more PDUs to transmit.

Additional objects and advantages of the invention will become apparent to those skilled in the art upon reference to the detailed description taken in conjunction with the provided figures.

BRIEF DESCRIPTION OF THE DRAWINGS

FIG. 3*a* is a schematic diagram illustrating the presently preferred format of a PDU according to the invention;

BRIEF DESCRIPTION OF THE APPENDIX

Appendix A is an engineering specification (Revision 0.3) for a port processor according to the invention;

Appendix B is an engineering specification (Revision 0.3) for a switch element according to the invention; and Appendix C is an engineering specification (Revision 0.3) for an alternate embodiment of the multicasting system described in section 5 of Appendix B.

DETAILED DESCRIPTION OF THE PREFERRED EMBODIMENTS

Figure 1A:
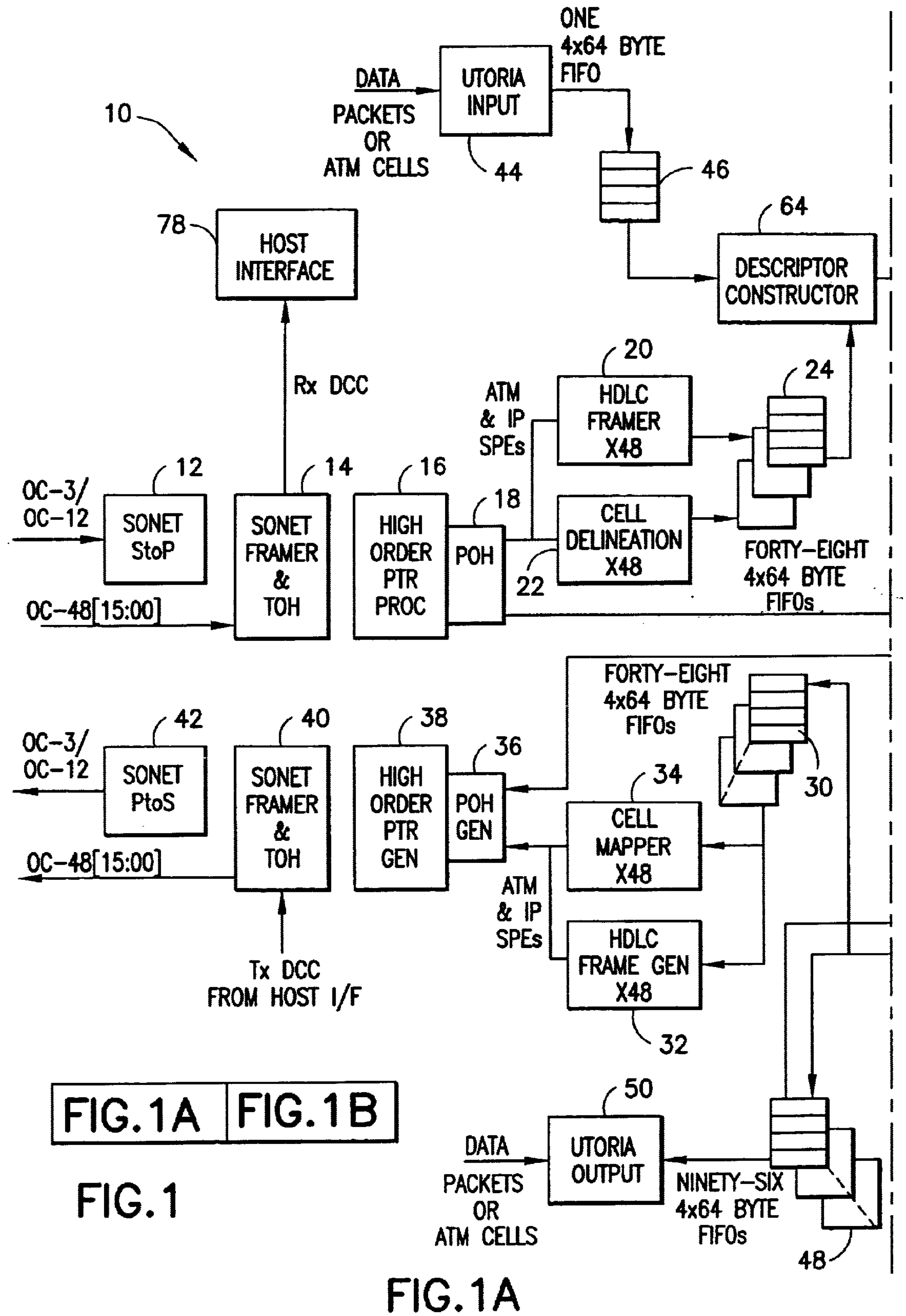
FIG. 1 is a simplified schematic diagram of a port processor according to the invention.
Figure 1B:
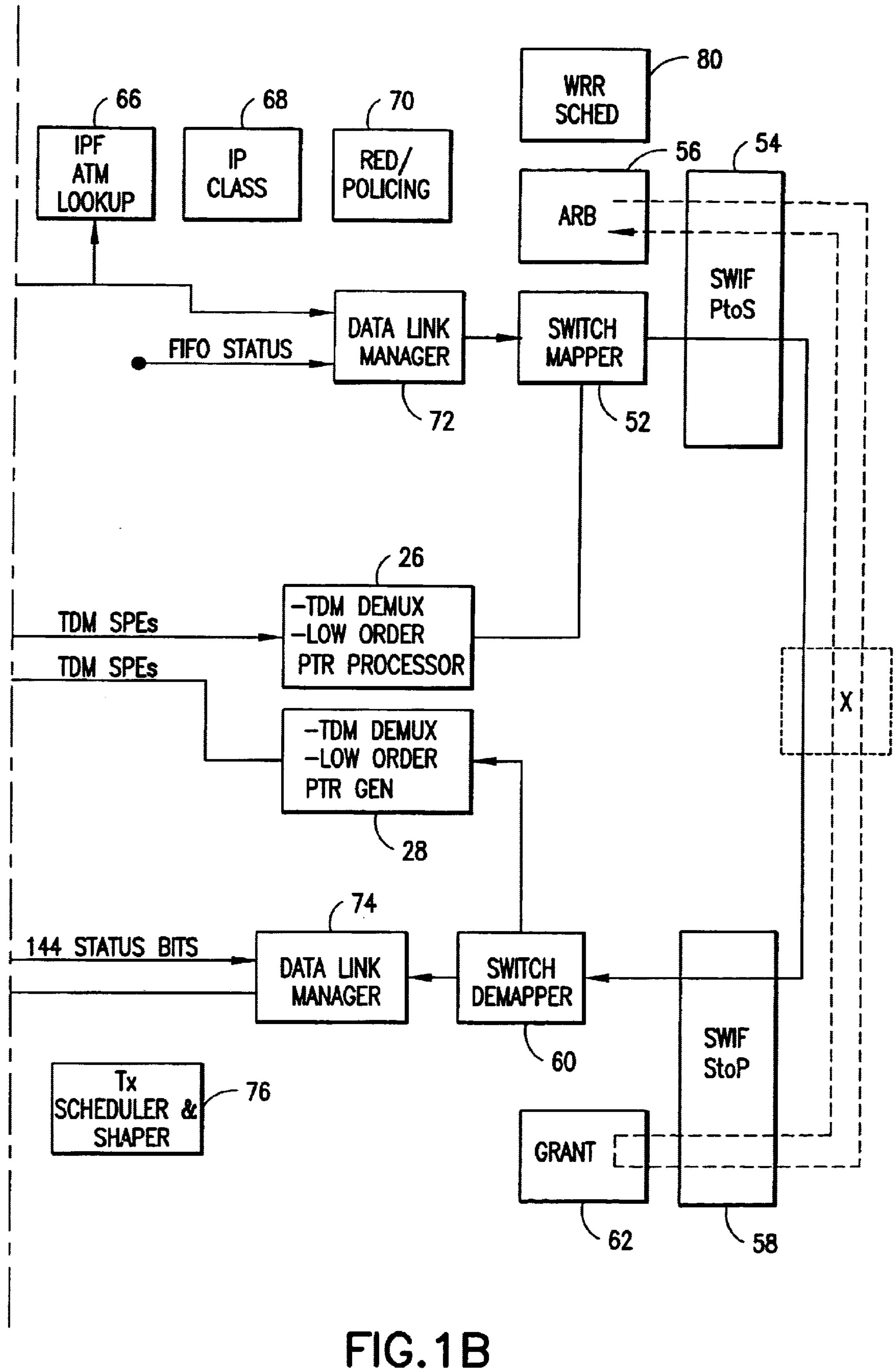
Figures 2, 2A:
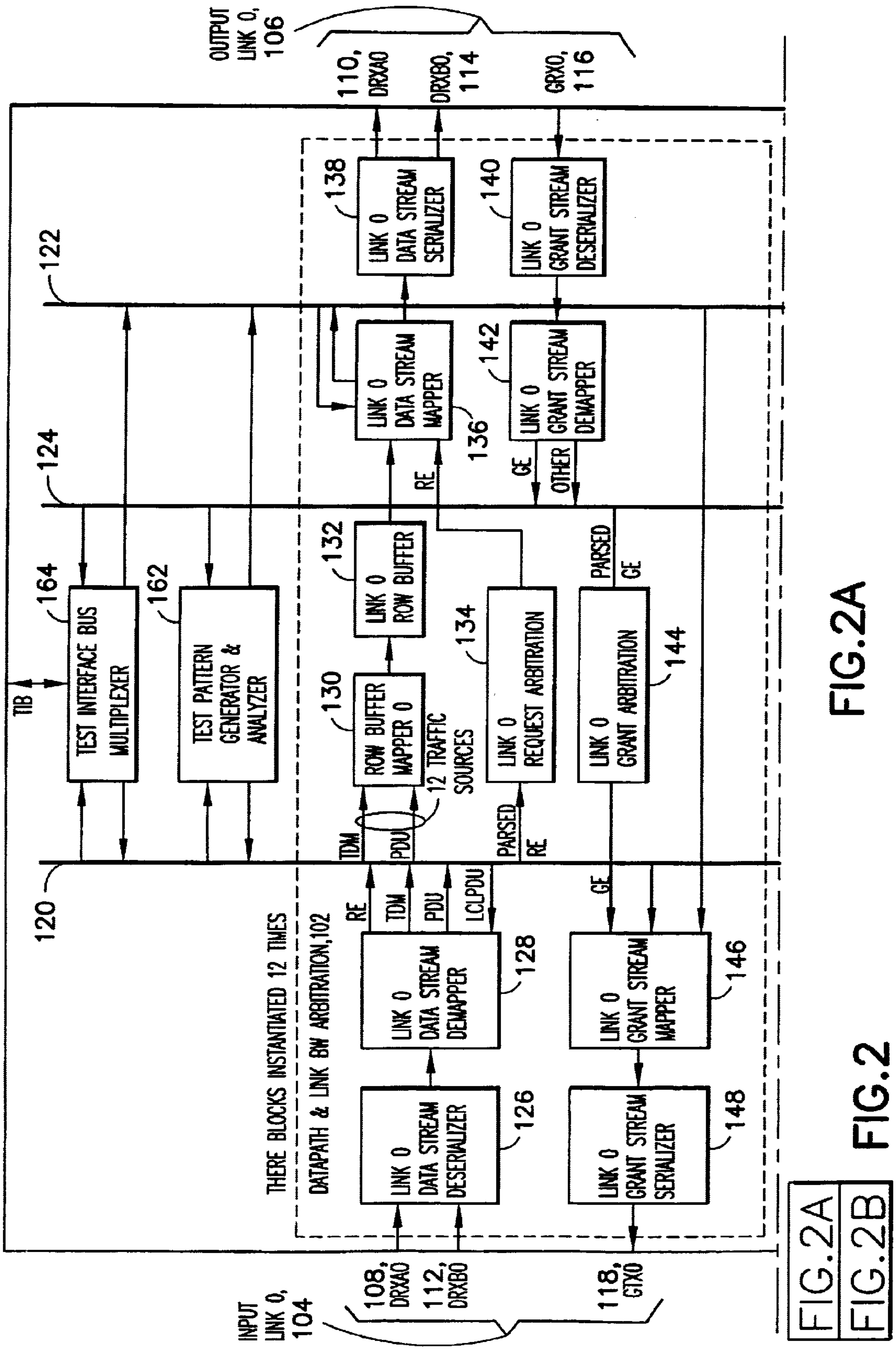
FIG. 2 is a simplified schematic diagram of a switch element according to the invention.
Figure 2B:
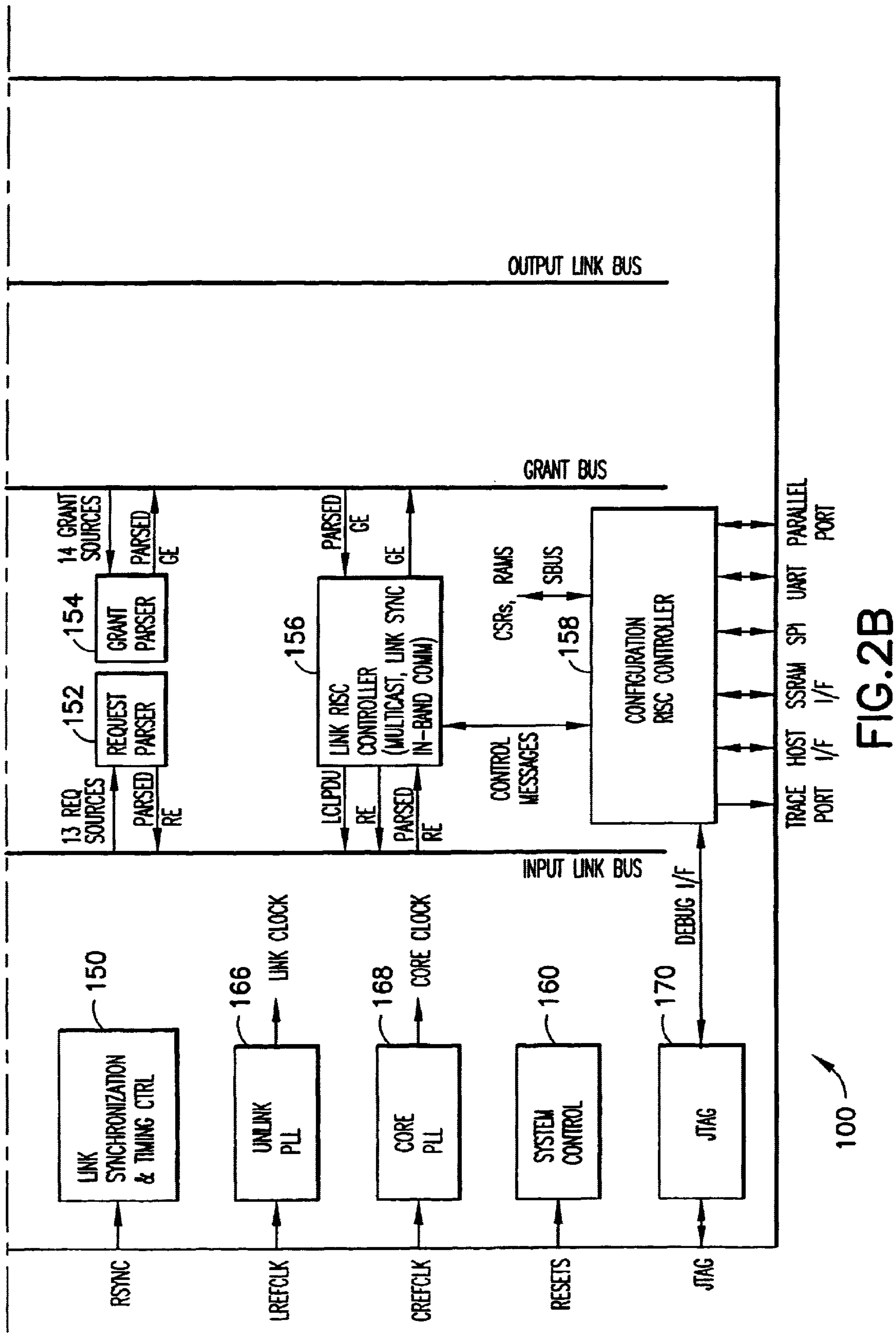

The apparatus of the invention generally includes a port processor and a switch element. FIG. 1 illustrates the main features of the port processor 10, and FIG. 2 illustrates the main features of the switch element 100. Referring now to FIG. 1, the port processor 10 includes a SONET interface and a UTOPIA interface. On the ingress (RX) side, the SONET interface includes a serial to parallel converter 12, a SONET framer and transport overhead (TOH) extractor 14, a high order pointer processor 16, and a path overhead (POH) extractor 18. For ATM and IP packets transported in an SPE, the ingress side of the SONET interface includes forty-eight HDLC framers 20 (for IP), forty-eight cell delineators 22 (for ATM), and forty-eight 64-byte FIFOs 24 (for both ATM and IP. For TDM signals transported in an SPE, the ingress side of the SONET interface includes a demultiplexer and low order pointer processor 26. On the egress (TX) side, the SONET interface includes, for TDM signals, a multiplexer and low order pointer generator 28. For ATM and IP packets transported in an SPE, the egress side of the SONET interface includes forty-eight 64-byte FIFOs 30, forty-eight HDLC frame generators 32, and forty-eight cell mappers 34. The egress side of the SONET interface also includes a POH generator 36, a high order pointer generator 38, a SONET framer and TOH generator 40, and a parallel to serial interface 42. On the ingress side, the UTOPIA interface includes a UTOPIA input 44 for ATM and Packets and one 4×64-byte FIFO 46. On the egress side, the UTOPIA interface includes ninety-six 4×64-byte FIFOs 48 and a UTOPIA output 50.

The ingress portion of the port processor 10 also includes a switch mapper 52, a parallel to serial switch fabric interface 54, and a request arbitrator 56. The egress portion of the port processor also includes a serial to parallel switch fabric interface 58, a switch demapper 60, and a grant generator 62.

For processing ATM and packet traffic, the port processor 10 utilizes, at the ingress portion, a descriptor constructor 64, an IPF and ATM lookup processor 66, an IP classification processor 68, an RED/Policing processor 70, all of which may be located off-chip. These units process ATM cells and packets before handing them to a (receive) data link manager 72. At the egress portion of the port processor, a (transmit) data link manager 74 and a transmit scheduler and shaper 76 are provided. Both of these units may be located off-chip. The port processor is also provided with a host interface 78 and a weighted round robin scheduler 80.

The purpose of the port processor at ingress to the switch is to unpack TDM, Packet, and ATM data and frame it according to the data frame described below with respect to FIG. 3. The port processor also buffers TDM and packet data while making arbitration requests for link bandwidth through the switch element and grants arbitration requests received through the switch as described in more detail below. In order to maintain timing for TDM traffic, the V1–V4 bytes in the SONET frame are stripped off and the VC bytes are buffered at the ingress to the switch. In rows having both PDU and TDM traffic, it is preferable that the PDUs are configured early and the TDM slots are configured late in the row. At the egress of the switch, the port processor reassembles TDM, Packet, and ATM data. The V1–V4 bytes are regenerated at the egress from the switch.

Though not shown in FIG. 1, the port processor 10 includes dual switch element interfaces which permit it to be coupled to two switch elements or to two ports of one switch element. When both interfaces are used, the "standby" link carries only frame information until a failure in the main link occurs and then data is sent via the standby link. This provides for redundancy in the switch so that connections are maintained even if a portion of the switch fails.

Turning now to FIG. 2, a switch element 100 according to the invention includes twelve "datapath and link bandwidth arbitration modules" 102 (shown only once in FIG. 2 for clarity). Each module 102 provides one link input 104 and one link output 106 through the switch element 100. Those skilled in the art will appreciate that data entering any link input can, depending on routing information, exit through any link output. According to the invention, each module 102 provides two forward datapaths 108, 110, 112, 114 and one return "grant" path 116, 118. The three paths are collectively referred to as constituting a single channel. The reason why two datapaths are provided is to increase the bandwidth of each channel. The two datapaths are interleaved to provide a single "logical" serial datastream which exceeds (doubles) the bandwidth of a single physical datastream. Data is routed from an input link 104 to an output link 106 via an input link bus 120 and an output link bus 122. Return path grants are routed from an output link 106 to an input link 104 via a grant bus 124.

The forward datapaths of each "datapath and link bandwidth arbitration module" 102 include a data stream deserializer 126, a data stream demapper 128, a row buffer mapper 130, a row buffer 132, a request arbitration module 134, a data stream mapper 136, and a data stream serializer 138. The return grant path for each module 102 includes a grant stream deserializer 140, a grant stream demapper 142, a grant arbitration module 144, a grant stream mapper 146, and a grant stream serializer 148.

The switch element 100 also includes the following modules which are instantiated only once and which support the functions of the twelve "datapath and link bandwidth arbitration modules" 102: a link synchronization and timing control 150, a request parser 152, a grant parser 154, and a link RISC processor 156. The switch element 100 also includes the following modules which are instantiated only once and which support the other modules, but which are not directly involved in "switching": a configuration RISC processor 158, a system control module 160, a test pattern generator and analyzer 162, a test interface bus multiplexer 164, a unilink PLL 166, a core PLL 168, and a JTAG interface 170.

Figure 4:
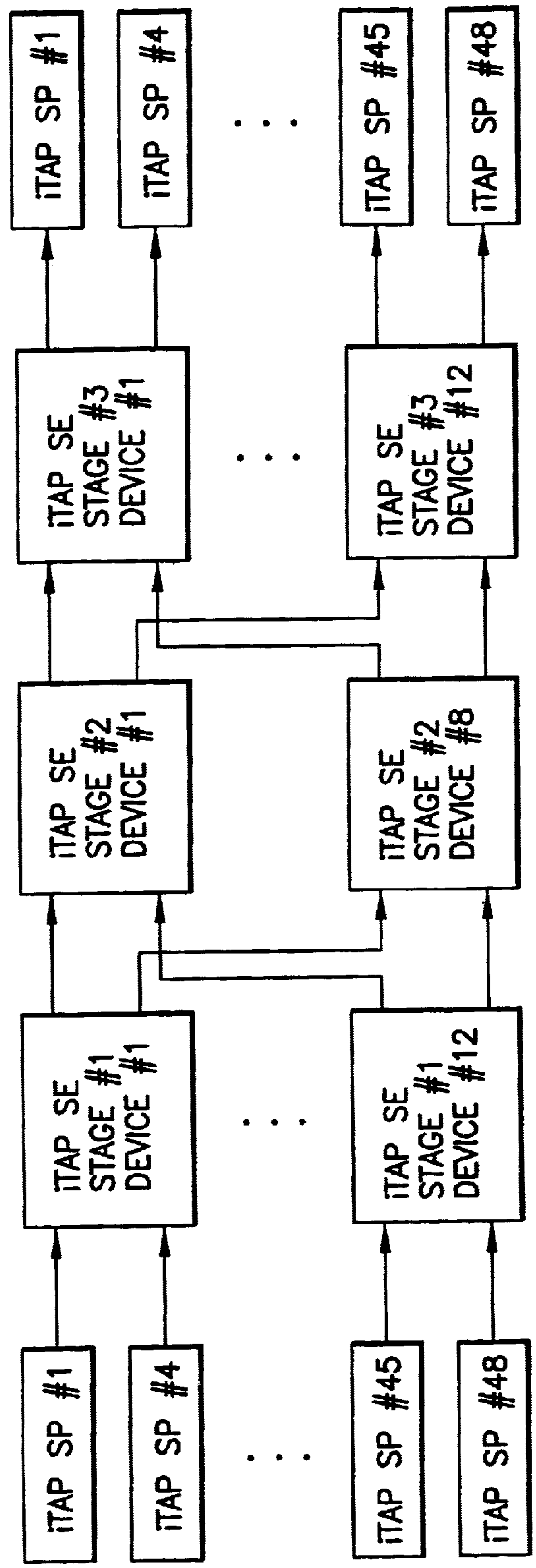
FIG. 4 is a schematic illustration of a three stage 48×48 switch according to the invention.
Figure 5:
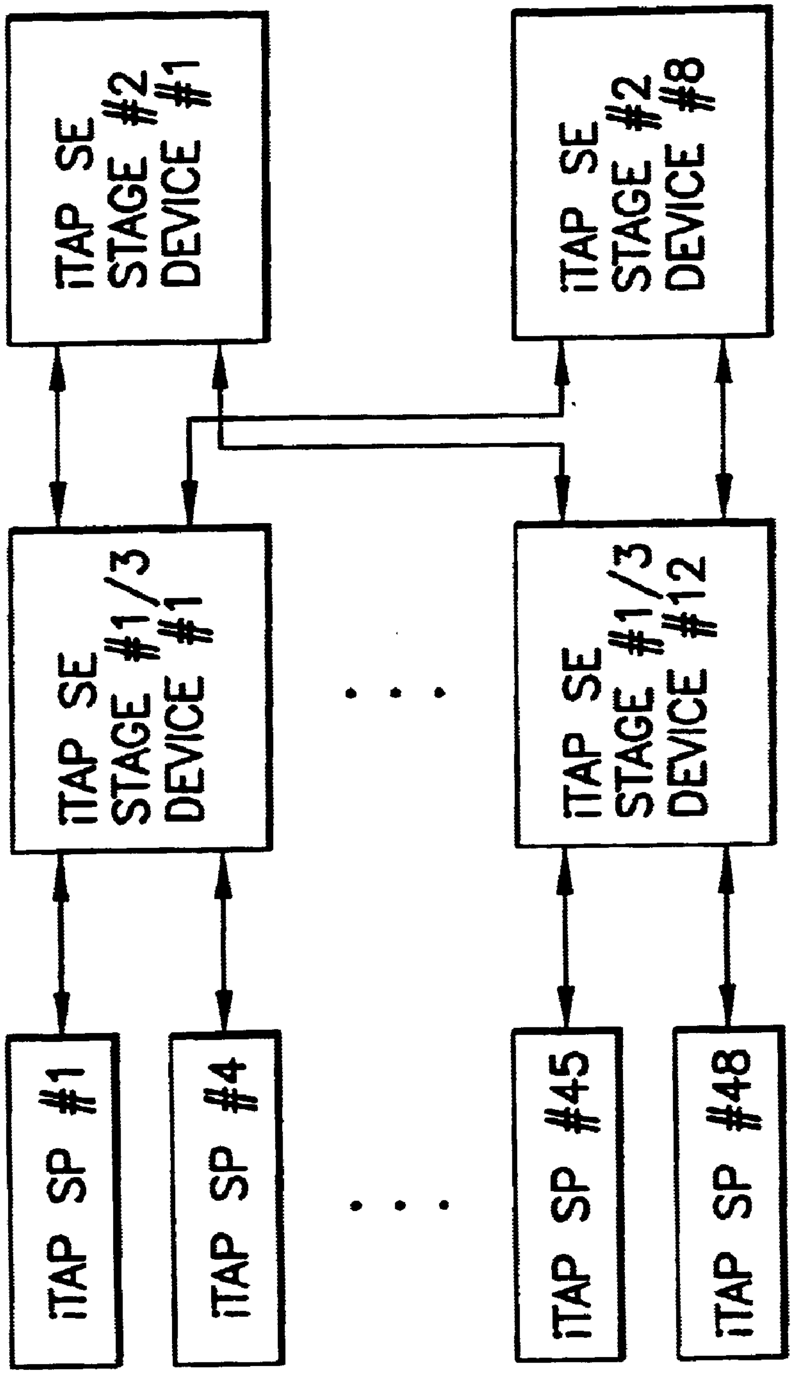
FIG. 5 is a schematic illustration of a 48×48 folded Clos architecture switch according to the invention.

A typical switch according to the invention includes multiple port processors 10 and multiple switch elements 100. For example, as shown in FIG. 4, forty-eight "input" port processors are coupled to twelve "first stage" switch elements, four to each. Each of the first stage switch elements is coupled to eight second stage switch elements. Each of the second stage switch elements is coupled to twelve third stage switch elements. Four "output" port processors are coupled to each of the third stage switch elements. From the foregoing, those skilled in the art will appreciate that the port processors and the switch elements of invention can be arranged in a folded Clos architecture as shown in FIG. 5 where a single switch element acts as both first stage and third stage.

Before describing in detail the functions of the port processor 10 and the switch element 100, it should be appreciated that the invention utilizes a unique framing technique which is well adapted to carry combinations of TDM, ATM, and Packet data in the same frame. Turning now to FIG. 3, according to the invention, a data frame of nine rows by 1700 slots is used to transport ATM, TDM, and Packet data from a port processor through one or more switch elements to a port processor. Each frame is transmitted in 125 microseconds, each row in 13.89 microseconds. Each slot includes a four-bit tag plus a four-byte payload (i.e., thirty-six bits). The slot bandwidth (1/1700 of the total frame) is 2.592 Mbps which is large enough to carry an E-1 signal with overhead. The four-bit tag is a cross connect pointer which is set up when a TDM connection is provisioned. The last twenty slots of the frame are reserved for link overhead (LOH). Thus, the frame is capable of carrying the equivalent of 1,680 E-1 TDM signals. The link overhead (LOH) in the last twenty slots of the frame is analogous in function to the line and section overhead in a SONET frame.

The contents of the LOH slots are inserted by the switch mapper (52 in FIG. 1). There are four types of data which may be inserted in the LOH slots. A 36-bit framing pattern is inserted into one of the twenty slots. The framing pattern is common to all output links and configurable via a software programmable register. A 32-bit status field is inserted into another slot. The status field is unique for each output link and is configurable via a software programmable register. A 32-bit switch and link identifier is inserted into another slot. The switch and link identifier includes a four bit link number, a twenty-four bit switch element ID, and a four bit stage number. A 32-bit stuff pattern is inserted into slots not used by framing, status, or ID. The stuff pattern is common to all output links and is configurable via a software programmable register.

For ATM and packet data, a PDU (protocol data unit) of sixteen slots is defined for a sixty-four-byte payload (large enough to accommodate an ATM cell with overhead). The format of the PDU is illustrated in FIG. 3*a*. A maximum of ninety-six PDUs per row is permitted (it being noted that the maximum number of ATM cells in a SONET OC-48 row is seventy-five). The sixteen four-bit tags (bit positions 32–35 in each slot) are not needed for PDU routing so they are used as parity bits to protect the ATM or IP payload. Of the sixty-four-byte payload, twelve bytes (96 bits) are used by the switch for internal routing (slots 0–2, bit positions 0–31). This leaves fifty-two bytes (slots 3–15) for actual payload which is sufficient to carry an ATM cell (without the one-byte HEC) and sufficient for larger packets after fragmentation. The PDUs are self-routed through the switch with a twenty-eight-bit routing tag (slot 0, bit positions 0–27) which allows routing through seven stages using four bits per stage. The remaining sixty-eight bits of the PDU are used for various other addressing information.

As shown in FIG. 3*a*, the PDU bits at slot 0, bits 30–31 are used to identify whether the PDU is idle (00), an ATM cell (01), an IP packet (10), or a control message (11). The two bits at slot 1, bit positions 30–31 are used to indicate the internal protocol version of the chip which produced the PDU. For Packets and control messages, the "valid bytes" field (slot 1, bits 24–29) are used to indicate how many payload bytes are carried by the PDU when the FragID field indicates that the PDU is the last fragment of a fragmented packet. The VOQID field (slot 1, bit positions 19–23) identifies the class of service for the PDU. The class of service can be a value from 0 to 31, where 0 is the highest priority and 31 is the lowest. The FragID at slot 1, bits 17–18 indicates whether this PDU is a complete packet (11), a first fragment (01), a middle fragment (00), or a last fragment (10). The A bit at slot 1, bit position 16 is set if reassembly for this packet is being aborted, e.g. because of early packet (or partial packet) discard operations. When this bit is set, fragments of the packet received until this point are discarded by the output port processor. The fields labelled FFS are reserved for future use. The Seq# field at slot 1, bits 0–3 is a modular counter which counts packet fragments. The DestFlowId field at slot 2, bits 0–16 identifies the "flow" in the destination port processor to which this PDU belongs. A "flow" is an active data connection. There are 128K flows per port processor.

As mentioned above, since ATM and Packet traffic are typically not provisioned, bandwidth must be arbitrated among ATM and Packet connections as traffic enters the system. Moreover, since TDM traffic shares the same frame as ATM and Packet traffic, bandwidth must be arbitrated while maintaining TDM timing. According to the invention, bandwidth is arbitrated by a system of requests and grants which is implemented for each PDU in each row of the frame. The request elements, which are generated by the port processors include "hop-by-hop" internal switch routing tags, switch element stage, and priority information. According to the presently preferred embodiment two request elements are sent in a three contiguous slot bundle and at least eight slots of non-request element traffic must be present between request element bundles. The time separation between request element bundles is used by the arbitration logic in the switch elements and the port processors to process the request elements. The presently preferred request element format is shown in section 7.1.5 of Appendix B.

Figure 3:
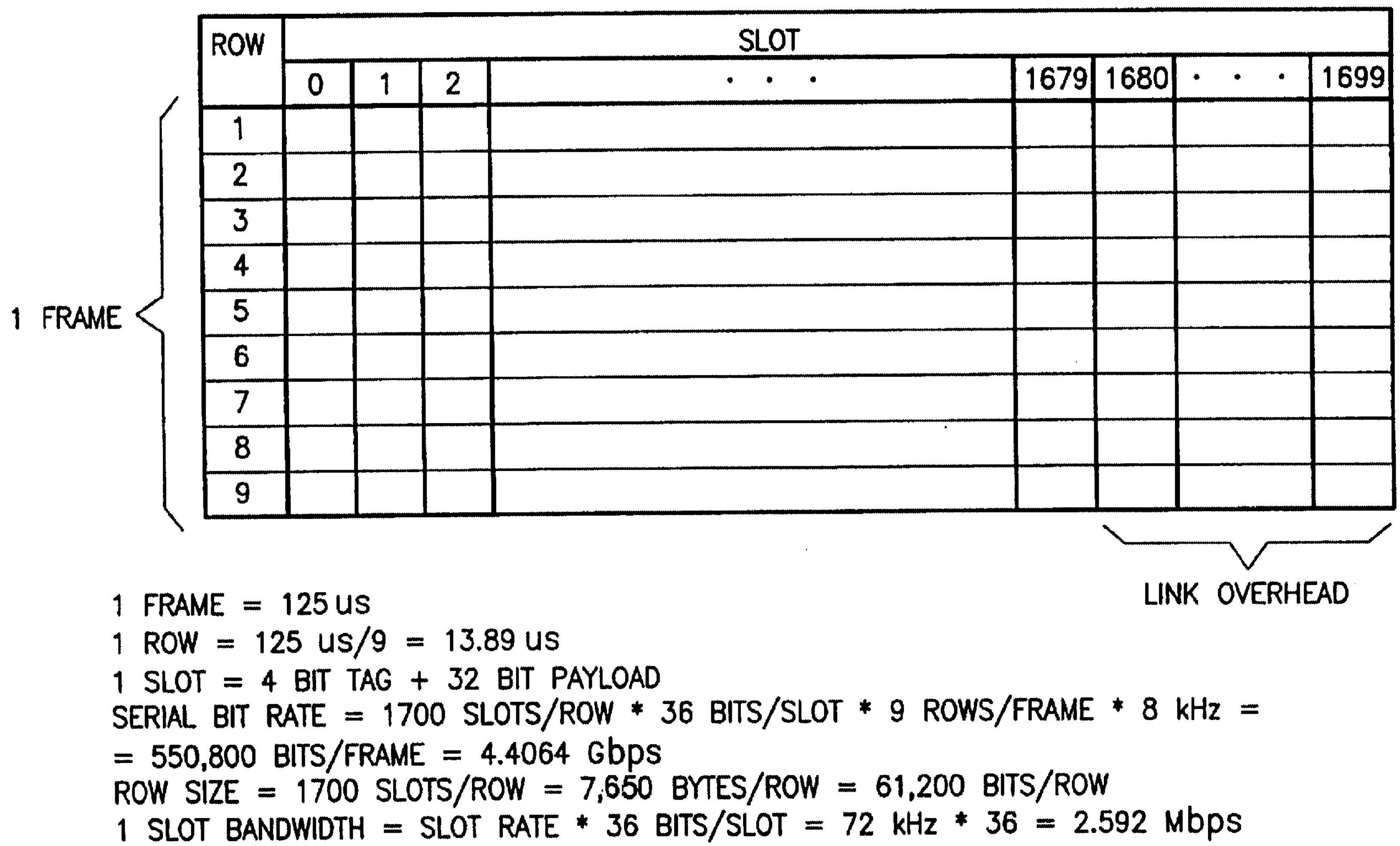
FIG. 3 is a schematic diagram illustrating the data frame structure of the invention.
Figure 3B:
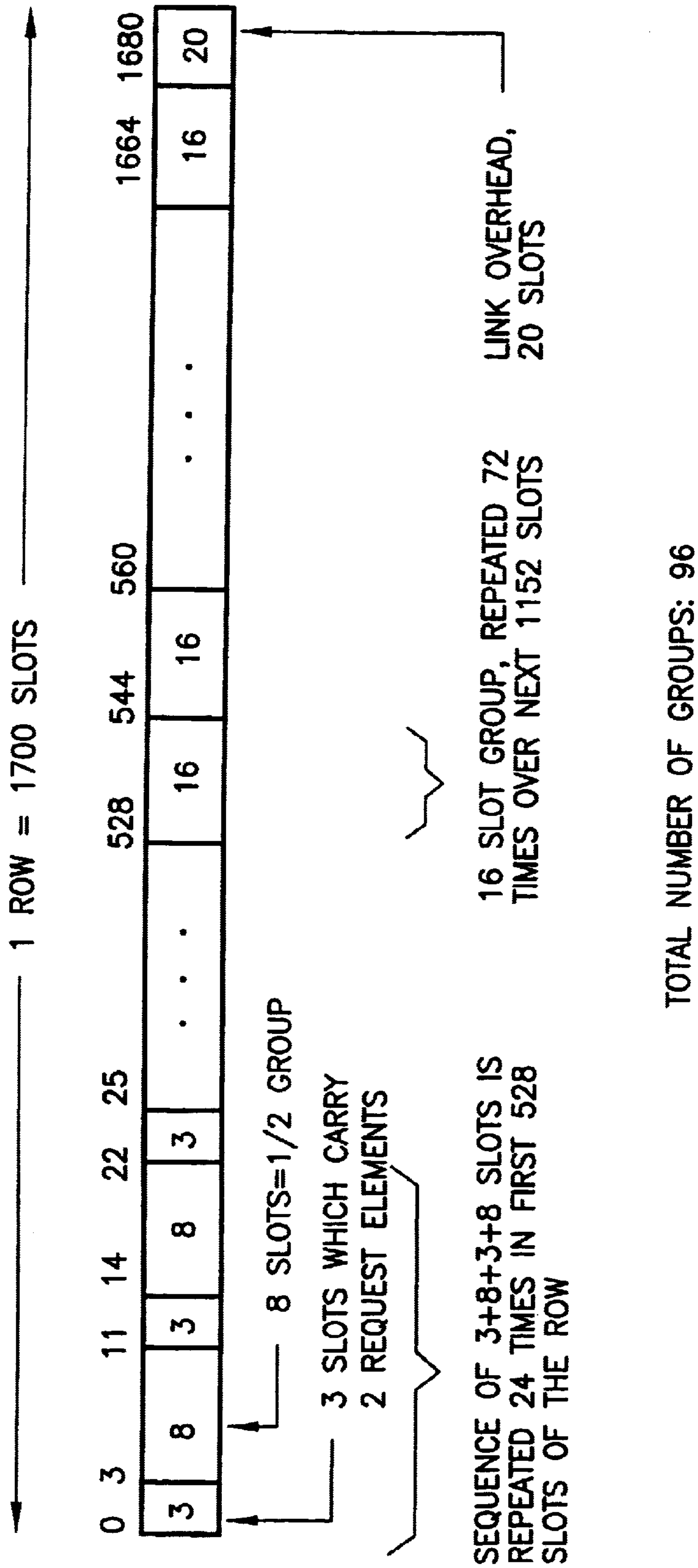
FIG. 3*b* is a schematic diagram illustrating the row structure including request elements to a first stage of the switch.

FIG. 3*b* illustrates one example of how the row slots may be allocated for carrying PDUs and request elements. As shown, the maximum PDU capacity for a row is ninety-six. A block of sixteen slots which is capable of carrying a single PDU is referred to as a "group". For each group in the row, 1.5 slots of bandwidth are required for carrying a forty-eight-bit request element (RE). FIG. 3*b* illustrates how two REs are inserted into three slots within each of the first twenty-four groups. All the REs should be carried within the row as early as possible in order to allow the REs to ripple through the multistage switch fabric as soon as possible after the start of a row. Section 7 of Appendix B explains in detail how this affects the arbitration process.

Figure 3C:
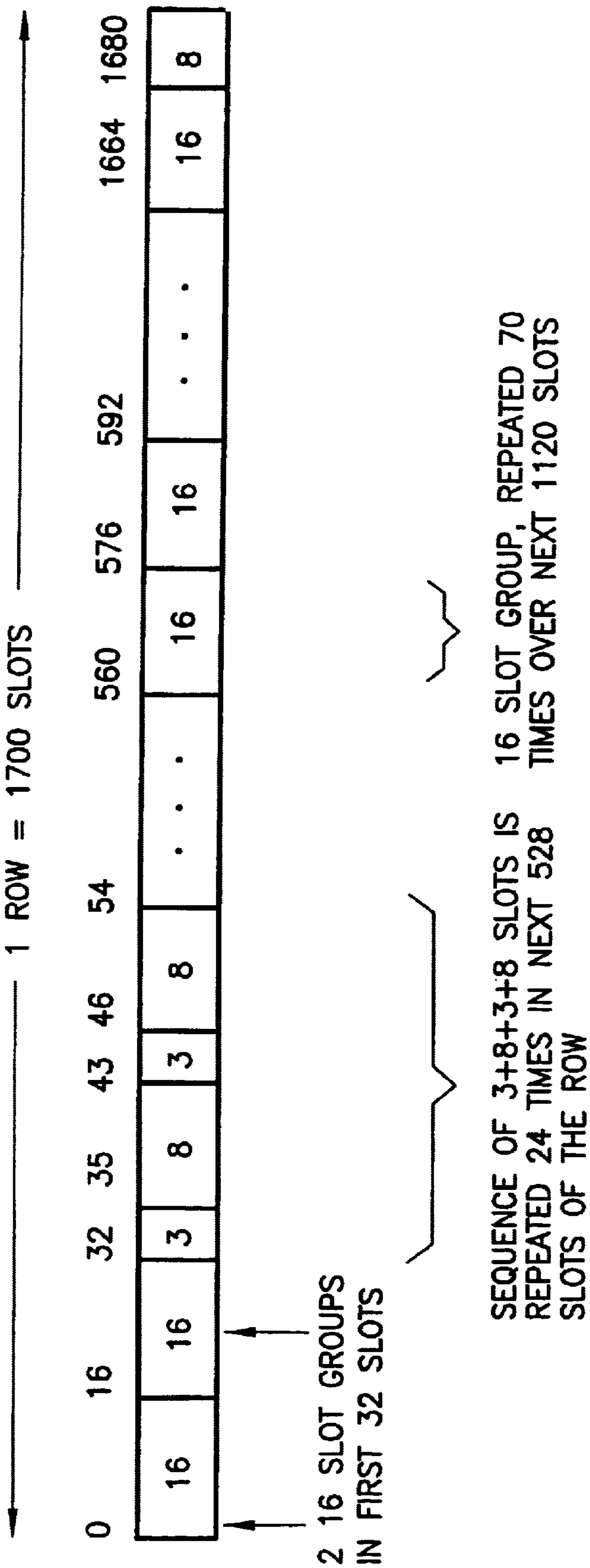
FIG. 3*c* is a schematic diagram illustrating the row structure including request elements to a second stage of the switch.

The structure shown in FIG. 3*b* is presently considered to be the optimal format (for the first link) given system requirements and implementation constraints. It places the REs early in the row but spaces them out enough to allow for arbitration. According to the presently preferred embodiment, the row structure is somewhat different depending on for which link of the switch it is configured. FIG. 3*b* represents the row structure between the port processor and a switch element of the first switch fabric stage. The first block of two REs occupy the first three slots of the row. The present implementation of the arbitration logic which processes REs requires at least twelve slot times of latency between each three-slot block of REs on the input link. Also, there must be some latency from when the first REs of the row are received by a switch element to when the REs are inserted into the output link of the switch element. This latency is used by the arbitration logic for mapping incoming REs into the RE buffers. Thus, the row structure for the link between the first stage and the second stage should have the first group of REs starting at slot time 32. This is illustrated in FIG. 3*c* which shows the same structure as FIG. 3*b* offset by thirty-two slot times.

According to the presently preferred embodiment, TDM traffic may be switched through the switch elements with a finest granularity of one slot per row. The TDM traffic is switched through the same path for a given slot for every row. The switch elements will not allow different switch paths for the same TDM data slot for different rows within the frame. This means that the switch does not care about what the current row number is (within a frame). The only time row numbering matters is when interpreting the contents of the Link Overhead slots.

With a finest granularity of one slot per row, the switch elements can switch TDM traffic with a minimum of 2.52 Mbps of switching bandwidth. Since a slot can carry the equivalent of four columns of traffic from a SONET SPE, it can be said that the switch elements switch TDM traffic with a granularity of a VT1.5 or VT2 channel. Although a VT1.5 channel only occupies three columns in the SONET SPE, it will still be mapped to the slot format which is capable of holding four SPE columns. As mentioned above, the format of the contents of the thirty-six-bit slot carrying TDM traffic is a four-bit tag and a thirty-two bits of payload. The tag field definitions are shown in Table 1 below.

TABLE 1

| | |
|---|---|
| 0000 | Idle |
| 0001 | reserved |
| 1010 | reserved |
| 1011 | Data present |
| 1100 | V5 byte in bits 31–24 |
| 1101 | V5 byte in bits 23–16 |
| 1110 | V5 byte in bits 15–8 |
| 1111 | V5 byte in bits 7–0 |

The switch elements know whether or not a slot contains TDM data via preconfigured connection tables. These tables are implemented as an Input Cross Connect RAM for each input link. The input slot number is the address into the RAM, while the data output of the RAM contains the destination output link and slot number. The connection table can be changed by a centralized system controller which can send control messages to the switch elements via either of two paths: (1) a host interface port or (2) in-band control messages which are sent via the link data channel. Since TDM connections will be changed infrequently, this relatively slow control message approach to update the connection tables is acceptable. It is the responsibility of an external software module to determine and configure the connection tables within the switch elements such that no TDM data will be lost.

Returning now to FIG. 1, the receive side SONET interface of the port processor 10 includes the deserializer 12 and framer 14. This interface may be configured as one OC-48, 16-bits wide at 155 MHz, four OC-12s, serially at 622 MHz, or four OC-3s, serially at 155 MHz. When configured as one OC-48, the deserializer 12 is not used. When configured as four OC-12s or one OC-48, the deserializer 12 converts the serial data stream to a sixteen-bit wide parallel stream. The deserializer 12 includes circuitry to divide the input serial clocks by sixteen. The inputs to the deserializer include a one-bit serial data input, a one-bit 622 MHz clock and a one-bit 155 MHz clock. The outputs include a sixteen-bit parallel data output, a one-bit 38.87 MHz clock and a 9.72 MHz clock. The SONET interfaces are described in more detail in sections 3.2 and 3.3 of Appendix A.

Parallel data is sent to the SONET framer and transport overhead (TOH) block 14. All incoming signals are framed according to the BELLCORE GR-253 standard which is incorporated herein by reference. The byte boundary and the frame boundary are found by scanning a series of sixteen bit words for the F628 pattern. The framer frames on the pattern F6F6F6282828. Independent SONET SPEs within the STS-N frame are demultiplexed by the framer 14. There is a maximum of four independent line interfaces, therefore the framer 14 includes four independent framers. The inputs to the framer include a sixteen-bit parallel data input, and a one-bit clock which will accept 155 MHz, 38.87 MHz, or 9.72 MHz. The outputs of the framer include a sixteen-bit parallel data output, a one-bit start of frame (SOF) indication, a six-bit SPE ID used to indicate SONET SPE number. The SPEs are numbered 1 through 48 with respect to the line side port configuration.

The block 14 also terminates the transport (section and line) overhead for each independent SONET SPE. Since there are a maximum of forty-eight OC-1s on the line side, forty-eight transport overhead blocks are provided unless blocks are time-shared. The inputs to the TOH termination are the same as those discussed above with respect to the framer. The six-bit SPE ID enables data into this block. There is no need for an output data bus as the traffic is routed to this block and to the next block (Ptr Proc 16) on the same data bus. The data path only flows into this block, not through it.

The pointer processor 16 uses the SONET pointer (H1, H2 and H3 bytes in the TOH) to correctly locate the start of the payload data being carried in the SONET envelope. The SONET pointer identifies the location of byte #1 of the path overhead. The pointer processor 16 is responsible for accommodating pointer justifications that were inserted in order to justify the frequency difference between the payload data and the SONET envelope. Since there are a maximum of forty-eight OC-1s, forty-eight pointer processor blocks are mated to the forty-eight transport overhead termination blocks unless blocks are time-shared. The inputs to the pointer processor 16 are the same as those to the framer and TOH terminator 14. The outputs include a sixteen-bit parallel data output, a one-bit start of SPE indicator which coincides with word 1 of SPE 3, a one-bit SPE valid indicator which gaps out overhead and accommodates pointer movements, and a one-bit POH valid indicator which indicates when a path overhead byte is on the output bus.

The POH processor 18 processes the nine bytes of Path Overhead in each of the forty-eight SONET SPEs. Since there are a maximum of forty-eight SPEs, forty-eight path overhead processors are provided unless processors are time-shared. The inputs to the path overhead processor 18 include an eight-bit parallel data input, a four-bit SPE ID, the one-bit start of SPE indicator, and the one-bit POH valid indicator. The outputs include a one-bit V1 indicator, J1 info, alarms, and path status. Further details about blocks 14, 16, and 18 are provided by the GR-253 standard and documentation accompanying standard SONET mapper/demappers such as those available from Lucent or TranSwitch.

Once the frame boundaries of the incoming SONET/SDH signals are found and the location of the SPEs has been identified either through pointer processing or through Telecom bus I/F control signals, and the Path Overhead is processed, the payload is extracted from the SPE. The SPEs may be carrying TDM traffic, ATM cells or IP packets. The type of traffic for each SPE is configured through the microprocessor interface 78. Each SPE can carry only one type of traffic. The data from each SPE is routed directly to the correct payload extractor.

SPEs containing packets and ATM cells are sent to the HDLC framer 20 and the cell delineation block 22, respectively. Each SPE can be configured to carry packet data (packet over SONET). The Port Processor 10 supports packet over SONET for the following SONET (SDH) signals: STS-1 (VC-3), STS-3c (VC-4), STS-12c (VC-4–4c), and STS-48c (VC-4–16c). The datagrams are encapsulated in PPP packets which are framed using the HDLC protocol. The HDLC frames are mapped byte-wise into SONET SPEs and high order SDH VCs. The HDLC framer 20 performs HDLC framing and forwards the PPP packet to a FIFO buffer 24 where it awaits assembly into PDUs. The framer 20 has an input which includes a sixteen-bit parallel data input, a six-bit SPE ID, a one-bit SPE valid indicator, and a one-bit PYLD valid indicator. The output of the framer 20 includes a sixteen-bit data bus, a one-bit start of packet indicator, and a one-bit end of packet indicator. Further details about packet extraction from SONET are found in IETF (Internet Engineering Task Force) RFC 1619 (1999) which is incorporated herein by reference.

The cell delineation block 22 is based on ITU-T G.804, "ATM Cell Mapping into Plesiochronous Digital Hierarch (PDH)", 1998, the complete disclosure of which is hereby incorporated herein by reference. The cell delineation block 22 has inputs which include a sixteen-bit parallel data bus, a six-bit SPE ID, a one-bit SPE valid indicator, and a one-bit POH valid indicator. The outputs include a sixteen-bit parallel data bus and a one-bit start of cell indicator. Cells are placed in a FIFO 24 while awaiting assembly into PDUs. Further details regarding ATM extraction from SONET are found in ITU-T G.804.

The TDM data is routed to a TDM demultiplexer and low order pointer processor block 26 where the low order VTs and VCs are identified. If a particular SPE is configured for TDM data, then the TDM mapping is described using the host interface 78. Each SPE can carry a combination of VC-11, VC-12, VC-2, VC-3 & VC-4. There are seven VT groups in a single STS-1 payload, each VT group has twelve columns. Within one VT Group all of the VTs must be the same. Different VT groups within the same STS-1 SPE can carry different VT types, but within the group it is required that all VTs be of the same type. The VCs and VTs are demultiplexed out of the SONET signal based on the configuration for each of the SPEs. There is no interpretation of the traffic required to locate the containers and tributaries as all of this information is found in the configuration table (not shown) which is configured via the host interface 78. Frames are located inside of the VCs and the VTs through the H4 byte in the path overhead of the SPE. Pointer processing is performed as indicated by the V bytes in the VT superframe. The TDM demultiplexer and low order pointer processor block 26 has inputs which include sixteen bits of parallel data, a six-bits SPE ID, a one-bit start of SPE indicator, a one-bit SPE valid indicator, a one-bit V1 indicator, and one-bit POH valid indicator. The TDM demultiplexer and low order pointer processor block 26 provides the following outputs to the switch mapper 52: sixteen bits of parallel data, a one-bit VT/VC valid indicator, a six-bit SPE ID, and a five-bit VT/VC Number (0–27). The TDM data is placed in reserved slots in the frame as mentioned above and described in more detail below with reference to the switch mapper 52. Further details regarding TDM extraction are found in the GR-253 specification IP packets and ATM cells from the UTOPIA interface 44 are placed in FIFO 46. Packets and cells from the FIFOs 24 are merged with the packets and cells from the FIFO 46. The descriptor constructor 64 determines whether the data is an ATM cell or an IP packet and generates a corresponding interrupt to trigger the IPF/ATM look-up processor 66 to perform either IP routing look-up or ATM look-up. IP routing look-up is performed by searching for the IP destination address for every packet and the IP source address for packets that need classification. ATM look-up is performed by searching the VPI/VCI fields of the cells. Outputs of the IPF/ATM look-up processor 66 for both IP packets and ATM cells include a seventeen-bit flow index, a five-bit QOS index, and an indicator showing whether the IP packet needs classification. If the IP packet needs classification, the packet is passed to the IP classification processor 68 for classification; otherwise it is passed to the next stage of packet processing, the RED/policing processor 70. IP classification is described in detail in section 6.4 of Appendix A. The RED/Policing processor 70 performs random early detection and weighted random early detection for IP congestion control, performs leaky bucket policing for ATM traffic control, and performs early packet and partial packet discard for controlling ATM traffic which contains packets. The RED/Policing traffic control is described in detail in sections 7.5 et seq. of Appendix A. The presently preferred embodiment of the port processor 10 includes a mode register (not shown) which can be placed in a bypass mode to globally turn off the IP/ATM forwarding. In bypass mode, an external device is used for IP/ATM forwarding, and the data descriptors generated by the descriptor constructor 64 are routed directly to an output FIFO (not shown).

All of the data stored in the FIFOs 24 and 46 is in fifty-two-byte "chunks". If an IP packet is longer than fifty-two-bytes, it is segmented into multiple fifty-two-byte chunks. The input data descriptor for each chunk includes indications of whether the chunk is an ATM cell or a packet, whether it is the start of a packet or the end of a packet, packet length, and the source and destination port numbers. After processing by the IPF/ATM lookup processor 66 and the IP classification processor 68, an output data descriptor is written to a FIFO (not shown) which is read by the RED/Policing processor 70.

Cells and packets which survive RED/policing are read by the receive data link manager 72 which creates the PDUs described above with reference to FIG. 3*a*. The receive data link manager is described in detail in section 8 of Appendix A. According to the presently preferred embodiment, processed cells and packets are stored in an external FIFO which is read whenever it is not empty.

As shown in FIG. 1, the switch mapper 52 receives TDM traffic from the TDM demultiplexer and low order pointer processor 26 as well as PDUs from the data link manager 72. As mentioned above, the switch mapper also receives request elements. The request elements are formed by the arbiter 56 as described in more detail below. It is the function of the switch mapper (also referred to as the data mapper in Appendix A) to arrange TDM data, PDUS, and request elements in the frame described above with reference to FIGS. 3 and 3*a–c*.

The switch mapper 52 includes a state machine (not shown) which is associated with the ATM/IP PDUs. The data link manager 72 writes the PDU's using a sixty-four-bit interface to the external FIFO (not shown). The data is transmitted from the external FIFO to the switch mapper 52 in thirty-two-bit slots with four bits of parity. The state machine associated with the external PDU FIFO monitors the status of the FIFO and maintains data integrity.

In section 9 of Appendix A, the data link manager 72, arbiter block 56, switch mapper 52, and weighted round robin scheduler 80, together with memory and other support circuits (not shown in FIG. 1) are referred to collectively as the "receive switch controller". As described in detail above, each incoming ATM cell and packet is processed by performing a lookup based on the ATM VPI/VCI or on the IP source and destination. This lookup first verifies that the connection is active, and if active, it returns. a seventeen-bit index. For ATM cells, the index points to a set of per VC parameters and to routing information. For packets, the index points to a set of queuing parameters and to routing information. The seventeen-bit index supports a maximum of 128K simultaneous IP and ATM flows through the port processor. The ATM cells are encapsulated in a cell container and stored in one of 128K queues in external memory. These 128K queues are managed by the data link manager 72. As mentioned above, the IP packets are fragmented into fifty-two-byte blocks and each of these blocks is encapsulated in a cell container (PDU). These cell containers are also stored in one of the 128K queues in external memory by the data link manager. The 128K IP/ATM flows are aggregated into one of thirty-two QOS queues for scheduling through the switch. The data link manager 72 also aggregates all the control headers required for transmission of cells through the switch into the QOS queues and inserts these routing tags into one of thirty-one QOS routing tag FIFOS. One of the queues, is reserved for high priority traffic. Any cells arriving in the high priority queue will interrupt the scheduler 80 and will be scheduled to leave the high priority queue immediately.

The scheduler 80 is responsible for scheduling cell containers through the switch. The scheduling algorithm used is weighted round robin which operates on the QOS queues. Once cells have been scheduled from these queues, the control headers from these queues are forwarded to the arbiter 56 and are stored in a request control table (not shown). The request arbiter 56 forms request elements from the control headers and forwards these requests to the switch data mapper 52 for transmission through the switch. The grants received in response to these requests are deserialized by block 58, deframed and transferred back to the arbiter block 56 by the grant block 62. For granted requests, the cell containers are dequeued from external memory by the data link manager 72 and transferred to the switch mapper 52 for transmission through the switch.

As mentioned above, the port processor 10 supports redundancy in order to improve reliability. Two redundancy schemes are supported. In the first redundancy scheme, the switch controller supports redundant routing tags and transparent route switch-over. In the second redundancy scheme, the port processor supports redundant data channels in both input and output directions. The redundant data channels connect to two separate switch fabrics. In the Appendices they are referred to as the A and B data channels. Each control header contains two routing tags, and each routing tag has a corresponding AB channel tag. This provides for two routes through the switch for data transmission. If both routing tags have the same channel tag, this allows for two alternate paths through the same switch fabric. If both routing tags have different channel tags, this allows for a redundant switch fabric and any route failing in one switch fabric will cause a switch-over to use the redundant switch fabric. An AB channel tag is used to indicate whether the data is to be routed using the A data channel or the B data channel. If, after a programmable number of consecutive tries, no grant is received in response to request elements using the A channel routing tag, a bit is set to switch over to the B channel routing tag. Further details of the redundancy feature are provided in sections 10.2.3 and 9.2.3 of Appendix A.

As mentioned above, the arbiter 56 is responsible for sending requests to the switch mapper 52 and processing the grants that arrive from the grant demapper 62. The arbiter dequeues requests from a routing tag FIFO, copies this information into a request control table, writes the FLOWID into FLOWID RAM, resets a request trial counter that counts the number of times a request has been tried, and resets the grant bit. Each request message has a unique request ID which is returned in the grant message. The request ID is the index in the arbiter request control table into which the routing tag is copied. The routing tag along with the request ID is forwarded to a routing tag formatter block which formats the routing tag into a request message and inserts the request into a request FIFO in the switch mapper 52.

The grant demapper in the grant block 62 stores the request ID and the grant in a FIFO called the grant_reqid FIFO. In the arbiter block 56, the request IDs are dequeued from A and B grant_reqid FIFOS alternatively depending on whether the switchover bit is set. The request IDs dequeued from the FIFO are used to set a grant bit in the grant register at the bit position indicated by the request ID, to index the FLOWID RAM, and read the FLOWID associated with the request ID. This FLOWID is written into a deq-flowid FIFO for the appropriate channel, i.e. if the request ID is dequeued from the A reqid_fifo, the FLOWID is written into the A deqflowid_fifo. The data link manager 72 monitors the deqflowid_fifo and uses the FLOWID to dequeue data PDUs from external memory and send them to the switch mapper 52 for transmission in the next row time.

An end_of_grants signal is asserted by the grant demapper 62, when no more grants can be received at the grant demapper. In most switch implementations the end_of_grants signal is rarely, if ever, asserted. It is only in switches having many stages that the end_of_grants signal is more likely to be asserted. Once the end of grant signal has been received the arbiter 56 begins the process of updating the request control table. If a grant has not been returned for a routing tag stored in the request control table, the request trial counter is incremented and a new request is generated using the routing tag. If a routing tag in the request control table has been sent as a RE a (programmed) maximum number of times, the most significant fifteen bits of the FLOWID are used to index into the redundancy control table and update the bit to indicate failure of the current path and to select the alternate routing path. Further details regarding the arbiter block 56 are provided at section 9.2.4 of Appendix A.

As described above, the TDM data, ATM/IP PDU's and the request messages are combined into a single data stream for transmission through the switch fabric. This combination is performed by the switch mapper 52 on the receive side of the port processor. On the transmit side of the port processor, a switch demapper 60 separates TDM data from ATM/IP PDUs. According to the presently preferred embodiment, the demapper 60 is provided with external memory for a PDU FIFO. For ATM/IP data, the demapper writes PDUs to the FIFO and interrupts the data link manager 74. The data link manager 74 reads the header information from the PDU FIFO, and extracts the FLOWID. Based on the FLOWID, the datalink manager 74 retrieves a Linked List/Shaping/Scheduling data structure from external memory. The data link manager 74 writes the linked list pointers to the PDU FIFO, then initiates a DMA transfer to move the PDU to external memory. The data link manager updates the head, tail, and count fields in the Linked List/Shaping/Scheduling data structure and passes the data structure to the Shaping/Scheduling processor 76 through a Shaping/Scheduling FIFO. The Shaping/Scheduling processor 76 performs the Shaping and Scheduling functions and updates the Linked List/Shaping/Scheduling datastructure.

The data flow from external memory to the SONET/UTOPIA Data FIFOs 30 and 48 is as follows. The data link manager 74 polls the PDU FIFO and SONET/UTOPIA FIFO status flags. If the PDU FIFO is not empty and the SONET/UTOPIA FIFO is not full for a particular output port, the data link manager 74 retrieves the Link List/Shaping/Scheduling data structure for the Flow ID read from the PDU FIFO. (Note that for an IP packet flow, the data link manager will continue to retrieve PDUs from the Linked List until a PDU with an End of Packet indicator is found.) The data link manager then initiates a DMA transfer from external memory to the SONET/UTOPIA FIFOs 30, 48. The data link manager 74 then updates the Link List/Shaping/Scheduling data structure and writes it back to external memory.

On the transmit side of the port processor 10, the grant framer, deframer, serializer and deserializer in the grant block 62, the switch demapper 60, the transmit datalink manager 74, and the transmit scheduler and shaper 76 are referred to collectively as the transmit (TX) switch controller in Appendix A. The TX switch controller is responsible for either accepting or rejecting requests that come into the port processor for output transmission. To do this, the TX switch controller checks if the queue identified by the output port number of the request can accept a cell container. These one hundred twenty-eight queues are managed by the TX data link manager 74. According to the presently preferred embodiment, these queues are stored in external memory. The scheduling of these cell containers is performed by the TX scheduler 76. If the queue can accept the cell container, the request is turned into a grant and inserted into a grant_fifo. The grant-framer and serializer 62 reads this information and creates an grant message for transmission through the grant path.

The TX switch controller monitors the status of the data queues for each of the one hundred twenty-eight output ports using the following three rules. If the full_status bit for the requested output port is set, there is no buffer space in the queue for any data PDUs destined for that output port and all requests to that output port are denied. If the full_status bit is not set and the nearly_full_status bit is set, there is some space in the queue for data PDUs destined for that output port; however this space may be reserved for higher priority traffic. In this instance the QOS number is checked against a threshold (programmed) QOS number and if the QOS number is less than the threshold, the request will be accepted. If the nearly full_status bit is not set, all incoming requests are granted. If a request is accepted, the corresponding output port counter is incremented. This reserves space in the data buffer (30 or 48) for the arrival of the data PDU at that output port. The transmit data link manager 74 constantly monitors the one hundred twenty-eight output port counters and sets/resets the one hundred twenty-eight full and nearly full status bits.

The port processor 10 creates complete outgoing SONET signals. All of the transport and path overhead functions are supported. The SONET interfaces can run in source timing mode or loop timing mode.

The high order pointer is adjusted by the high order pointer generator 38 through positive and negative pointer justifications to accommodate timing differences in the clocks used to generate the SONET frames and the clock used to generate the SONET SPES. At initialization, SPE FIFOs are allowed to fill to halfway before data is taken out. The variations around the center point are monitored to determine if the rate of the SONET envelope is greater than or less than the rate of the SPE. If the rate of the SONET envelope is greater than the rate of the SPE, then the SPE FIFO will gradually approach a more empty state. In this case, positive pointer movements will be issued in order to give the SPE an opportunity to send additional data. If the rate of the SONET envelope is less than the rate of the SPE, then the SPE FIFO will gradually approach a more full state. In this case, negative pointer movements will be issued in order to give the SPE an opportunity to output an extra byte of data from the FIFO. The SONET framer and TOH generator 40 generate transport overhead according to the BELLCORE GR-253 standard.

The outgoing SONET frames are generated from either the timing recovered from the receive side SONET interface or from the source timing of the Port Processor. Each signal is configured separately and they can be configured differently. The frame orientation of the outgoing SONET frames is arbitrary. Each of the four signals can be running off different timing so there is no need to try to synchronize them together as they will constantly drift apart. There is no need to frame align the Tx ports to the Rx ports as this would result in realigning the Tx port after every realignment of the Rx port.

For OC-3 and OC-12 the 16-bit wide internal bus is serialized to 155 Mbps or 622 Mbps by the serializer 42. For OC-48 applications, the entire sixteen bit bus is output under the control of an external serializer (not shown).

There is a potential for forty-eight different SPEs being generated for the outgoing SONET interfaces. All of these SPEs are generated from a single timing reference. This allows all of the SPE generators to be shared among all of the SONET and Telecom bus interfaces without multiplexing between the different clocks of the different SONET timing domains. The SPE consists of the Path level overhead and the payload data. The payload data can be TDM, ATM or packet. All of these traffic types are mapped into single SPEs or concatenated SPEs as required by their respective standards. As the SPEs are generated, they are deposited into SPE FIFOs. For each SPE there is a sixty-four-byte FIFO and these individual SPE FIFOs are concatenated through SPE concatenation configuration registers. As described above, the fill status of the SPE FIFOs is used to determine the correct time to perform a positive or negative pointer justification.

TDM, ATM and packet data are all mapped into SONET SPEs as specified by their respective standards. The type of data carried in each of the potential forty-eight SPEs is configured through the external host processor. Based on this configuration, each SPE generator is allocated the correct type of mapper. All of this configuration is performed at initialization and can only be changed when the particular SPE is first disabled. Once the configuration is complete, there is an isolated set of functional blocks allocated to each SPE. This set of functional blocks includes one of each of the following: payload mapper, payload FIFO, POH generator, SPE FIFO and SPE generator. Each of the ATM and packet payload mappers has a payload FIFO into which it writes payload data for a particular SPE. For TDM traffic, each potential Virtual Container is allocated its own FIFO.

Returning now to FIG. 2, in each "datapath and link bandwidth arbitration module" 102, the data stream deserializer 126 synchronizes to the incoming serial data stream and then reassembles the row stream which is transported using two physical unilink channels. It also provides FIFO buffering on each of the two incoming serial streams so that the streams may be "deskewed" prior to row reassembly. It recovers the thirty-six-bit slot data from the row stream in a third FIFO which is used for deskewing the twelve input links. This deskewing allows all the input links to forward slot N to the switching core simultaneously. The link deskewing is controlled by the link synchronization and timing control module 150. The deserializer 126 also continuously monitors the delta between where slot 0 of the incoming row is versus the internal row boundary signal within the switch element. The difference is reported to the Link RISC Processor 156 and is used (in the first stage of a switch) as part of the ranging process to synchronize the port processor connected to the input link.

The data stream demapper 128 is responsible for extracting the data from the incoming serial data links. It demaps the input link slots based on the input slot number and determines whether the traffic is TDM, PDU, or a request element (RE). For TDM traffic, the demapper determines the destination link and row buffer 132 memory address. This information is stored in a demapper RAM (not shown) which is configured by software when TDM connections are added or torn down. For PDU traffic, the demapper 128 assembles all sixteen slots which make up the PDU into a single 64-byte PDU word, then forwards this entire PDU word to the row buffer mapper logic 130. The PDUs are assembled prior to forwarding them to the row buffer 132 so that the row buffer mapper 130 can write the entire PDU to the row buffer 132 in a single clock cycle. This provides the maximum possible write-side memory bandwidth to the row buffer 132. It is a significant feature of the switch element that twelve entire PDUs are written to a single row buffer in six link slot times (twelve core clock cycles). For request elements, the demapper 128 assembles the three-slot block of REs into two forty-eight-bit REs and forwards them to the request parser module 152. A detailed description of the data stream demapper 128 is provided in Sections 4.3.1 et seq. of Appendix B.

The row buffer mapper 130 is responsible for mapping traffic which is received from the data stream demapper 128 into the row buffer 132. The mapper 130 provides FIFO buffers for the TDM traffic as it is received from the data stream demapper 128, then writes it to the row buffer 132. The row buffer memory address is actually preconfigured in the demapper RAM (not shown) within the data stream demapper module 128. That module forwards the address to the row buffer mapper 130 along with the TDM slot data. The mapper 130 also writes PDU traffic from the data stream demapper 128 to the row buffer 132 and computes the address within the row buffer 132 where each PDU will be written. PDUs are written into the row buffers starting at address 0 and then every sixteen-slot address boundary thereafter, up to the maximum configured number of PDU addresses for the row buffer 132. A detailed description of the row buffer mapper 130 is provided in Section 4.3.1.4 of Appendix B.

The row buffer 132 contains the row buffer memory elements. According to the presently preferred embodiment, it provides double buffered row storage which allows one row buffer to be written during row N while the row data which was written during row N−1 is being read out by the data stream mapper 136. Each row buffer is capable of storing 1536 slots of data. This allows the row buffer to store ninety-six PDUs or 1536 TDM slots or a combination of the two traffic types. Request elements and link overhead slots are NOT sent to the row buffer 132. Therefore the row buffer does not need to be sized to accommodate the entire 1700 input link slots. According to the presently preferred embodiment, the row buffer write port is 16*36=576 bits wide and it supports writing of only one thirty-six-bit slot (TDM data) or writing of an entire 576-bit word (PDU data) in a single clock cycle. A detailed description of the row buffer 132 is provided in Section 4.3.1.4 of Appendix B.

Request arbitration utilizes two components: a centralized request parser module 152 and a request arbitration module 134 for each of the output links. Request elements are extracted from the input slot stream by the data stream demapper 128 and are forwarded to the request parser 152. The request parser 152 forwards the forty-eight-bit request elements to the appropriate request arbitration module 134 via two request buses (part of the input link bus 120). Each request bus may contain a new request element each core clock cycle. This timing allows the request arbitration logic to process thirteen request sources in less than eight core clock cycles. The thirteen request sources are the twelve input data streams and the internal multicast and in-band control messaging module 156. The request arbitration module 134 monitors the two request element buses and reads in all request elements which are targeted for output links the request arbitration module is implementing. According to the presently preferred embodiment, the request arbitration module 134 provides buffering for up to twenty-four request elements. When a new request element is received, it is stored in a free RE buffer (not shown). If there are not any free RE buffers, then the lowest priority RE which is already stored in a buffer is replaced with the new RE if the new RE is a higher priority. If the new RE is equal to or lower in priority than all REs currently stored in the RE buffers then the new RE is discarded. On the output side, when the data stream mapper module 138 is ready to receive the next RE, the request arbitration module 134 forwards the highest priority RE which is stored in the RE buffers to the data stream mapper module 136. If the RE buffers are empty, then an "Idle" RE is forwarded. A detailed description of the request arbitration module 134 is provided in Section 7 of Appendix B.

The data stream mapper 136 is responsible for inserting data and request elements into the outgoing serial data links. This includes mapping of the output link slots based on the output slot number to determine if the traffic is TDM, PDU, request element, or test traffic. The determination is based on the contents of the mapper RAM (not shown). For TDM traffic, the row buffer memory address is determined from the mapper RAM which is configured by software as TDM connections are added or torn down. For PDU traffic, the data stream mapper 136 reads one slot at a time from the row buffer 132. The row buffer memory address is stored in the mapper RAM by software. If the target PDU is not valid (i.e., a PDU was not written to that row buffer location during the previous row time), then the mapper 136 transmits an idle pattern in order to ensure that a data PDU is not duplicated within the switch. For request elements, the mapper assembles the three-slot block of REs from two forty-eight-bit REs. The REs are read from the request arbitration module 134. For test patterns, the mapper 136 inserts the appropriate test pattern from the output link bus 122. These test patterns are created by either the test pattern generator 162 or test interface bus 164 modules.

The data stream mapper supports slot multicasting at the output stage. For example, the data stream mapper for any output link is able to copy whatever any other output link is sending out on the current slot time. This copying is controlled via the mapper RAM and allows the mapper to copy the output data from another output link on a slot-by-slot basis. A detailed description of the data stream mapper 136 is provided in Section 4 of Appendix B.

The data stream serializer 138 creates the output link serial stream. Data slots are received via the data stream mapper module 136 and the link overhead is generated internally by the data stream serializer 138. The serializer 138 also splits the row data stream into two streams for transmission on the two paths 110, 114. A detailed description of this module is provided in Section 11 of Appendix B.

The grant stream deserializer 140 in each module 102 works in much the same manner as the data stream deserializer 126. The primary difference is that the grant data only utilizes a single path, thus eliminating the need for deskewing and deinterleaving to recover a single input serial stream. Since this serial link is only one half the data stream rate of the forward link, there are 850 slots per row time. A single FIFO (not shown) is used to allow for deskewing of the input serial grant streams for all 12 links. A detailed description of the grant stream deserializer 140 is provided in Section 11 of Appendix B.

The grant stream demapper 142 is responsible for extracting the data from the incoming serial grant links. This includes demapping of the received grant link slots based on the input slot number to determine if the traffic is a grant element or another kind of traffic. The determination is based on the contents of the grant demapper RAM (not shown). According to the presently preferred embodiment, traffic other than grant elements is not yet defined. For grant elements, the grant stream demapper 142 assembles the three-slot block of GEs into two forty-eight-bit GEs and forwards them to the single grant parser module 154. A detailed description of the grant stream demapper 142 is provided in Section 7.2.3.2 of Appendix B.

The grant arbitration module 144 operates in an identical manner to the request arbitration logic 134. In the presently preferred embodiment, this module is identical to the request arbitration module. The only difference is that it processes grant elements in the reverse path instead of request elements in the forward path. It will be recalled that grant elements are, in fact, the request elements which have been returned.

The grant stream mapper 146 is responsible for inserting data into the outgoing serial grant links. It maps the output grant slots based on the output slot number to determine if the traffic is a grant element or test traffic. The determination is based on the contents of the grant mapper RAM (not shown). For grant elements, it assembles the three-slot block of GEs from two forty-eight-bit GEs. The GEs are read from the grant arbitration module 144. For test patterns, it inserts the appropriate test pattern from the output link bus 122. These test patterns are created by either the test pattern generator 162 or the test interface bus 164 modules. A detailed description of the grant stream mapper 146 is provided in Section 7.2.3.2.

The grant stream serializer 148 works in much the same manner as the data stream serializer 138. The primary difference is that the grant data only utilizes a single path, thus eliminating the need for interleaving the transmit serial stream across multiple output serial streams. Since this serial link is only one half the forward data stream rate, there are only 850 slots per row time. A detailed description of the grant stream serializer 148 is provided in Section 11 of Appendix B.

The modules described above (except for the request parser and the grant parser) are instantiated for each link module 102 of which there are twelve for each switch element 100. The following modules are instantiated only once for each switch element.

The link synchronization & timing control 150 provides the global synchronization and timing signals used in the switch element. It generates transmission control signals so that all serial outputs start sending row data synchronized to the RSYNC (row synchronization) input reference. It also controls the deskewing FIFOs in the data stream deserializers so that all twelve input links will drive the data for slot N at the same time onto the input link bus 120. This same deskewing mechanism is implemented on the grant stream deserializers. A detailed description of the link synchronization and timing control 150 is provided in Section 10 of Appendix B.

The request parser 152 receives inputs from all thirteen request element sources and forwards the REs to the appropriate request arbitration modules via the two request element buses. A detailed description of the request parser 152 is provided in Section 7.2.1.1 of Appendix B.

The grant parser 154 physically operates in an identical manner to and is identical to the request parser 152. The only difference is that it processes grant elements in the reverse path instead of request elements in the forward path. As mentioned above, the grant elements contain the same information as the request elements, i.e. the link address through the switch from one port processor to another.

The link RISC processor 156 controls the ranging synchronization on the input links with the source port processors in the first stage of the switch fabric. It also controls the ranging synchronization on the output link grant stream input with the source port processors in the last stage of the switch fabric. It also handles the Req/Grant processing needed to transmit multicast messages and controls the reception and transmission of the in-band communications PDUs. All in-band communications PDUs are forwarded to the Configuration RISC Processor 158 which interprets the messages. The link RISC processor 156 only handles the Req/Grant processing needed to transmit multicast and in-band communications messages.

The configuration RISC controller 158 processes configuration and status messages received from an external controller module (not shown) and in-band communication messages as described above. The system control module 160 handles all the reset inputs and resets the appropriate internal modules. The configuration RISC controller 158 and the system control module 160 are preferably implemented with an Xtens™ processor from Tensilica, Inc., Santa Clara, Calif.

The test pattern generator and analyzer 162 is used for the generation of various test patterns which can be sent out on any slot on the data stream or grant stream outputs. It is also capable of monitoring input slots from either the received data stream or grant stream.

The test interface bus multiplexer 164 allows for sourcing transmit data from the external I/O pins and forwarding data to the I/O pins. This is used for testing the switch element when a port processor is not available.

The unilink PLL 166 is used to create the IF clock needed by the unilink macros. Within each unilink macro another PLL multiplies the IF clock up to the serial clock rate. The core PLL is used to create the clock used by the switch element core logic. In the presently preferred embodiment, the core clock is approximately 250 MHz. A detailed description of both PLLs is provided in Section 9 of Appendix B.

The JTAG interface 170 is used for two purposes: (1) boundary scan testing of the switch element at the ASIC fab and (2) Debug interface for the Configuration RISC Processor.

As shown in FIG. 2, there are three datapath buses (the input link bus 120, the output link bus 122, and the grant bus 124) which are used to move switched traffic from the input links to the output links. These buses are also used to carry traffic which is sourced or terminated internally within the switch element. The significant datapaths of the input link bus are summarized in Table 2 below. The significant datapaths of the output link bus are summarized in Table 3 below. The significant datapaths of the grant bus are summarized in Table 4 below.

TABLE 2

| Name | Qty | Width | Description | Source |
|---|---|---|---|---|
| islot_num | 1 | 11 | Current input slot number for traffic from the Data Stream Deserializers | Link Sync & Timing Ctrl |
| ilink_req_0 thru ilink_req_11 | 1 | 48 | Request elements received on the input link | Data Stream Demapper module for each input link |
| lcl_req_0 | 1 | 48 | Request elements generated locally | Link RISC Controller |
| req_a, req_b | 2 | 48 | Parsed request elements | Request Parser |
| ilink_tdm_data_0 thru ilink_req_11 | 12 | 47 | TDM data, 36-bit data + 11 bit destination row buffer address each input | Data Stream Demapper module for link. |
| ilink_tdm_dlink_0 thru ilink_tdm_dlink_11 | 12 | 4 | Destination output link (i.e., row buffer) identifier | Data Stream Demapper module for each input link |
| ilink_pdu_0 thru ilink_pdu_11 | 12 | 512 | Complete 64-byte PDU which has been assembled from the incoming slots | Data Stream Demapper module for each input link |
| ilink_pdu_flag_0 thru ilink_pdu_flag_11 | 12 | 13 | Each flag is asserted for each destination which the current PDU is addressed. Total destinations = 12 output links plus the internal MC & In-band Comm Controller | Data Stream Demapper module for each input link |
| lcl_pdu | 1 | 64 | Bus used to transport locally generated PDUs to the Data Stream Demappers | Link RISC Controller |

TABLE 3

| Name | Qty | Width | Description | Source |
|---|---|---|---|---|
| oslot_num | 1 | 11 | Current output slot number for traffic destined for the output links. | Link Sync & Timing Ctrl |
| rbuf_dout_0 thru rbuf_dout_11 | 12 | 36 | Slot data output from the row buffer. | Row Buffer for each output link. |
| rbuf_rd_addr | 12 | 12 | Row buffer read address. | Data Stream Mapper for each output link. |

TABLE 3-continued

| Name | Qty | Width | Description | Source |
|---|---|---|---|---|
| test_src1, test_src2, test_src3 | 3 | 35 | Test traffic sources. | Test Pattern Generator, Test Interface Bus |
| idle_ptrn | 1 | 36 | Idle pattern which is transmitted when no valid PDU data is available. | Data Stream Demapper module for each input link. |
| olink_req_0 thru olink_req_11 | 12 | 48 | Request elements for each output link. | Req Arbitration modules. |
| omap_data_0 thru omap_data_11 | 12 | 36 | Link output after the mapping multiplexers. All 12 outputs are fed back into each of the Data Stream Mappers so that TDM multicasting can be done. | Data Stream Mapper for each output link |

TABLE 4

| Name | Qty | Width | Description | Source |
|---|---|---|---|---|
| olink_gntslot_num | 1 | 10 | Current input slot number for traffic from the Grant Stream Deserializers | Link Sync & Timing Ctrl |
| olink_gnt_0 thru olink_gnt_11 | 12 | 48 | Grant elements received on the grant receiver which is associated with the output link. | Grant Stream Demapper. |
| olink_gntslot_0 thru olink_gndslot_11 | 12 | 36 | Demapped slots from the received grant stream. These are slots which are not carrying grant elements. | Grant Stream Demapper. |
| gnt_a, gnt_b | 2 | 48 | Parsed grant elements | Grant Parser |

According to the presently preferred embodiments, each switch element includes a multicast controller and a separate multicast PDU buffer. Two alternate embodiments are provided for multicasting. The first embodiment requires fewer gates and is best suited for an environment where multicasting is not a major portion of the traffic. The second embodiment requires many more gates to implement. However, it is better suited in an environment where multicasting is a frequent event. The second embodiment requires more latency in setting up a multicast path, but less latency in multicasting data.

The first embodiment is described in Section 5 of Appendix B. Multicast request elements flow through the switch in the same manner as standard unicast request elements. See Section 5.2 and FIG. 5.3 in Appendix B. At the point where the message needs to be multicast, the hop-by-hop field's bit code for that switch stage indicates that the request is multicast. The request is forwarded to the multicast controller. On the grant path, the multicast controller sources a grant if there is room for the data in the multicast recirculating buffers. Once the data has been transmitted to the multicast buffer, the multicast controller examines the data header and determines which output links it needs to be sent out on. At this point, the multicast controller sources a number of request messages which are handled in the same manner as unicast requests. See Section 5.2.2 of Appendix B. The process repeats with the sequence of send request, receive grant, transmit PDU. I.e, before each multicast PDU is transmitted, a request and a grant must traverse the switch. See FIG. 5.3 of Appendix B. This arrangement may be considered a "store and forward" arrangement. Such an arrangement introduces some latency with regard to the multicast data. In order to ameliorate some of this latency, the multicast PDUs (Section 5.3.1 of Appendix B) include a multicast cache tag (McCacheTag), a 4-bit tag which identifies the multicast cache entry to use when duplicating the PDU. As shown in FIG. 5-4 of Appendix B, the multicast controller compares the McCacheTag to a McCache (a subset of the routing table) before copying the PDU for multicasting. If there is no entry in the McCache which matches the McCacheTag, the PDU is discarded. Further details about the McCache and the McCacheTag are provided in Section 5.3.1.1 of Appendix B. The cache entries are loaded via a multicast parameter PDU (similar to a Request Element) which is illustrated in Section 5.3.2 of Appendix B. The first embodiment of multicasting supports up to 16,000 active multicast flows. The latency for each MC packet is two row times.

According to the second embodiment, a multicast path is reserved for a period of time by sending multiple requests (one for each hop) until all hops have been granted. Once the path is set up in this manner, PDUs are multicast one after the other with no latency until the reserved time expires or there are no more PDUs to transmit. Details of the second embodiment of multicasting are contained in Appendix C. Rather than "store and forward", the second embodiment implements a "bandwidth pre-allocation" mechanism. A multicast path (tree) is reserved for a period of time measured in "row times". The reservation process is illustrated in FIG. 5-2 of Appendix C. The latency of this embodiment is all in the set-up of the path which requires one row time for each hop through the switch. The multicast PDU of this embodiment, described in Section 5.2.1 of Appendix C does not include a cache tag, but is in other respects the same as the PDU of the first embodiment. The parameter PDU of this embodiment is described in Section 5.2.2 of Appendix C. The parameter PDU comprises slots 0–3. Slot 0 is the same as in a unicast request element. Slots 1 and 2 include a routing tag for one destination as well as other information for arbitrating link bandwidth. Slot includes an indication of the duration requested for the multicast session. The duration indication is 16-bits. The longest duration which can be requested is therefore 64,000 row times. As mentioned above, nine row times equals one SONET frame time. The second multicasting embodiment permits up to 128,000 active ongoing multicast flows. The latency of the second embodiment is N+1 row times to set up a multicast flow, where N is the number of stages of the switch, and N row times to pass data through the switch.

There have been described and illustrated herein several embodiments of a network switch which supports tdm, atm, and ip traffic. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as so claimed.

iTAP Service Processor Chip Specification

Appendix A
10/00

AUTHOR:

REVISION: 0.3

DATE: 31.AUG.2000

APPROVED:

THIS DOCUMENT IS THE PROPERTY OF ONEX COMMUNICATIONS CORPORATION AND IS DELIVERED ON THE EXPRESS CONDITION THAT IT NOT BE DISCLOSED, REPRODUCED IN WHOLE OR IN PART, OR USED FOR MANUFACTURE FOR ANYONE OTHER THAN ONEX COMMUNICATIONS CORPORATION WITHOUT ITS WRITTEN CONSENT, AND THAT NO RIGHT IS GRANTED TO DISCLOSE OR SO USE ANY INFORMATION CONTAINED IN SAID DOCUMENT. THIS RESTRICTION DOES NOT LIMIT THE RIGHT TO USE INFORMATION OBTAINED FROM OTHER SOURCES.

Copyright © 1999 Onex Communications Corporation. Onex and iTAP are trademarks of Onex Communications Corporation.

*Proprietary and Confidential Information of Onex Communications Corporation*

1 Overview

The iTAP Port Processor chip is a communications processor which extracts and maps TDM, ATM and IP payload data from and to SONET interface signals and a UTOPIA 2/3 ATM/POS interface.

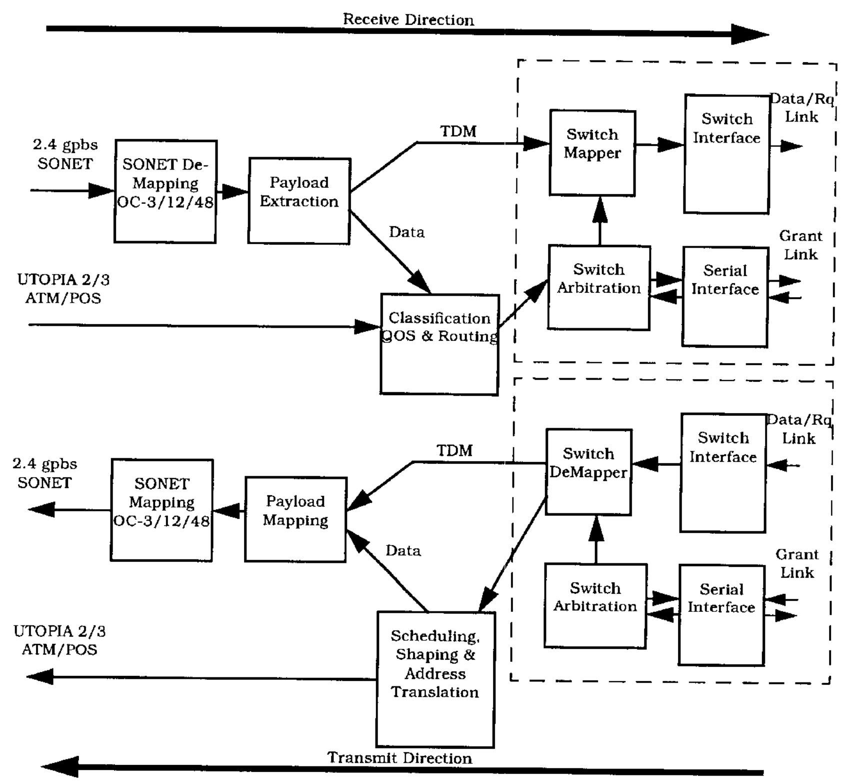

Figure 1: ITAP Port Processor Overview

As shown in Figure 1, data is received on two types of interfaces: SONET and UTOPIA. There are 4 separate SONET interfaces. These interfaces can be configured as 4 OC-3s or 4 OC-12s or a single OC-48. Transport and Path overhead temination functions are supported. There is an external serial DCC port provided to pass the DCC overhead bytes to an external unit.

The total of SONET interfaces is four and can not exceed 2.4 gbps. The single UTOPIA Interface can be configured as Level 2 or Level 3, ATM or packet. The UTOPIA interface can be used in addition to the SONET interfaces, but the aggregate bandwidth of all interfaces into the Port Processor can not exceed 2.4 gbps unless the switch interface is not used as would be the case in the single chip router application (this is discussed later in this section).

Payload data is extracted from the SPEs of the incoming SONET signals. The type of payload in each SPE is provisioned through the external microprocessor interface. TDM data is routed directly to a Switch Mapper and the ATM and IP data is extracted using cell delineation and HDLC processing and then routed to an internal microprocessor for further service. The UTOPIA POS-PHY data, ATM cells or variable-length packets, is routed directly to a series of internal traffic processors. These traffic processors perform connection ID validation, high-speed IP Forwarding, ATM VPI/VCI lookup, traffic classification, traffic policing and congestion control.

All of the receive traffic is destined for the Switch fabric and is mapped into an OneX proprietary row format. This row consists of NNN slots of 36 bits each. Each slot carries 4 bytes of data and 4 bits of control information. TDM data is allocated dedicated bandwidth through the switch fabric and the OneX proprietary row format is designed to optimally support TDM traffic down to the VC-11 and VC-12 level. Incoming TDM traffic is never buffered, it is routed directly to pre-allocated and pre-configured slots in the outgoing rows. ATM cells and PPP frames are not allocated dedicated bandwidth through the switch fabric. The bandwidth for these ATM and IP data units must be arbitrated through the switch and the destination Port Processor. The row is designed to support a super-slot or data-slot which is an aggregation of 16 single slots.

The switch row is serialized and distributed across high speed serial ports for transmission to the switch. The aggregate throughput to the switch is N.NN gbps.

In the Transmit Direction, the Port Processor responds to arbitration requests from a Switch chip. The arbitration grant from the Port Processor is based on the available buffer space in the traffic memory. TDM traffic and granted data traffic is received through the high speed switch interface. TDM traffic is mapped directly into outgoing SPEs. ATM Cells and PPP frames are all buffered externally where they wait to be scheduled out a transmit SONET or UTOPIA interface. There is an internal microprocessor that is dedicated to processing the transmit data units. This processor is responsible for scheduling, shaping and address translation. Once the data is scheduled, it is mapped into a SONET SPE or is routed to the UTOPIA interface.

OC-3, OC-12 and OC-48 frames are generated and Transport and Path overhead generation functions are supported in the Port Processor. An external serial port is available for DCC input. As in the receive direction, the total of SONET interfaces is four and can not exceed 2.4 gbps. The single UTOPIA Interface can be configured as Level 2 or Level 3, ATM or packet. The UTOPIA interface can be used in addition to the combination of SONET and Telecom Bus interfaces, but the total aggregate bandwidth out of the Port Processor can not exceed 2.4 gbps except when the switch interface is not used.

There is a data path connection between the SONET interfaces and the UTOPIA Interface. This is provided to enable a single chip routing function. In this mode no Switch chips are required.

The Port Processor can store a total of 50 ms worth of data received at an OC-48 rate. This equates to 2.488 gbps/50ms = 124,400 Mbits = ~16MBytes. This 16 MBytes of memory is split between the Rx side and the Tx side of the PP. The ratio of the split is TBD.

The Port Processor is able to process packets and cells at an OC-48 rate. This equates to (2.488 gbps X 86/90)/(48bytes/packet X 8bits/byte) = 6.19 Mpackets/s = 160ns and for cells (2.488 gbps X 86/90)/(53bytes/packet X 8bits/byte) = 5.61 Mcells/s = 178ns.

The host processor interface is based on mailboxes and is described in detail in a later section .

1.1 Features

- Line Interfaces

1. SONET
   - 4 X OC-3
   - 4 X OC-12
   - 1 X OC-48
2. Telecom Bus
   - Parallel(?)
   - Serial
3. UTOPIA
   - Level 2/3
   - ATM / Packet
   - 100 MHz See the feature list in the Product Outline...

*Proprietary and Confidential Information of Onex Communications Corporation*

*Proprietary and Confidential Information of Onex Communications Corporation*

2 Synchronization

The timing domains are shown in the following figures. Each signal that crosses a timing domain boundary needs to be handled carefully to assure that no ill effects of meta-stability will be seen. Single bit signals are double sampled in the destination timing domain. Multi-bit buses will be sampled in the destination timing domain after a single bit asynchronous enable signal indicates that the data bus is stable.

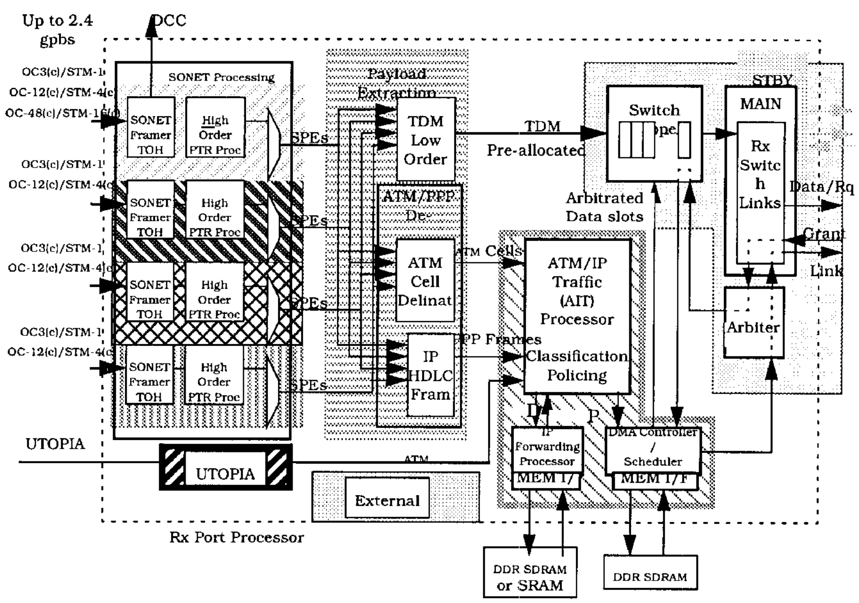

6

Proprietary and Confidential Information of Onex Communications Corporation

*Proprietary and Confidential Information of Onex Communications Corporation*
3 External Port Descriptions
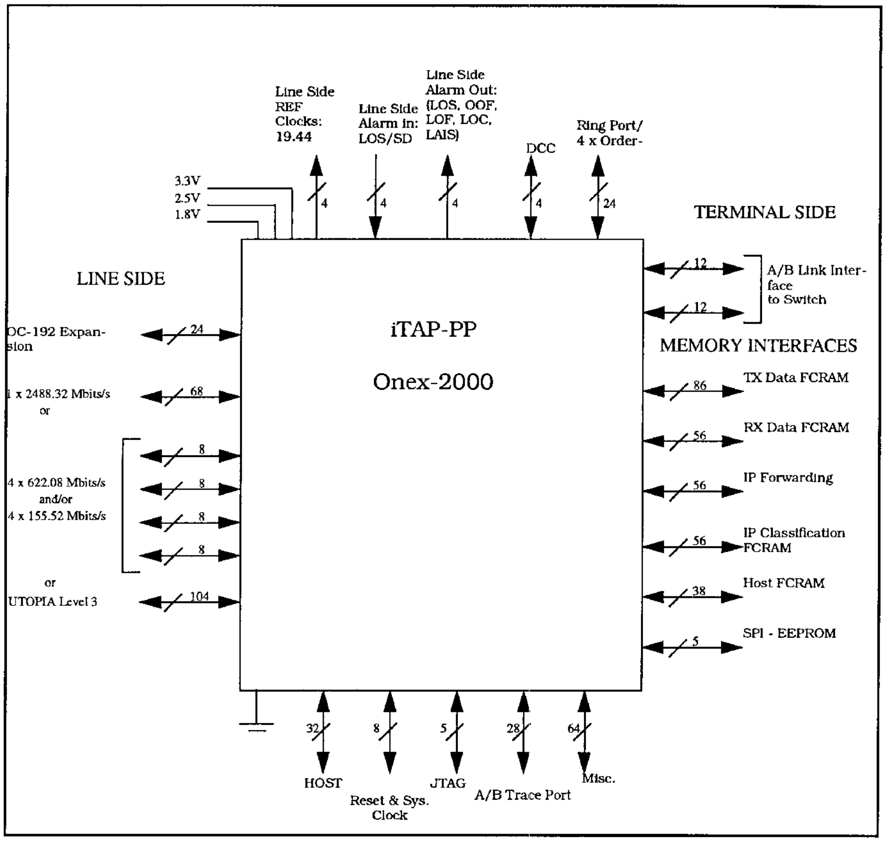

*Proprietary and Confidential Information of Onex Communications Corporation*

3.1 Utopia L3 Port 32 bit wide Utopia L3 interface configurable for Master or slave.

3.2 OC-3/12/48

On the line side the PP supports four interfaces. The PP can be run in a single chip application. For a single PP application the total SDH/SONET/Telecom Bus interface can be 2.5Gbits/s interfacing to the Utopia port.

1. A single sixteen bit 155MHz LVPECL parallel interface to support one STS-48/48c or STM-16/16c.
2. Four 622/155Mhz serial LVPECL interfaces to support either STS-12/12c, STM-4/4c, STS-3/3c and/or STM-1.
3. One Utopia L3 interface to support ATM and IP traffic.

3.3 OC-192/STM-16 Expansion Port

The OC-192/STM-16 expansion port will allow for connection of four iTap PP. An external multiplexer will be required to mux the four OC-48 signals to OC-192.

3.4 Line Side ReferenceClocks

In the transmit direction the PP can be configured to provide self-time and loop-time on a per-port basis. Also, the PP has four reference clock outputs, each corresponding to a SDH/SONET interface. A configuration register selects the frequency of these clocks. The clock rates are a divided down 8Khz or 19.44Mhz from the received clock.

3.5 Alarm In

RESERVED

3.6 Alarm Out

RESERVED

3.7 DCC

RESERVED

3.8 Ring Port and Orderwire (Still Defining)

RESERVED

3.9 Terminal Side Switch Links

RESERVED

3.10 TX and RX Data FCRAM port Interfaces

RESERVED

3.11 IP Forwarding and Classification FCRAM

RESERVED

3.12 FCRAM Host Interface Memory

RESERVED

3.13 Serial Boot Prom

RESERVED

3.14 Miscellaneous Pins

RESERVED

3.15 Internal Processor Trace Port

RESERVED

3.16 JTAG

RESERVED

3.17 Rest & System Clock

RESERVED

3.18 Host Interface

RESERVED

3.19 Power Pins

The PP uses 1.8V for core operation with 1.8/2.5/3.3V for I/Os.

*Proprietary and Confidential Information of Onex Communications Corporation*

//

*Proprietary and Confidential Information of Onex Communications Corporation*

4 Data Path Description

RESERVED

Proprietary and Confidential Information of Onex Communications Corporation

Proprietary and Confidential Information of Onex Communications Corporation

4.1 Receive Data Path

RESERVED

4.1.1 Receive Side Block Diagram

4.1.2 Receive Side SONET Interfaces

- RESERVED

4.1.2.1 Serial to Parallel Conversion

RESERVED

4.1.2.2 SONET Framing

RESERVED.

4.1.2.3 Transport Overhead Termination

RESERVED

4.1.2.4 Pointer Processing (H1, H2, H3)

RESERVED

*Proprietary and Confidential Information of Onex Communications Corporation*

4.1.3 Receive Side SONET Interfaces

.RESERVED

4.1.3.1 Serial to Parallel Conversion

RESERVED

4.1.3.2 SONET Framing & Descrambling

RESERVED

4.1.3.3 Transport Overhead Termination

RESERVED

4.1.3.4 OC-48 Data and Timing Multiplexors

RESERVED

4.1.3.5 High Order Pointer Tracking (H1, H2, H3)

RESERVED

4.1.4 Receive Side SONET Overhead Processing

RESERVED

4.1.4.1 Transport Overhead Termination

RESERVED

4.1.4.1.1 Orderwire

RESERVED

4.1.4.1.2 Section & Line DCC

RESERVED.

4.1.4.2 Path Overhead Processor

RESERVED

4.1.5 OC-48c

RESERVED

4.1.6 Receive Side Telecom Bus I/F

RESERVED

4.1.7 SPE Mux

RESERVED.

4.1.8 SPE Processing

RESERVED

4.1.8.1 Payload Extraction

RESERVED

4.1.8.1.1 TDM Demultiplexing from SONET/SDH

RESERVED

Proprietary and Confidential Information of Onex Communications Corporation

4.1.8.1.2 ATM Extraction From SONET/SDH

RESERVED

4.1.8.1.3 IP Extraction Out of SONET

RESERVED

*Proprietary and Confidential Information of Onex Communications Corporation*

5 Descriptor Builder

5.1 Overview

RESERVED

5.2 Functions

RESERVED

5.3 Input Data Structure

RESERVED

5.4 Output Data Structure

RESERVED

5.5 Diags, Test Modes and "T" bytes

RESERVED

5.6 Input Traffic Types

RESERVED

5.6.1 ATM & AAL5 Cells

RESERVED

5.6.2

RESERVED

5.6.3 IPv4

RESERVED

5.6.4 IPv6

RESERVED

5.6.5

RESERVED

5.6.6 MPLS

RESERVED

5.6.7 Frame Relay

RESERVED

5.7 TIE Instructions:

RESERVED.

Proprietary and Confidential Information of Onex Communications Corporation

6 Traffic Forwarding and Classification

Traffic forwarding and classification block (TFC) performs the function of IP packet layer 3 route lookup, IP classification, ATM cell VPI/VCI lookup, Frame Relay DLCI lookup and MPLS label lookup. The design goals and worst case processing times are listed in Table 6-1, "Design Goals," on page 27.

Table 6-1: Design Goals

| Traffic Type | # of Flows / Routing Entries | Line Rate | Cell/Pkt Rate @ MIN PDU | Processing time |
|---|---|---|---|---|
| ATM cell | upto 128K | 2.488 Gbps | 5.61M cps | 180 ns |
| IP packet | upto 128K | 2.488 Gbps | 6.19M pps | 160 ns |
| FR packet | upto 128K | 2.488 Gbps | 6.19M pps | 160 ns |
| MPLS packet | upto 128K | 2.488 Gbps | 6.19M pps | 160 ns |

Note that for each traffic type, upto 128K flows are supported, however, the sum of flows from all four traffic types shall not exceed 128K.

6.1 Data Flow

The following block diagram shows the components of and the data flow through the TFC block.

Proprietary and Confidential Information of Onex Communications Corporation

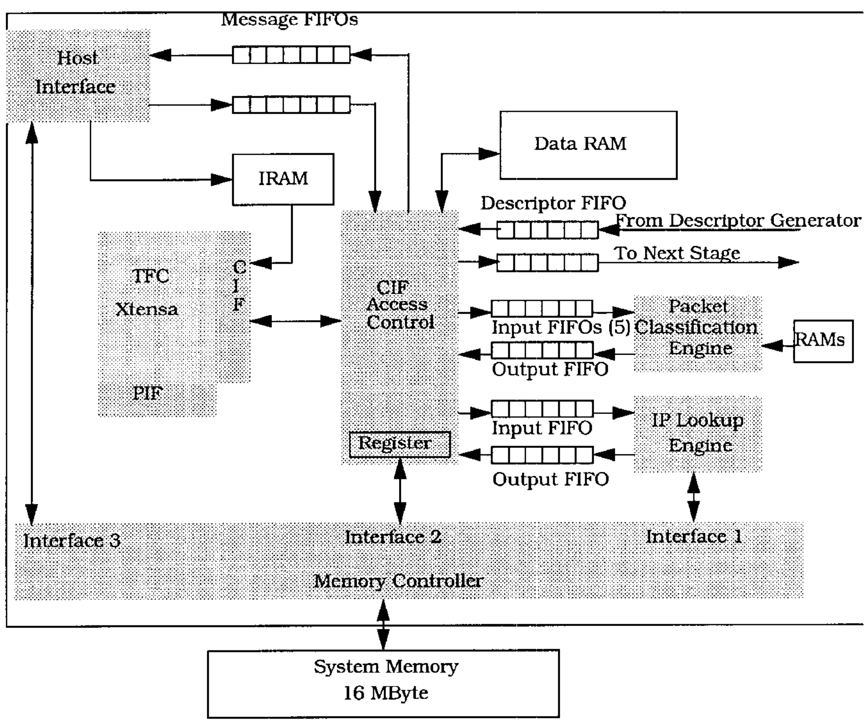

IP packets, ATM cells, Frame Relay and MPLS packets are merged into one flow at the SONET and UTOPIA interface. TFC block receives a traffic descriptor from the Descriptor Builder for each data chunk PDU (52 bytes). Based on traffic type, the TFC processor performs the corresponding lookup/classification functions. The results of lookup and classification are mergered and combined with fields from incoming descriptor to form a new outgoing descriptor, which is passed to the next stage of packet processing.

There is a mode register, Bypass, which globally turns off the Traffic Forwarding and Classification. In this mode, a external device is used for forwarding and/or classification, and the data descriptors generated are routed directly to the next packet processing stage.

The shaded block are implemented in hardware, please refer to Section 6.10 on page 31 for implementation details.

6.1.1 Inputs to IPF block

RESERVED

6.1.2 Outputs of IPF block

RESERVED

*Proprietary and Confidential Information of Onex Communications Corporation*

6.2 Overview of IP Routing Table Lookup Algorithms

RESERVED

6.2.1 Multi-bit Trie with controlled prefix expansion

RESERVED

6.2.2 Binary Search on prefix length with Hash tables

RESERVED

6.2.3 Binary(multi-way) Search on prefix ranges

RESERVED

6.3 Search Structure for Multi-bit Trie

RESERVED

6.3.1 Storage requirement and data structure

RESERVED

6.3.1.1 Search Data Structure

RESERVED

6.3.1.2 Determine expansion levels

RESERVED

6.3.1.3 Storage requirement

RESERVED

6.3.1.4 Techniques to reduce storage requirement

6.3.1.4.1 Packed Node

RESERVED

6.3.1.4.2 Leaf Pushing

RESERVED

6.3.2 IP Search database construction

RESERVED

6.3.3 Pseudo-code for Search, Insertion and Deletion

RESERVED

6.3.4 Improvement to Insertion/Deletion scheme

RESERVED

6.3.4.1 Incremental Deletion with reduced binary radix tree

RESERVED

6.3.4.2 Storage analysis for Patricia tree

*Proprietary and Confidential Information of Onex Communications Corporation*

6.3.4.3 Special case for Class B address update when first stride is 16

RESERVED

6.3.5 TIE Instructions

RESERVED

6.3.5.1 Configuration (State) Registers

RESERVED

6.3.5.2 TIE Instruction Syntax

RESERVED

6.4 IP Packet Classification

The function of packet classification is to indentify the flow a packet belongs to, based on one or more fields in the packet header. The most common fields are the IP destination address(32 bits), IP source address(32 bits), protocol type (8 bits), and TCP/UDP port numbers (16 bits each) of destination and source applications, and TCP flags. The classification rule set, aka filter database, consists of N rules $R_1$, $R_2$, ... , $R_N$ over K fields (dimensions). Each rule R is a K-tuple (F[*1*], F[2], ... , F[*k*]), where F[*i*] is a range (interval) of values the fields *i* may take; each rule also associats with a priority. A query is done for every packet upon the arrival of the packet. A packet $P = [f_1, f_2, ...., f_k]$, where each $f_i$ is a singleton value, matches rule R if for all packet fields *i*, $f_i$ of packet *P* lies in the range F[*i*] of rule R. The packet classification problem is to find the highest priority rule matching a given packet *P*.

6.4.1 Features of IP Classification Function

RESERVED

6.4.2 Theory of Operation

RESERVED

6.4.2.1 Basic Algorithm

RESERVED

6.4.2.2 Algorithm Improvement

RESERVED

6.4.3 Implementation

RESERVED

6.4.3.1 Preprocessing (software)

RESERVED

6.4.3.2 On-line Classification (hardware)

RESERVED

6.4.4 Storage requirement and data structure

RESERVED

6.4.4.1 Search Data Structure

RESERVED

6.4.4.2 Storage requirement

RESERVED

6.5 ATM/FR/MPLS Table Lookups

6.5.1 PHY Table Lookup

RESERVED

6.5.2 VPI Table Lookup

RESERVED

6.5.3 VCI Table Lookup

RESERVED

6.5.4 FR/MPLS Table Lookup

RESERVED

6.6 Storage Requirement and Memory Sharing

RESERVED

6.7 ATM Cell Table Lookup

6.7.1 Two-Step search on VPI and VCI page

RESERVED

6.7.1.1 ATM lookup table organization

RESERVED

6.7.1.2 Mapping Multiple VCI pages to a Single VPI

RESERVED

6.7.1.3 VPI and VCI Record Data Structure

RESERVED

6.7.1.4 ATM Cell Lookup

RESERVED

6.8 Frame Relay DLCI Look-up

RESERVED

6.8.1 Lookup table organization and Data Structure

RESERVED

6.9 MPLS Label Switch Look-up

RESERVED

6.9.1 Lookup table organization and Data Structure

RESERVED

6.10 Storage Requirement and Memory Sharing

*Proprietary and Confidential Information of Onex Communications Corporation*

RESERVED

6.11 Hardware Implementation

This section documents the implementation details of all the hardware blocks.

6.11.1 IP Forwarding (IPF)

RESERVED

6.11.2 IP Classification (IPC)

RESERVED

6.11.3 CIF DataRAM Access Control

RESERVED

6.11.3.1 Data RAM (16K Byte)

RESERVED

6.11.3.2 DESC_IN_FIFO

RESERVED

6.11.3.3 DESC_OUT_HH_FIFO and DESC_OUT_LH_FIFO

RESERVED

6.11.3.4 IPF_IN_FIFO

RESERVED

6.11.3.5 BASE_FIFO

RESERVED

6.11.3.6 IPF_OUT_FIFO

RESERVED

6.11.3.7 IPC_IN_FIFOs

RESERVED

6.11.3.8 IPC_OUT_FIFO

RESERVED

6.11.3.9 DESC_TEMP_FIFO_WR and DESC_TEMP_FIFO_RD

RESERVED

6.11.3.10 LOAD_32_CMD

RESERVED

6.11.3.11 LOAD_64_CMD

RESERVED

6.11.3.12 LOAD_RESULT

RESERVED

6.11.3.13 STORE_CMD

RESERVED

6.11.3.14 STORE_DATA

RESERVED

6.11.3.15 FIFO_STATUS

RESERVED

6.11.3.16 RSLT_READY_STATUS

RESERVED

6.11.4 Master(API) Processor Interface

RESERVED

6.11.5 External Memory Interface

RESERVED

6.11.5.1 Format of Commands

RESERVED

*Proprietary and Confidential Information of Onex Communications Corporation*

27

*Proprietary and Confidential Information of Onex Communications Corporation*

7 Receive AIT Processor

The Receive AIT/IP Traffic Processor (Rx AIT Processor) is responsible for managing incoming ATM and IP traffic from the Utopia Interface on the Titan Chip. The IP Forwarding Processor provides various traffic parameter to the Rx AIT Processor through the "Traffic Descriptor". The Rx AIT Processor uses the incoming Traffic Descriptor to decide whether drop/pass/mark incoming cells. This information is placed in an modified output Traffic Descriptor which is passed on to the Data Link Manager for it to decide whether to enqueue the payload that will be forward to the Chiron Switch Fabric.

The Rx AIT Processor is a single Tensilica Processor with 64 bit data bus interface for high data bandwidth and several custom instructions for accelerating the traffic management algorithms. The processor uses an instruction RAM rather than an instruction cache to eliminate instructions stalls from instruction cache misses. The processor uses an on chip data RAM to hold parameters for the traffic management algorithms, and a data cache which is connected to a large external SDRAM memory bank to hold 128K connection tables used for ATM traffic policing. The processor receives a Traffic Descriptor from the IPF Processor from an input FIFO and then generates and updated Traffic Descriptor for the DLM Processor.

The Rx AIT Processor does not directly observe or modify ATM or IP cells, headers or payloads.

7.1 Traffic Descriptor

RESERVED

7.2 Compute Budget

RESERVED

7.3 Processor Memory Subsystem

RESERVED

7.4 Rx_AIT / Rx_DLM Shared Memory

RESERVED

7.5 Rx IP Traffic Management with (W)RED

The Rx AIT Processor use the (Weighted) Random Early Detection, (W)RED, algorithms to manage IP traffic. These algorithms tell the DLM to pass/drop an IP packet before its payload is enqueued by the DLM. The (W)RED algorithms perform both the traffic management function and service differentiation function. This implementation of RED supports 32 Quality of Service buffers, and this implementation of WRED supports 6 precendence levels.

7.5.1 Random Early Detection / RED

RESERVED

7.5.1.1 Drop Probability

RESERVED

7.5.1.2 Average Queue Length

RESERVED

7.5.2 RED Parameters

RESERVED

7.5.3 RED Internal Variables

RESERVED

7.5.4 Random Drop Calculation

*Proprietary and Confidential Information of Onex Communications Corporation*

RESERVED

7.5.4.1 Weighted Random Early Detection / WRED

RESERVED.

7.5.5 WRED Parameters

RESERVED

7.5.6 Rx_AIT / DLM Shared Memory

RESERVED

7.6 Custom TIE Instructions

RESERVED

7.6.1 PSRAND TIE Instruction

RESERVED

7.6.2 IDIV TIE Instruction

RESERVED

7.6.3 Leaky Bucket TIE Instruction

RESERVED

7.7 Rx ATM Traffic Management

The Rx AIT Processor use the Dual Leaky Bucket Policer and Early Packet Discard/Partial Packet Discard to manage ATM traffic. One Leaky Bucket checks for sustain rate and the other Leaky Buck burst rate conformance. The Dual Leaky Buckets can set the CLP bit (in the Traffic Descriptor, extracted from the ATM cell header). A set CLP bit allows agents down stream to drop this cell if necessary.

7.7.1 ATM Packets

RESERVED

7.7.2 AAL5 Frames

RESERVED

7.7.3 Dual Leaky Bucket

RESERVED

7.7.4 ATM Traffic Policing

RESERVED

7.7.5 Early Packet Discard / Partial Packet Discard (ATM/AAL5 Packets)

RESERVED

7.7.6 Multi-Threshold

RESERVED.

7.7.7 Early Packet Discard

RESERVED

7.7.8 Partial Packet Discard

RESERVED

*Proprietary and Confidential Information of Onex Communications Corporation*

7.7.9 Tail Packet Discard, TPD

RESERVED.

Proprietary and Confidential Information of Onex Communications Corporation

*Proprietary and Confidential Information of Onex Communications Corporation*

8 Receive Data Link Manager & Memory Controller

The Receive Data Link Manager (RxDLM) manages the external RX memory which is used to store RX Data and RX Control Parameters. All of the ATM cells and all of the frame-based data received through the SONET interfaces and the UTOPIA interface are stored in the external RX memory while they wait to be scheduled to a Switch port. Parameters required by some of the RX data processing functions are stored in the external RX memory. The RX data processing functions using this external memory include: Traffic Policing, Congestion Management, Per-Flow Queue Management, QOS Queue Management, Free Queue Management and the Switch Arbiter and Scheduler.

The RxDLM interfaces to a Memory Controller. The Memory Controller takes read and write requests from the RxDLM and transforms them into physical memory cycles. The interface between the RxDLM and the Memory Controller is through FIFOs. The RxDLM pushes read requests and write requests with write data into these FIFOs. The Memory Controller reads from these FIFOs and performs the requested access to external memory. The interface between the Memory Controller and the RxDLM is very specific to the functionality required by the RxDLM. The Interface between the External Memory and the Memory Controller is very specific to the selected memory technology. As a design goal, the selected memory technology could be changed with no impact to the Rx DLM and impact to the Memory Controller only in the actual interface to the external memory.

The series of memory accesses required by the RxDLM is predetermined and is explained in detail in sub-sections of this section of the document. As shown in Figure 8-1, the Memory Controller provides a separate port for each of these predetermined external memory accesses. The Memory Controller queues all pending memory access requests in an order that uses the interface to the external memory in the most efficient way. Efficiency is measured as the percent of bus cycles that are used to transfer data versus the number of bus cycles left empty.

The Memory Controller provides two ports for the Host interface to read and write the external memory.

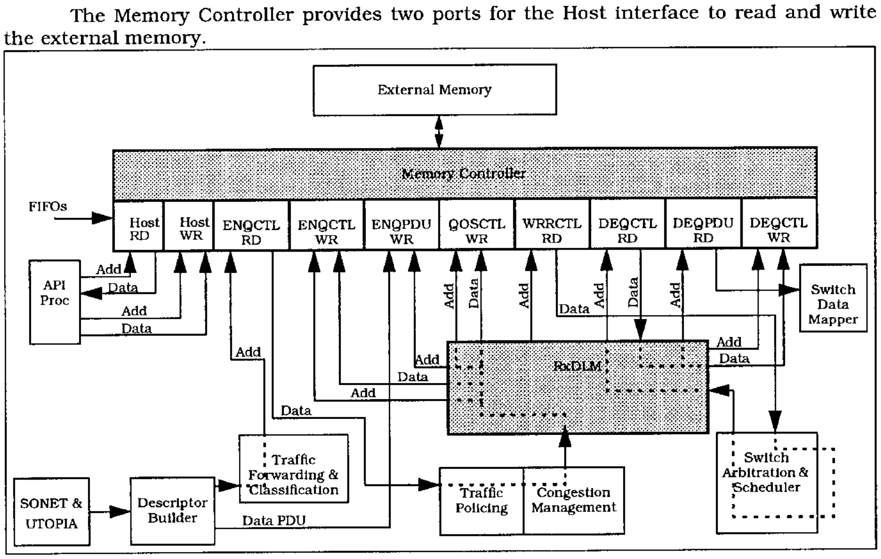

Figure 8-1: RxDLM Interface to Memory Controller

*Proprietary and Confidential Information of Onex Communications Corporation*
8.1 External Memory Structure
The External Memory Structure is shown in Figure 8-2. The external memory is divided into three sections: PDU Storage; Per-Flow Parameters; and QOS Request Queues.
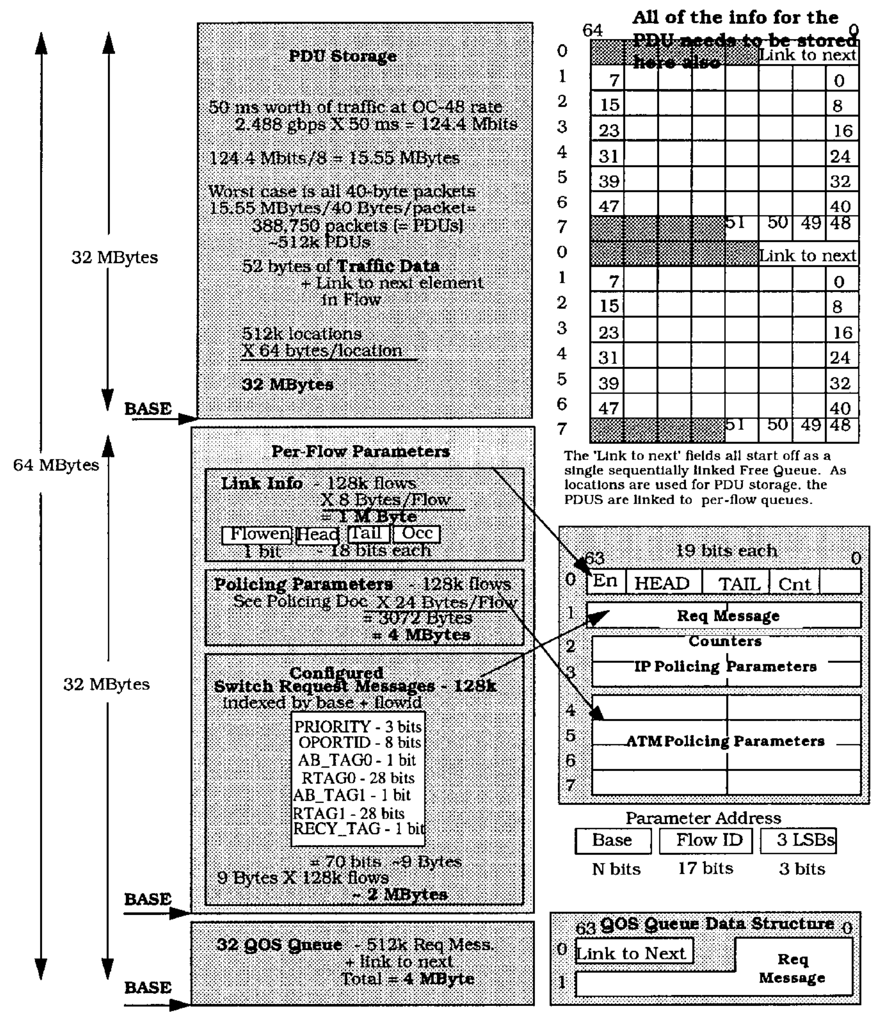
Figure 8-2: Rx External Memory
33

8.1.1 PDU Storage

The RxDLM stores 52-byte ATM Cells (no HEC) and 52-byte packet chunks in external memory. Each of these 52-byte chunks is stored in a 64-byte segment of memory. This 64-byte segment of memory is called a Payload Data Unit (PDU). There is no distinction here between ATM cells and IP packets. They are all stored and retrieved as 52-byte entities - cells or chunks. The Switch Scheduler schedules packet chunks before the entire packet is received, so the Rx_DLM does not need a packet building link manager.

The Receive side of the Service Processor is required to store a minimum of 50 ms worth of 40-byte IP Packets arriving at an OC-48 rate. The equation in Figure 8-2 shows that 512k PDUs of storage exceeds this requirement. The Service Processor can store PDUs in increments of 64 bytes. 512k PDUs at 64-bytes per PDU equates to 32 MBytes of storage.

A Linked-List data structure is used to manage the PDU Storage Memory. The Service Processor can support up to 128k different traffic flows and each one of these traffic flows is allocated its own set of Linked-List Parameters. These Linked-List Parameters consist of a Head, Tail and Count in units of PDUs. These Linked List Parameters are stored in the external memory with the Per-Flow Parameters (see Section 8.1.2).

The Count is stored on a per-flow basis for control purposes. If a particular flow or set of flows is filling the buffer to an unusually high level, then something is wrong. Maybe the output Port Processor is not scheduling it or the output flow is clogged... Whatever the reason, once the flow exceeds a defined threshold, the DLM will alert SW so that some corrective action can be taken. A global threshold can be set to limit the number of PDU locations that can be used by any single flow.

In order to support this Linked List memory management, a Free Queue needs to be maintained. Initially, all PDU locations belong to the Free Queue. As PDU elements arrive, storage locations are allocated from the HEAD of the Free Queue and appended to the TAIL of the per-flow linked-list. As PDU elements are scheduled out of the external memory, the storage locations are returned to the Free Queue by appending the location to the TAIL of the Free Queue. Since the "Link to Next" field of the stored PDU must be written when the PDU is written, a free PDU is pre-allocated to the TAIL of each of the active per-flow queues.

In order to minimize the number of accesses to external memory during memory intense conditions, a cache of Free Queue locations is kept internal to the Service Processor. The Free Queue cache is a list of pointers to a subset of the Free Queue. This Free Queue Cache is required for the worst case equilibrium state in which traffic is being queued at an OC-48 rate and traffic is being de-queued at the same OC-48 rate. In this equilibrium state all external memory cycles are used for enqueuing and dequeing PDUs and control information resulting in no memory cycles left over for Free Queue maintenance. In this worst case equilibrium state, as PDUs are dequeued, the PDU locations are internally returned to the Free Queue cache to be used immediately to enqueue the incoming PDUs.

In a non-equilibrium state, the rate of enqueues does not equal the rate of dequeues. If the rate of enqueues is greater than the rate of dequeues, then the unused PDU dequeue opportunities are used to replenish the internal Free Queue cache by reading Free Queue locations stored externally. If the rate of dequeues is greater than the rate of enqueues, then the unused PDU enqueue opportunities are used to append elements of the growing internal Free Queue cache to the external Free Queue.

The size of this Free Queue cache is TBD.

8.1.2 Per-Flow Parameters

The Per-Flow Parameters consist of all of the configuration parameters, link management information and performance monitoring that needs to be maintained separately for each of the 128k data flows. The data structure for the Per-Flow Parameters is shown in Figure 8-3. This data structure must be retrieved from external memory for every received ATM cell and for the first PDU accumulated for every frame or packet. There is no need to retrieve this information for any PDUs other than the first of each frame or packet because all algorithms and parameters are designed to operate in increments of packets and frames. This being the case, information describing multi-PDU packets and frames is kept internal to the Service Processor so that the yet to arrive PDUs will be queued to the correct flow and QOS. One set of parameters per PHY port and SPE is kept internally as interleaving of packets and frames on the same PHY port or SPE is not allowed - except for the case of AAL5 in which the SOP/EOP delineation and the packet pass/drop status is kept externally with the Per-Flow parameters.

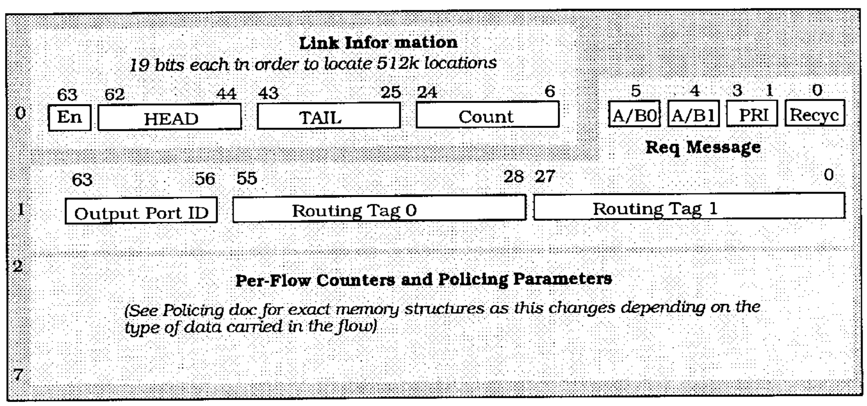

Figure 8-3: Per-Flow Control Data Structure

8.1.3 QOS Request Queues

Arriving PDUs must request access to and through the switch fabric. Once the PDUs are stored in PDU Storage, a request for the PDU must be queued in the QOS Request Queues. The switch scheduler will monitor these request queues and will map the requests into an outgoing message structure. The PDUs are classified into one of 32 different Classes or levels of QOS. These 32 classes dictate the priority of the PDU in the weighted scheduling algorithm that is used to schedule and arbitrate for routes through the switch fabric.

The information needed to build a switch request message and the link to the next element in the queue is stored in the QOS Request Queues. There are 32 queues - one for each class of service. The information needed to build a request and the structure of this data is shown in Figure 8-4.

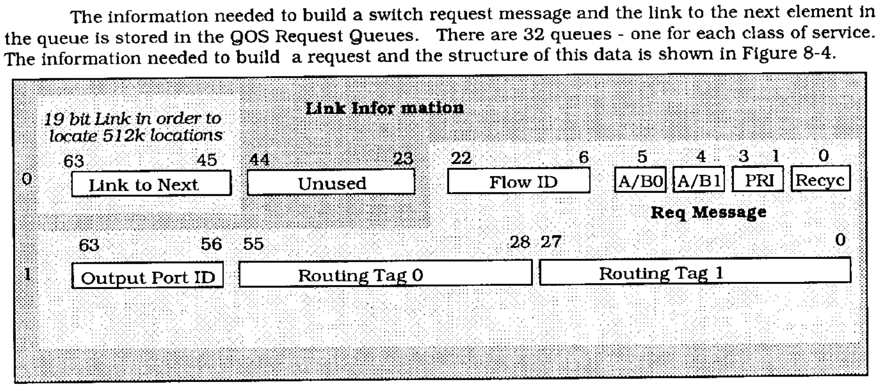

Figure 8-4: QOS Queue Data Structure

A linked-list is used to manage the 32 separate queues. Since there are only 32 queues, the linked list parameters - Head, Tail and Count - are kept internal to the Service Processor. The elements in these queues are stored in order of PDU arrival. A separate entry is made to these queues for every PDU arrival. PDUs from different flows will be intermingled, but the cells and chunks in a particular flow will maintain order.

These QOS Queues are extended into the Service Processor. The tops of the queues are stored in 32 internal FIFOs. As long as there is room in these internal FIFOs, the Request elements will be pushed into these FIFOs. The RxDLM is responsible for keeping these internal FIFOs full. As these internal FIFOs become full, the request elements will be stored in the external QOS Request Queues.

8.2 Host RD

8.3 Host WR

8.4 Data & Control Flow

Figure 8-5 shows the required memory accesses and the order of the memory access that are required to enqueue and dequeue a single PDU. The accesses always follow the order shown in Figure 8-5. This prescribed order allows for the maximum utilization of the external memory bus. This sequence of memory accesses is designed to finish in less than the minimum sized packet (48 bytes) arrival time at an OC-48 rate when processing IP packets and in less than the arrival rate of ATM cells at an OC-48 rate when processing ATM traffic. To fully process a PDU it takes many packet/cell processing times. When cells or frames are received back-to-back, the memory cycles for each are pipelined as shown in Figure 8-6.

The high-level description of the PDU and Control flow in and out of external memory is in Figure 8-5. More detailed descriptions of these memory cycles is given in the following subsections.

*Proprietary and Confidential Information of Onex Communications Corporation*
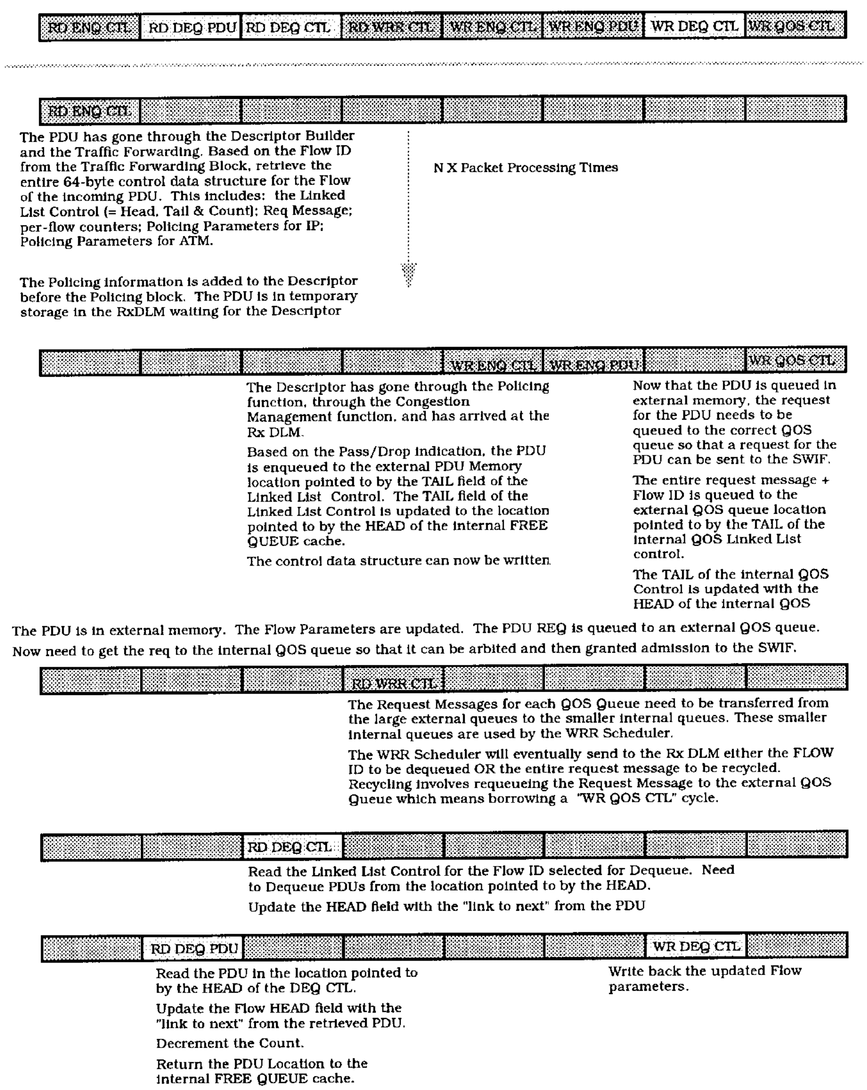
Figure 8-5: External Memory Access Flow

*Proprietary and Confidential Information of Onex Communications Corporation*

| | RD ENQ CTL | RD DEQ PDU | RD DEQ CTL | RD WRR CTL | WR ENQ CTL | WR ENQ PDU | WR DEQ CTL | WR QOS CTL |
|---|---|---|---|---|---|---|---|---|
| | One Packet/Cell Processing Time | | | | | | | |
| | RD ENQ CTL | | | | | | | |
| P | RD ENQ CTL | | | | | | | |
| CM | RD ENQ CTL | | | | | | | |
| | RD ENQ CTL | | | | WR ENQ CTL | WR ENQ PDU | | WR QOS CTL |
| | RD ENQ CTL | | | RD WRR CTL | WR ENQ CTL | WR ENQ PDU | | WR QOS CTL |
| | RD ENQ CTL | | RD DEQ CTL | RD WRR CTL | WR ENQ CTL | WR ENQ PDU | | WR QOS CTL |
| | RD ENQ CTL | RD DEQ PDU | RD DEQ CTL | RD WRR CTL | WR ENQ CTL | WR ENQ PDU | WR DEQ CTL | WR QOS CTL |
| | RD ENQ CTL | RD DEQ PDU | RD DEQ CTL | RD WRR CTL | WR ENQ CTL | WR ENQ PDU | WR DEQ CTL | WR QOS CTL |
| | RD ENQ CTL | RD DEQ PDU | RD DEQ CTL | RD WRR CTL | WR ENQ CTL | WR ENQ PDU | WR DEQ CTL | WR QOS CTL |
| | RD ENQ CTL | RD DEQ PDU | RD DEQ CTL | RD WRR CTL | WR ENQ CTL | WR ENQ PDU | WR DEQ CTL | WR QOS CTL |
| | RD ENQ CTL | RD DEQ PDU | RD DEQ CTL | RD WRR CTL | WR ENQ CTL | WR ENQ PDU | WR DEQ CTL | WR QOS CTL |
| | | RD DEQ PDU | RD DEQ CTL | RD WRR CTL | WR ENQ CTL | WR ENQ PDU | WR DEQ CTL | WR QOS CTL |
| | | RD DEQ PDU | RD DEQ CTL | RD WRR CTL | WR ENQ CTL | WR ENQ PDU | WR DEQ CTL | WR QOS CTL |
| | | RD DEQ PDU | RD DEQ CTL | RD WRR CTL | WR ENQ CTL | WR ENQ PDU | WR DEQ CTL | WR QOS CTL |
| | | RD DEQ PDU | RD DEQ CTL | RD WRR CTL | | | WR DEQ CTL | |
| | | RD DEQ PDU | RD DEQ CTL | | | | WR DEQ CTL | |
| | | RD DEQ PDU | | | | | WR DEQ CTL | |
| | 7 | 1 | 2 | 3 | 4 | 4 | 1 | 4 |
| | T0 | T-6 | T-5 | T-4 | T-3 | T-3 | T-6 | T-3 |
| EnQ | T0 | | | | T-3 | T-3 | | T-3 |

From the time that the ENQ Control Data Structure is read out of external memory, 4 packet/cell processing times go by before this control information is written back to external memory. This means two things:

1. The Rx DLM must be able to store at least 4 ENQ Control Data Structures.
2. If consecutive packets or cells from the same flow arrive within 4 packet or cell processing times of each other, then the ENQ Control Data Structure must be read from the processors internal cache as the external data structure will be holding stale information.

Figure 8-6: External Memory Access Pipeline

*Proprietary and Confidential Information of Onex Communications Corporation*
8.4.1 RD ENQCTL
Read the Enqueue Control Data Structure.
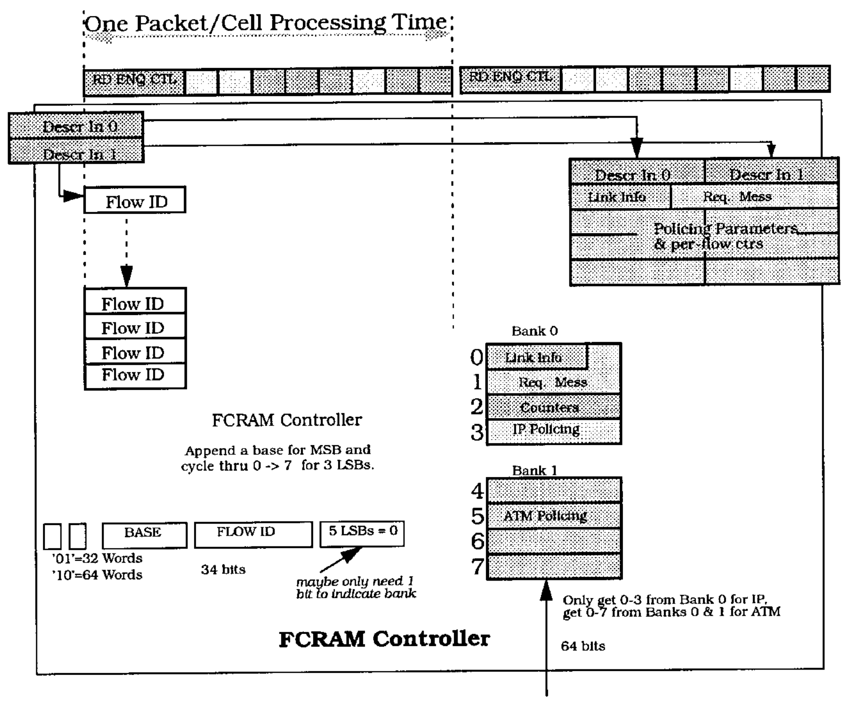

Proprietary and Confidential Information of Onex Communications Corporation
8.4.2 WR ENQCTL - Write the Updated Enqueue Control Data Structure
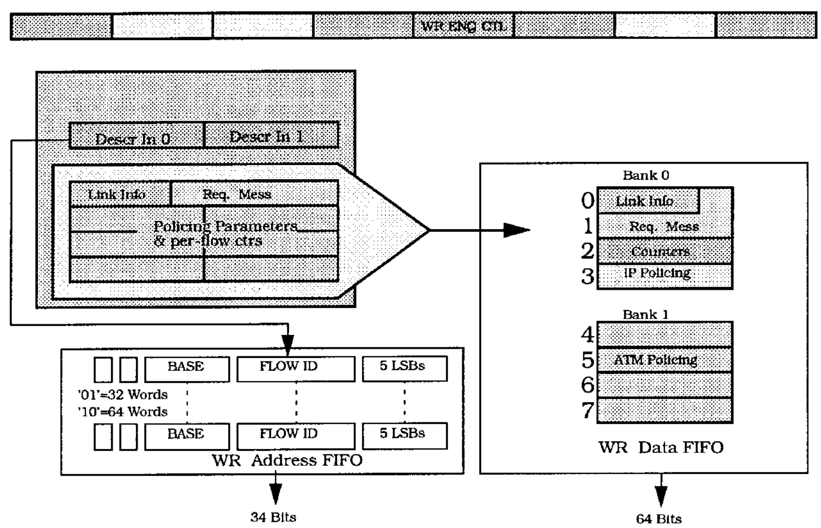

8.4.3 WR ENQPDU - Enqueue a Data PDU

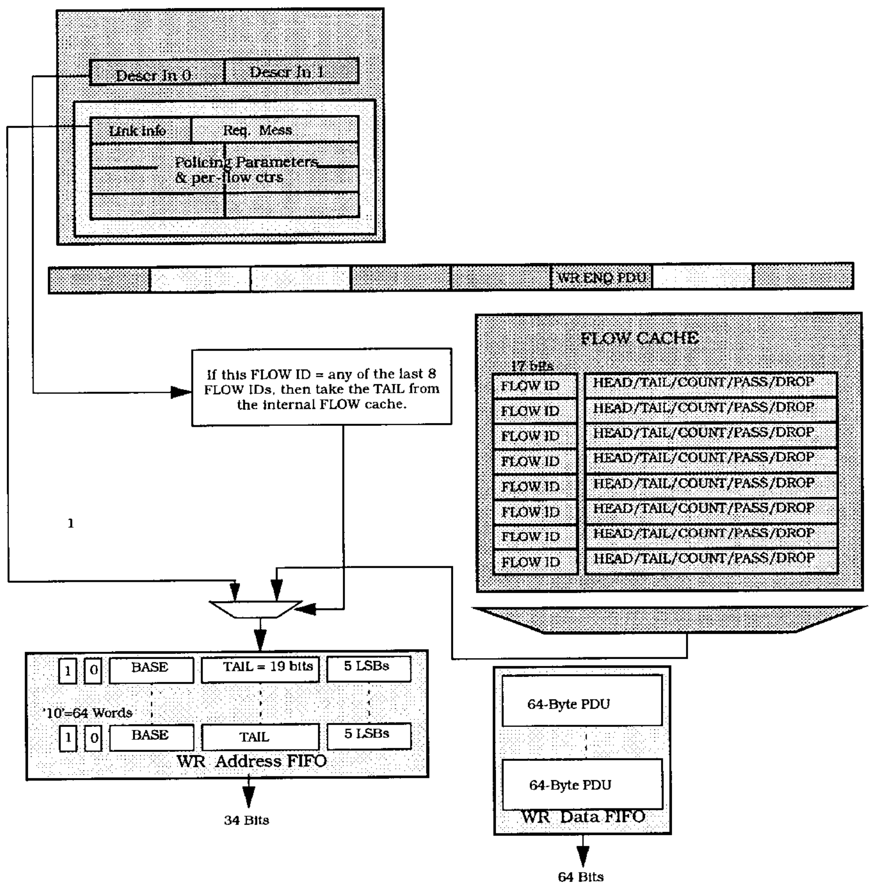

When the Data FIFO from the Descriptor Builder indicates 'not empty', the DLM must remove a 64-byte element from the FIFO. The DLM writes the cell or chunk to the location pointed to by the head of the free queue. If this is an ATM cell or the first chunk of a packet (SOP=1), then the DLM waits for the descriptor to arrive so that it can identify to which flow queue to enqueue the data and also to which QOS Queue to enqueue the request. For SOP packet chunks, the DLM writes the Flow ID and the QOS ID into a dedicated location to be referenced when the rest of the packet arrives. The PDU counter is updated on every PDU arrival. A Data PDU is always 64-bytes. The PDU can contain either a 52-byte ATM Cell or a packet chunk that is less than or equal to 52 bytes in length. The packet counter is only updated on the arrival of the first chunk of an IP packet. The packet counter is not updated for ATM cell arrival. The packet chunks that arrive after the first chunk will have a descriptor accompanying them and the SOP bit will = 0. This tells the DLM to check the non-SOP Proprietary and Confidential Information of Onex Communications Corporation
RAM to find the flow ID and the QOS level.
8.4.4 WR QOS CTL
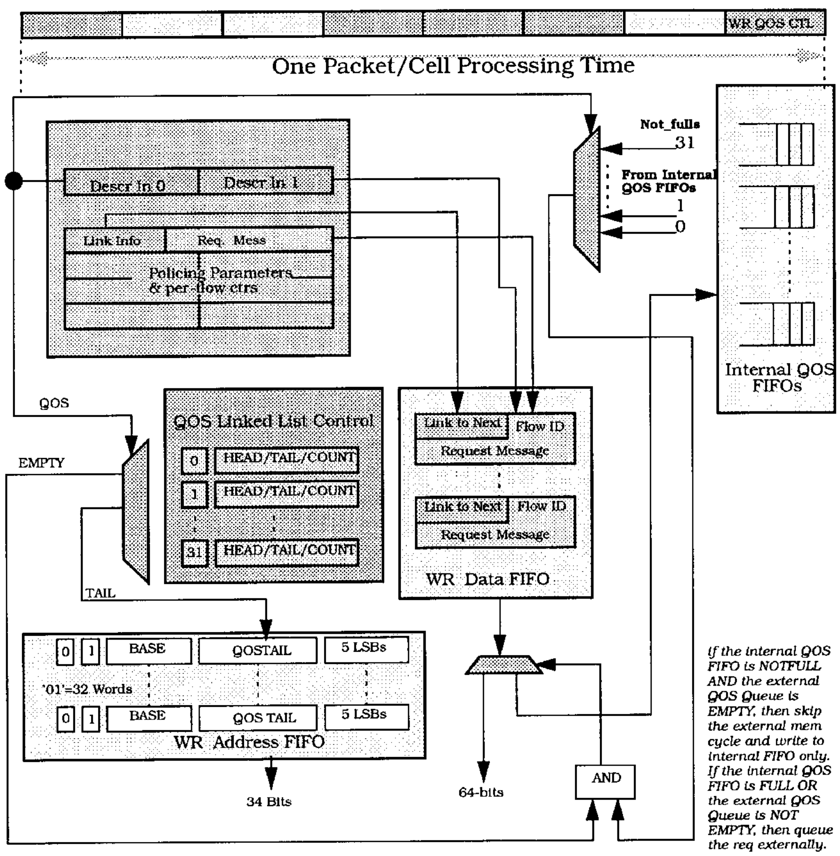

*Proprietary and Confidential Information of Onex Communications Corporation*

8.4.5 RD WRR CTL

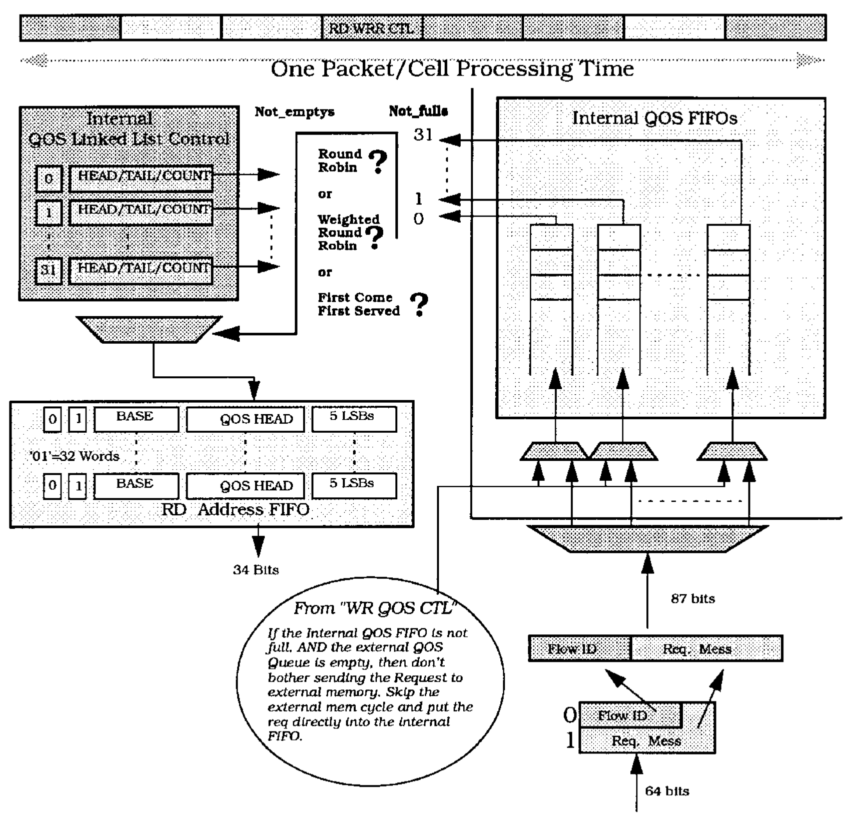

8.5 Element Arrival

8.5.1 ATM CELL

Queue the PDU and when the descriptor arrives, link the PDU to the correct Flow and QOS queues.

1. Write PDU to the location pointed to by the Head of the Free Queue. - 7 writes. Keep the pointer as it will need to be written into the "link to next" field of the last item in the flow queue or to the Head of the flow queue.

*The top portion of the Free Queue is stored internally and is updated as a background task. This background task will need to be quantified.*

When the Descriptor arrives it will contain the Flow ID and a QOS.

2. Get the Head & Tail & Occupied and Thresh of the Flow ID Queue - 2 reads from the parameters
3. a. If Head and Tail are not equal, Write the pointer to where the PDU was just written to into the "link to next" field of the last written (before this one) PDU. - 1 write b. If Head =Tail, then write the pointer into the Head value for the flow - 1 write
4. Get the Head & Tail of the QOS queue. 1 read
5. a. If Head and Tail are not equal, Write the pointer to where the PDU was just written to into the "link to next" field of the last written (before this one) link. - 1 write b. If Head =Tail, then write the pointer into the Head value for the QOS queue - 0 write *All QOS heads and tails should be stored in internal memory*
6.

*Proprietary and Confidential Information of Onex Communications Corporation*

9 Switch Controller

The switch controller is the control interface between the port processor and the switch. The functionality of the switch controller can be logically broken down into two sections (see 9-1).

The first switch controller section (RX Switch Controller) interfaces the receive direction of the switch data-path and the switch. The second switch controller section (TX Switch Controller) interfaces the transmit direction of the switch data path and the switch. These two switch controllers are described in detail in the following sections.

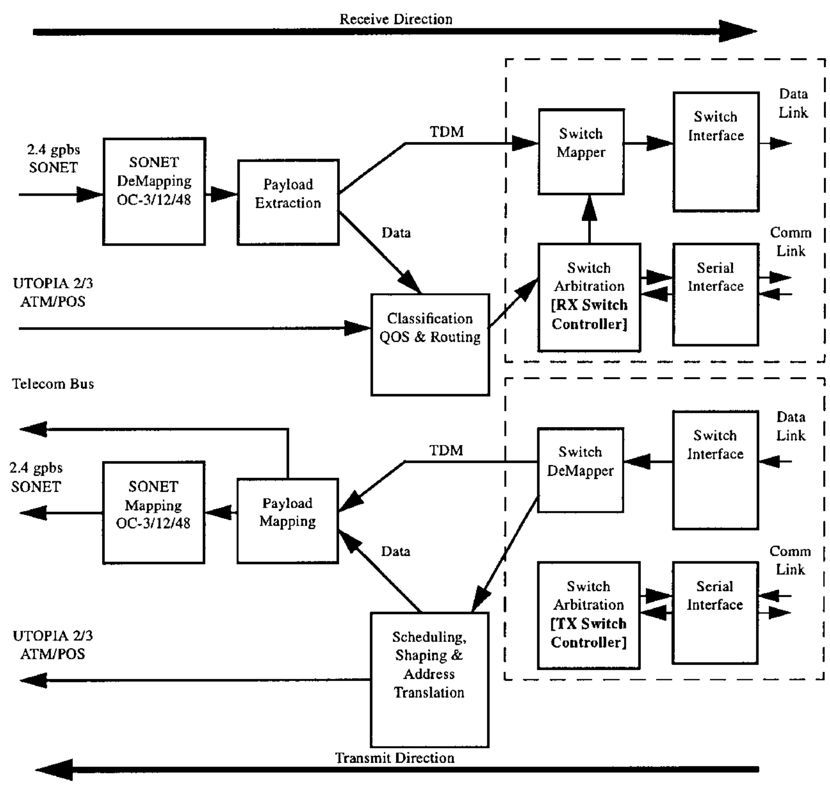

Figure 9-1: iTAP Port Processor Overview

*Proprietary and Confidential Information of Onex Communications Corporation*

9.1 RX Switch Controller

The TDM traffic is circuit switched and circuits are provisioned through the switch for the TDM traffic. The RX Switch Controller does not handle any control signals for the TDM traffic. The bandwidth transmission capacity remaining after provisioning of the TDM traffic is available for transmission of IP and ATM Traffic. The TDM and ATM traffic is packet switched through the switch fabric in fixed size cell containers of 64 bytes including overhead. The format of a cell container is documented in the overview section of the ITAP switch chip engineering specification. (An alternative term used for these cell containers is Payload Data Unit or PDU's).

9.2 RX Transmission Path

Each incoming cell and packet is processed by the RX port processor. In order to perform this algorithmic processing, the Port Processor needs to retrieve the set of configured parameters for each ATM cell or PPP frame. For ATM Cells the Port Processor performs a lookup based on the ATM VPI/VCI. This lookup will first verify that the connection is active and if active, it will return an 17-bit index to a set of per VC parameters and to routing information. The 17 bit index supports a maximum of 128K simultaneous IP and ATM flows through the port processor.

IP Packets are forwarded to an internal processor allocated to performing routing based on a third party Longest Prefix Match algorithm. The result of the lookup process is verification that the connection is active, and if active the lookup will return an 17-bit index to a set of queueing parameters and to routing information.

The ATM cells are encapsulated in a cell container and stored in one of 128K queues in external memory. These 128K queues are managed by the Data Link Manager which is not part of the RX switch controller. Control information required to transmit the packet is forwarded to the RX Switch Controller.

The IP packets are fragmented into 51 byte blocks and each of these blocks are encapsulated in a cell container. These cell containers are stored in one of 128K queues in external memory by the data link manager and control information required to transmit the packets is forwarded to the RX switch controller. A conceptual overview of the RX switch controller is shown in 9-2.

Proprietary and Confidential Information of Onex Communications Corporation

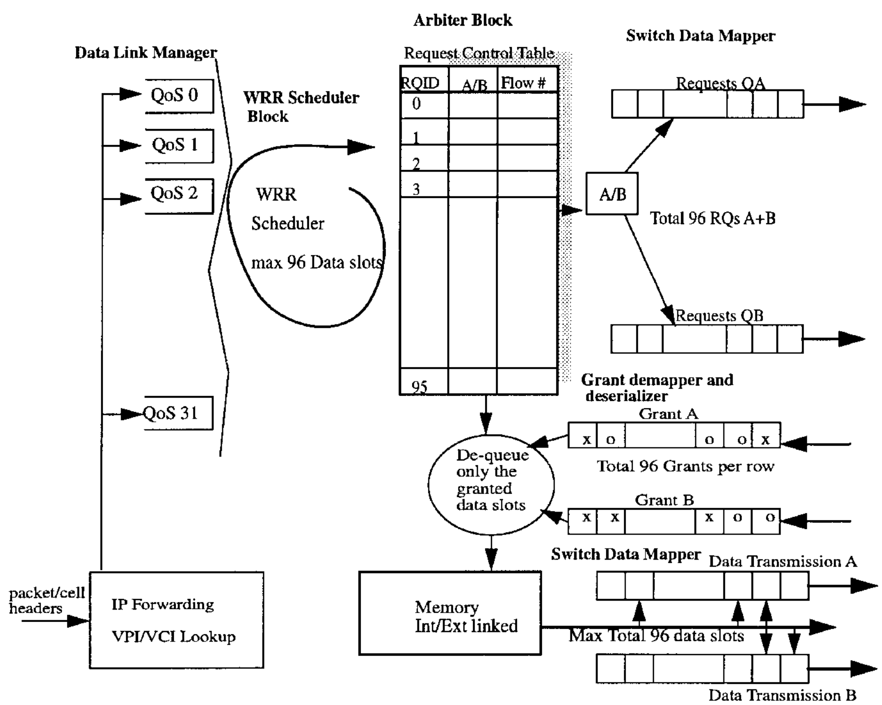

Figure 9-2: Overview of the RX Switch Controller

The 128K IP/ATM flows are aggregated into one of 31 QoS queues for scheduling through the switch. The data link manager aggregates all the control headers required for transmission of cells through the switch into 31 QOS queues and inserts these routing tags into one of 31 QOS routing tag fifos. One of the queues, here called QOS 0 is reserved for high priority traffic. Any cells arriving in the high priority queue will interrupt the scheduler and be scheduled to leave the high priority queue immediately.

The scheduler is responsible for scheduling cell containers through the switch. The scheduling algorithm used is Weighted Round Robin and operates on these 31 QoS queues. Once cells have been scheduled from these queues, the control headers from these queues are forwarded to the arbiter and are stored in a request control table.

The request arbiter forms requests from the control headers and forwards these requests to the switch data mapper block for transmission through the switch. The grants received in response to these requests are deserialized and deframed and transferred back to the arbiter block. For requests accepted for transmission through the switch, the cell containers are dequed from external memory by the data link manager and transferred to the switch data mapper for transmission through the switch.

A architectural overview of the RX switch controller with the data flow between blocks is shown overleaf in Figure Figure 9-3.

*Proprietary and Confidential Information of Onex Communications Corporation*
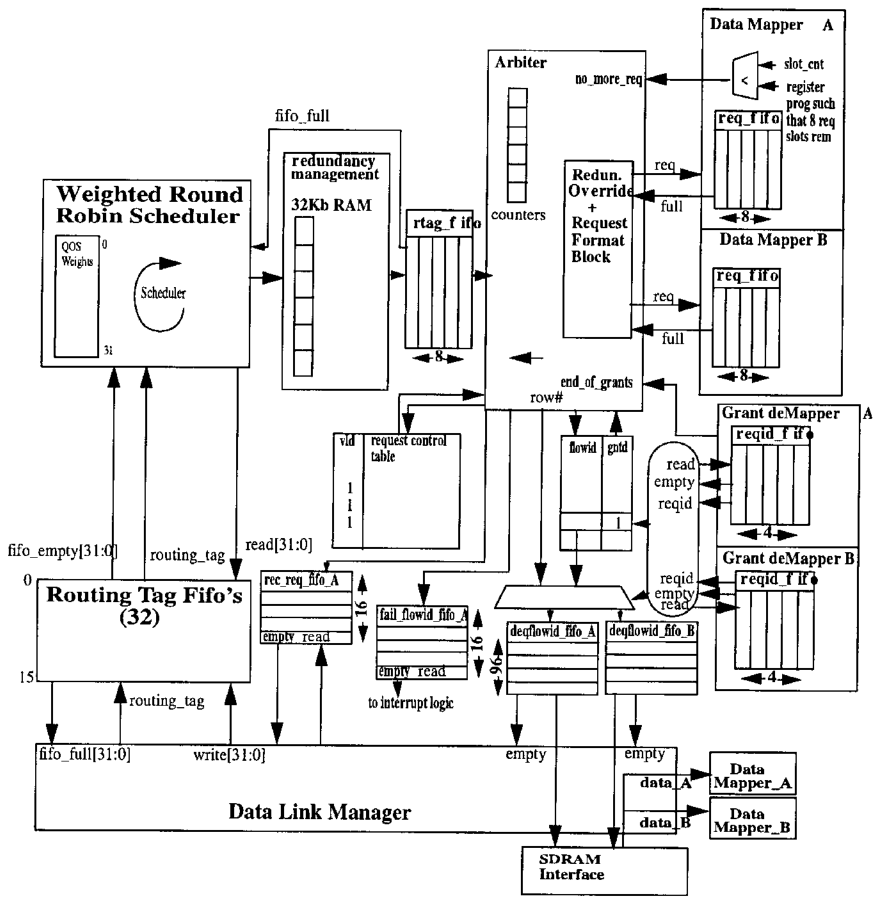
Figure 9-3: Data Flow between blocks in the RX Switch Controller

*Proprietary and Confidential Information of Onex Communications Corporation*

9.2.1 Routing Tag Fifo's

The Routing Tag Fifo's are 32 fifo's containing 16 routing tags each. The weighted round robin scheduler will schedule routing tags out of these 16 fifos and will monitor the 32 fifo_empty lines while scheduling. The Data Link Manager will monitor the 32 fifo_full lines and update the routing tag fifo's to keep them full.

9.2.2 Weighted Round Robin Scheduler

The Weighted Round Robin Scheduler selects routing tags from one of 31 QoS queues and schedules these routing tag for transmission through the switch. The weighted round robin scheduler is run each time there is a location in the rtag_fifo. One of the fifo's, fifo 0 will be given absolute highest priority, the arrival of routing tags in this fifo queue will interrupt the weighted round robin scheduling of packets, and these routing tags will be scheduled to leave the switch immediately. When there are no more routing tags in this queue, weighted round robin scheduling of routing tags from the remaining 31 queues will continue.

This implementation uses 1 counter - 8 bits wide.

```
if (fifo_empty[0]) /* highest priority */
  begin /* scheduling cycle */
  for (qos_no = 0; qos_no < 30; qos_no++)
    {current_queue = weight[qos_no]; /* weights are programmed at setup time */
      while (current_queue > 0)
      {insert_into_table (get_packet_from_head(qos_no));
        current_queue--;
    }
  }
  end /* scheduling cycle */
```

9.2.3 Redundancy Management Block

In order to improve reliability, two redundancy schemes are supported. In the first redundancy scheme, the switch controller supports redundant routing tags and transparent route switch-over. In the second redundancy scheme, the port processor supports redundant data channels in both input and output directions. The redundant data channels connect to two separate switch fabrics. In this case we will call them A and B data channels.

Each control header will contain two routing tags, and each routing tag will have a corresponding AB channel tag. This provides for two routes through the switch for data transmission. If both routing tags have the same channel tag, this allows for two alternate paths through the same switch fabric. If both routing tags have different channel tags, this implies that there is a redundant switch fabric and any route failing in one switch fabric will cause a switch-over to use the redundant switch fabric.

Upon entry into the redundancy management block, a memory lookup using the most significant 15 bits of the flowid will be used to determine if the first or second routing tag is to be used. (A 32K bit memory is used in the redundancy management block to decide if the first or second routing tag should be used. Using 32K bits implies that we have aggregated four flows for the purpose of redundancy management and switch-over). The AB channel tag will indicate whether the data is to be routed using the A or the B data channel.

A request message will be sent using the appropriate routing tag for a programmable number of times. If no grant is received using the this routing tag, a bit will be set in the 16KB memory to switch over the routing tag for subsequent requests and the current request will be sent using the other routing tag. Setting the switchover bit implies that all four flows that share the same 14 msb bits in the flowid will be switched over as a group to use the other routing tag. The aggregation of flows into groups of 8 was done to save on chip memory.

9.2.4 Arbiter Block

The arbiter is responsible for sending requests to the data-mapper and processing the grants that arrive from the grant demapper. Initially the arbiter will deque requests from the rtag_fifo and 1. copy this information into the request control table,
2. write the flowid into the flowid ram 3. reset the request trial counter that counts the number of times a request has been tried
4. reset the grant bit.

The request message sent will have a unique request id (reqid) attached to the request, which is returned in the grant message. The reqid is the index in the arbiter request control table into which the routing tag is copied. The routing tag along with the reqid is forwarded to the routing tag formatter block which formats the routing tag into a request message and inserts the request into the request_fifo in the data-mapper block.

In the grant demapper block, the request id returned with the grant are stored in a fifo called the grant_reqid fifo. In the arbiter block, these reqids will be dequed from the A and B grant_reqid fifos alternatively. The reqids dequed from the fifo are used to 1. set a grant bit in the grant register at the bit position indicated by the request id.
2. index the flowid ram and read the flowid associated with the reqid. This flowid is written into the deq-flowid fifo for the appropriate channel, i.e if the requestid is dequeued from the A reqid_fifo, the flowid is written into the A deqflowid_fifo.

The data link manager monitors the deqflowid fifo and uses the flowid to deque data pdus from external memory and send them to the data mapper for transmission in the next row time.

The end_of_grants signal is asserted by the grant demapper, when no more grants can be received at the grant demapper. Once the end_of_grant signal has been received the arbiter begins the process of updating the request control table. If a grant has not been returned for a routing tag stored in the request control table, the request trial counter will be incremented and a new request will be generated using the routing tag.

If a routing tag in the request control table has been tried a maximum number of times (this number is programmed from 0 to 15), the most significant 14 bits of the flowid (out of the 17 bit flowid field) are used to index into the redundancy control table and update the bit to indicate failure of the current path and to select the alternate routing path. The current request will then be retried using the secondary routing tag for the maximum number of times.

If a packet could not be scheduled using either the primary or secondary routing tags, the request is removed from the arbiter request control table and the request is placed into a recycled_request fifo. A new request is dequeued from the rtag_fifo and copied into the request control table.

If the request has been granted a new request is dequeued from the rtag_fifo and copied into the request control table.

9.2.5 Recyling Requests

If a request could not be sent using either the primary or secondary routing tag, the request is removed from the request control table and the request is placed in the recycle request fifo. The removal of the routing tag from the request control table is to avoid head of line blocking. However, the request may not have been granted due to congestion at the output port and should be retried. (Congestion in the output port is the most likely scenario to be encountered by a request that has to be recycled, since congestion through the swich fabric is avoided by using the second routing tag). The recycled request is removed from the recycled request queue and written into the tail of the qos queue in external memory by the data link manager. There are two options that are supported in queing recycled requests. In the first option, the request is re-queued in to the original qos queue which contains packets for the flowid. i.e the qos of this packet is not changed in going through recycling. In the second option to be supported, a special qos number and queue is reserved for all recycled requests.

A recycled request is treated no differently in the arbitration block. A request message will be sent for this request and the request will be tried a programmable number of times using the first routing tag, if a grant is not recieved in the programmable number of times, the second routing tag will be tried next a programmable number of times.

Each time a request fails to be acknowledged with a grant, and it placed in the recycle fifo, the flowid is saved in the failed flowid fifo and an interrupt is made to the host processor along with the failing flowid.

The host processor will upon receipt of an error message indicating the inability to route the particular flowid perform diagnosis. Corrective action that can be taken is to either change the route by updating the routing tag in external memory, or shut off the flow by setting a bit in the routing tag to indicate an invalid routing tag. The data link manager will not queue routing tags for a particular flowid in which the invalid routing tag bit has been set.

Proprietary and Confidential Information of Onex Communications Corporation

9.3 TX switch controller

On the TX side of the port processor, the TX switch controller is responsible for either accepting or rejecting requests that come into the port processor for output transmission. In this case the TX switch controller has to check if the queue identified by the output port number of the request can accept a cell container. These 144 queues are stored in external memory and managed by the TX data link manager. The scheduling of these packets at the output is done by the TX scheduler. If the queue can accept the cell container, the request is turned into a grant and inserted into the grant_fifo. The grant-framer and serializer reads this information and creates an grant message for transmission through the grant path.

A data flow diagram and the data structures used in by the TX switch controller are shown below in 9-4

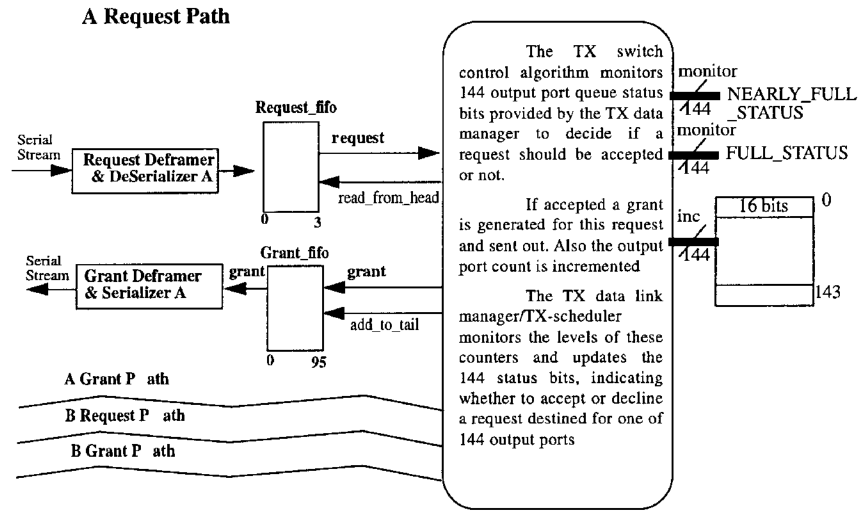

Figure 9-4: Data path and data structures in the TX switch controller

The acceptance of requests by the TX switch controller is done by monitoring the status of the data queues for each of the 144 output ports and using the following three rules 1. If the full_status bit for the request output port is set, there is no buffer space in the queue for any data pdus destined for that output port and all requests to that output port are denied.
2. If the full_status bit is not set and the nearly_full_status bit is set, this implies that there is some space in the queue for data pdus destined for that output port, however this space may be reserved for higher priority traffic. In this instance the QoS number is checked against a threshold programmed QoS and if the QoS number is less than the threshold, the request will be accepted, else it will be denied. (This implies that lower QoS numbers have higher priority)
3. If the nearly full_status bit is not set, all incoming requests are granted.

If a request is accepted the corresponding output port counter is incremented. This reserves space in the data buffer for the arrival of the data pdu at that output port. The transmit data link manager constantly monitors the 144 output port counters and sets/resets the 144 full and nearly full status bits.

*Proprietary and Confidential Information of Onex Communications Corporation*

10 Data Mapper

The TDM data, ATM/IP PDU's and the request messages are combined into a single data stream for transmission through 2 Serial links. (For more information read the overview section of the ITAP switch chip engineering specification)

This mapping is performed by the Data Mapper. A block diagram of the data mapper that maps the Row Buffer which contains the TDM and ATM/IP data and the requests and interfaces with the serializer logic is below in 10-1.

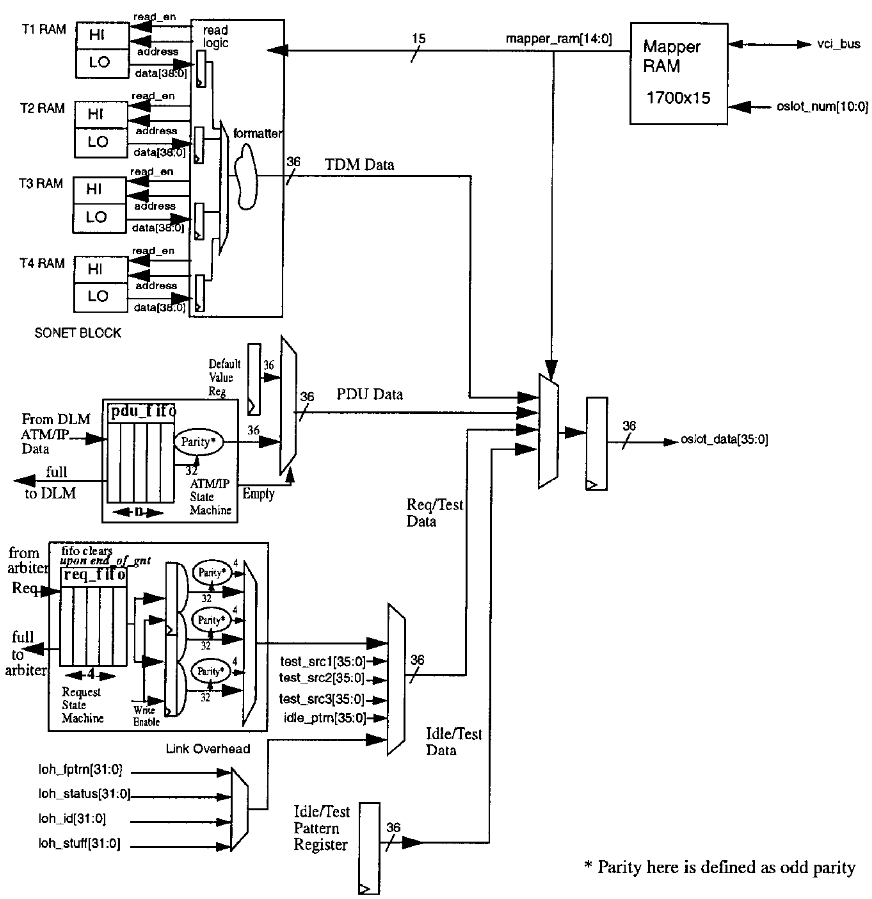

Figure 10-1: Request and Row Buffer Mapping

10.1 Mapper RAM

The Mapper RAM determines what data to map onto each slot of the output link.

Proprietary and Confidential Information of Onex Communications Corporation

The oslot_num input is incremented once for each outgoing slot and will be used as the address for this RAM. This output slot number will start at 0 for the first slot and then simply be incremented once for each new output slot up to the maximum number of slots in the row.

Since there will always be at least 2 cclk cycles per output slot, the accessing of the RAM is split into two phases. During phase 0 the RAM will be addressed using the oslot_num input, the output of the RAM will be registered at the end of phase 0 so that it will remain valid for the following 2 cclk cycles. During phase 1, the RAM may be written to or read from by the host processor via the vci bus. The RAM will be implemented with a 1 write, 1 read port memory macro.

The Mapper RAM is 15-bits wide. The first bits identify the type of data being transmitted, the value of these two bit determine how the next 13 bits are interpreted. The structure of the RAM is shown in Figure Figure 10-2

*Proprietary and Confidential Information of Onex Communications Corporation*
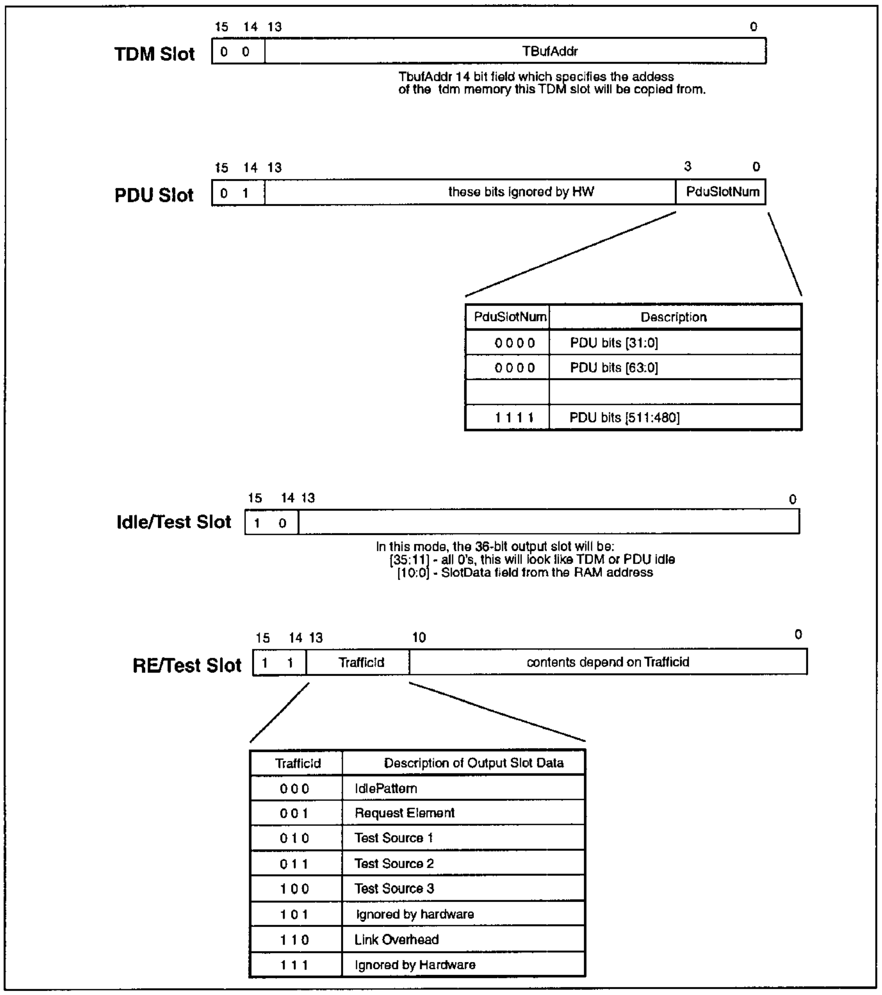
Figure 10-2: Mapper RAM Structure (1 of 2)

*Proprietary and Confidential Information of Onex Communications Corporation*
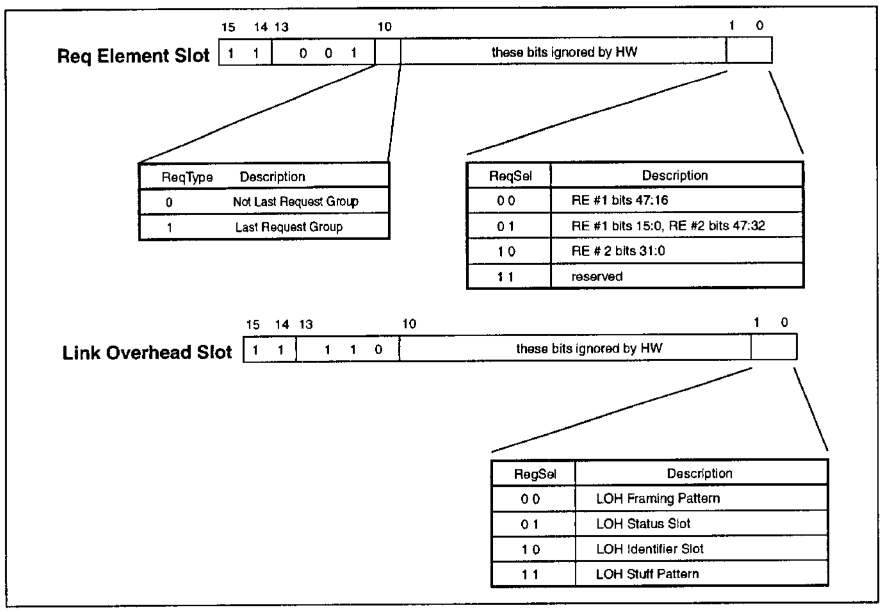
Figure 10-3: Mapper RAM Structure (2 of 2)
10.2 The ATM/IP Data Fifo
The ATM/IP Data Fifo is used as the interface between the Data Link Manager and the Data Mapper. A block diagram of the ATM/IP Data fifo is shown below in 10-4
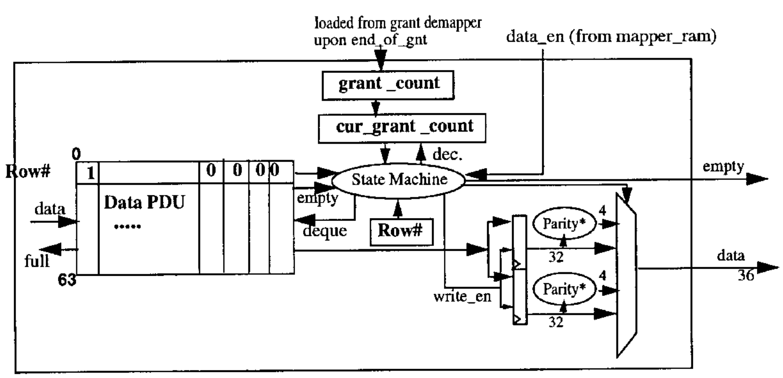

*Proprietary and Confidential Information of Onex Communications Corporation*

Figure 10-4: ATM/IP Data Fifo

The Data Link Manager writes the Data PDU's using a 64 bit interface to the fifo. The data is transmitted from the fifo in 32 bit slots with 4 bits of parity. The State Machine associated with the ATM/IP data pdu fifo has to monitor the status of the fifo and maintain data integrity. The following checks are performed by the State Machine.

1. At the beginning of each row, i.e when sor_en_b is asserted, the state machine will check the cur_grant_count. If the cur_grant_count is > 0, an alarm will be raised. (If cur_grant_count > 0 this implies that there were data PDU's left over from the previous row in the fifo). The grant_count will be loaded into cur_grant_count. (The grant_count is loaded from the grant demapper at the assertion of the end_of_gnt signal)
2. The row# will be toggled. Upon startup it is set to the value opposite to the value of the row# in the arbiter block. This is to reflect the normal device operation, where a data slot granted in row i will be transmitted in the row i + 1.
3. The empty status line will be set if there are less than 7, double pdu data slots in the fifo. Upon receipt of a data_en from the mapper ram, the state_machine will check a 4 bit counter to see if it is zero (this counts the number of data_pdu slots available for transmission of a pdu). If zero and the empty status line is not asserted i.e not zero. (i.e there is at least one full data pdu available for transmission). The dequeue will be asserted and the write_en will be asserted along with a select bit to select the top half of the data pdu for transmission through the mux.
4. The count will be incremented upon each assertion of data_en and will reset to zero, if data_en is not asserted. The rationale for this counting behavior. The data mapper will have 16 consecutive 1's for loading a data pdu, and can be begin asserting immediately after transmitting a data-pdu, in which case the counter just rolled over to zero, or immediately after transmitting either TDM data or a request, in which case the counter will be reset to zero. The ATM/IP Fifo cannot begin transmitting a data pdu if any data_en have been asserted, as all 16 slots are required to transmit a data pdu and the header information for the pdu is found in the first few dataslots.???? (check with mike how he plans to do this since he is talking about less than 16 consecutive data PDU's icky!!!)
5. Upon transmission of a data pdu, the row# placed in the fifo will be checked against the row# in the state machine, if they match the data will be transmitted, else the data will be suppressed. A mismatch may happen if data-pdu's are left over from transmission of the previous row. This may happen if the data-link manager, was late in writing in data-pdus and the number of data-pdu slots left in the row to transmit the remaining data-pdus was less than the data-remaining in the fifo. The cur_grant_count will not be decremented. An alarm will be raised to inform the control processor of this error condition.
6. If the data-pdus row# matches the row# and cur_grant_count is greater than zero, then the data-pdu will be transmitted. (Conditions: empty not asserted and cur_grant_count > 0 are prerequisites too).
7. If the cur_grant_count is zero, and the data-pdu is not empty and data_en is asserted, no data will be transmitted. If the row# matches the row# in the state_machine, the data will be dequeued from the fifo and an alarm will be raised. This is because we cannot transmit more data-pdus than that have been granted. If the row# does not match the row# in the state_machine, the data PDU's will remain in the fifo, till the assertion of the sor_en_b at which time it can be transmitted in the next row.

*Proprietary and Confidential Information of Onex Communications Corporation*

10.3 Transmit Data Path

TDM, ATM and IP data are received through the switch interface ports. The data is routed to the correct processing blocks and then mapped into the line side interfaces. The TDM data is mapped directly into pre-assigned data slots. The ATM and IP data are routed to a Tx ATM/IP processor. This processor schedules these cells and packets for transmission using a WFQ algorithm and a leaky bucket rate shaper. The Tx processor also performs IP routing and VPI/VCI address translation.

*Proprietary and Confidential Information of Onex Communications Corporation*
10.3.1 Transmit Side Block Diagram
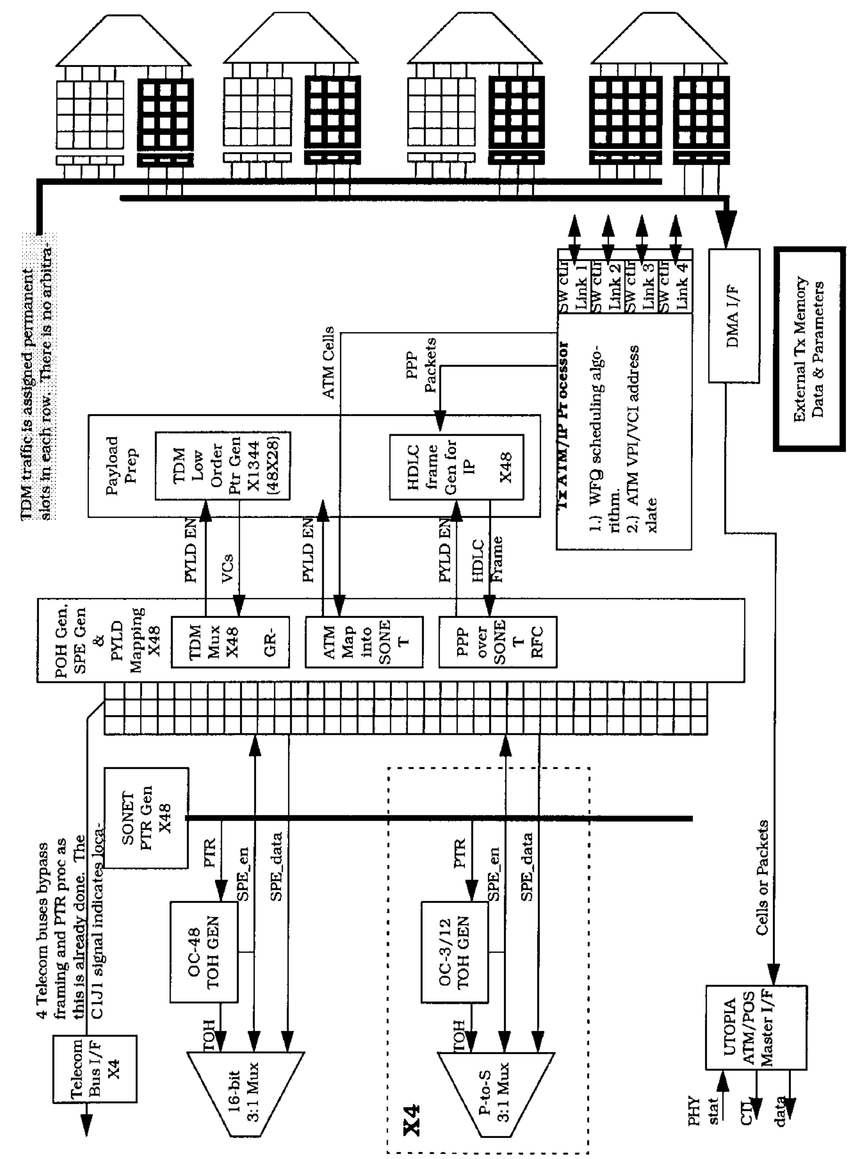
59

Proprietary and Confidential Information of Onex Communications Corporation

11 Transmit AIT/IP Traffic Processor

RESERVED

11.1 SFQ Scheduling Algorithm

RESERVED.

11.2 Start Number Sorting Algorithm

RESERVED

11.3 Hardware Heap Sorter

RESERVED

11.4 ATM Cell Processing

RESERVED.

11.4.1 ATM Cell Shaping

RESERVED.

11.4.2 ATM Cell Control Parameter Table

RESERVED

11.5 IP Packet Processing

RESERVED.

11.5.1 IP Packet Control Parameter Table

RESERVED

11.6 MPLS Packet Processing

RESERVED

11.6.1 MPLS Packet Control Parameter Table

RESERVED

11.7 Frame Relay Packet Processing

RESERVED

11.7.1 Frame Relay Packet Control Parameter Table

RESERVED.

11.8 Tx AIT Processor FIFO Data Structures

RESERVED

11.8.1 Shaping/Scheduling Parameter Read FIFO

RESERVED.

11.8.2 Shaping/Scheduling Parameter Write FIFO

RESERVED

11.8.3 External Memory Access Control FIFO

RESERVED

11.8.4 Control Message FIFO Format

RESERVED.

11.8.5 Enqueue Req FIFO

RESERVED

Proprietary and Confidential Information of Onex Communications Corporation

11.8.6 Tx AIT Dequeue Ack FIFO
RESERVED

11.8.7 Tx DLM Dequeue Req FIFO
RESERVED.

11.8.8 Tx DLM Dequeue Ack FIFO
RESERVED

11.8.9 FIFO and Hardware Heap Sorter Status Register
RESERVED.

11.9 Memory Map

RESERVED

*Proprietary and Confidential Information of Onex Communications Corporation*

12 Transmit Data Link Manager

The Transmit Data Link Manager (Tx DLM) manages the external tx memory which is used to store tx data and tx control parameters. All of the ATM cells and IP packets received from the switch interface are stored in the external tx memory while they wait to be scheduled and transmitted to an output SONET or UTOPIA port. Parameters required by the transmit shaping and scheduling algorithms are stored in the external tx memory. The Tx DLM will also perform address translation on ATM cells.

The Tx DLM will also process MPLS encapsulated IP packets. The scheduling function for MPLS will be the same as for IP. The main difference between IP and MPLS is that the Tx DLM must insert or delete an MPLS label when the Service Processor is at the edge of an MPLS network and must perform label switching when the Service Processor is in the core of an MPLS network.

The Tx DLM also allows the Host interface access to the external memory for writing and reading control parameters and to insert diagnostic and control ATM cells and IP and MPLS packets in the transmit path.

*Proprietary and Confidential Information of Onex Communications Corporation*
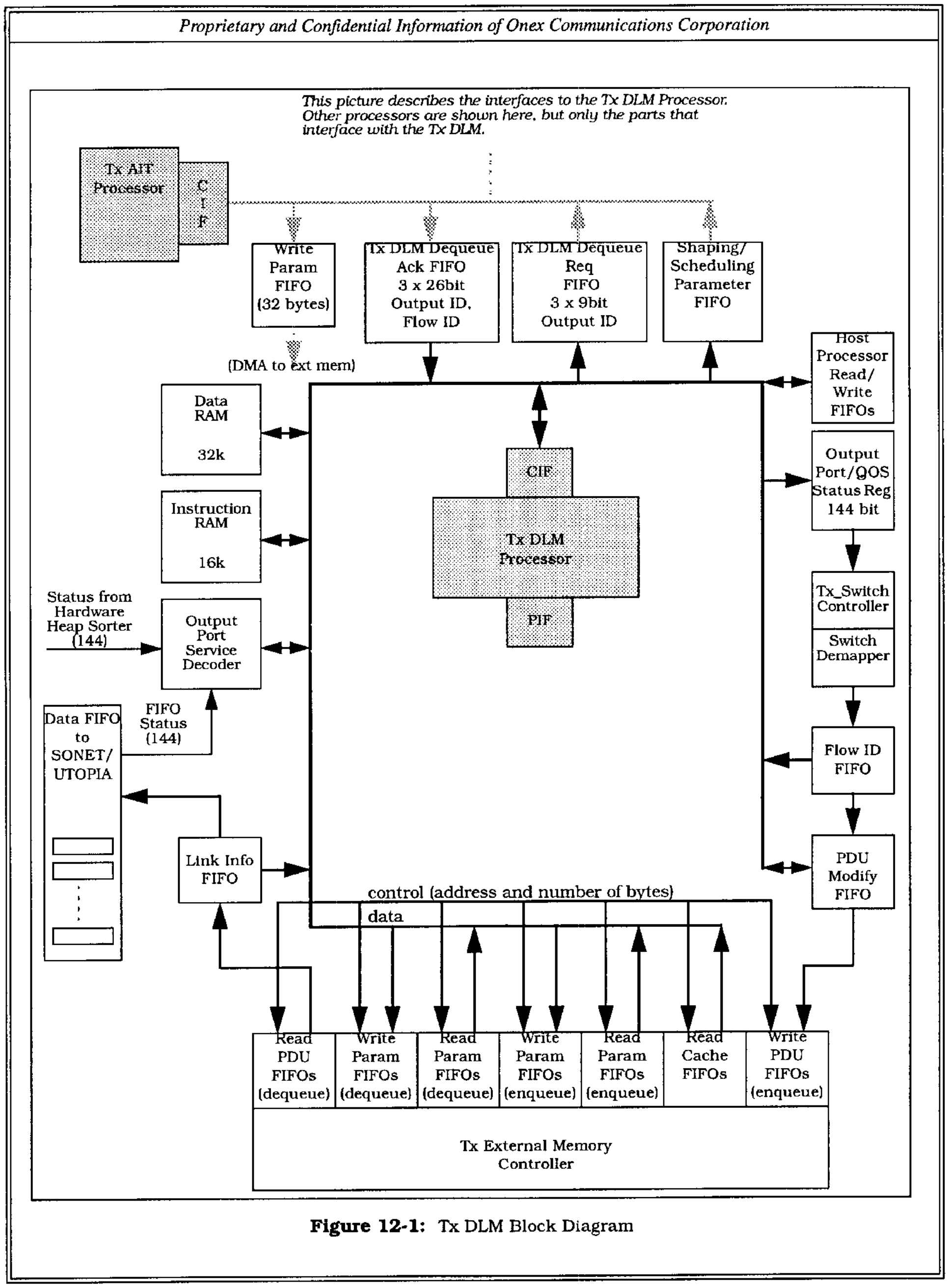
Figure 12-1: Tx DLM Block Diagram

*Proprietary and Confidential Information of Onex Communications Corporation*

The TxDLM is responsible for the tasks described in the following sections.

12.1 Tx Data Flow

The TxDLM stores ATM cells and IP and MPLS packet chunks in external memory.

- Maintain a linked list memory structure on a per-flow basis
- Maintain the Head, Tail and Length in units of 52-byte cells on a per-flow basis The length is stored on a per-flow basis for diagnostic purposes. If a particular flow or set of flows is filling the buffer to an unusually high level, then something is wrong. Maybe the SONET or UTOPIA output port is not configured correctly. Whatever the reason the DLM will alert SW so that some corrective action can be taken.

The data flow from the Switch Demapper to external memory is as follows:

- The Switch Demapper writes a PDU to the PDU FIFO and interrupts the Tx DLM.
- The Tx DLM reads the header information from the PDU FIFO, and extracts the Flow ID.
- Based on the Flow ID, the Tx DLM retrieves the Linked List/Shaping/Scheduling data structure from external memory.
- The Tx DLM writes the linked list pointer to the PDU FIFO and performs ATM address translation or MPLS label swapping, addition or deletion. The Tx DLM then initiates a DMA transfer to move the PDU to external memory.
- The Tx DLM updates the tail and count fields in the Linked List/Shaping/Scheduling data structure.
- If the PDU is an ATM cell or the last PDU of an IP or MPLS packet, then the Tx DLM passes the data structure to the Shaping/Scheduling processor through the Shaping/Scheduling Parameter FIFO. If the PDU is the first or middle fragments of an IP packet, the Tx DLM will write the data structure directly back to external memory.

The Tx AIT processor will performing the Shaping and Scheduling functions and then update and write the Linked List/Shaping/Scheduling data structure back to external memory. The data flow from external memory to the SONET/UTOPIA Data FIFOs is as follows:

- The Tx DLM will poll the Output Port Service Decoder to determine which SONET or UTOPIA Data FIFO needs servicing. The Output Port Service Decoder will perform a round robin poll of the SONET and UTOPIA Data FIFO not full signals and the Hardware Heap Sorter status signals. If a packet has been scheduled and the Data FIFO is not full, then the Output ID will be presented by the Output Port Service Decoder.
- The Tx DLM will write the Output ID to the Tx DLM Dequeue Req FIFO. The Tx AIT processor will transfer the Output ID to the Hardware Heap Sorter module. When the Hardware Heap Sorter has retrieved the Flow ID from the heap, the Tx AIT processor will write the Flow ID and Output ID to the Tx DLM Dequeue Ack FIFO.
- For a multi-PDU IP or MPLS packet, the Tx DLM will write the Output ID to Tx DLM Dequeue Req FIFO only for the Start of Packet (SOP). After that the Tx DLM will set a mask bit in the Output Port Service Decoder so that only the SONET and UTOPIA Data FIFO not full flag is used by the decoder.
- When a Flow ID and Output ID has been retrieved from the Hardware Heap Sorter, the Tx AIT will write the values to the Tx DLM Dequeue Ack FIFO. Tx DLM will then initiate a DMA transfer from external memory to the SONET/UTOPIA FIFO for the Flow ID.
- The Tx DLM will update the Link List/Shaping/Scheduling data structure and write it back to external memory.

The linked list structure for each flow is illustrated in Figure 12-2 below:

*Proprietary and Confidential Information of Onex Communications Corporation*

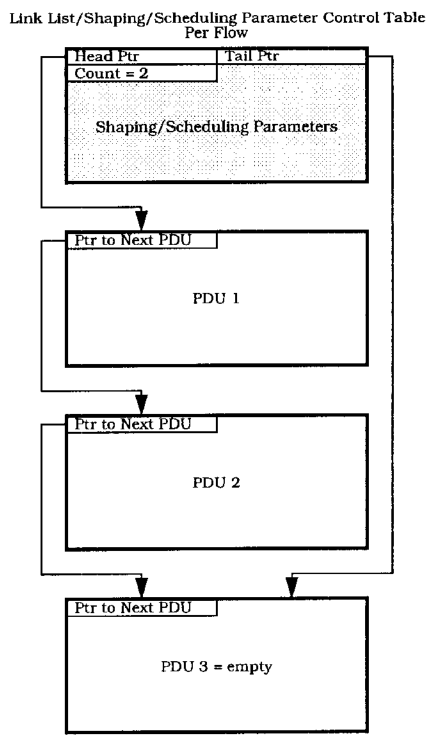

Figure 12-2: Linked List Illustration

12.2 External Memory Map

The external memory will consists of a quantity of 4, "4-bank X 4-Meg X 16-bit" FCRAM memory chips, for a total of 132M bytes of memory. The memory will partitioned such that the control table data structures will be stored in banks 0 and 1, and the PDU data structures will be stored in

*Proprietary and Confidential Information of Onex Communications Corporation*
banks 2 and 3.
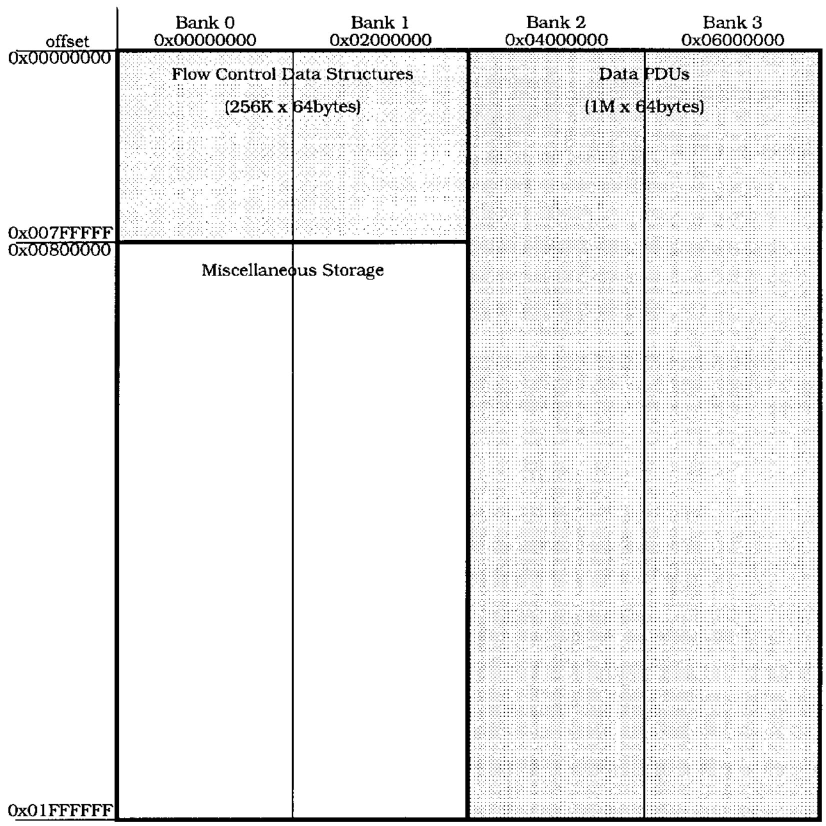
12.3 PDU Data Formats
The format of the PDU received from the switch is shown in Table Figure 12-3 below.

*Proprietary and Confidential Information of Onex Communications Corporation*

Table 12-3: PDU Format from Switch

| 63 … 56 | 55 … 48 | 47 … 40 | 39 … 32 | 31 … 24 | 23 … 16 | 15 … 8 | 7 … 0 |
|---|---|---|---|---|---|---|---|
| Pdu - - RouteTag | | | | Ver ValidPlBytes | VOQID Frg | A - - - - - - - - | - - - - SeqNo |
| - - - - - - - - | - - - - - - - FlowID | | | Payload_Byte_0 | Payload_Byte_1 | Payload_Byte_2 | Payload_Byte_3 |
| Payload_Byte_4 | Payload_Byte_5 | Payload_Byte_6 | Payload_Byte_7 | Payload_Byte_8 | Payload_Byte_9 | Payload_Byte_10 | Payload_Byte_11 |
| Payload_Byte_12 | Payload_Byte_13 | Payload_Byte_14 | Payload_Byte_15 | Payload_Byte_16 | Payload_Byte_17 | Payload_Byte_18 | Payload_Byte_19 |
| Payload_Byte_20 | Payload_Byte_21 | Payload_Byte_22 | Payload_Byte_23 | Payload_Byte_24 | Payload_Byte_25 | Payload_Byte_26 | Payload_Byte_27 |
| Payload_Byte_28 | Payload_Byte_29 | Payload_Byte_30 | Payload_Byte_31 | Payload_Byte_32 | Payload_Byte_33 | Payload_Byte_34 | Payload_Byte_35 |
| Payload_Byte_36 | Payload_Byte_37 | Payload_Byte_38 | Payload_Byte_39 | Payload_Byte_40 | Payload_Byte_41 | Payload_Byte_42 | Payload_Byte_43 |
| Payload_Byte_44 | Payload_Byte_45 | Payload_Byte_46 | Payload_Byte_47 | Payload_Byte_48 | Payload_Byte_49 | Payload_Byte_50 | Payload_Byte_51 |

Note: reserved bit positions are indicated with a "-". The default state for these bits is 0.

The field descriptions are as follows:

Pdu

This 2-bit field identifies what type of data is being carried within this PDU.

| PDU]1:0] | Description |
|---|---|
| 00 | Idle |
| 01 | ATM Cell |
| 10 | IP Packet |
| 11 | Control Message |

If an "Idle" PDU is detected, it will not be forwarded through the switch.

RouteTag 28-bit field which identifies the self route through the switch fabric.

A - Abort

This bit will be set if fragmentation for this packet is being aborted. When the Tx DLM detects a PDU with this bit set, it will terminate reassembly of the packet and discard any fragments previously received.

Ver

This 2-bit field indicates the iTAP protocol version used when creating this PDU. This field will be set to "00" for the initial version of the iTAP chipset.

ValidPlBytes

For IP and control PDUs, when the Fragment Indicator is set for "Last Fragment" this 6-bit field will indicate how many payload bytes are carried in this PDU.

VOQID

This 5-bit field identifies the destination iTPP's Virtual Output Queue for this PDU.

Frg

This 2-bit field identifies whether this is a complete packet or a fragment of a longer IP packet or control message.

| Frg[1:0] | Description |
|---|---|
| 00 | Middle Fragment |
| 01 | First Fragment |

*Proprietary and Confidential Information of Onex Communications Corporation*

| | |
|---|---|
| 10 | Last Fragment |
| 11 | Complete Packet |

A - Abort
This bit will be set if fragmentation for this packet is being aborted. When the output port processor detects a PDU with this bit set, it will terminate reassembly of the packet and discard any fragments previously received.

SeqNo
SeqNo is the fragment sequence count, it will be incremented for each fragment. The SeqNo will start at 0 for the first fragment. If there are more than 16 fragments to the PDU, this SeqNo will roll over past 15 and continue counting.

FlowId
This 17-bit field identifies which flow this cell belongs to in the destination iTPP.

After the entire PDU has been received in the Enqueue PDU FIFO, the Tx DLM will modify the PDU by adding the Next Pointer for link list operation and by performing ATM address translation or MPLS label swapping, insertion, or deletion. The format of the modified PDU is shown in Table Figure 12-4.

Table 12-4: PDU Format in External Memory

| 63 56 | 55 48 | 47 40 | 39 32 | 31 24 | 23 16 | 15 8 | 7 0 |
|---|---|---|---|---|---|---|---|
| PhyNo | Ver ValidPlBytes | VOQID Frg A - - | PduStart | NextPointer | | | |
| (may contain data if an MPLS flow) | | | | Payload_Byte_0 | Payload_Byte_1 | Payload_Byte_2 | Payload_Byte_3 |
| Payload_Byte_4 | Payload_Byte_5 | Payload_Byte_6 | Payload_Byte_7 | Payload_Byte_8 | Payload_Byte_9 | Payload_Byte_10 | Payload_Byte_11 |
| Payload_Byte_12 | Payload_Byte_13 | Payload_Byte_14 | Payload_Byte_15 | Payload_Byte_16 | Payload_Byte_17 | Payload_Byte_18 | Payload_Byte_19 |
| Payload_Byte_20 | Payload_Byte_21 | Payload_Byte_22 | Payload_Byte_23 | Payload_Byte_24 | Payload_Byte_25 | Payload_Byte_26 | Payload_Byte_27 |
| Payload_Byte_28 | Payload_Byte_29 | Payload_Byte_30 | Payload_Byte_31 | Payload_Byte_32 | Payload_Byte_33 | Payload_Byte_34 | Payload_Byte_35 |
| Payload_Byte_36 | Payload_Byte_37 | Payload_Byte_38 | Payload_Byte_39 | Payload_Byte_40 | Payload_Byte_41 | Payload_Byte_42 | Payload_Byte_43 |
| Payload_Byte_44 | Payload_Byte_45 | Payload_Byte_46 | Payload_Byte_47 | Payload_Byte_48 | Payload_Byte_49 | Payload_Byte_50 | Payload_Byte_51 |

The PDU fields modified by the Tx DLM are described below:

PhyNo
Phy No is a value from decimal 0 to 143, that identifies which SONET or UTOPIA Data FIFO the PDU is to be written to when the PDU is dequeued from external memory.

NextPointer
This 32-bit field is used to link the PDUs for a particular flow together.

PduStart
This 6-bit field will be used during the dequeue operation to determine the location of the first payload byte. The default location is 12, as shown in Table Figure 12-4. In applications where an MPLS label is being inserted, the first payload byte will be in location 8. Likewise, in applications where an MPLS header is being deleted, the first payload byte will be in location 16.

12.4 ATM Cell Processing

The data flow for receiving an ATM cell PDU from the switch, performing address translation and then enqueueing the cell PDU in external memory is described below:

- The Switch Demapper writes an ATM cell to the Enqueue PDU FIFO.

*Proprietary and Confidential Information of Onex Communications Corporation*

- The Tx DLM will begin processing the ATM cell when the Enqueue PDU FIFO full flag is set. The full flag can either be polled or an interrupt can be generated. Hardware supports either method.
- The Tx DLM will read the Flow ID from the FIFO and retrieve the Linked List/Shaping/Scheduling parameter table from external memory.
- A new PDU pointer will be allocated from the Free List and written to the NextPointer field.
- The address translation enable bit in the parameter table will be examined to determine if the VPI/VCI address bytes in the PDU should be overwritten with values from the parameter table. If enabled, PDU bytes 0-3 will be overwritten with the VPI/VCI from the parameter table, except for the PTI and CLP bits.
- The parameter table is transferred to the Shaping/Scheduling Parameter FIFO so that the ATM cell can be scheduled.

The address translation function and resulting format of the ATM cell PDU in external memory is shown in the table below.

Table 12-5: ATM Cell PDU Format to External Memory

| 63 … 56 | 55 … 48 | 47 … 40 | 39 … 32 | 31 … 24 | 23 … 16 | 15 … 8 | 7 … 0 |
|---|---|---|---|---|---|---|---|
| PhyNo | Ver, ValidPlBytes | VOQID, Frg, A | -, -, PduStart | NextPointer | | | |
| - - - - - - - - | - - - - - - - - | - - - - - - - - | - - - - - - - - | VPI/VCI Byte 0 | VPI/VCI Byte 1 | VPI/VCI Byte 2 | VPI/VCI Byte 3 |
| Payload_Byte_4 | Payload_Byte_5 | Payload_Byte_6 | Payload_Byte_7 | Payload_Byte_8 | Payload_Byte_9 | Payload_Byte_10 | Payload_Byte_11 |
| Payload_Byte_12 | Payload_Byte_13 | Payload_Byte_14 | Payload_Byte_15 | Payload_Byte_16 | Payload_Byte_17 | Payload_Byte_18 | Payload_Byte_19 |
| Payload_Byte_20 | Payload_Byte_21 | Payload_Byte_22 | Payload_Byte_23 | Payload_Byte_24 | Payload_Byte_25 | Payload_Byte_26 | Payload_Byte_27 |
| Payload_Byte_28 | Payload_Byte_29 | Payload_Byte_30 | Payload_Byte_31 | Payload_Byte_32 | Payload_Byte_33 | Payload_Byte_34 | Payload_Byte_35 |
| Payload_Byte_36 | Payload_Byte_37 | Payload_Byte_38 | Payload_Byte_39 | Payload_Byte_40 | Payload_Byte_41 | Payload_Byte_42 | Payload_Byte_43 |
| Payload_Byte_44 | Payload_Byte_45 | Payload_Byte_46 | Payload_Byte_47 | Payload_Byte_48 | Payload_Byte_49 | Payload_Byte_50 | Payload_Byte_51 |

Proprietary and Confidential Information of Onex Communications Corporation
The enqueue process for an ATM cell PDU is shown in the flow chart below:
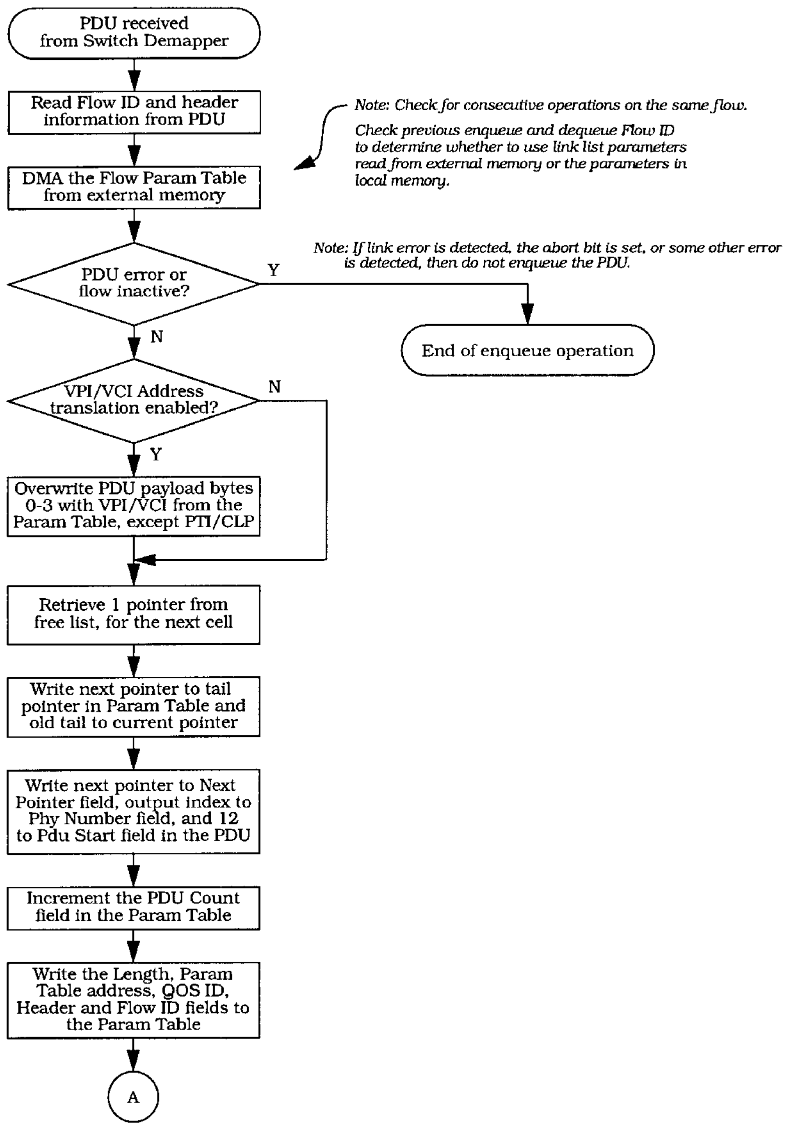

Proprietary and Confidential Information of Onex Communications Corporation
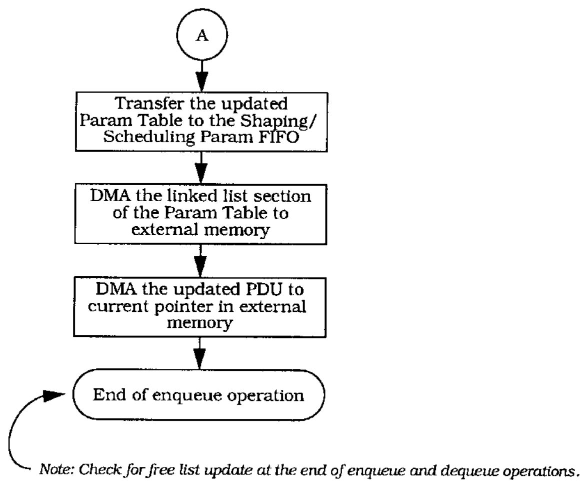

*Proprietary and Confidential Information of Onex Communications Corporation*
The dequeue process for an ATM cell PDU is shown in the flow chart below:
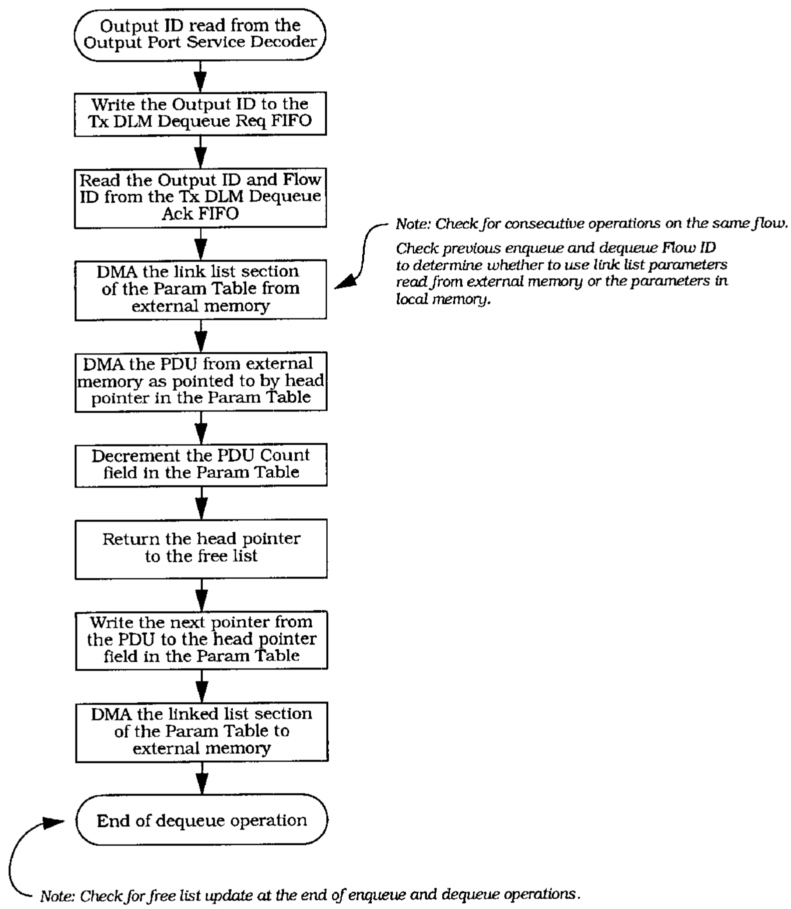

*Proprietary and Confidential Information of Onex Communications Corporation*

The shaping, scheduling, and state information that must be kept for each flow is described in this section. The table format for an ATM cell flow is shown in the table below.

Table 12-6: ATM Flow Transmit Control Table

| 63–56 | 55–48 | 47–40 | 39–32 | 31–24 | 23–16 | 15–8 | 7–0 | addr offset |
|---|---|---|---|---|---|---|---|---|
| Last Finishing Number (dynamic) | | | | Egress CLP0+1 Counter (dynamic) | | | | 0x00 |
| Last Conformance Timestamp 0 (dynamic) | | | | Last Conformance Timestamp 1 (dynamic) | | | | 0x08 |
| Shaping Bucket 0 Counter (dynamic) | | | | Shaping Bucket 1 Counter (dynamic) | | | | 0x10 |
| Non-Conforming Weight, Bucket 0 (static) | | Non-Conforming Weight, Bucket 1 (static) | | Non-Conforming Cell Counter (dynamic) | | OAM Cell Counter (dynamic) | | 0x18 |
| Shaping Bucket 0 Limit (static) | | Shaping Bucket 1 Limit (static) | | LmtMult0 (static) | LmtMult1 (static) | Conforming Weigh (static) | | 0x20 |
| Shaping Bucket 0 Increment (static) | | Shaping Bucket 1 Increment (static) | | VPI/VCI Address Translation (static) | | | | 0x28 |
| MiscParams (static) | OutputIndex (static) | Shp0 (static) | Shp1 (static) | Head Pointer (dynamic) | | | | 0x30 |
| PDU Count (dynamic) | | | | Tail Pointer (dynamic) | | | | 0x38 |

12.5 IP Packet Processing

The data flow for receiving an IP PDU from the switch and enqueueing the IP PDU in external memory is described below:

- The Switch Demapper writes an IP PDU to the Enqueue PDU FIFO.
- The Tx DLM will begin processing the IP PDU when the Enqueue PDU FIFO full flag is set. The full flag can either be polled or an interrupt can be generated. Hardware supports either method.
- The Tx DLM will read the Flow ID from the FIFO and retrieve the Linked List/Shaping/Scheduling parameter table from external memory.
- A new PDU pointer will be allocated from the Free List and written to the NextPointer field.
- If the PDU is the last DPU fragment of an IP packet or a single PDU IP packet (Frg field = 10 or 11), then the Tx DLM will transfer the parameter table to the Shaping/Scheduling Parameter FIFO so that the IP packet can be scheduled.

The format of the IP packet PDU in external memory is shown in the table below.

Table 12-7: IP Packet PDU Format to External Memory

| 63–56 | 55–48 | 47–40 | 39–32 | 31–24 | 23–16 | 15–8 | 7–0 |
|---|---|---|---|---|---|---|---|
| PhyNo | Ver, ValidPIBytes | VOQID, Frg, A | -, -, PduStart | NextPointer | | | |
| - - - - - - - - | - - - - - - - - | - - - - - - - - | - - - - - - - - | Payload_Byte_0 | Payload_Byte_1 | Payload_Byte_2 | Payload_Byte_3 |
| Payload_Byte_4 | Payload_Byte_5 | Payload_Byte_6 | Payload_Byte_7 | Payload_Byte_8 | Payload_Byte_9 | Payload_Byte_10 | Payload_Byte_11 |
| Payload_Byte_12 | Payload_Byte_13 | Payload_Byte_14 | Payload_Byte_15 | Payload_Byte_16 | Payload_Byte_17 | Payload_Byte_18 | Payload_Byte_19 |
| Payload_Byte_20 | Payload_Byte_21 | Payload_Byte_22 | Payload_Byte_23 | Payload_Byte_24 | Payload_Byte_25 | Payload_Byte_26 | Payload_Byte_27 |
| Payload_Byte_28 | Payload_Byte_29 | Payload_Byte_30 | Payload_Byte_31 | Payload_Byte_32 | Payload_Byte_33 | Payload_Byte_34 | Payload_Byte_35 |

Proprietary and Confidential Information of Onex Communications Corporation

| 63 | 56 55 | 48 47 | 40 39 | 32 31 | 24 23 | 16 15 | 8 7 0 |
|---|---|---|---|---|---|---|---|
| Payload_Byte_36 | Payload_Byte_37 | Payload_Byte_38 | Payload_Byte_39 | Payload_Byte_40 | Payload_Byte_41 | Payload_Byte_42 | Payload_Byte_43 |
| Payload_Byte_44 | Payload_Byte_45 | Payload_Byte_46 | Payload_Byte_47 | Payload_Byte_48 | Payload_Byte_49 | Payload_Byte_50 | Payload_Byte_51 |

Proprietary and Confidential Information of Onex Communications Corporation
The enqueue process for an IP packet PDU is shown in the flow chart below:
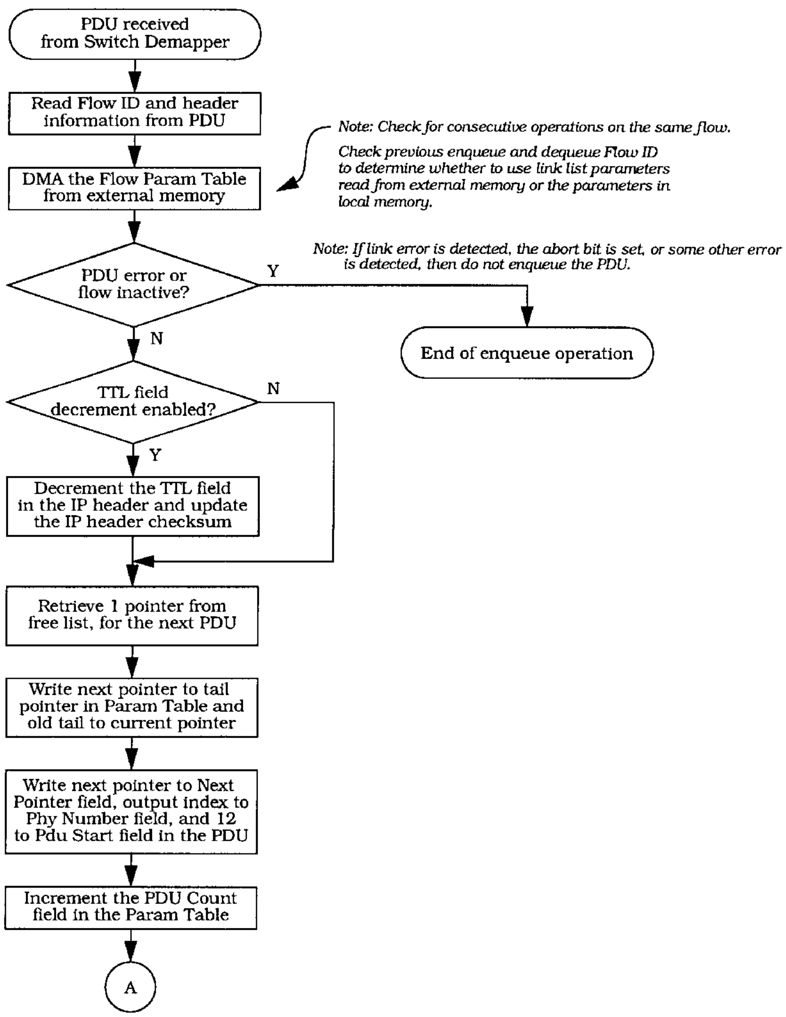

Proprietary and Confidential Information of Onex Communications Corporation
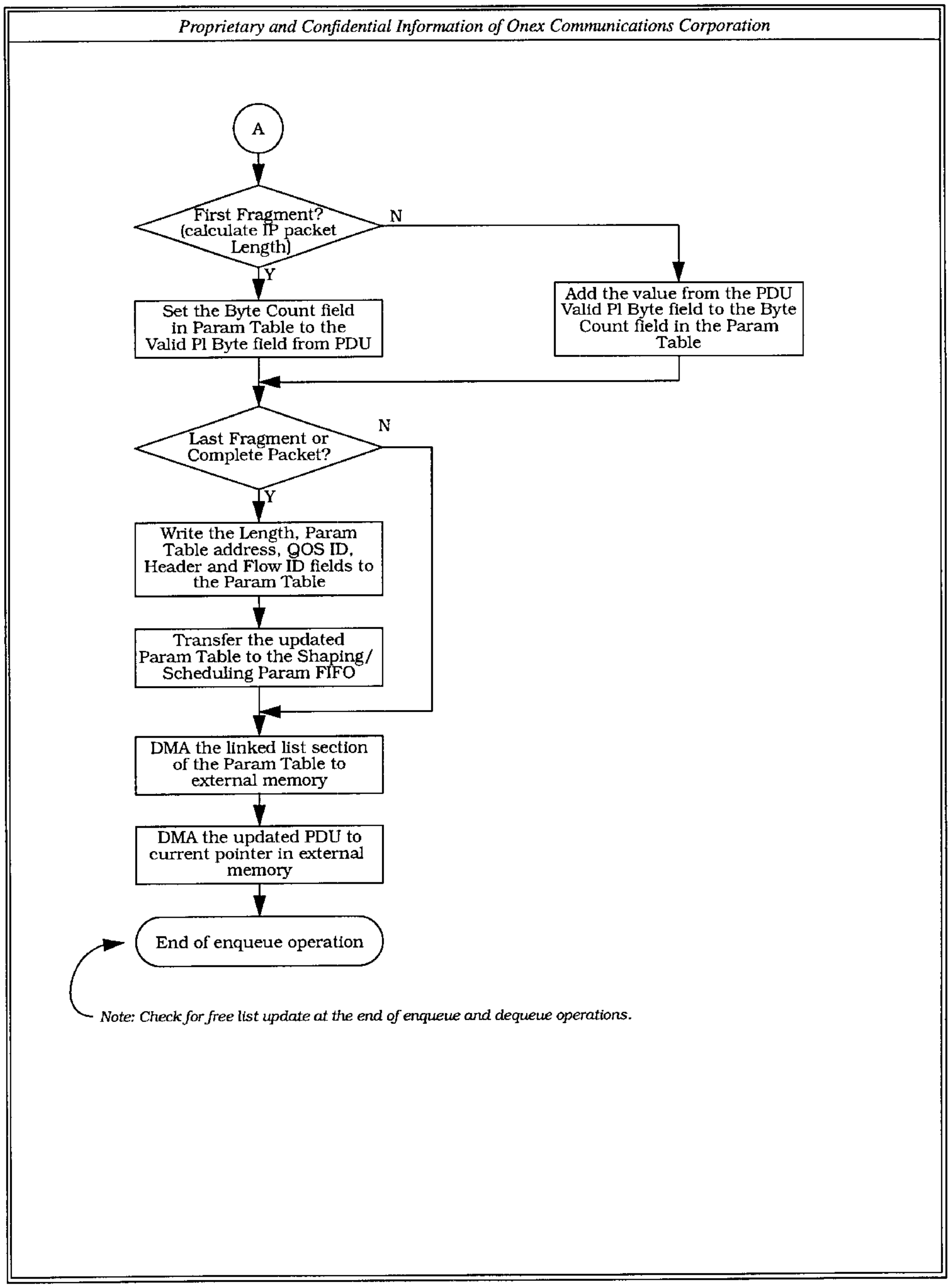

*Proprietary and Confidential Information of Onex Communications Corporation*
The dequeue process for an IP packet PDU is shown in the flow chart below:
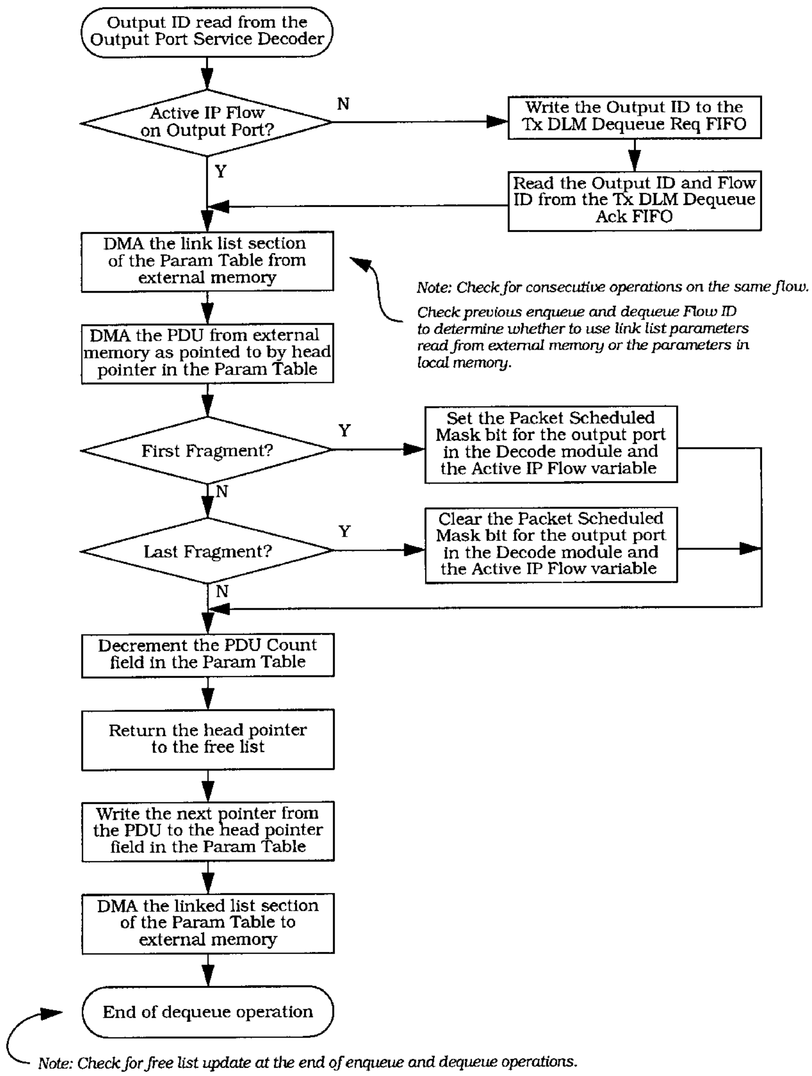

*Proprietary and Confidential Information of Onex Communications Corporation*

The control table data structure for an IP flow is shown in the table below:

Table 12-8: IP Flow Transmit Control Table

| 63–56 | 55–48 | 47–32 | 31–16 | 15–0 | addr offset |
|---|---|---|---|---|---|
| Last Finishing Number (dynamic) | | | IP Byte Count, Cumulative (dynamic) | | 0x00 |
| Reserved | | | Reserved | | 0x08 |
| Reserved | | | Reserved | | 0x10 |
| Reserved | | | Reserved | | 0x18 |
| Enqueue Head Pointer (dynamic) | | | PDU Count in Current Packet (dynamic) | Flow Allocation Weight (static) | 0x20 |
| Dequeue Head Pointer (dynamic) | | | Reserved | | 0x28 |
| MiscParams (static) | OutputIndex (static) | Byte Count in Current Packet (dynamic) | Head Pointer (dynamic) | | 0x30 |
| PDU Count (dynamic) | | | Tail Pointer (dynamic) | | 0x38 |

12.6 MPLS Packet Processing

The data flow for receiving an MPLS PDU from the switch and enqueueing the MPLS PDU in external memory is described below:

- The Switch Demapper writes an MPLS PDU to the Enqueue PDU FIFO.
- The Tx DLM will begin processing the MPLS PDU when the Enqueue PDU FIFO full flag is set. The full flag can either be polled or an interrupt can be generated. Hardware supports either method.
- The Tx DLM will read the Flow ID from the FIFO and retrieve the Linked List/Shaping/Scheduling parameter table from external memory.
- A new PDU pointer will be allocated from the Free List and written to the NextPointer field.
- The MplsMode and PppMode bits in the parameter table will be examined to determine what action should be taken with regards to the MPLS header. This is described in detail later in this section.
- If the PDU is the last DPU fragment of the MPLS packet or a single PDU MPLS packet (Frg field = 10 or 11), then the Tx DLM will transfer the parameter table to the Shaping/Scheduling Parameter FIFO so that the MPLS packet can be scheduled.

There are two MPLS operating modes that the Tx DLM must support: as a Label Edge Router (LER) and as a Label Switching Router (LSR). When functioning as an LER, the Tx DLM will be able to add and delete an MPLS label from an IP packet. When functioning as an LSR in the core of an MPLS network, the Tx DLM will perform MPLS label switching, similar to ATM address translation. An added complexity is that the IP packet may have a PPP protocol field appended to the front of the packet. The exact mode of operation is determined by the MplsMode field in the Link List/Shaping/Scheduling parameter table. The MplsMode field is described below:

| MplsMode[1:0] | Description |
|---|---|
| 00 | MPLS label added |
| 01 | MPLS label deleted |
| 10 | MPLS label switched |
| 11 | MPLS label unchanged |

The location of the MPLS label in the PDU is determined by the PppMode bit, as described below:

| PppMode | Description |
|---|---|
| 0 | IP packet, no PPP encapsulation |
| 1 | IP packet with PPP encapsulation |

Several PDU examples are shown below, illustrating how the PDU format changes depending

*Proprietary and Confidential Information of Onex Communications Corporation* on the MplsMode and PppMode bit settings:

| PHY | PlBytes | | PduStart | | | | |
|---|---|---|---|---|---|---|---|
| | | | | B0 | B1 | B2 | B3 |
| B4 | B5 | B6 | B7 | B8 | B9 | B10 | B11 |
| B12 | .... | ........ | ........ | ........ | ... | | B19 |
| B20 | .... | ........ | ........ | ........ | ... | | B27 |
| B28 | .... | ........ | ........ | ........ | ... | | B35 |
| B36 | .... | ........ | ........ | ........ | ... | | B43 |
| B44 | B45 | B46 | B47 | B48 | B49 | B50 | B51 |

MPLS SOP PDU before label modification or MplsMode = 11
PduStart = 12

Legend: B - Payload Bytes
M - New MPLS Label Bytes

| PHY | PlBytes | | PduStart | | | | |
|---|---|---|---|---|---|---|---|
| M0 | M1 | M2 | M3 | B0 | B1 | B2 | B3 |
| B4 | B5 | B6 | B7 | B8 | B9 | B10 | B11 |
| B12 | .... | ........ | ........ | ........ | ... | | B19 |
| B20 | .... | ........ | ........ | ........ | ... | | B27 |
| B28 | .... | ........ | ........ | ........ | ... | | B35 |
| B36 | .... | ........ | ........ | ........ | ... | | B43 |
| B44 | B45 | B46 | B47 | B48 | B49 | B50 | B51 |

Add MLPS Label, no PPP encapuslation
MPLS SOP PDU after label modification
MplsMode = 00, PppMode = 0, PduStart = 8
PlBytes = ValidPlBytes + 4

| PHY | PlBytes | | PduStart | | | | |
|---|---|---|---|---|---|---|---|
| B0 | B1 | M0 | M1 | M2 | M3 | B2 | B3 |
| B4 | B5 | B6 | B7 | B8 | B9 | B10 | B11 |
| B12 | .... | ........ | ........ | ........ | ... | | B19 |
| B20 | .... | ........ | ........ | ........ | ... | | B27 |
| B28 | .... | ........ | ........ | ........ | ... | | B35 |
| B36 | .... | ........ | ........ | ........ | ... | | B43 |
| B44 | B45 | B46 | B47 | B48 | B49 | B50 | B51 |

Add MLPS Label, with PPP encapuslation
MPLS SOP PDU after label modification
MplsMode = 00, PppMode = 1, PduStart = 8
PlBytes = ValidPlBytes + 4

| PHY | PlBytes | | PduStart | | | | |
|---|---|---|---|---|---|---|---|
| | | | | | | | |
| B4 | B5 | B6 | B7 | B8 | B9 | B10 | B11 |
| B12 | .... | ........ | ........ | ........ | ... | | B19 |
| B20 | .... | ........ | ........ | ........ | ... | | B27 |
| B28 | .... | ........ | ........ | ........ | ... | | B35 |
| B36 | .... | ........ | ........ | ........ | ... | | B43 |
| B44 | B45 | B46 | B47 | B48 | B49 | B50 | B51 |

Delete MLPS Label, no PPP encapuslation
MPLS SOP PDU after label modification
MplsMode = 01, PppMode = 0, PduStart = 16
Note: old MPLS Bytes were located in B0-B3
PlBytes = ValidPlBytes - 4

| PHY | PlBytes | | PduStart | | | | |
|---|---|---|---|---|---|---|---|
| | | | | | | | |
| B0 | B1 | B6 | B7 | B8 | B9 | B10 | B11 |
| B12 | .... | ........ | ........ | ........ | ... | | B19 |
| B20 | .... | ........ | ........ | ........ | ... | | B27 |
| B28 | .... | ........ | ........ | ........ | ... | | B35 |
| B36 | .... | ........ | ........ | ........ | ... | | B43 |
| B44 | B45 | B46 | B47 | B48 | B49 | B50 | B51 |

Delete MLPS Label, with PPP encapuslation
MPLS SOP PDU after label modification
MplsMode = 01, PppMode = 1, PduStart = 16
Note: old MPLS Bytes were located in B2-B5
PlBytes = ValidPlBytes - 4

| PHY | PlBytes | | PduStart | | | | |
|---|---|---|---|---|---|---|---|
| | | | | M0 | M1 | M2 | M3 |
| B4 | B5 | B6 | B7 | B8 | B9 | B10 | B11 |
| B12 | .... | ........ | ........ | ........ | ... | | B19 |
| B20 | .... | ........ | ........ | ........ | ... | | B27 |
| B28 | .... | ........ | ........ | ........ | ... | | B35 |
| B36 | .... | ........ | ........ | ........ | ... | | B43 |
| B44 | B45 | B46 | B47 | B48 | B49 | B50 | B51 |

Switch MLPS Label, no PPP encapuslation
MPLS SOP PDU after label modification
MplsMode = 10, PppMode = 0, PduStart = 12
Note: old MPLS Bytes were located in B0-B3
PlBytes = ValidPlBytes

| PHY | PlBytes | | PduStart | | | | |
|---|---|---|---|---|---|---|---|
| | | | | B0 | B1 | M0 | M1 |
| M2 | M3 | B6 | B7 | B8 | B9 | B10 | B11 |
| B12 | .... | ........ | ........ | ........ | ... | | B19 |
| B20 | .... | ........ | ........ | ........ | ... | | B27 |
| B28 | .... | ........ | ........ | ........ | ... | | B35 |
| B36 | .... | ........ | ........ | ........ | ... | | B43 |
| B44 | B45 | B46 | B47 | B48 | B49 | B50 | B51 |

Switch MLPS Label, with PPP encapuslation
MPLS SOP PDU after label modification
MplsMode = 10, PppMode = 1, PduStart = 12
Note: old MPLS Bytes were located in B2-B5
PlBytes = ValidPlBytes

*Proprietary and Confidential Information of Onex Communications Corporation*
The enqueue process for an MPLS packet PDU is shown in the flow chart below:
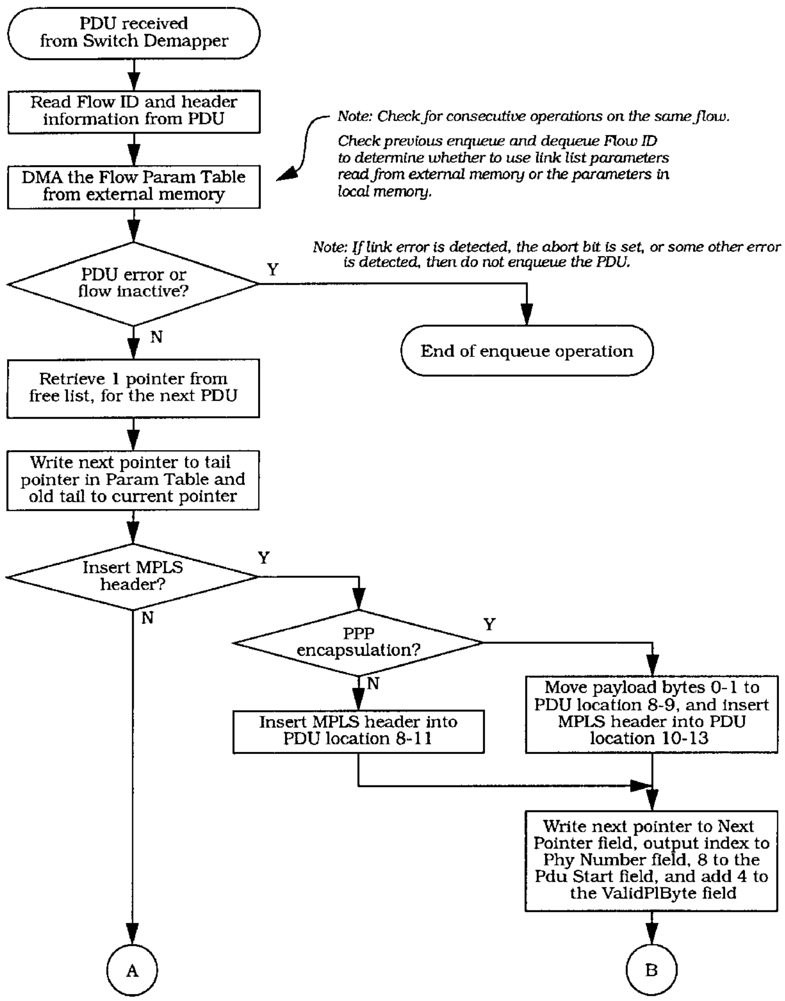

*Proprietary and Confidential Information of Onex Communications Corporation*
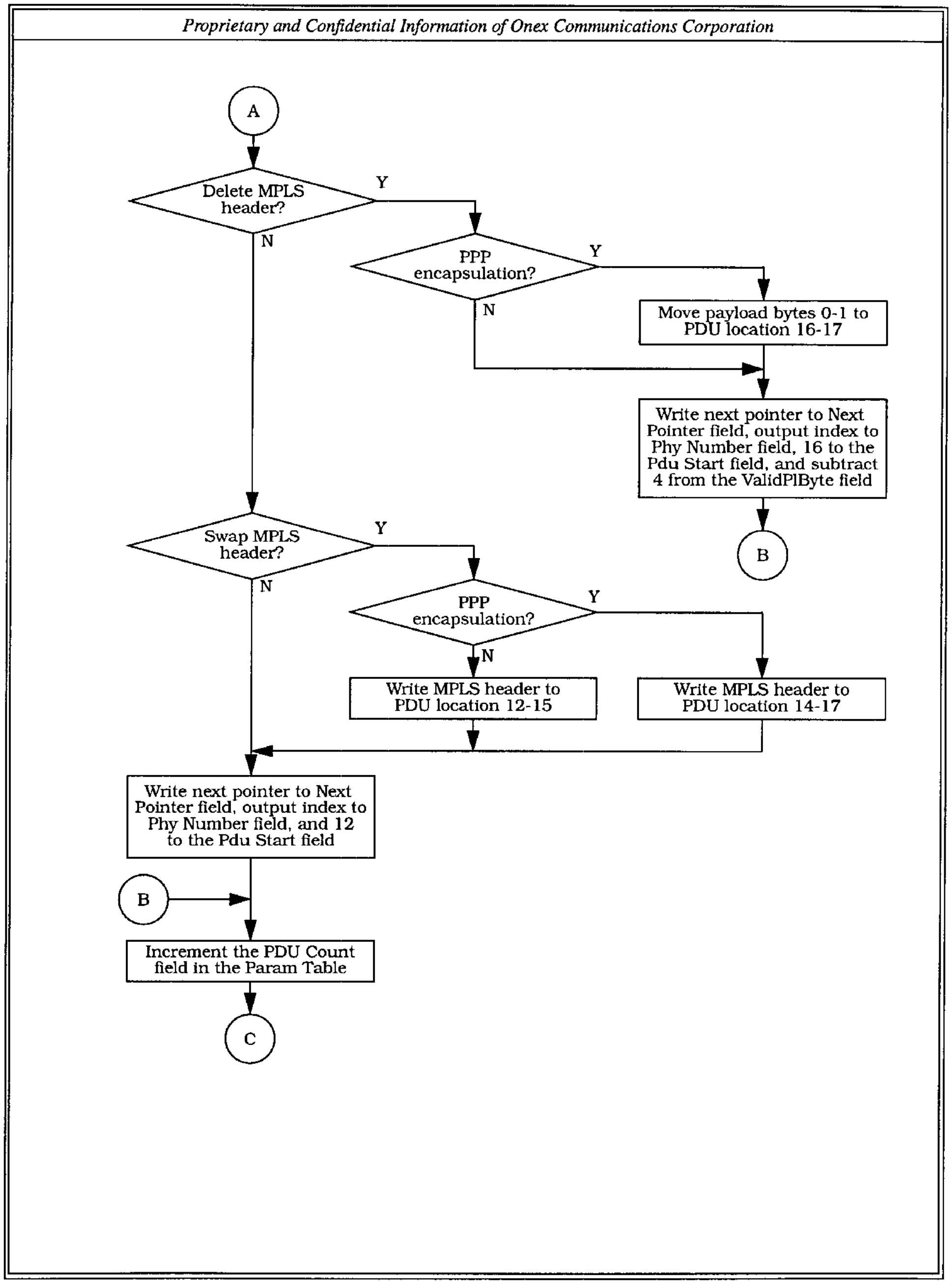
82

*Proprietary and Confidential Information of Onex Communications Corporation*
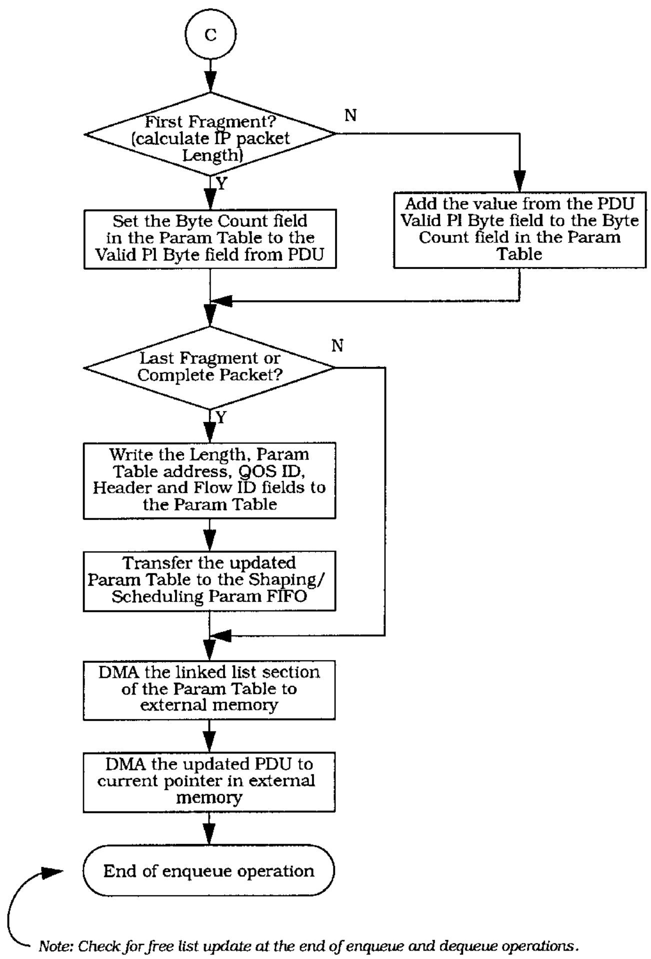

*Proprietary and Confidential Information of Onex Communications Corporation*
The dequeue process for an MPLS packet PDU is shown in the flow chart below:
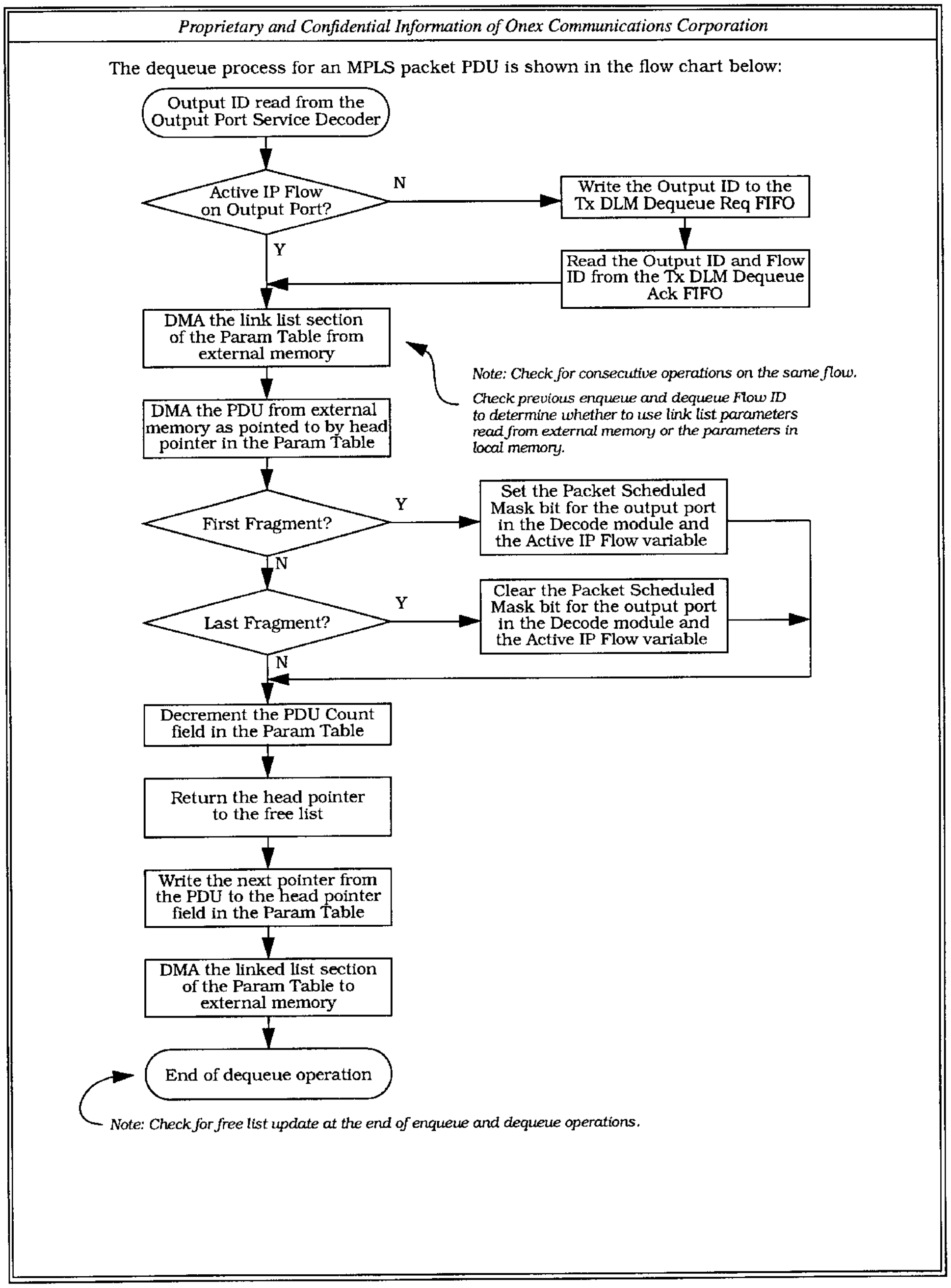
84

The control table data structure for an MPLS flow is shown in the table below:

Table 12-9: MPLS Flow Transmit Control Table

| 63 … 56 | 55 … 48 | 47 … 40 39 … 32 | 31 … 24 23 … 16 | 15 … 8 7 … 0 | addr offset |
|---|---|---|---|---|---|
| Last Finishing Number (dynamic) | | | IP Byte Count, Cumulative (dynamic) | | 0x00 |
| Reserved | | | Reserved | | 0x08 |
| Reserved | | | Reserved | | 0x10 |
| Reserved | | | Reserved | | 0x18 |
| Enqueue Head Pointer (dynamic) | | | PDU Count in Current Packet (dynamic) | Flow Allocation Weight (static) | 0x20 |
| Dequeue Head Pointer (dynamic) | | | MPLS Label (static) | | 0x28 |
| MiscParams (static) | OutputIndex (static) | Byte Count in Current Packet (dynamic) | Head Pointer (dynamic) | | 0x30 |
| PDU Count (dynamic) | | | Tail Pointer (dynamic) | | 0x38 |

12.7 Free List Data Structure

The Free List will be stored in external memory, but a cache will be kept in local data RAM. The idea is to keep 16 full and 16 empty pointers locally. The free pointer data structure is shown

*Proprietary and Confidential Information of Onex Communications Corporation* below:

The process will be that enqueues will use pointers from the local cache until there less than 8 pointers left locally. When this threshold is reached, a new pointer will be read from external memory and written into the next local empty location. Likewise, dequeues will write freed up pointers to empty locations in the local cache. When there are less than 8 empty locations left in the local cache, then a pointers will be written back to external memory, freeing up a location in the local cache.

Free List Local Cache at Initialization

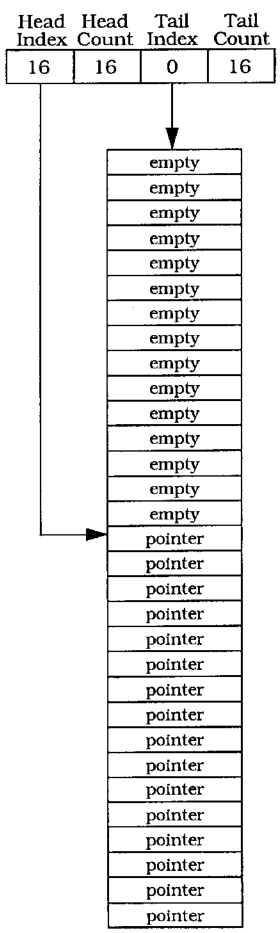

Free List External Pointers

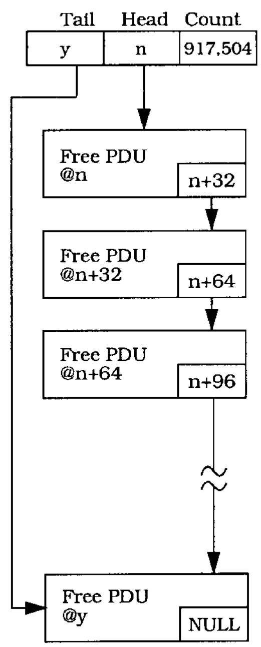

Note: Banks 2 and 3 of the external memory are reserved for PDU storage, which allows a maximum of 1M (1,048,576) 64-byte PDUs. At Initialization, the first 128K PDUs are pre-allocated, one per flow, leaving 917,504 PDUs in the free queue.

86

12.8 Tx DLM Processor FIFO Data Structures

The Tx DLM Processor will communicate with the Tx AIT and the SONET/UTOPIA and Switch Interface hardware modules through FIFOs connected to the Cache Interface (CIF). Address decoding is required to connect the FIFOs to the CIF data bus and generate the FIFO read and write strobes.

*Proprietary and Confidential Information of Onex Communications Corporation*

13 Transmit Side SONET Interfaces

RESERVED

13.1 Path Overhead Generation

RESERVED

13.2 High Order Pointer Generation

RESERVED

13.3 Transport Overhead Generation

RESERVED

13.3.1 Section Overhead

RESERVED

13.3.2 Line Overhead

RESERVED

13.4 SONET Frame Generation & Scrambling

RESERVED

13.5 Parallel to Serial Conversion

RESERVED

13.6 SPE Generation

RESERVED.

13.6.1 Payload Mapping

RESERVED.

13.6.2 TDM Mapping into SONET

RESERVED

13.6.3 ATM Cell Mapping into SONET

RESERVED

13.6.4 SONET Encapsulation of IP

RESERVED

13.6.5 SPE Routing

RESERVED

13.6.6 Transmit Side Telecom Bus I/F

RESERVED

Proprietary and Confidential Information of Onex Communications Corporation

14 UTOPIA Interface

14.1 UTOPIA Summary

- Level 2. Level 2 Frame Based (UL2+), Level 3 & L3 Frame Based
- Master & Slave
- 96 Supported PHYs in both Master and Slave mode Number of supported PHYs is limited by the UTOPIA Output side and the amount of buffering required per-PHY. Goal is 192 PHYs because this is the projected number of DSL ports that can be put in one rack. This number is based on a power limitation. The buffering required for support of 192 is too much

- UTOPIA In has one 4-cell FIFO - all PHYs pass through the same FIFO

Since all of the incoming data is destined for the external memory and will be queued with respect to flow ID it doesn't make any sense to exert back pressure on a per-PHY basis. The Data Link Manager (DLM) can stop taking data from the UTOPIA I/F and this would cause the FIFO in the UTOPIA Interface to overflow and the UTOPIA In I/F should set an alarm as this is an error condition. It is a design goal that the RxDLM and the SDRAM controller are able to service the UTOPIA In FIFO fast enough so that the overflow condition will never happen

- Rx DLM must be able to keep this single FIFO close to empty
- Error condition if Input FIFO becomes full - need to set alarm
- UTOPIA Out has a separate FIFO for each supported PHY with a minimum of 3 cells per PHY (This will probably be 4 cells. We need to evaluate the case of the 104-byte chunk - in this case the buffer only accomodates 2 transfer units. This would only allow 1 input, 1 output and no buffer - just need to verify whether this can inhibit throughput. This is only a concern for the Output direction. In the input direction, the UTOPIA I/F should still assert cell ready to the RxDLM when it has at least 1 cell ready)

| # PHYS | bytes/ cell | cells/ PHY | bytes | bits | cells/ PHY | bytes | bits | cells/ PHY | bytes | bits |
|---|---|---|---|---|---|---|---|---|---|---|
| 1 | 64 | 2 | 128 | 1024 | 3 | 192 | 1536 | 4 | 256 | 2048 |
| 32 | 64 | 2 | 4096 | 32768 | 3 | 6144 | 49152 | 4 | 8192 | 65536 |
| 64 | 64 | 2 | 8192 | 65536 | 3 | 12288 | 98304 | 4 | 16384 | 131072 |
| 96 | 64 | 2 | 12288 | 98304 | 3 | 18432 | 147456 | 4 | 24576 | 196608 |
| 128 | 64 | 2 | 16384 | 131072 | 3 | 24576 | 196608 | 4 | 32768 | 262144 |
| 192 | 64 | 2 | 24576 | 196608 | 3 | 36864 | 294912 | 4 | 49152 | 393216 |
| 256 | 64 | 2 | 32768 | 262144 | 3 | 49152 | 393216 | 4 | 65536 | 524288 |

The UTOPIA Interface of the iTPP is an external interface that provides an ATM Forum compliant path to transmit and receive ATM cells and variable length IP Packets. The interface is configurable as Level 2 or Level 3, Master or Slave, and ATM or Packet mode. The data bus width is configurable to be 8-bit, 16-bit or 32-bit. The supported modes are indicated in Table 14-1.

| L-2/L-3 | M/Sl | ATM/ POS | 8/16/32 | Supported Y/N | MaxClk (MHz) |
|---|---|---|---|---|---|
| L-2 | M | ATM | 8 | Y | 104 |
| L-2 | M | ATM | 16 | Y | 104 |
| L-2 | M | ATM | 32 | N | |
| L-2 | Sl | ATM | 8 | Y | 104 |
| L-2 | Sl | ATM | 16 | Y | 104 |

| L-2/L-3 | M/SI | ATM/ POS | 8/16/32 | Supported Y/N | MaxClk (MHz) |
|---|---|---|---|---|---|
| L-2 | SI | ATM | 32 | N | |
| L-2 | M | POS | 8 | ? | |
| L-2 | M | POS | 16 | ? | |
| L-2 | M | POS | 32 | NA | |
| L-2 | SL | POS | 8 | ? | |
| L-2 | SL | POS | 16 | ? | |
| L-2 | SL | POS | 32 | NA | |
| L-3 | X | X | 8 | N | |
| L-3 | X | X | 16 | N | |
| L-3 | M | ATM | 32 | Y | 104 |
| L-3 | M | POS | 32 | Y | 104 |
| L-3 | SI | ATM | 32 | Y | 104 |
| L-3 | SI | POS | 32 | Y | 104 |

Table 14-1: UTOPIA Modes

The Master/Slave control bit can be configured differently for the Input direction and the Output direction. All other configuration bits shown in Table 14-1 must be the same for both directions.

The external interfaces to the UTOPIA blocks is specified in the ATM Forum's UTOPIA Level-2 and Level-3 specs. Refer to these specs for more details of the interface as the interface specification is not replicated in this document. The supported and non-supported features are listed in the next sections.

14.2 UTOPIA Level 2 - ATM

In UTOPIA Level-2 mode, the iTPP supports the following:

- Cell-Level Handshaking
- 54-byte cell for 16 bit mode
- 53-byte cell for 8 bit mode
- 56-byte cell in 16 bit mode to allow the addition of routing information.
- 56-byte cell in 8 bit mode to allow the addition of routing information.
- MPHY operation with 1 RxClav and 1 TxClav
- Weighted Round Robin PHY Polling
- 32 PHY addresses in Slave mode
- 32 PHY addresses in master mode
- Back-to-back cell transfer

14.3 UTOPIA Level 2 - Frame Based Interface

In Level 2 Packet mode, the iTPP supports the following enhancements to the UTOPIA Level-2 spec as described in the ATM Forum's XXXXX spec:

- 8 bit data bus?????????
- 16 bit data bus
- packet-level transfer control
- 48 byte Transfer Chunk sizes
- Out of band polling and selection
- 5-bit address bus in the "Output" or "Transmit" direction - from Master to PHY Multi PHY Handshaking

PIA Level 3 - ATM Mode or UTOPIA Level-3, ATM Mode the iTPP supports the following:

32-bit data bus
8-bit address bus
52-octet cell format as shown in Table 2.1 of the UTOPIA L3 spec, dated November 1999
56-octet cell format as shown in Table 2.2 of the UTOPIA L3 spec, dated November 1999
control of up to 96 PHYs in Master Mode
Weighted Round Robin PHY Polling
response to up to 96 PHY addresses in slave mode
Multi-PHY Operation with 1 TxClav and 1 RxClav Signal
Back-to-back cell transfers

OPIA Level 3 - Frame Based Interface n Packet mode, the iTPP supports the following enhancements to the UTOPIA Level-3 spec as d in the ATM Forum's Frame-based ATM Interface spec:

32-bit data bus
packet-level transfer control
Transfer Chunk sizes

- 52 bytes
- (<52) 48 bytes - we will pad 4 bytes through the switch and notify the far-end PP
- (>52) 104 bytes - anything greater than 52 - and not a multiple will break the single input FIFO idea as we would be storing partial packets and partial headers and we would need to wait for the rest of the header before we could forward it to the IPF polled status
8-bit address bus in the "Output" or "Transmit" direction - from Master to PHY

TOPIA I/F in iTAP iTPP

The UTOPIA interface is high-lighted in the full iTPP block diagram shown in 14-2. The blocks are labelled as "Input" and "Output" to correspond to the direction of data flow. The Receive" and "Transmit" are used in the UTOPIA specs where "Receive" indicates data flowing e PHY to the Master and "Transmit" indicates data flowing from the Master to the PHY. Since P can be configured as Master or Slave, it would be confusing to label them as Rx and Tx as bels would change depending on the configured mode.

The direction of some of the UTOPIA control signals (Address, Enables, Clavs...) changes ing on the Master Slave configuration of the iTPP. Any signal that changes direction in this implemented as a bi-directional pin with the Master/Slave configuration bit controlling the output selection.

14-2 is a conceptual block diagram. The Architectural block diagram which describes the implementation is described in later sections.

UTOPIA Level-2 requires LVTTL buffers. UTOPIA Level-3 requires HSTL I/O buffers. This quire us to duplicate the chip level I/O signals that are shared between Level-2 and Level-3.

FIFOs

ATM Cells

*Proprietary and Confidential Information of Onex Communications Corporation*

14.7 UTOPIA Input Interface

The Block diagram and I/O are shown in Figure 14-3.

In ATM mode, the UTOPIA In block can operate in two modes - Normal and extended byte (XT_byte) mode. In Normal mode, this block buffers complete 52-byte cells (no HEC). These cells will eventually be transferred to external Rx memory under control of another block. The UTOPIA In block supports a 53-byte cell in 8-bit data bus mode in which case the HEC (UDF) byte will be dropped. The UTOPIA In block supports a 54-byte cell in 16-bit data bus mode in which case the two UDF bytes will be dropped. This UTOPIA block indicates when it has at least one complete cell in its buffer by asserting the Cell Ready signal.

In extended byte mode, the UTOPIA interface supports a 56-byte cell in 8-bit data bus mode and a 56-byte cell in 16-bit data bus mode. This mode allows a user to attach his own router/classifier to the UTOPIA Input Interface and bypass the internal ATM Lookup processor. In this mode, four extra bytes are inserted into the 4 UDF bytes of the ATM cell. These 4 extra bytes contain the information that is needed to create the ATM cell descriptor that would normally be output by the ATM Lookup processor. This mode is enabled through the Rx_XT_Byte_Mode configuration bit. The data structure for this 56-byte cell is referenced in Table 14-12.

In Packet mode , this block inputs and buffers chunks of packets destined for the external Rx memory. As in ATM mode, transfer to the external memory is under full control of a different block. This "chunking" is actually segmenting the incoming packet into an iTAP sized PDU. The packet chunk size is the number of bytes transferred across the UTOPIA interface and is programmable to one of three values: 48, 52 or 104 bytes. The payload area of an iTAP Switch Mapped data cell is 52 bytes. Once a packet chunk has begun to be transmitted across the UTOPIA interface, it must be completely transferred before another packet chunk can begin. This UTOPIA block indicates when it has a packet chunk ready for transfer by asserting the Cell Ready signal. Chunks of packets from different PHYs can be interleaved on the UTOPIA interface, but a chunk is always transferred completely before another chunk can start. The UTOPIA interface detects the final bytes of a variable length packet by sampling the End of Packet Signal. The transfer of variable length packets into the iTPP typically results in a partial chunk (less than the programmed number of bytes) being used for the final bytes of a packet. The UTOPIA Input block indicates the last byte of a packet by asserting a similar End of Packet signal to the next block inside the iTPP as the last word is clocked out of the input FIFO.

If the Rx_XT_Byte_Mode configuration bit is set in Packet mode, then 4 bytes are added to the beginning of the first chunk of an IP Packet. These 4 additional bytes are only added to the first chunk of a packet - all subsequent chunks revert back to the programmed chunk size. The first 4 bytes of the first packet chunk are assumed to be routing / classification information that has been calculated by an external 3rd party IP forwarding / classification engine. These bytes will be substituted in place of the output of the IP forwarding and Classification engine.

In both ATM and Packet mode, the UTOPIA Input block has a single 4-cell (implemented as 64 bytes) FIFO which is used for clock separation and data buffering. The first location for each cell or packet chunk contains the PHY ID number. The data interface from the UTOPIA Input block into the iTPP is through this FIFO. There is also a separate Header FIFO that is used to hold ATM and IP header information. Up to four headers can be stored. The control interface from the UTOPIA Input block into the iTPP is through this FIFO. Both of these FIFOs are inside the UTOPIA Input block. The Read control signals for these FIFOs are inputs to the block and should be treated as asynchronous to the UTOPIA Input timing.

The back-pressure to UTOPIA Input block is the rate at which data is removed from the transfer FIFO by the Data Link Manager. If the DLM can not keep up with the rate of the incoming traffic, the buffer will fill and this is an error condition. The UTOPIA In block sets an alarm to indicate a full buffer.

This function is no longer in this block. It needs to be done on the SONET interfaces also, so it will be done in the block that creates the descriptor as all of the SONET traffic and the UTOPIA traffic go through it.

The UTOPIA Master interface services the ninety-six FIFO buffers in a weighted round robin manner as described in Section 14.9.

*Proprietary and Confidential Information of Onex Communications Corporation*

14.7.1 UTOPIA Input Block I/O

- Inputs
  1. All inputs required to support UTOPIA Level 2 & 3 - listed in Table 14-8.
  2. Mode configuration and enable signals
     - L2/L3 - '0' = Level 2 mode, '1' = Level 3 mode
     - ATM/Packet = '0' = ATM mode, '1' = Packet mode
     - Master/Slave - '0' = Master, '1' = Slave - could be different for Input side and Output side
     - PHY Enables - '1' = Enabled, '0' - not enabled. Separate bit for each PHY. Slave does not respond to polls that are not internally enabled - it leaves its CLAV tri-stated when it receives a poll for a not enabled PHY. The Master could poll a disabled PHY, but it will ignore the response of the PHY if the enable bit is not set.
     - Chunk Size = 48, 52 or 104
     - Rx_XT_Byte_Mode - '0' = normal mode, '1' = extended byte mode. When this bit is set in ATM mode, 4 extra bytes have been inserted into the 4 UDF bytes of each incoming ATM cell. The ATM cell transfer size is 56 bytes in 8 bit L2 mode, 56 bytes in 16 bit L2 mode and 56 bytes in 32-bit L3 mode. When this bit is set in IP mode, 4 extra bytes are prepended to the first chunk of an IP Packet. The four extra bytes are placed into the 'T' byte locations shown in Figure 14-3.
  3. Header FIFO Read control signals
  4. Data FIFO Read control signals
- Outputs
  1. All outputs required to support UTOPIA Level 2 & 3 - listed in Table 14-8.
  2. Data FIFO status
  3. Header FIFO status.
  4. Start of Cell / Packet - active during the transfer of word #1 which includes the PHY number.
  5. End of Cell / Packet
  6. Abort Indication - forces packet indicated by ID bits to be discarded. (IP only)
  7. Status signals and counters

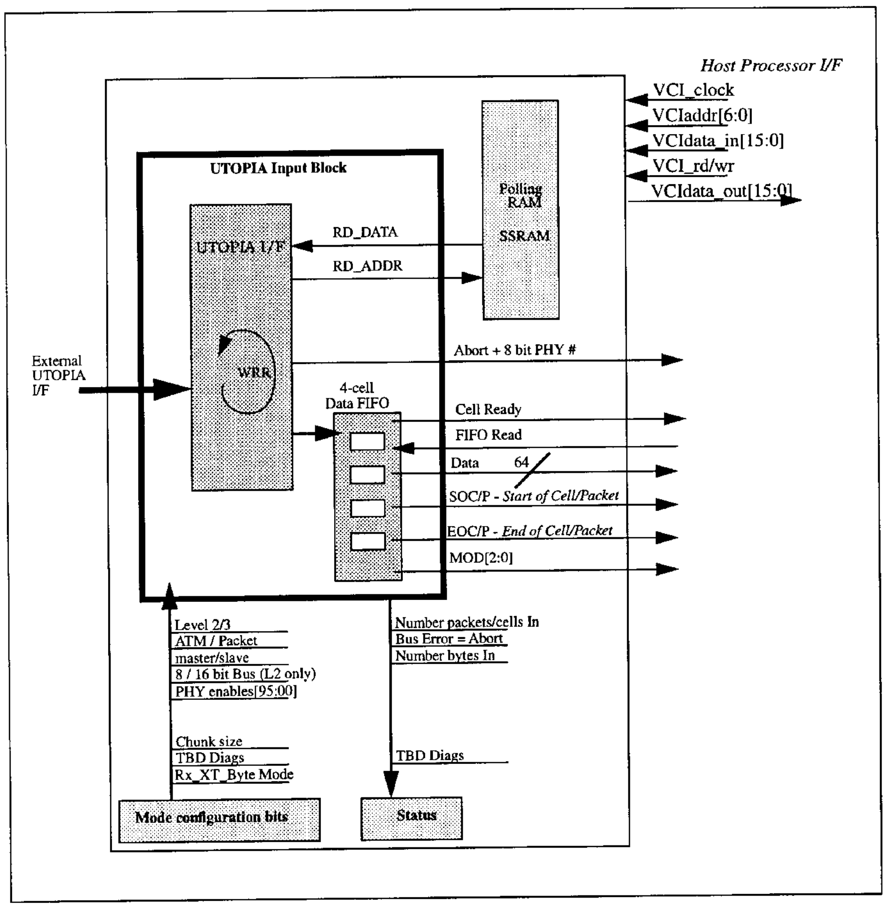

Figure 14-3: UTOPIA Input Block Diagram

The data structure shown in Figure 14-4 shows the data structure that is clocked out of the Input side PDU FIFO. The only variation from this data structure is in packet mode when the chunk size is programmed to 48 bytes. In this 48-byte mode, the last 4 bytes of the payload (B48 - B51) will be forced to all 0's. In packet mode, the UTOPIA Input block will generate the EOP signal to indicate the word that contains the last byte of the packet and will also generate the MOD bits to indicate the number of bytes that are valid in this last word. A value of '000' with the EOP bit set indicates that the last byte is in the first location of this word and that the other 7 bytes in the word are not valid. '001' identifies the last byte as being in the second byte and so on.

*Proprietary and Confidential Information of Onex Communications Corporation*

The PHY # is needed in IP mode by the RxDLM to identify the link for an ongoing packet receipt as the RxDLM only gets a descriptor for the first chunk of a packet

63 ........................................ 0

| | | | | | | | |
|---|---|---|---|---|---|---|---|
| PHY# | | | | T1 | T2 | T3 | T4 |
| B0 | B1 | B2 | B3 | B4 | B5 | B6 | B7 |
| B8 | .... | ........ | ........ | ........ | ... | | B15 |
| B16 | .... | ........ | ........ | ........ | ... | | B23 |
| B24 | .... | ........ | ........ | ........ | ... | | B31 |
| B32 | .... | ........ | ........ | ........ | ... | | B39 |
| B40 | .... | ........ | ........ | ........ | ... | | B47 |
| B48 | B49 | B49 | B51 | | | | |

In Packet mode, the "T" bytes are only valid for the fist chunk of a packet.

Figure 14-4: Output Data Structure for UTOPIA Input PDU FIFO

The Input FIFO must store the EOP information temporarily while it is waiting for the DLM to take the PDU. The FIFO structure is actually 68 bits wide as shown in Figure 14-5 with 64 bits being used to store the PDU data and the extra 4 bits being used to store the EOP and MOD bits. This eases the task of generating the EOP and MOD bits as they are clocked directly out of the FIFO onto the EOP and MOD signals.

| 67 | 66 | 65 | 64 | 63 | | | | | | | 0 |
|---|---|---|---|---|---|---|---|---|---|---|---|
| EOP | MOD2 | MOD1 | MOD0 | PHY# | | | | T1 | T2 | T3 | T4 |
| EOP | MOD2 | MOD1 | MOD0 | B0 | B1 | B2 | B3 | B4 | B5 | B6 | B7 |
| EOP | MOD2 | MOD1 | MOD0 | B8 | .... | ........ | ........ | ........ | ... | | B15 |
| EOP | MOD2 | MOD1 | MOD0 | B16 | .... | ........ | ........ | ........ | ... | | B23 |
| EOP | MOD2 | MOD1 | MOD0 | B24 | .... | ........ | ........ | ........ | ... | | B31 |
| EOP | MOD2 | MOD1 | MOD0 | B32 | .... | ........ | ........ | ........ | ... | | B39 |
| EOP | MOD2 | MOD1 | MOD0 | B40 | .... | ........ | ........ | ........ | ... | | B47 |
| EOP | MOD2 | MOD1 | MOD0 | B48 | B49 | B49 | B51 | | | | |

Figure 14-5: Input FIFO Data Structure

The HDR bytes are shown in the data structures referred to in Table 12-8.
The "T" bytes are taken from the UDF bytes of the ATM cell

| | | | | |
|---|---|---|---|---|
| PHY # | HDR1 | HDR2 | HDR3 | HDR4 |
| | T1 | T2 | T3 | T4 |

Figure 14-6: UTOPIA Input Header FIFO data Structure - ATM mode

Under Construction

Figure 14-7: UTOPIA Input Header FIFO data Structure - Packet mode

*Proprietary and Confidential Information of Onex Communications Corporation*

| Signal | Direction | L2 Master | L2 Slave | L3 ATM Master | L3 ATM Slave | L3 Frame-based Master | L3 Frame-based Slave |
|---|---|---|---|---|---|---|---|
| IADD[7:0] | In/Out *In-slave* *Out-mstr* | RxAddr[4:0] | TxAddr[4:0] | RxAddr[7:0] | TxAddr[7:0] | *in-band addr* | TADR[?:?] |
| IDAT[31:0] | Input | RxData[15:0] | TxData[15:0] | RxData[31:0] | TxData[31:0] | RDAT[31:0] | TDAT[31:0] |
| ISOC/P | Input | RxSOC | TxSOC | RxSOC | TxSOC | RSOP | TSOP |
| IEOP | Input | - | - | - | - | REOP | TEOP |
| IENB* | In/Out *In-slave* *Out-mstr* | RxEnb* | TxEnb* | RxEnb* | TxEnb* | RENB | TENB |
| ICLAV | In/Out *In-mstr* *Out-slave* | RxClav | TxClav | RxClav[0] | TxClav[0] | - | PTPA |
| ICLK | Input | RxClk | TxClk | RxClk | TxClk | RFCLK | TFCLK |
| IERR | Input | - | - | - | - | RERR | TERR |
| IMOD[1:0] | Input | - | - | - | - | RMOD[1:0] | TMOD[1:0] |
| ISX | Input | - | - | - | - | RSX | TSX |
| IVAL | Input | - | - | - | - | RVAL | - |

Table 14-8: UTOPIA Input Interface Signals

*Proprietary and Confidential Information of Onex Communications Corporation*

14.8 UTOPIA Output Interface

The Block diagram and I/O are shown in Figure 14-9.

In ATM mode, the UTOPIA Output block buffers complete 52/3/4/6-byte cells which will eventually be transferred onto the external UTOPIA interface. This block makes the cell available to the UTOPIA interface only after the entire cell is received into its FIFO. For 52, 53 and 54 byte cells, the UTOPIA Output block will receive 52 bytes into its FIFO and the UTOPIA Output block will insert 0's into the UDF byte locations. For 56 byte cell transfer mode, the UTOPIA Output block will receive all 56 bytes into its FIFO. In this 56 byte transfer mode, the data structure referred to in Table 14-12 is used. The UTOPIA Output block can support up to 96 PHY devices in Slave mode and in Master mode. The goal of the iTPP is to keep the Output UTOPIA buffers full and ready to output a cell. In order to do this, the iTPP must maintain a separate buffer for each supported PHY address.

In Packet mode, the UTOPIA Ouput block buffers chunks of packets destined for the external UTOPIA Interface. These chunks are clocked onto the UTOPIA data bus as one contiguous packet. Once a packet begins to be transmitted out the UTOPIA interface, it is the responsibility of the Data Link Manager in the iTPP to keep the buffer sufficiently full so that there are no gaps on the UTOPIA data bus. Once a packet chunk has begun to be transmitted across the UTOPIA interface, it must be completely transferred before another chunk can begin. The UTOPIA interface terminates the transfer of the variable length packets by asserting the End of Packet Signal. The UTOPIA Output block indicates the last word of a packet by asserting the End of Packet signal. The packet chunk size used for FIFO statusing is programmable and can be set to 48, 52 or 104 bytes.

In both ATM and Packet mode, the UTOPIA Output block has ninety-six 4-cell (64 bytes each) FIFOs which are used for clock separation and data buffering. There is per-PHY back-pressure. The data interface into the UTOPIA Output block from the iTPP is through this FIFO. This FIFO is inside the UTOPIA Output block. The Write control signals for these FIFOs are inputs to the block and should be treated as asynchronous to the UTOPIA Input timing.

The UTOPIA Master interface services the ninety-six FIFO buffers in a weighted round robin manner as described in Section 14.9.

Whenever a PHY is in a disabled state, the internal interface must report "not ready" for that PHY. Whenever one of the PHY enable signals toggles to off, the UTOPIA block must be able to remove from its buffers any packets or cells for the newly disabled PHY.

14.8.1 UTOPIA Output Block I/O

- Inputs
  1. All inputs required to support UTOPIA Level 2 & 3 - listed in Table 14-11.
  2. Mode configuration and enable signals - Same as in Input Direction - can be the same control signals except for the Master/Slave bit. The Master/Slave configuration can be different for Input and Output
     - Master/Slave - could be different for Input side and Output side
     - L2/L3
     - ATM/Packet
     - PHY Enables - '1' = Enabled, '0' - not enabled. Separate bit for each PHY. Slave does not respond to polls that are not internally enabled - it leaves its CLAV tri-stated when it receives a poll for a not enabled PHY. The Master could poll a disabled PHY, but it will ignore the response of the PHY if the enable bit is not set. The UTOPIA Output block will not accept cells or packets from the DLM for disabled PHYs.
     - Chunk Size = 48, 52 or 104
     - Tx_XT_Byte_Mode - '0' = normal mode, '1' = extended byte mode. When this bit is set in ATM mode, 4 extra bytes have been added to each incoming ATM cell. The ATM cell transfer size is 56 bytes in 8 bit L2 mode, 56 bytes in 16 bit L2 mode and 56 bytes in 32-bit L3 mode. The four extra bytes are taken from the 'T' byte locations shown in Figure 14-10.
  3. Data FIFO Write control signals
  4. Start of Cell / Packet
  5. End of Cell / Packet

*Proprietary and Confidential Information of Onex Communications Corporation*

6. Abort Indication - Frame based mode only

- Outputs

1. All outputs required to support UTOPIA Level 2 & 3 - listed in Table 14-11.
2. Data FIFO status for 96 FIFOs
3. Status signals and counters

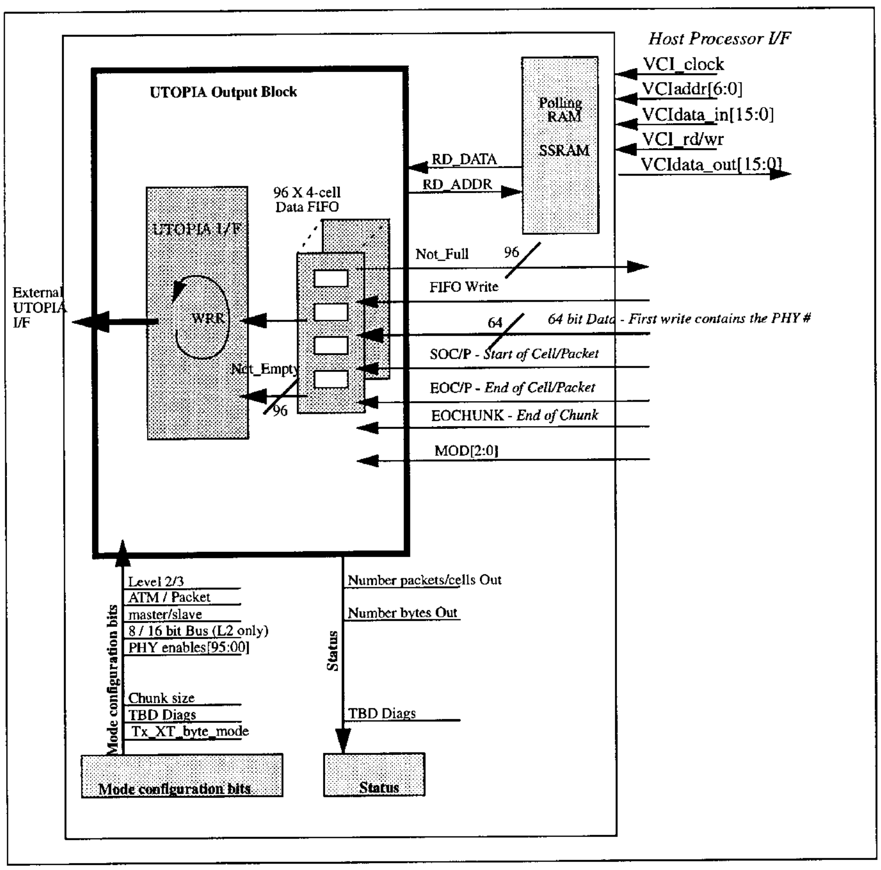

Figure 14-9: UTOPIA Output Block Diagram

The data structure shown in Figure 14-10 shows the data structure that is clocked into the Output side PDU FIFO. The only variation from this data structure is in packet mode when the chunk

*Proprietary and Confidential Information of Onex Communications Corporation* size is programmed to 48 bytes. In this 48-byte mode, the last 4 bytes of the payload (B48 - B51) will be forced to all 0's. In packet mode, the UTOPIA Output block will receive the EOP signal to indicate the word that contains the last byte of the packet and will also receive the MOD bits to indicate tbe number of bytes that are valid in this last word. A value of '000' with the EOP bit set indicates that the last byte is in the first location of this word and that the other 7 bytes in the word are not valid. '001' identifies the last byte as being in the second byte and so on.

The PHY # is used in both IP & ATM modes by the UTOPIA interface to identify the buffer that the PDU should be put in.

63 ........................................ 0

| | | | | | | | |
|---|---|---|---|---|---|---|---|
| PHY | | | | T1 | T2 | T3 | T4 |
| B0 | B1 | B2 | B3 | B4 | B5 | B6 | B7 |
| B8 | .... | ........ | ........ | ........ | ... | | B15 |
| B16 | .... | ........ | ........ | ........ | ... | | B23 |
| B24 | .... | ........ | ........ | ........ | ... | | B31 |
| B32 | .... | ........ | ........ | ........ | ... | | B39 |
| B40 | .... | ........ | ........ | ........ | ... | | B47 |
| B48 | B48 | B49 | B51 | | | | |

If extended byte mode is enabled in the output direction, the 4 "T" bytes will be output onto the UTOPIA bus in the 4 UDF bytes of the ATM cell or as the first 4 bytes of an IP packet.

In Packet mode, the "T" bytes can only be valid in the first chunk of an IP packet. These byte locations are undefined for the non-first PDUs.

Figure 14-10: Input Data Structure for UTOPIA Output PDU FIFO

The Output FIFO must store the EOP information temporarily while it is waiting for the UTOPIA interface to take the PDU. The FIFO structure is the same as in the Input Block as shown in Figure .

| Signal | Direction | L2 Master | L2 Slave | L3 ATM Master | L3 ATM Slave | L3 Frame-based Master | L3 Frame-based Slave |
|---|---|---|---|---|---|---|---|
| OADD[7:0] | In/Out *In-slave* *Out-mstr* | TxAddr[4:0] | RxAddr[4:0] | TxAddr[7:0] | RxAddr[7:0] | TADR[?:?] | *in-band addr* |
| ODAT[31:0] | Output | TxData[15:0] | RxData[15:0] | TxData[31:0] | RxData[31:0] | TDAT[31:0] | RDAT[31:0] |
| OSOC/P | Output | TxSOC | RxSOC | TxSOC | RxSOC | TSOP | RSOP |
| OEOP | Output | - | - | - | - | TEOP | REOP |
| OENB* | In/Out *In-slave* *Out-mstr* | TxEnb* | RxEnb* | TxEnb* | RxEnb* | TENB | RENB |
| OCLAV | In/Out *In-mstr* *Out-slave* | TxClav | RxClav | TxClav[0] | RxClav[0] | PTPA | - |
| OCLK | Input | TxClk | RxClk | TxClk | RxClk | TFCLK | RFCLK |
| OERR | Output | - | - | - | - | TERR | RERR |
| OMOD[1:0] | Output | - | - | - | - | TMOD[1:0] | RMOD[1:0] |
| OSX | Output | - | - | - | - | TSX | RSX |
| OVAL | Output | - | - | - | - | - | RVAL |

Table 14-11: UTOPIA Output Interface Signals

14.9 Weighted Round Robin Polling

RESERVED.

14.10 Configuration and Alarms

Table 14-12 in this section maps the configuration bit combinations to the data transfer size across the UTOPIA Interface. The Data Structure column in the table indicates the reference for the data structure for each mode. In ATM XT_Byte mode, the 4 UDF bytes in the Data Structure are used to carry the added routing information. In IP XT_Byte mode, the first 4 bytes of the first chunk of the packet carry the added routing information.

*Proprietary and Confidential Information of Onex Communications Corporation*

| L2/L3 | ATM/ Packet | 8/16 | XT_byte mode | Chunk Size | Transfer Size(bytes) | Transfer Data Structure |
|---|---|---|---|---|---|---|
| L2 | ATM | 8 | 0 | X | 53 | UTOPIA L1, V2.01, Fig 2 |
| L2 | ATM | 8 | 1 | X | 56 | UTOPIA L3, Nov '99,Table 2.2 |
| L2 | ATM | 16 | 0 | X | 54 | UTOPIA L1, V2.01, Fig 8 |
| L2 | ATM | 16 | 1 | X | 56 | UTOPIA L3, Nov '99,Table 2.2 |
| L3 | ATM | X | 0 | X | 52 | UTOPIA L3, Nov '99,Table 2.1 |
| L3 | ATM | X | 1 | X | 56 | UTOPIA L3, Nov '99,Table 2.2 |
| L3 | Packet | X | 0 | 48 | 48 | Frame Based ATM Interface (Extension to UTOPIA L3), Feb 2000 Fig 5.1 - N=48 not 109 |
| L3 | Packet | X | 1 | 48 | 1st=52 others=48 | others = same as above. 1st = same as above except N=52 & Bytes 1-4 carry proprietary routing info |
| L3 | Packet | X | 0 | 52 | 52 | Frame Based ATM Interface (Extension to UTOPIA L3), Feb 2000 Fig 5.1 - N=52 not 109 |
| L3 | Packet | X | 1 | 52 | 1st=56 others=52 | others = same as above. 1st = same as above except N=56 & Bytes 1-4 carry proprietary routing info |
| L3 | Packet | X | 0 | 104 | 104 | Frame Based ATM Interface (Extension to UTOPIA L3), Feb 2000 Fig 5.1 - N=104 not 109 |
| L3 | Packet | X | 1 | 104 | 1st=108 others=104 | others = same as above. 1st = same as above except N=108 & Bytes 1-4 carry proprietary routing info |

Table 14-12: UTOPIA Transfer Size Configuration

An Alarm is required if the UTOPIA Output Block receives a PDU for a PHY that is disabled. This will be an indication of a misconfiguration either in this Output Port Processor or in the originating Input Port Processor. If the UTOPIA Ouput block receives a PDU for a disabled PHY, the PDU is dropped and the alarm will indicate which disabled PHY was sent a PDU. This requires that the PHY Enable information be synchronized to both the UTOPIA timing domain and also to the DLM timing domain. The easiest way to have these config bits in both domains is to have the Host configure them into one domain and then double sample them into the other. The implementor of this block can consider other more creative solutions to this problem.

*Proprietary and Confidential Information of Onex Communications Corporation*

15 SONET DCC

15.1 Tx Section & Line DCC

THIS SECTION SHOULD/WILL BE TRANSFERRED TO THE Rx AND Tx SONET SECTIONS

The Section and Line DCC bytes are supported in the iTAP Service Processor. The Tx SONET interface allows a micro processor to insert messages that are less than or equal to 256 bytes into the Section DCC bytes (D1-D3) and Line DCC bytes(D4-D12) of the outgoing SONET Signals. The iTAP Service Processor inserts the DCC messages into the DCC bytes associated with STS-1 #1 of the OC-3(c), OC-12(c) and OC-48(c) ports or into the first DCC bytes of an SDH port. Some of the other DCC byte locations have been designated as "NU", National Use or "MDB", Media Dependent Bytes. These NU and MDB bytes as well as the undefined DCC byte locations are accessible through the processor interface, but are not part of the DCC support described here.

As shown in Figure 15-1, the DCC is used to provide host processors at different points in a SONET network with an in-band communication channel. The iTAP Service Processor encapsulates the DCC messages in HDLC. The HDLC format is shown in Figure 15-2. The Service Processor adds the HDLC flags and the 16 or 32 bit FCS fields. All other fields must be loaded through the processor interface.

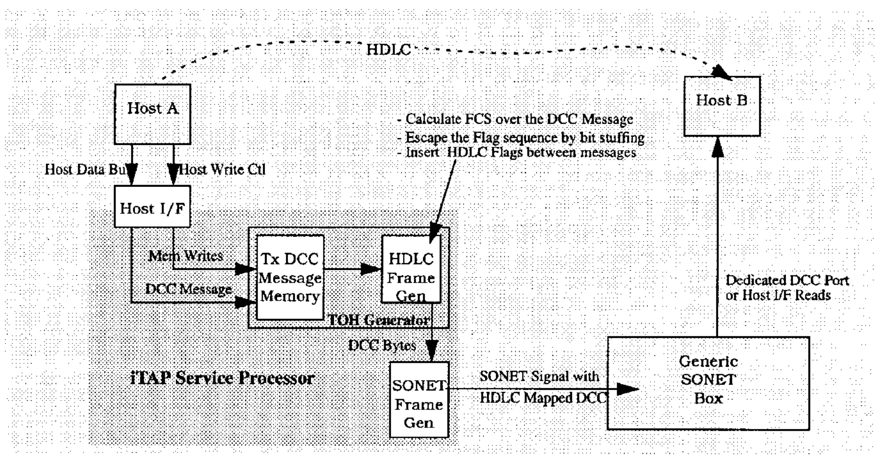

Figure 15-1: Tx DCC

*Proprietary and Confidential Information of Onex Communications Corporation*

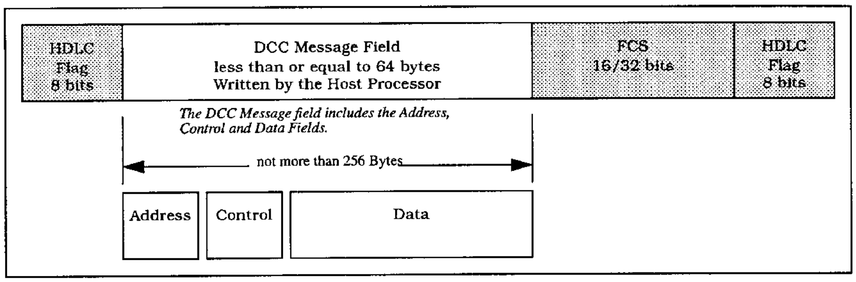

Figure 15-2: HDLC Format

The TOH generator of the Tx SONET interface has a read/write processor interface through which the processor is able to load DCC messages into a mesage RAM. Two 256-byte sections of memory are allocated to each DCC Channel. Two messages for each Section DCC and Line DCC of each of the four SONET interfaces (the OC-48 interface will use one of these four) equates to storage for sixteen 256-byte messages. These memory locations are treated as 32-bit registers so that they can be separately accessed by the processor. After loading in a message, the processor must write the length of the message and a control bit that triggers the TOH generator to mux the particular HDLC encapsulated message into the outgoing DCC byte locations. The message length and the control bit are stored in a separate memory from the message itself. A separate DCC control register is allocated to each of the 16 messages so that either of the two stored messages for each channel can be sent out in any order.

The HDLC protocol is described in rfc1662. The Service Processor supports Bit-Stuffed Framing as described in Section 5. The Service Processor does NOT support Octet-stuffed framing.

The FCS is calculated on-the-fly as the DCC message is muxed into the outgoing SONET signal. "0" bit insertion to support Transparency is also performed on-the-fly - after FCS computation. Performing "0" bit insertion on the way out of the message buffer results in a complex output circuit where words read out of the buffer could be shifted bit-by-bit and thereby not directly muliplexed into the outgoing SONET stream. Figure 15-3 shows a proposal for the implementation of Proprietary and Confidential Information of Onex Communications Corporation the '0' bit insertion.

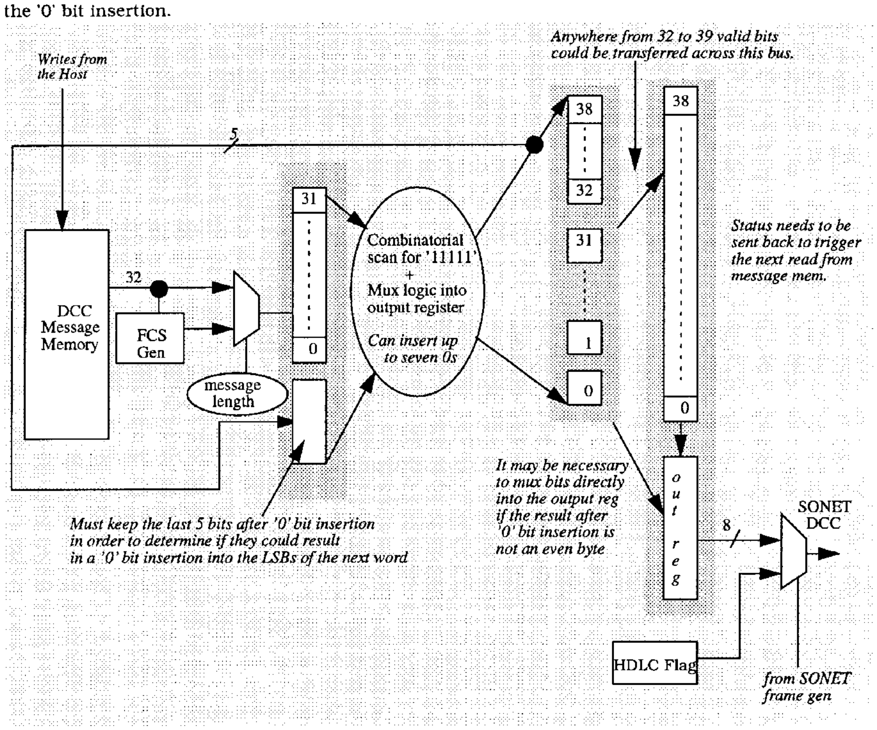

Figure 15-3: '0' bit insertion

The Flag sequence is transmitted on the DCC bytes when there is no message to send.

15.2 Rx Section & Line DCC

The SONET Data Communications Channels are accessed through the Host Processor Interface. The Rx SONET Overhead Processor Block is designed to receive and interpret 8 separate HDLC mapped data streams - one Section and one Line for each physical SONET port. A high level view of DCC support in the Service Processor is shown in Figure 15-4.

Proprietary and Confidential Information of Onex Communications Corporation

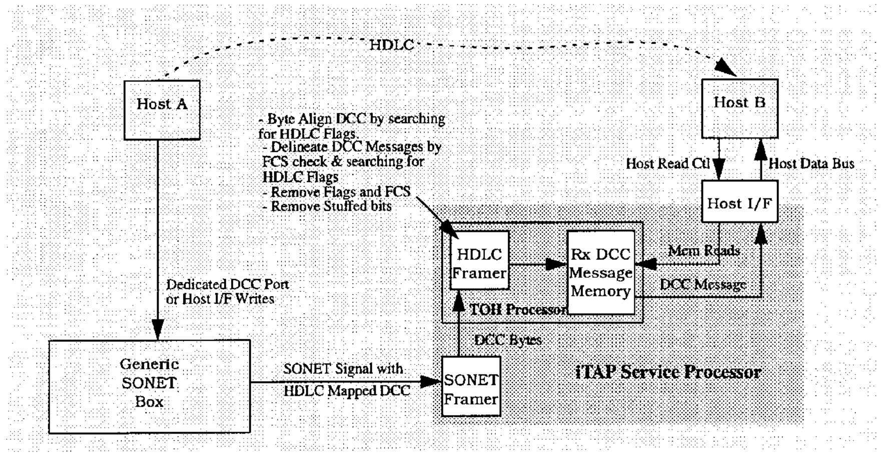

Figure 15-4: High Level View of Rx DCC

The Section DCC Bytes (D1, D2, D3) and the Line DCC bytes (D4-D12) of STS#1 of an STSN signal or of an STM signal are identified and routed to the HDLC Framer in the TOH Processor Block. There is a pair of HDLC framers for each SONET interface. One of the pair is used for Section DCC and the other for Line DCC.

The HDLC mapped data carried in the DCC bytes are NOT necessarily byte aligned. The Transmit SONET interface of the Service Processor does byte align DCC messages in the DCC byte locations, but it is not a requirement. The HDLC Framer searches for the Flag sequence in order to first byte align the DCC channel and then to delineate the messages carried in the DCC bytes. Figure 15-5 shows the HDLC framer logic. .

*Proprietary and Confidential Information of Onex Communications Corporation*

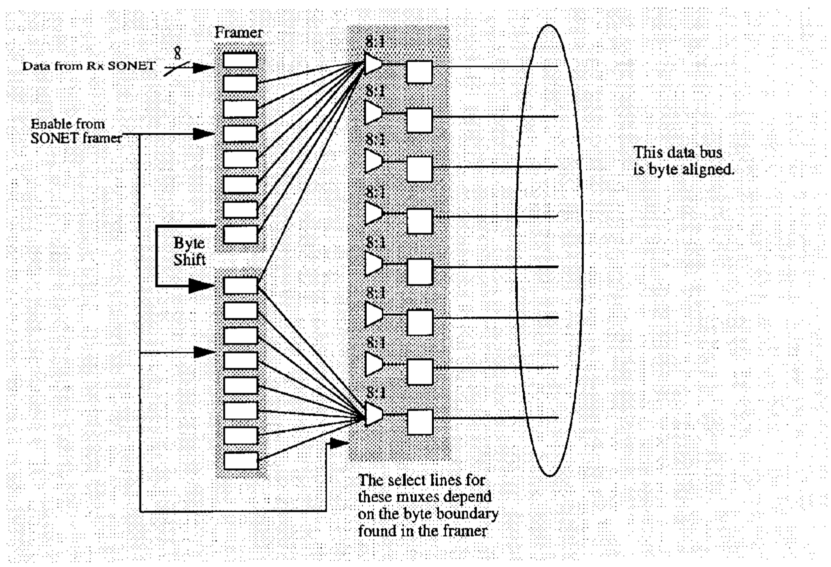

Figure 15-5: HDLC Framer

Once the framer identifies the byte boundary and finds a byte that is NOT Flag, the framer starts to extract the message embedded in the HDLC. The first NOT Flag byte following the last received Flag byte is the first byte of the DCC message. This first byte of the DCC message is the first byte used in the Frame Check Sequence (FCS) calculator. All of the bytes in the DCC message are used to calculate the FCS. The End of Message (EOM) is declared when the FCS is located in the data stream AND the next byte is a Flag byte. Both of these conditions must be detected before declaring EOM in order to avoid a false EOM declaration on the coincidental occurence of a correct FCS. The FCS can be located by comparing the resulting FCS value to the "good FCS" value indentified for the FCS algorithms.

The DCC message extracted from the HDLC is loaded into a RAM that is accessible by the Master Processor. When the end of the DCC message is detected a status bit will be set to indicate that a message is ready to be read and the message length in bytes will be available for reading by the processor.

Proprietary and Confidential Information of Onex Communications Corporation

*Proprietary and Confidential Information of Onex Communications Corporation*

1.0 Host Interface

This section is intended to serve as an interface specification that defines the message interface for the iTAP chipset. This interface defines a set of primitives that allows a host system to control and interact with both the Port Processor and Switch Element.

1.1 Description

The service interface is implemented through the use of mailboxes between an individual iTAP device and the host. Management of the queue and transfer of messages to and from the host are performed by the host interface. Buffer resources for the mailbox are contained in a single dual port memory. The physical description and organization of the mailboxes are described in a following section.

The request mailbox allows the host to post requests for operations as defined in the following interface specification. The standard message descriptor structure is an ?-byte message header followed by a variable length message . Much of the host activity through the request mailbox will be to configure the operational parameters.The format and definition of fields within each of the request messages are outlined in section ??.

During operation alerts/alarms are require notifying the host to activities and errors which are occurring during operation. Status mailboxes are used to post responses to host requests or alert the host to errors and events occurring during processing of the traffic. The status messages, like the request messages, are ?-byte message header followed by a variable length message . The format and definition of fields within each of the status messages are outlined in section ???.

The processing of the request and indicate message descriptors is performed completely by firmware which is running in the devices, and by the host driver. SInce the implementation of the service interface is completely in firmware/software, later changes may be made to optimize the interface or upgrade the commands to allow new features. This flexibility also allows customer specific requirements or value added features to be easily implemented.

*Proprietary and Confidential Information of Onex Communications Corporation*

2.0 Interface Description and Physical Organization

The host interface contains an integrated controller (tensilica processor) for transferring data and control information. The host interface is a message based interface between the host and the an iTAP devices, and is supported via mailboxes in the iTAP. A synchronous dual-port static ram is used to hold the mailbox entries. Each mailbox is ?? words in length. A number of operational and failure conditions can be reported to the host processor via messages. The host interface incorporates several FIFO buffers to allow masking of latency and significant improvement in throughput.

The communications procedure is as follows: the HOST or iTAP device writes a message to a mailbox. The write status field is toggled (HW/IW) to indicate to the recipient of the message and then the host interface asserts $\overline{\text{INTER}}$(R) (->iTAP device) or $\overline{\text{INTER}}$(L) (->HOST) is asserted. The reading entity reads the write status field, and then the message from the mailbox. The reading of the status field locations will deassert the INTER pin. After the complete message is read, the reader toggles the appropriate read status field, and then DPSRAM signals the writing entity via the $\overline{\text{INTER}}$ (L,R) pin. The original writer will then read the read status field to update the availability of the mailbox .

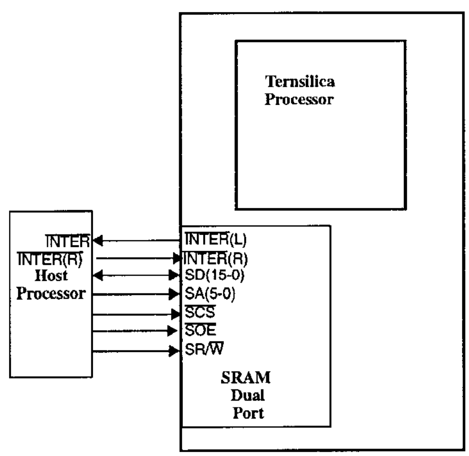

Figure 1. Host Processor Interface

2.1 Host Control Logic

The host interface control logic allows the external host processor to access on-chip control/status registers, and external control memory data structures. This allows the host software to configure, control and poll, and to communicate with firmware running on the internal tensilica cores. The control logic also implements read and write FIFO buffers that interface between the control logic and DMA controller and internal registers. The FIFO buffers allow burst writes and reads to be performed from the off-chip mailboxes to the local memory or on-chip registers.The host interface uses a ?-word write command/data FIFO, and a ?-word read command FIFO. These two FIFOs permit the host interface to implement a write-behind/fetch-ahead behavior: memory commands are buffered and memory read data words are prefetched to hide memory access latencies.Microprocessor interrupt pin INTER is asserted when the appropriate status field is written, and deasserted when the status field is read.

2.2 Mailbox Organization

There are 6 mailboxes which correspond to read/write to/from each individual internal processor to the host :

| Addr | | | | | | | | |
|---|---|---|---|---|---|---|---|---|
| | HOST -> iTAP (high priority) | | | | | | | |
| | | | | | | | | |
| | | | | | | | | |
| | | | | | | | | |
| | iTAP -> HOST (high priority) | | | | | | | |
| | | | | | | | | |
| | | | | | | | | |
| | | | | | | | | |
| | HOST -> iTAP (low priority) | | | | | | | |
| | | | | | | | | |
| | | | | | | | | |
| | | | | | | | | |
| | iTAP -> HOST (low priority) | | | | | | | |
| | | | | | | | | |
| | | | | | | | | |
| | | | | | | | | |
| | AW | | | | | AR | | |
| | HW | | | | | HR | | |

Each Mailbox is a maximum of ? 32-bit words in length.

The mailbox static ram is a ?k memory organized as . Handshake status signals are in SRAM addresses NN

IW: 2-bits indicates current write status of iTAP to HOST mailboxes. Bits change on event basis i.e. are toggled. Organization is High, Low. iTAP updates this field.

IR: 2-bits indicates current read status of HOST to iTAP mailboxes. Bits change on event basis i.e. are toggled. Organization is High, Low. iTAP updates this field.

HW: 2-bits indicates current write status of iTAP to HOST mailboxes. Bits change on event basis i.e. are toggled. Organization is High, Low. Host updates this field.

HR: 2-bits indicates current read status of HOST to iTAP mailboxes. Bits change on event basis i.e. are toggled. Organization is High, Low. Host updates this field.

iTAP Switch Chip Engineering Specification

"Chiron Chip"

Appendix B
9/00

AUTHOR: M. Renault, D. Toebes, F. Carter

REVISION: Revision 0.30

DATE: May 12, 2000

APPROVED:

THIS DOCUMENT IS THE PROPERTY OF ONEX COMMUNICATIONS CORPORATION AND IS DELIVERED ON THE EXPRESS CONDITION THAT IT NOT BE DISCLOSED, REPRODUCED IN WHOLE OR IN PART, OR USED FOR MANUFACTURE FOR ANYONE OTHER THAN ONEX COMMUNICATIONS CORPORATION WITHOUT ITS WRITTEN CONSENT, AND THAT NO RIGHT IS GRANTED TO DISCLOSE OR SO USE ANY INFORMATION CONTAINED IN SAID DOCUMENT. THIS RESTRICTION DOES NOT LIMIT THE RIGHT TO USE

Copyright © 2000 Onex Communications Corporation. Onex and iTAP are trademarks of Onex Communications Corporation.

1 Overview

The iTAP Switch Element (iTSE) is a communications chip which can be used as a stand-alone device to implement a 12 x 12 port switching fabric. When combined with other iTSEs it is possible to create larger switch fabrics up to 1728 x 1728 ports for a 5-stage banyan network or up to 572 x 572 ports for a 5-stage Clos network.

Each port of an iTSE can simultaneously carry a mixed traffic load of TDM traffic, ATM traffic, and Packet traffic.

The iTAP switch fabric (comprised of one or more iTSEs) will typically be used as the interconnect scheme between iTAP Port Processors (iTPP).

*Feature Highlights*

- Synchronous Switching Architecture - All links which interconnect iTSE and ITPP ports are synchronized to a common data clock and row start reference.
- Bufferless Switching Fabric - Packet buffering is implemented via a combination of input and output queues within the iTPPs.
- For TDM traffic, the iTSE will support Time-Space-Time switching.
- The switching granularity for TDM traffic is at the VT1.5 level.
- For ATM/IP traffic, the iTSE will support a self-routed switching scheme. Since the iTSE will not implement packet buffers, a 2 phase switching algorithm is used. During phase 1 self-routed request messages will be transmitted across the switching fabric in a overlay control channel which matches the data interconnection paths. A "knockout" principle is then used to determine which requests will be serviced. The actual ATM/IP data is then sent through the switch fabric during phase 2. Requests not serviced during phase 1 will typically be re-requested during the next switch arbitration cycle.
- The switching granularity for ATM/IP traffic will be 64-byte fixed length PDUs.

1.1 Conventions in this Specification

The following conventions are used in this specification:

1.1.1 Terms and Concepts

Before proceeding to describe the operations of the iTSE, it will be useful to describe some terms and concepts which will be used throughout this document. The terms presented here are described in detail in Section 2, they are presented here only in a summary format.

Port

A port is physical interface on the iTSE which is used to interconnect to other iTSEs or iTPPs to form a switching fabric. The iTSE will have 12 input ports and 12 output ports. Each port is comprised of multiple LVDS channels. Specifically, an input port consists of 2 LVDS channel inputs and one LVDS channel output while an output port consists of of 2 LVDS channel outputs and one LVDS channel input.

Link

This is the term used to describe the connection between the output port on one iTSE or iTPP and the input port on another iTSE or iTPP. The link physically consists of the circuit board wires to interconnect the LVDS channels. A link will always connect the bundle of LVDS channels from a single output port to a single input port, i.e., mixing of LVDS channels between links is not allowed. The LVDS channel bundle which makes up a link will consists of 3 LVDS pairs, 2 pair are used to carry the data traffic and 1 pair is used as an overlay network in the reverse path for carrying arbitration grants.

[LVDS] Channel

Individual LVDS channels will be bundled together to form a single link. The terms "LVDS channel" and "channel" will be used interchangeably in this document.

Row

The synchronous switching mechanism within the iTSE operates on "row" boundaries. The term row will be used to describe the traffic which is carried across a link during a single row time. Row start times will occur at a 72 kHz rate (13.9 us). A row of data will consist of all the data carried on the link during a given row time. The row of data will be byte interleaved across multiple LVDS channels in order to achieve an aggregate data rate of 4.4 Gbps across the link.

Frame
A frame consists of a group of 9 rows which results in a frame rate of 8 kHz.

Group
The row structure is subdivided to carry 96 groups. Each group will be comprised of a block of 16 slots. The fixed length data PDUs are mapped into these groups (one PDU per group). The concept of switching a group of data (or a single PDU) is reserved for data carried in a single group.

Slot
In addition to subdividing row into groups, the row can also be subdivided into slots. A slot will be 36-bits wide. TDM traffic will be mapped onto the row using the slot terminology. Switching on a slot basis is reserved for TDM traffic.

PDU
Protocol Data Unit. A PDU will be defined for the iTAP chip which will be used to carry either ATM cells or IP Packets. Since the PDU will be fixed to a length of 64-bytes, longer IP packets will need to be fragmented and carried through the switch fabric on multiple PDUs.

Speedup
Concept where the switch fabric I/O ports each run faster than the external line rate. The ratio of switch fabric port speed / external line rate is the speedup. Speedup helps reduce input and output blocking through the switch.

Strictly Nonblocking
A switch is strictly nonblocking if a connectin can always be set up between any idle input and output without the need to rearrange the paths taken by existing connections.

Recirculating Buffers
Used in a switch fabric. If multiple cells are destined to go through the same switch path, only one is allowed through and the rest are sent to the recirculating buffer where they willl be looked at during the next switch cycle. This is frequently done to support multicasting. Also, recirculating buffers are sometimes timestamped so the cell stored in them will be discarded if it isn't forwarded withing a given time interval. One thing to watch out for when using recirculating buffers is to prevent cell reordering, cells must be forwarded out the output port of the switch in the same order they're received at an input port.

*Proprietary and Confidential Information of Onex Communications Corporation*

1.1.2 Byte and Bit Ordering

Byte order is big-endian, bit ordering is little-endian (LSB is bit 0). This is shown below.

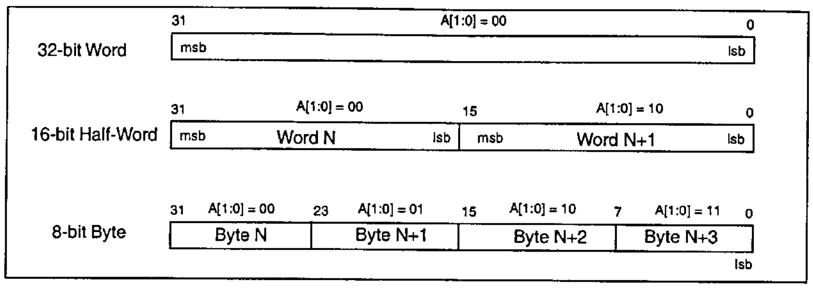

Figure 1-1: Byte and Bit Ordering Conventions for this Specification

1.2 References

*Onex Communications Inter nal Documents -*

[1]
[2]
[3]
[4]
[5]
[6]
[7]
[8]
[9]
[10]

*Papers on Switching -*

[11] S. Liew, M. Ng, and C. Chan, "Blocking and Nonblocking Multirate Clos Switching Networks," *IEEE/ACM Trans. Networking*, vol. 6, no. 3, pp. 307-318, June 1998.

Nice simple review of Clos netwoks in section II.

[12]
[13]

*Proprietary and Confidential Information of Onex Communications Corporation*

1.3 Requirements

1. RESERVED

Proprietary and Confidential Information of Onex Communications Corporation

2 iTAP Switch Element Functional Description

This section will provide the architectural overview of the ITSE. The objective here is to describe *what* the iTSE does, not how it is implemented. Some implementation concepts may be expressed in this section to aid in describing what the iTSE does, these implementation concepts may not reflect the actual implementation of the iTSE and are not constraints on the implementation approach to be chosen. The actual implementation will be provided in later sections of this document.

2.1 Switch External Interface

The figure below illustrates the iTAP Switch Element system I/O signals.

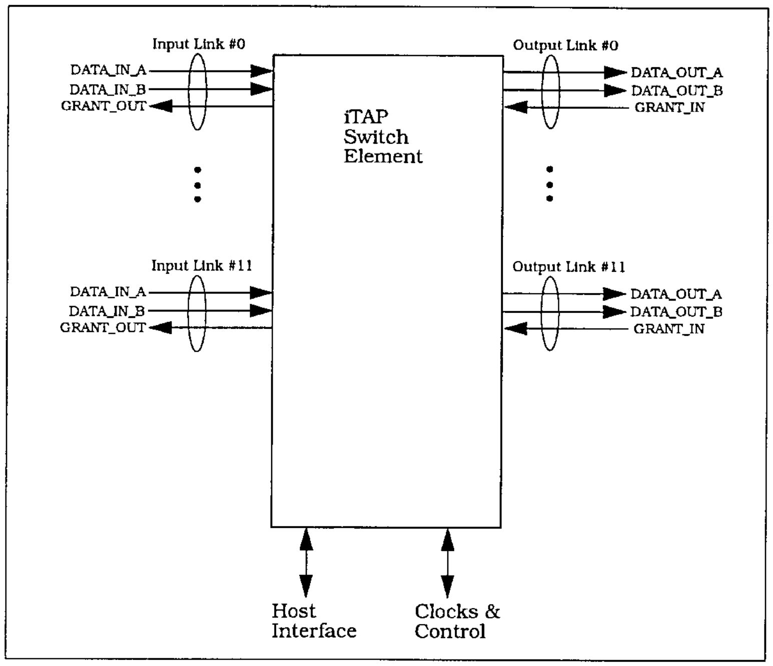

Figure 2-1: Switch Interface Block Diagram

*Input Link's -*

Each of the 12 Input Links is comprised of 3 highs speed serial LVDS I/O signal pairs. The Input Links provide the data traffic input to the iTSE and the grants back to the previous stage.

The DATA_IN_A and DATA_IN_B pairs are used together to form a single high speed "logical" serial data input stream. This data input stream is used to carry both data traffic and the Request Elements which are used for bandwidth arbitration. The GRANT_OUT serial pair provides the output control channel for this Input Link.

All three LVDS pairs associated with an input link will always be connected as a group to the Output Link of the source iTSE or iTPP.

Multiple LVDS pairs must be used to create the single logical high speed Gbps serial stream because the maximum speeds currently supported by the candidate silicon vendors are less than what is need for an individual data link.

*Output Link's -*

The output link configuration matches the input link configuration.

6

2.2 Serial Link Formats

This section describes the formats for the serial links which are used to interconnect the iTSEs and iTPPs.

Since the output link of an iTSE would be directly connected to the input link for the next stage iTSE or an output Port Processor, these data structure describe the serial data formats for both the input and output links.

2.2.1 Design Objectives for Sizing Links

RESERVED.

*Proprietary and Confidential Information of Onex Communications Corporation*

2.2.2 Data Link

The 4.4 Gbps serial data stream is actually implemented using multiple lower speed serial streams. For this discussion, how the 4.4 Gbps serial data is split between the lower speed streams is not relevant, always view the serial data associated with an individual link as a single 4.4 Gbps stream.

As shown in the figure below, the serial data link channel is organized into slots, rows and frames. A "slot" consists of a 4-bit tag field and a 32-bit data (payload) field. The timing of rows and frames is architected to match that of Sonet/SDH frame timing. This will simplify the switching of TDM traffic which originates in Sonet/SDH payloads.

The last 20 slots are reserved for Link Overhead and may not be used to carry TDM or data traffic. The frame is transmitted from left to right (slot 0 to slot 1699) and top to bottom (row 1 to row 9). The msb of each slot is transmitted first. Note that for the data stream, a single PHY channel will not be capable of running at 4.4 Gbps, therefore the data stream will be split between two PHY channels each running at 2.2 Gbps. If the 1700 slot row is viewed instead as a 7560 byte row, the odd bytes will be transmitted on Phy channel A and the even bytes will be sent via channel B. The msb of each byte will be transmitted first. The row byte numbering start at 0, thus the last byte of the row is byte number 7559.

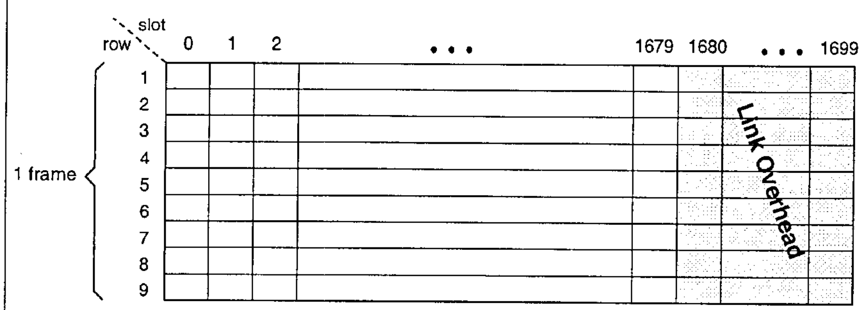

1 frame = 125 us 1 row = 125 us / 9 = 13.89 us 1 slot = 4 bit tag + 32 bit payload serial bit rate = 1700 slots/row * 36 bits/slot * 9 rows/frame * 8 kHz = 550,800 bits/frame = 4.4064 Gbps row size = 1700 slots/row = 7,560 bytes/row = 61,200 bits/row 1 slot bandwidth = slot rate * 36 bits/slot = 72 kHz * 36 = 2.592 Mbps

Figure 2-2: Data Frame Structure

For the transport of data PDUs, a block of 16 slots is required. The figure below illustrates one example of how the row slots may be allocated for carrying PDUs and Request Elements. As shown, the maximum PDU capacity for a row is 96. The term for block of 16 slots which is capable of carrying a single PDU is "group".

Note: Figure 2-3 illustrates just one partitioning of the row slots into groups and request elements, the implementation will allow flexibility in changing the row structure if necessary.

For each group in the row, 1.5 slots of bandwidth are required for carrying a 48-bit Request Element (RE). Figure 2-3 illustrates how 2 REs are inserted into 3 slots within each of the first 24 groups. All the REs need to be carried within the row as early as possible in order to allow the REs to ripple through the multi-stage switch fabric as soon as possible after the start of a row (see the Arbitration section for complete details). One option (not shown in this figure) would have been to send all 96 REs in the first 64 slots of the row. This is not being done because of the implementation Proprietary and Confidential Information of Onex Communications Corporation approach for the Arbitration logic which processes the RE. The implementation requires the REs to be spaced out in time. The structure shown in Figure 2-3 is considered to be the optimal format given system requirements and implementation constraints.

The row structure will in reality actually be different depending on which link of the switch it configured for. For example, lets assume Figure 2-3 defines the row structure between the iTPP and the first iTSE of the first switch fabric stage. In this case the first block of 2 REs occupy the first 3 slots of the row. The implementation of the arbitration logic which processes REs will require at least 12 slot times of latency between each 3-slot block of REs on the input link. Also, there must be some latencey from when the first REs of the row are received to when the REs are inserted into the output link, this latency is used by the arbitration logic for mapping incoming REs into the RE buffers. This means the row structure for the link between into the second stage will have the first group of REs starting at slot time 32. This is illustrated in Figure 2-4.

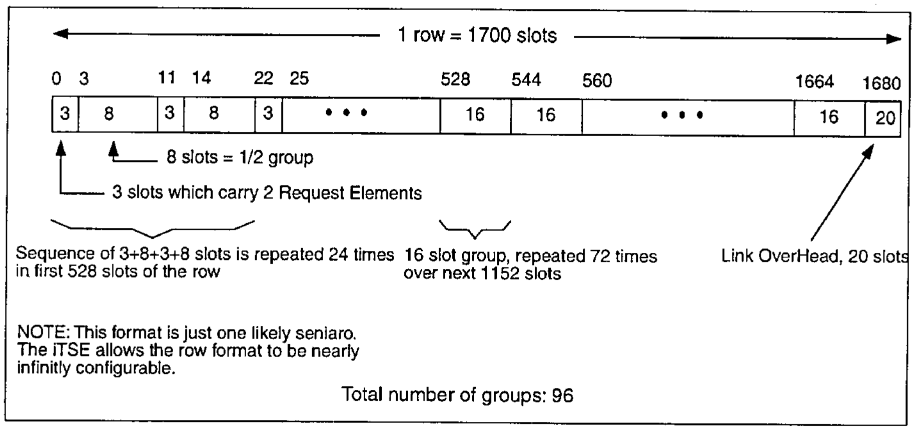

Figure 2-3: Row Structure, Input to Stage 1

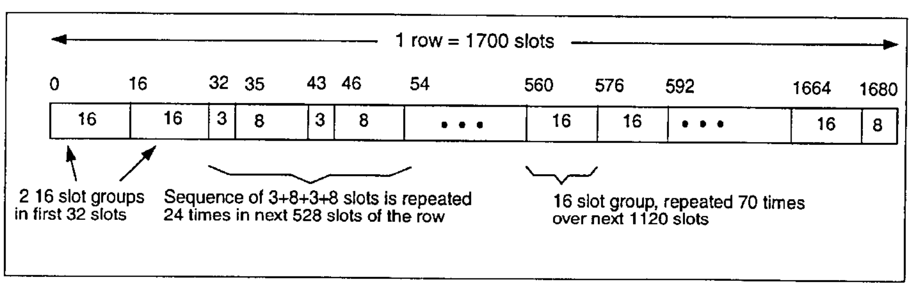

Figure 2-4: Row Structure, Input to Stage 2

2.2.3 TDM Traffic

RESERVED.

*Proprietary and Confidential Information of Onex Communications Corporation*

2.2.4 Data Traffic

RESERVED

Proprietary and Confidential Information of Onex Communications Corporation

2.2.4.1 Unicast Data PDU Format

RESERVED.

2.3 iTAP System Implementation

RESERVED.

2.3.1 Clos Networks

RESERVED

2.3.2 Redundancy

RESERVED

*Proprietary and Confidential Information of Onex Communications Corporation*

2.4 iTSE Switching Examples

This section will provide examples which explain how data is sent through a 3-stage iTAP switch fabric. The examples will also summarize the control messages required to configure the switch connections.

2.4.1 Single PDU

The figure below illustrates a typical arbitration and data passing sequence fora data PDU.

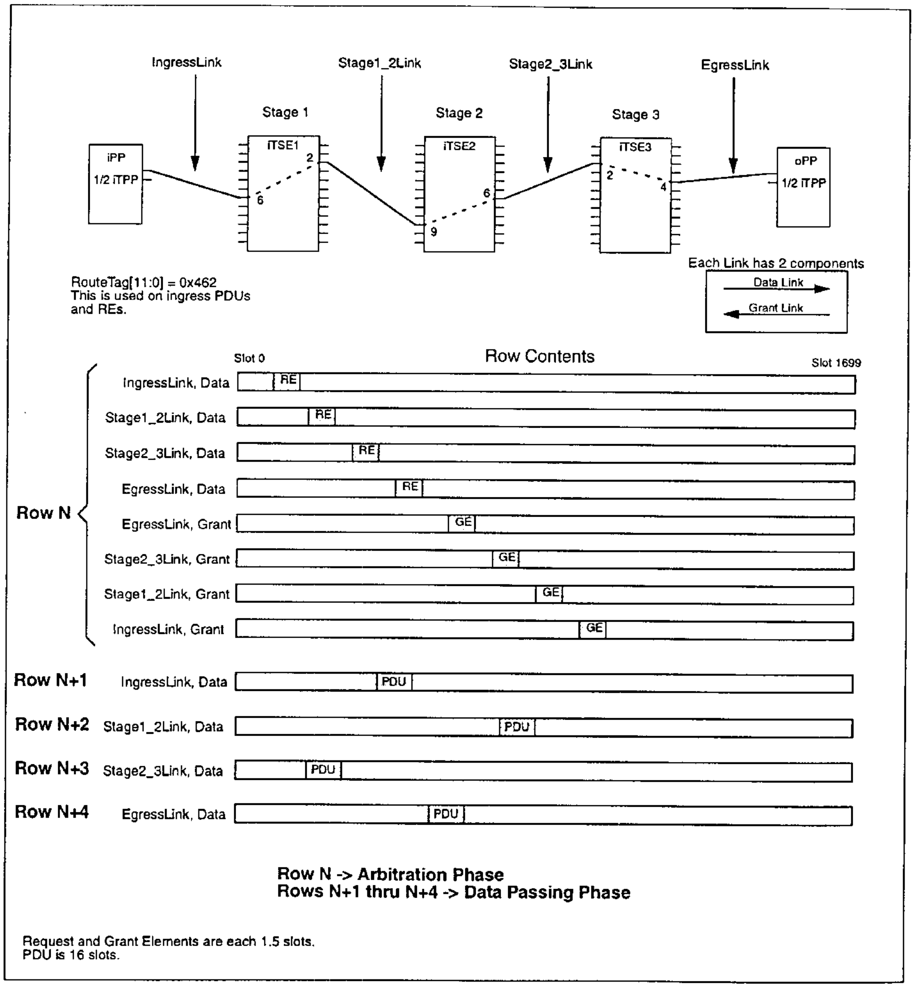

Figure 2-5: Single PDU Through a 3-Stage Switch Example

15

Proprietary and Confidential Information of Onex Communications Corporation

Control & Configuration -

In order to pass a data PDUs through the switch fabric, control messages is not used to set up the switch path. Instead, a "self-routed" concept is used. This means each RE, GE, and PDU sent through the switch fabric contains a RouteTag which identifies the path through the switch.

For each received ATM cell or IP packet, the iPP will classify which flow the data belongs to. The iPP will contain route tables which will contain the RouteTag field to be used to forward the data through the switch. When a new flow is established, only the PP route tables need to be updated, the switch doen't require any updates.

*Proprietary and Confidential Information of Onex Communications Corporation*
2.4.2 Single TDM VT1.5 Channel
The figure below illustrates a typical TDM data flow through the a 3-stage switch fabric.
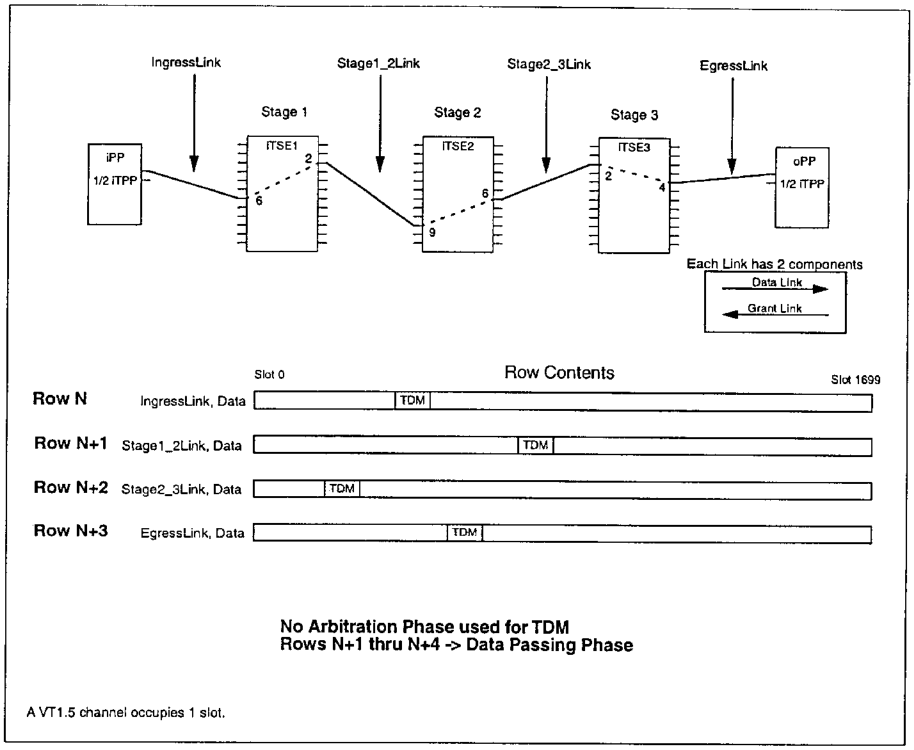
Figure 2-6: Single TDM VT1.5 Through a 3-Stage Switch Example
*Control & Configuration -*
- RESERVED

*Proprietary and Confidential Information of Onex Communications Corporation*

3 iTSE Implementation Overview

A block diagram of the iTSE is shown in Figure 3-1. This section will provide a brief overview of what each module in the block diagram does.

3.1 Datapath & Link BW Arbitration (per link modules)

This group of modules is instantiated 12 times, once for each I/O link the iTSE supports. These modules implement the core data path switching functions. A summary of the signals on the 3 internal datapath buses is shown in Section 3.4.

3.1.1 Data Stream Deserializer

The feature highlights of this module are:

- Synchronize to the incoming serial data stream and then reassemble the row stream which is transported using two physical Unilink channels. Provide FIFO'ing on each incoming serial stream so that the streams may be "deskewed" prior to row reassembly.
- Recover the 36-bit slot data from the row stream forward it a third FIFO which will be used for deskewing the 12 input links. This deskewing will allow all the input links to forward slot N to the switching core simultaneously. The link deskewing is controlled by the Link Synchronization & Timing Control module.
- Continuously monitor the delta between where slot 0 of the incoming row is versus the internal row boundary signal within the iTSE. This result will be reported to the Link RISC Processor and will be used as part of the ranging process to synchronize the iTPP connected to the input link (this would be a first stage function only).

The detailed description of this module is provided in Section 11.

3.1.2 Data Stream Demapper

This module is responsible for extracting the data from the incoming serial data links. The feature highlights of this module are:

- Demapping of the input link slots. This means based on the input slot number determine if the traffic is TDM, PDU, or a Request Element. The determination is based on the contents of the Demapper RAM.
- For TDM traffic, determine the destination link and row buffer memory address. This information is stored in a Demapper RAM which is configured by software as TDM connections are added or torn down.
- For PDU traffic, assemble all 16 slots which make up the PDU into a single 512-byte PDU. Then forward this entire PDU word to the row buffer mapper logic. The PDUs are assembled prior to forwarding them to the row buffer so that the row buffer can write the entire PDU to the row buffer memory in a single clock cycle. This will provide the maximum possible write-side memory bandwidth to the row buffers. This is the most critical constraint of the iTSE implementation, being able to write 12 entire PDUs to a single row buffer in 6 link slot times (12 core clock cycles).
- For Request Elements, assemble the 3-slot block of REs into two 48-bit REs and forward them to the Request Parser module.

The detailed description of this module is provided in Section 4.3.1.2.

3.1.3 Row Buffer Mapper

This module is responsible for mapping traffic which is received from the Data Stream Demappers into the row buffer memories. The feature highlights of this module are:

- FIFO the TDM traffic as it's received from the Data Stream Demappers. Then write it to the row buffer. The row buffer memory address is actually pre-configured in the Demapper RAM within the Data Stream Demapper module. That module will forwarded the address to the row buffer mapper along with the TDM slot data.
- Write PDU traffic from the Data Stream Demappers to the row buffers. The Row Buffer Mapper will compute the address within the row buffer where each PDU will be written. PDUs will be written into the row buffers starting at address 0 and then every 16-slot address boundary thereafter, up to the maximum configured PDU addresses for the row buffer.

The detailed description of this module is provided in Section 4.3.1.3.

3.1.4 Row Buffer

This module simply contains the row buffer memory elements. The requirements are:

- Provide double buffered row storage which will allow one row buffer to be written during row N while the row data which was written during row N-1 is being read out by the Data Stream Mapper.
- Each row buffer must be capable of storing 1536 slots of data. This will allow the row buffer to store 96 PDUs or 1536 TDM slots or a combination of the two traffic types. Request elements and Link Overhead slots are NOT sent to the row buffer, therefore the row buffer does not need to be sized to accommodate the entire 1700 input link slots.
- The row buffer write port must be 16*36=576 bits wide. It must support writing of only one 36-bit slot (TDM data) or writing of an entire 576-bit word (PDU data) in a single clock cycle.

The detailed description of this module is provided in Section 4.3.1.4.

3.1.5 Request Arbitration

The request arbitration consists of 2 components: (1) a centralized Request Parser module and (2) a Request Arbitration module for each of the output links.

Request Elements are extracted from the input slot stream by the Data Stream Demapper modules and then forwarded to the Request Parser. The Request Parser (which is summarized in Section 3.2.2) will forward the 48-bit request elements to the Request Arbitration modules via two request busses. Each request bus may contain a new request element each core clock cycle. This timing will allow the Request Arbitration logic to process all 13 request sources in less than 8 core clock cycles. The 13 request sources are the 12 input data streams and the internal Multicast & In-Band control messaging module.

The Request Arbitration module will monitor the two request element buses and read in all request elements which are targeted for output link the Request Arbitration module is implementing.

Requirements for this Request Arbitration module are:

- Provide buffering for up to 24 request elements.
- When a new request element is received store it in a free RE buffer. If there are not any free buffers, then replace the lowest priority RE which is already stored in a buffer with the new RE if the new RE is a higher priority. If the new RE is equal to or lower in priority than all REs currently stored in the buffers then discard the new RE.
- On the output side, when the Data Stream Mapper module is ready to receive the next RE, forward the highest priority RE which is stored in the RE buffers to the Data Stream Mapper module. If the RE buffers are empty, then forward an "Idle" RE.

The detailed description of this module is provided in Section 7.

3.1.6 Data Stream Mapper

This module is responsible for inserting data into the outgoing serial data links. The feature highlights of this module are:

- Mapping of the output link slots. This means based on the output slot number determine if the traffic is TDM, PDU, Request Element, or test traffic. The determination is based on the contents of the Mapper RAM.
- For TDM traffic, determine the row buffer memory address. This information is stored in a Mapper RAM which is configured by software as TDM connections are added or torn down.
- For PDU traffic read one slot at a time from the row buffer. The row buffer memory address is stored in the Mapper RAM by software. If the target PDU is not valid (i.e., a PDU was not written to that row buffer location during the previous row time), then transmit the idle pattern, this will insure that a data PDU is not duplicated within the switch.
- For Request Elements, assemble the 3-slot block of REs from two 48-bit REs. The REs are read from the Request Arbitration module.
- For test patterns, insert the appropriate test pattern from the Output Link Bus. These test patterns are created by either the Test Pattern Generator or Test Interface Bus modules.

- Support slot multicasting at the output stage. For example, if we're the Data Stream Mapper for output link 3, we will be able to copy whatever any other output link is sending out on the current slot time. This copying is controlled via the Mapper RAM and will allow the Mapper to copy the output data from another output link on a slot-by-slot basis.

The detailed description of this module is provided in Section 4.3.1.5.

3.1.7 Data Stream Serializer

The feature highlights of this module are:

- Create the output slot stream, data slots are received via the Data Stream Mapper module, overhead slot data is generated internally to this module.
- Split the row data stream into two byte streams for transmission on two Unilink drivers.
- Scramble the output byte stream
- Serialize the output byte stream The detailed description of this module is provided in Section 11.

3.1.8 Grant Stream Deserializer

The Grant Stream Deserializer works in much the same manner as the Data Stream Deserializer. The primary difference is that the grant data only utilizes a single Unilink receiver, thus eliminating the need for deskewing and deinterleaving to recover a single input serial stream.

Since this serial link will only be one half the data stream rate, there will only be 850 slots per row time.

A single FIFO is used to allow for deskewing of the input serial grant streams for all 12 links.

The detailed description of this module is provided in Section 11.

3.1.9 Grant Stream Demapper

This module is responsible for extracting the data from the incoming serial grant links. The feature highlights of this module are:

- Demapping of the received grant link slots. This means based on the input slot number determine if the traffic is a Grant Element or another kind of traffic. The determination is based on the contents of the Grant Demapper RAM. Note: Traffic other than Grant Elements is TBD.
- For Grant Elements, assemble the 3-slot block of GEs into two 48-bit GEs and forward them to the Grant Parser module.

The detailed description of this module is provided in Section 7.2.3.1.

3.1.10 Grant Arbitration

The grant arbitration operates in an identical manner to the Request Arbitration logic. In fact, this module if the identical to the Request Arbitration module, the only difference is that it's processing grant elements in the reverse path instead of request elements in the forward path.

3.1.11 Grant Stream Mapper

This module is responsible for inserting data into the outgoing serial grant links. The feature highlights of this module are:

- Mapping of the output grant slots. This means based on the output slot number determine if the traffic is a Grant Element or test traffic. The determination is based on the contents of the Grant Mapper RAM.
- For Grant Elements, assemble the 3-slot block of GEs from two 48-bit GEs. The GEs are read from the Grant Arbitration module.
- For test patterns, insert the appropriate test pattern from the Output Link Bus. These test patterns are created by either the Test Pattern Generator or Test Interface Bus modules.

The detailed description of this module is provided in Section 7.2.3.2.

3.1.12 Grant Stream Serializer

*Proprietary and Confidential Information of Onex Communications Corporation*

The Grant Stream Serializer works in much the same manner as the Data Stream Serializer. The primary difference is that the grant data only utilizes a single Unilink transmitter, thus eliminating the need for interleaving the transmit serial stream across multiple output serial streams.

Since this serial link will only be one half the data stream rate, there will only be 850 slots per row time.

The detailed description of this module is provided in Section 11.

3.2 Datapath & Link BW Arbitration (per chip modules)

This group of modules is instantiated only once in the iTSE. These modules provide support functions as part of the implementations of the core data path switching functions.

3.2.1 Link Synchronization & Timing Control

This module provides the global synchronization and timing signals used in the iTSE. Some of its features are:

- Generate transmission control signals so that all serial outputs start sending row data synchronized to the RSYNC (row synchronization) input reference.
- Control the deskewing FIFOs in the Data Stream Deserializers so that all 12 input links will drive the data for slot N at the same time onto the input link bus. Note: this same deskewing mechanism is implemented on the Grant Stream Deserializers.

The detailed description of this module is provided in Section 10.

3.2.2 Request Parser

This module will receive inputs from all 13 request element sources and forward the REs to the Request Arbitration modules via two request element buses. Basically, this module is mapping the 13 parallel RE inputs onto two TDM buses.

The detailed description of this module is provided in Section 7.2.1.1.

3.2.3 Grant Parser

The grant arbitration operates in an identical manner to the request arbitration logic. In fact, this module if the identical to the Request Parser module, the only difference is that it's processing grant elements in the reverse path instead of request elements in the forward path.

3.2.4 Link RISC Processor

This module will be a Tensilica processor core (one of two on the iTSE) which will implement these functions:

- Control the ranging synchronization on the input links with the source iTPP. This function only needs to be done on an iTSE which resides within the first stage of the switch fabric.
- Likewise, control the ranging synchronization on the output link grant stream input with the source iTPP (i.ie. iTPP generating the grant stream). This function only needs to be done on an iTSE which resides within the last stage of the switch fabric.
- Multicast controller. This Link RISC Processor will handle the Req/Grant processing needed to transmit multicast messages.
- In-band data communications controller. This module will only control the reception and transmission of the in-band communications PDUs. All PDUs will be forwarded to the Configuration RISC Processor which will interpret the messages. This Link RISC Processor will only handle the Req/Grant processing needed to transmit messages.

The detailed description of this module is provided in Section 6.

3.3 Support Modules

This group of modules is instantiated only once in the iTSE. Since the primary function of the iTSE is switching of traffic between the input and output links, we can view modules which are not actively transporting traffic as "support" modules for the switching functions.

3.3.1 Configuration RISC Processor

Proprietary and Confidential Information of Onex Communications Corporation

This is a Tensilica based RISC processor core, it is one of two Tensilica RISC processors which is present in the iTSE. The primary function of this core is to process configuration and status messages from an external (to the iTSE) controller module.

The detailed description of this module is provided in .

3.3.2 System Control

This module will handle all the reset inputs and reset the appropriate internal modules.

The detailed description of this module is provided in Section 12.

3.3.3 Test Pattern Generator & Analyzer

This module will be used for the generation of various test patterns which can be sent out on any slot on the Data Stream or Grant Stream outputs. It will also be capable of monitoring input slots from either the received Data Stream or Grant Stream.

The detailed description of this module is provided in Section 17.1.

3.3.4 Test Interface Bus Multiplexer

This module will allow for sourcing transmit data from the external I/O pins. Also, received data can be forward to the I/O pins. This will be used for testing the iTSE when an iTPP may not yet be available.

The detailed description of this module is provided in Section 17.2.

3.3.5 PLLs

The Unilink PLL is used to create the IF clock needed by the Unilink macros. Within each Unilink macro another PLL will multiply the IF clock up to the serial clock rate.

The Core PLL is used to create the clock used by the iTSE core logic. This core clock is expected to be around 250 MHz.

The detailed description of these PLLs is provided in Section 9.

3.3.6 JTAG

The JTAG interface is used for two purposes: (1) boundary scan testing of the iTSE at the ASIC fab and (2) Debug interface for the Configuration RISC Processor. Note: the Link RISC Processor will not have a debug interface, it will be implementing finite state machines so we want to keep it as small as possible.

The detailed description of this module is provided in Section 17.4.

3.4 Internal Datapath Buses

RESERVED

*Proprietary and Confidential Information of Onex Communications Corporation*

4 Data Path Description

This section will describe how the switch data path is implemented within an iTSE. There are two types of data which may be switched through the iTSE, TDM data and Data PDUs (which can carry an ATM cell or a fragment of an IP packet). This section will focus on TDM and unicast Data PDU switching. Multicast Data PDU switching is described in Section 5.

The switching mechanism will operate on a row by row basis. This means TDM or Data traffic on an input link during any given row time may be switched to any output link and/or slot time within the same given row time. The structure of the iTSE is a Time-Space-Time division fabric. This concept is illustrated in Figure 4-1.

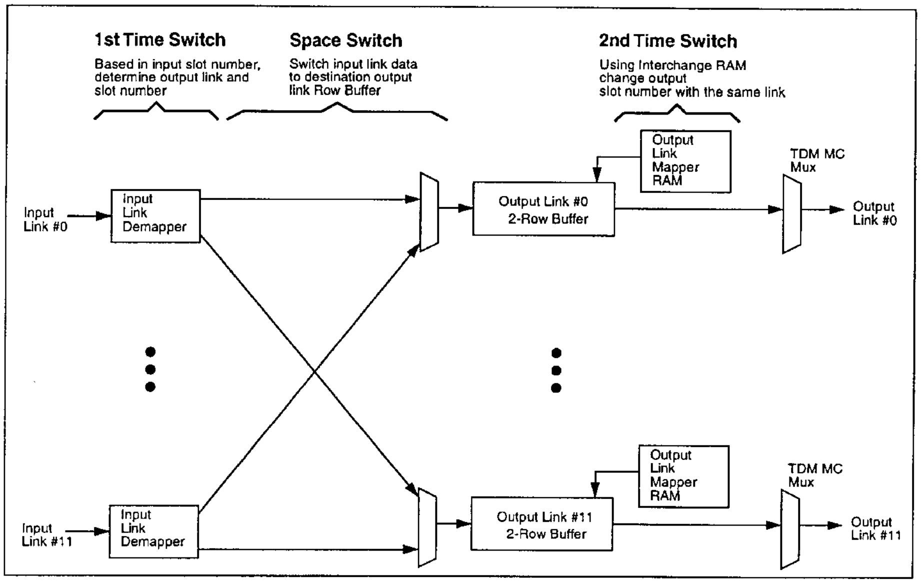

Figure 4-1: iTSE Time-Space-Time Switching Fabric

The T-S-T switching concept only applies to TDM traffic. For data PDUs, the implementation of the iTSE allows the data PDUs to reside in any group number within the row. This means that for data traffic the iTSE switch fabric can simply be viewed as a Space switch.

Since the iTSE switches traffic on a row by row basis, a 2-Row Buffer store is required. While one row is being received and written into one of the 2 row buffers, the other row buffer (which contains data received during the previous row time) is being played out to the output link.

TDM traffic is switched based on how the Input Link Demapper RAM, of which there is one per input link, and the Output Link Mapper RAM, of which there is also one per output link, are configured. Reference Figure 4-16 and Figure 4-19 for where these RAMs are implemented. These RAM are configured via the internal RISC processor, which in turn gets the configuration messages from an external software module which is determining the switching path for each new TDM stream which is added to the switch fabric.

Data traffic is switched as 16-slot "PDUs" through the switching fabric. Each PDU will include a self-route tag which identifies the path it will take through the switching fabric. Data PDUs enter the switching fabric based on scheduling algorithms which are running on each input Port Processor chip. Since these scheduling algorithms are independent, there is not any synchronization between the iTPPs. This could result in the iTPPs sending more data PDUs to a single output row buffer than it can store, which would result in the switch dropping the excess PDUs. In order to prevent this situation from occurring, the concept of "arbitration" for the PDU data path has been introduced to the iTSE architecture. With this arbitration scheme, the source iTPPs will send request messages to the destination iTPPs. The destination iTPPs will in turn reply with a grant message, via a separate out-of-band control channel which is implemented as a full reverse overlay network within the switch fabric, to the source iTPPs. If the source iTPP receives a grant for a request, it will be able to send the data PDU in the next row and be certain that the PDU will get to the destination iTPP and not be lost within the switch fabric due to buffer overflow.

This arbitration scheme is described in detail in Section 7. This arbitration scheme, in concert with the implementation of the data path, will guarantee that no data is lost within the switch fabric.

4.1 Constraints on Switch Configuration

This section summarized the constraints on iTSE usage which, if met, will guarantee that no data is lost within the switch fabric.

*TDM Switc hing Constraints -*

- TDM traffic may not be transported on the last 36 slots of the row.
- In any given slot, no more than 2 TDM slots on any of the 12 input links may be destined for the same row buffer input TDM FIFO (see Figure 4-16 for where the TDM FIFOs reside).
- In any given 16-slot period, no more than 18 total TDM slots may be destined for the same row buffer input TDM FIFO.

4.2 iTSE Data Path Timing

Figure 4.2 illustrates the basic timing for writing incoming data into the Row Buffers. Writing of incoming data to the Row Buffers is the critical timing path because it's possible that as many as 14 traffic sources will simultaneously send traffic destined to the same output Row Buffer. The 14 traffic sources are the 12 Input Link Demappers, the Multicast Controller, and the Control Message Controller.

The timing concept will operate on a "group" basis, where a group will define the 16-slots which may contain a data PDU. The input links associated with a specific switch stage must all have the same configuration for data PDU slots. This means that the data PDU slots must all be defined to line up on the same slot boundaries. This definition is done by was of the Input Link Demapper RAM configuration.

For example, let's say input links 0, 1, and 2 are all configured to be within the same switch stage. In addition, let's say that link 0 contains 3 PDUs, link 1 contains 1 PDU, and link 2 contains 2 PDUs. One possible configuration for where the PDUs are placed on each of these 3 links would be:

- Link 0 - 1st PDU in slots 2 through 17, 2nd PDU in slots 20 through 35, 3rd PDU in slots 36 through 51.
- Link 1 - 1st PDU in slots 20 through 35.
- Link 2 - 1st PDU in slots 2 through 17, 2nd PDU in slots 36 through 51.

Observed that the 16-slot PDUs for all input links must always fall within the same link slot boundaries. Links which carry fewer PDUs may use the unused PDU slot areas for carrying TDM traffic.

The 16-slot group time period is then divided into two half-group periods, which are called "1st 1/2 group period" and "2nd 1/2 group period". During group number N, if an incoming link is carrying a data PDU, the 1st half of the data PDU will be assembled into one large 256-bit word (8 slots * 32 bits/slot). Half way into group number N, the Row Buffer Mappers will be given a start signal which tells them that they may now write the first half of the PDUs into the upper part of the row buffers. This row-buffer write period may take up to 12 cclk cycles. While the 1st half of the group is being written to the row buffers, the 2nd half of the group is being assembled into another larger 256-bit word (8 slots). At the end of group number N, the 2nd half of the PDU will be written into the lower part of the row buffers. This timing is illustrated in Figure 4-2.

If an incoming link is carrying TDM data, the TDM slot data will be written directly into the appropriate TDM FIFO. The contents of the TDM FIFOs are then written to the row buffers during periods where PDU data is not being written.

The internal core clock for this datapath logic will be running at 2x the slot rate, i.e., there will be 2 clock cycles available to process each received slot of data. Thus, on average, 7 slot times (14 cclk cycles) are used to write up to 14 PDUs of data to the Row Buffer RAM. The remaining 9 slot times (18 clock cycles) will be used to unload the TDM FIFOs and write their contents to the Row Buffer RAM.

This timing is illustrated in the figure below. Because there are only 2 core clock cycles available per incoming slot time, only 2 TDM slots of data may be written to any single TDM FIFO in that single slot time. This will be a Proprietary and Confidential Information of Onex Communications Corporation constraint that the user must make sure not to violate when setting up TDM paths through a switch fabric. Another constraint for TDM traffic is that in any given 16-slot group period, a maximum of 18 TDM slots are written to any single TDM FIFO.

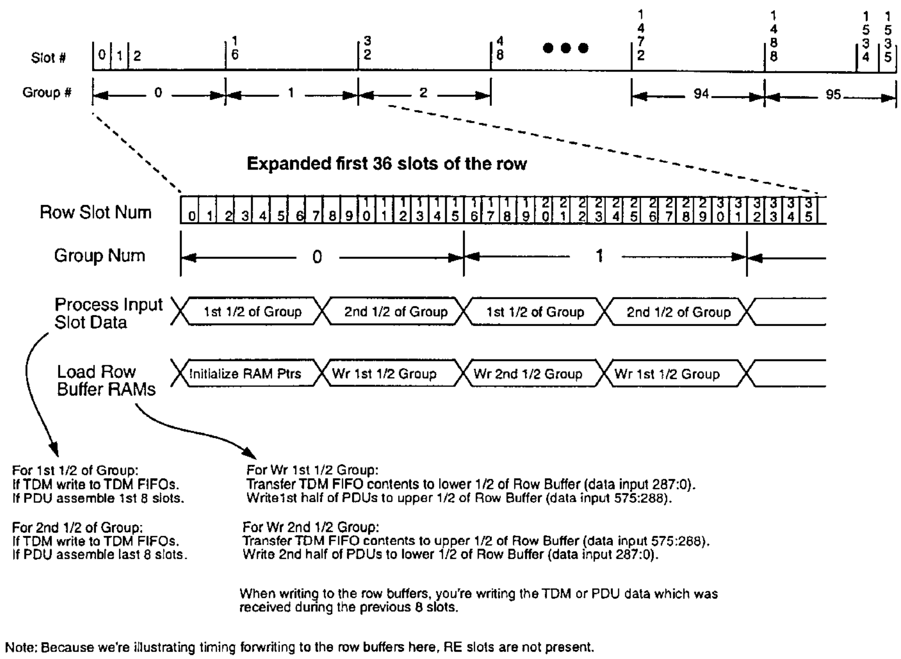

Figure 4-2: Input TDM & PDU Dataflow Timing

Note: In this figure, we don't show the Request Element slots. Normally these RE slots would be inserted in slots early in the row, this is shown in Section 2.2.2. The purpose of this figure is to illustrate the worse timing scenario for writing PDU and TDM data to the row buffers.

*Proprietary and Confidential Information of Onex Communications Corporation*
4.3 Datapath Core Implementation
A block diagram of the data path core of the iTSE is shown below.
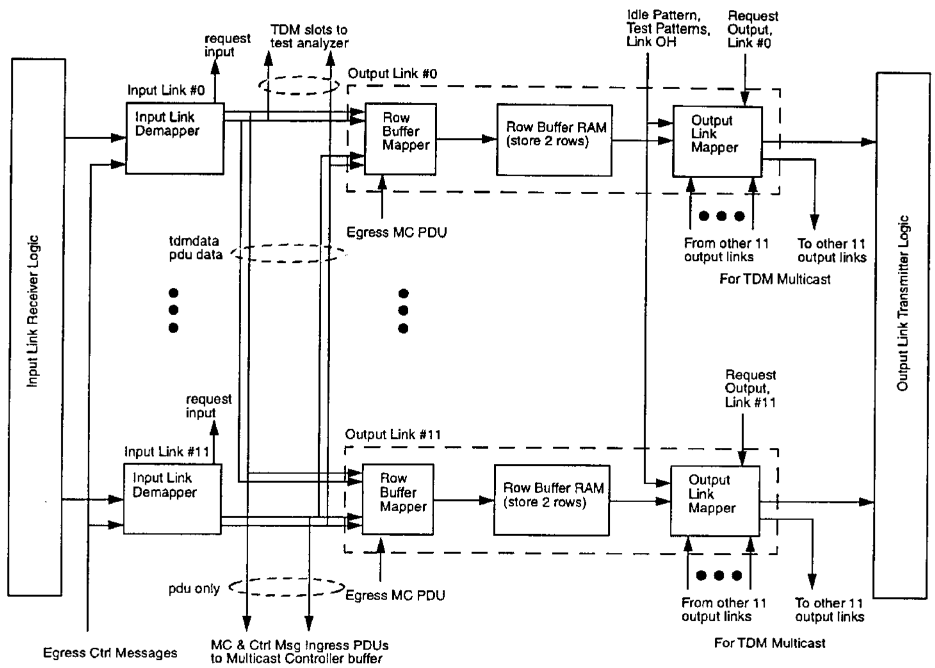
Figure 4-3: Switch Datapath Block Diagram
This Datapath core will be implemented with the hierarchy shown in Figure 4-4.
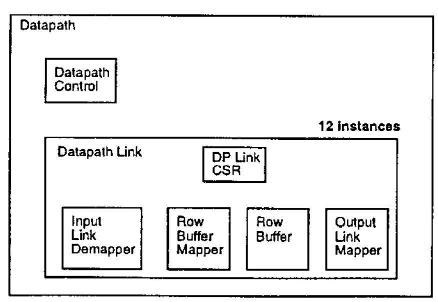
Figure 4-4: Datapath Module Hierarchy

*Proprietary and Confidential Information of Onex Communications Corporation*

4.3.1 Datapath Link Module

A Datapath Link module is comprised of the modules which will make up a single switch datapath link. The iTSE Datapath module will instantiate 12 of these Datapath Link modules.

As shown in the Figure 4-5, a Datapath Link module will instantiate these modules:

- Input Link Demapper
- Row Buffer Mapper
- Row Buffer RAM
- Output Link Mapper
- Datapath Link CSR

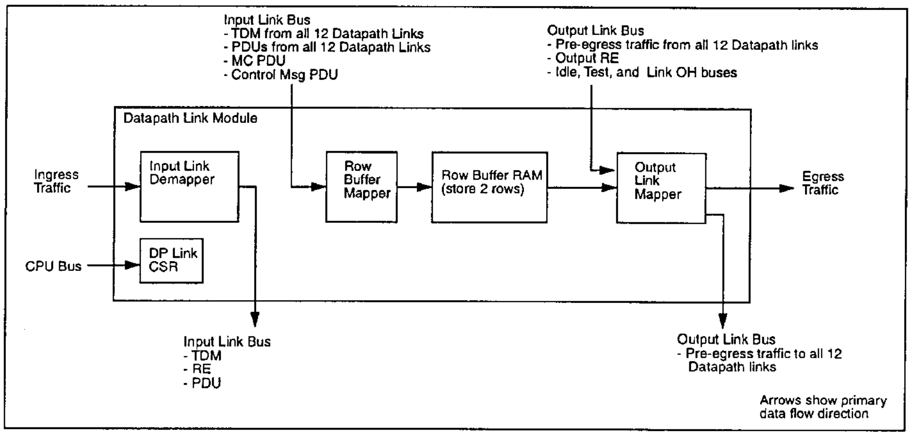

Figure 4-5: Datapath Link Module Interfaces

4.3.1.1 Interface I/O Signals & Timing

Because there are a large number of I/O ports associated with a Datapath Link module we'll summarize them in the table below so that the reader has a feel for the I/O signals prior to describing the implementation of each of the modules which make up a Datapath Link. Figure 4-5 illustrates the interfaces of a Datapath Link module.

*Ingress Traffic Timing -*

Figure 4-6 illustrates the timing for incoming data slots. The iTSE implementation will require cclk to be at least twice the incoming slot rate. This will insure that the iTSE will have a minimum of two cclk cycles to process each incoming slot of data. The two cclk cycles per slot are split into two phases in order to identify which cclk edge the incoming islot_num and islot_data signals are changing.

The iTSE will allow cclk to be asynchronous to the serial link clocks, the only requirement is that cclk be chosen such that there are always a minimum of two cclk cycles per slot. Because cclk may be asynchronous to the incoming link, there may more that 2 cclk cycles for any given input slot. In this case both islot_phase0 and islot_phase1 will both be deasserted for all but the first two clock cycles for each input data slot. This case is is shown during islot_num = 2 in Figure 4-6. Whenever an extra timing adjust clock cycle is inserted, the signal islot_phasez will be asserted.

Notes:

- The islot_row_end would normally occur during the last slot of the link. But we do have the option of speeding up the link (for characterization in the lab), which would result in the link having more than 1700 slots per row. In this scenario, islot_row_end will be asserted starting at slot 1699 and remain asserted until slot 0 of the next row.

- If link synchronization is lost, islot_phase0 and islot_phase1 will remain deasserted and islot_phasez will be asserted.

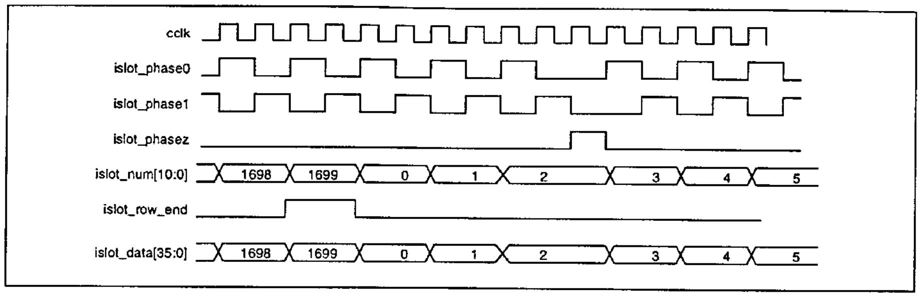

Figure 4-6: Ingress Traffic Timing

*Input Bus T iming -*

For the input bus we'll show these timing diagrams:

- Driving received TDM slots onto the Input Bus.
- Driving received PDUs onto the Input Bus.
- Driving received REs onto the Input Bus.

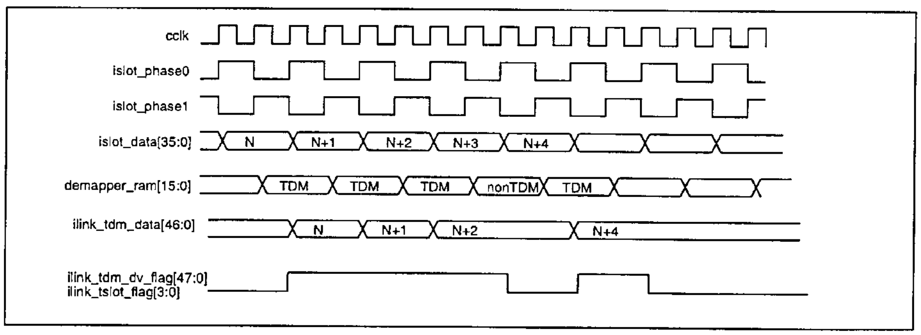

Figure 4-7: Input Link Bus, TDM Timing

*Proprietary and Confidential Information of Onex Communications Corporation*
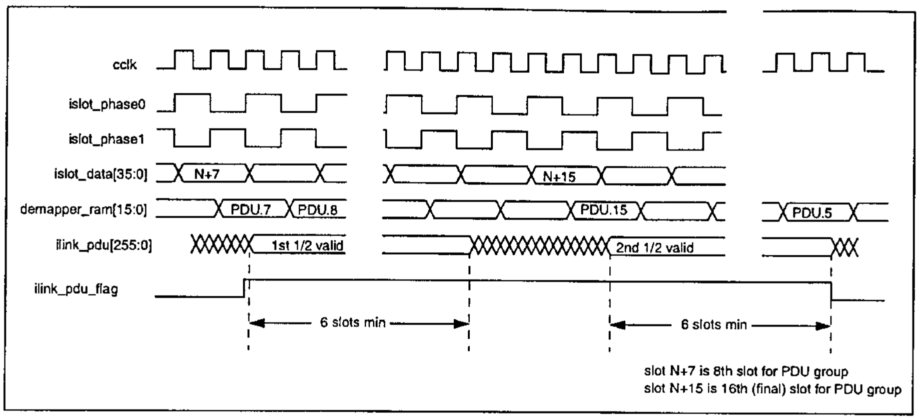
Figure 4-8: Input Link Bus, PDU Timing
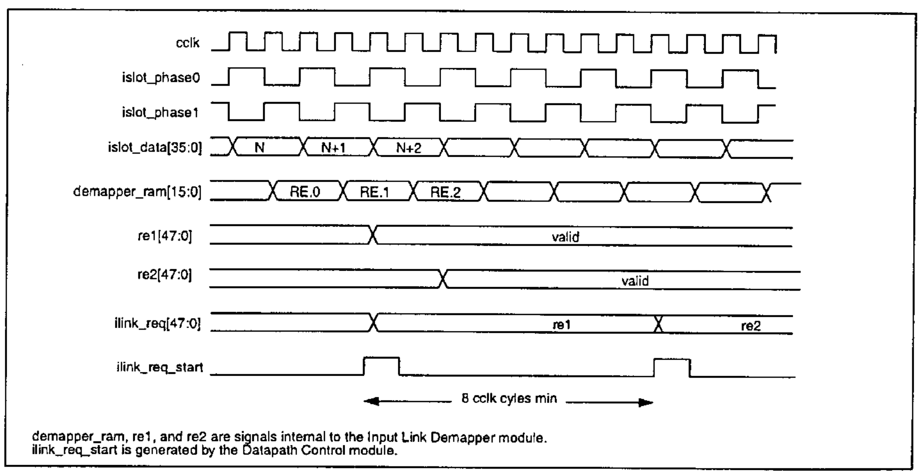
Figure 4-9: Input Link Bus, Request Element Timing

4.3.1.2 Input Link Demapper

This module is instantiated once per Link module. A high-level block diagram is shown in Figure 4-10.

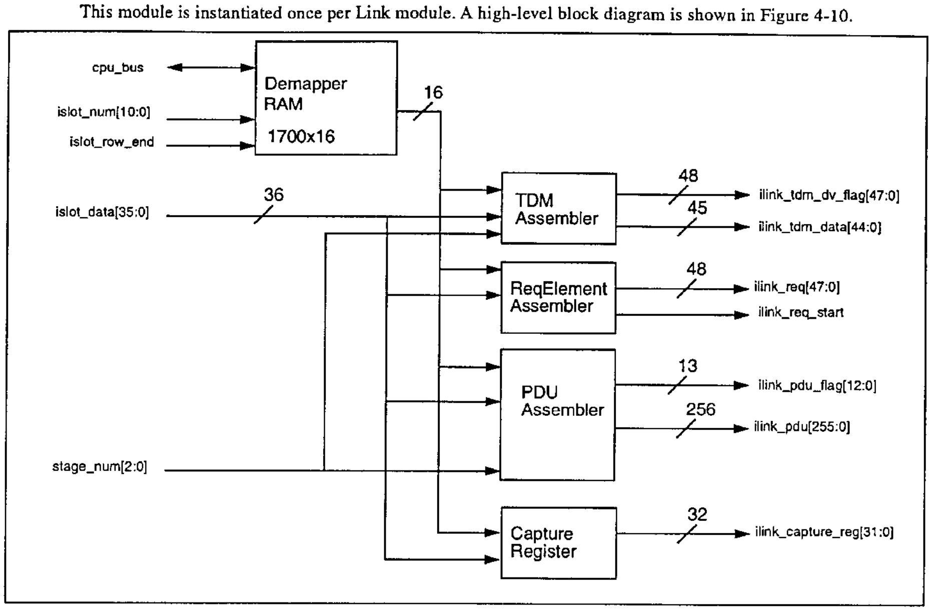

Figure 4-10: Input Link Demapper Block

The inputs to this module are the CPU Bus and the Ingress Traffic interface. These I/O interfaces are described in Section 4.3.1.1.

4.3.1.2.1 Demapper RAM

The Demapper RAM determines how each slot on the input link is being used. The RAM will be configured by the CPU to do two primary functions:

- Define the structure of the input link. This means identifying whether the input slot is carrying TDM traffic, a portion of a data PDU, a portion of a Request Element, a Test Traffic slot, or is slot which should be ignored.
- For TDM traffic, it also specifies the destination row buffer and the address within that row buffer. This is the Time-Space cross-connect mapping function.

The islot_num input is incremented once for each incoming slot and will be used as the address for this RAM. This input slot number will start at 0 for the first slot and then simply be incremented once for each new input slot up to the maximum number of slots in the row.

Since there will always be at least 2 cclk cycles per input slot, the accessing of the RAM is split into two phases. During phase 0 the RAM will be addressed using the islot_num input, the output of the RAM will be registered at the end of phase 0 so that it will remain valid for the following 2 cclk cycles. During phase 1, the RAM may be written to or read from by the CPU. This timing is illustrated in Figure 4-11. The RAM will be implemented with a 1 write, 1 read port memory cell.

*Proprietary and Confidential Information of Onex Communications Corporation*

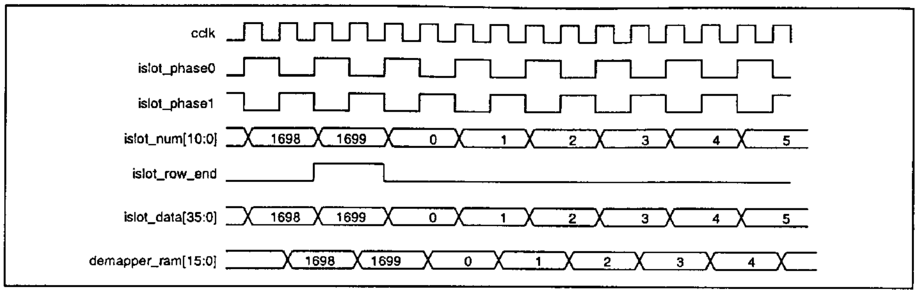

Figure 4-11: Demapper RAM Timing

The Demapper RAM is 16-bits wide. The first bit identifies whether or not the slot contains TDM traffic. If so the remaining 15-bits identify the destination row buffer and address within that row buffer. If the slot is not TDM traffic, then the remaining 15-bits are used to identify what the slot could be used for. This structure of the RAM is shown in the figures below.

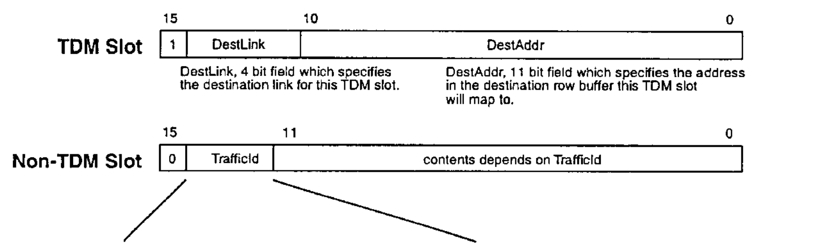

| TrafficId | Description |
|---|---|
| 0 0 0 | Expansion (bits 11:0 identify traffic) |
| 0 0 1 | Request Element |
| 0 1 0 | PDU |
| 0 1 1 | Test Analyzer 1 |
| 1 0 0 | Test Analyzer 2 |
| 1 0 1 | Test Analyzer 3 |
| 1 1 0 | Capture Register |
| 1 1 1 | Multicast Request Element |

Figure 4-12: Demapper RAM Structure, TDM vs Non-TDM Slot

Proprietary and Confidential Information of Onex Communications Corporation

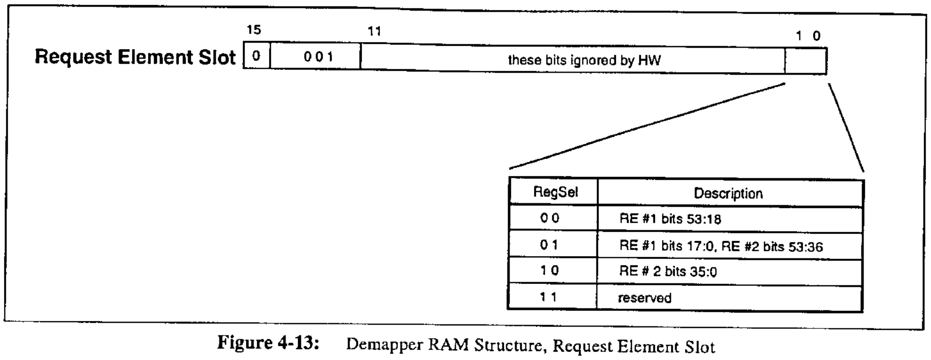

Figure 4-13: Demapper RAM Structure, Request Element Slot

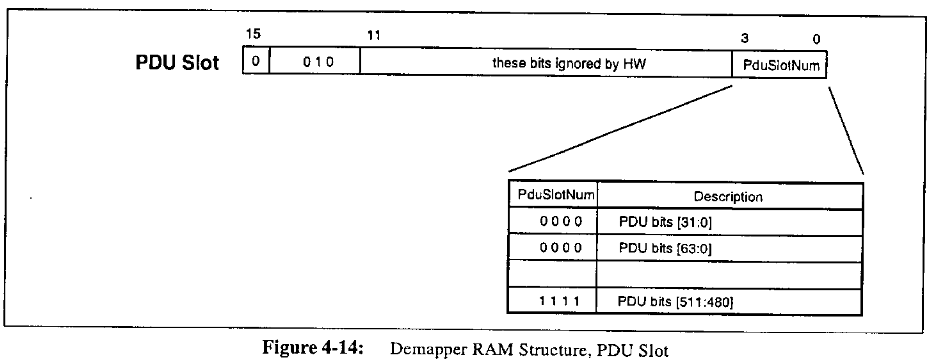

Figure 4-14: Demapper RAM Structure, PDU Slot

Table 4-1: Expansion Slot Definitions

| Demapper Ram [11:0] | Traffic Type | Comments |
|---|---|---|
| 0 | idle | Unused ingress slot, will be ignored by Demapper logic. |
| 1 | BIP-36 | Bit Interleaved Parity for all slots from slot 0 or previous BIP-36 slot. |
| 2 | LOH Status | Link Overhead slot which contains status information fromthe remote connectionin bits 28:24. |
| 2-4095 | | reserved for future use |

4.3.1.2.2 TDM Assembler

The TDM Assembler module simply latches both the TDM slot data (islot_data) and the output of the Demapper RAM when the incoming slot is a TDM slot. It then generates signals (ilink_tdm_dv_flag[47:0]) which inform the Row Buffering logic that TDM data is available.

The timing diagram below illustrates the receiving of 4 TDM slots on the input link. Slot numbers N, N+1, N+2, and N+4 are the TDM slots.

Also, non-TDM slots which don't fall into the Request Element or PDU category will also be driven out on this TDM bus. The TrafficId bits are decoded be driven out on the ilink_tslot_flag[3:1] ports.

4.3.1.2.3 Request Element Assembler

Because the request element (RE) size is 54 bits, it cannot fit into a single slot. Therefore, in order to minimize the number of slots required to carry up to 96 REs per row we'll define a structure which will pack 2 REs into 3 slots. The request element assembly block will contain 2 54-bit buffers which will hold the two REs from the 3 slot structure.

As shown in Figure 4-13, the 2 Lsb's of the Demapper RAM will specify which buffer register the current 36-bit slot will be written to. In this timing example of Figure 4-9, the 3 slots which contain the request payloads are slot numbers N, N+1, and N+2. The ilink_req_start output will inform the request arbitration logic that it can now start processing the new request element which is available on the ilink_req bus.

4.3.1.2.4 PDU Assembler

Data PDU slots will be forwarded to the PDU assembler where they will be assembled into a 256-bit wide words (8 slots * 32 bits/slot). This 8 slots will be the two halves of a 16-slot PDU. After each half-PDU is assembled, the 256-bit half-PDU is available to the row buffer memories so that the entire half-PDU can be written into the row buffer RAM in an single write cycle.

The PDU assembler must be able to store up to 14 slots of data, 8 slots for the half-PDU, plus another 6 slots to store the first 6 slots of the next incoming half-PDU while the main half-PDU store buffer is waiting for the row buffer RAM to write the half-PDU to the memory.

The appropriate ilink_pdu_flag is asserted for the output link this PDU should be forwarded to. For each PDU received on the input link, the flag to set is determined by the appropriate 4-bit field from the self-route tag in the PDU header. The stage_num control input determines which 4-bits to use from the self-route tag. This ilink_pdu_flag field is one bit per output link (as opposed to using a 4 bit encoded field) so that the Row Buffer Mapper doesn't need to decode a 4-bit field.

The mapping of input PDU slots to the 512-bit complete PDU is shown below:

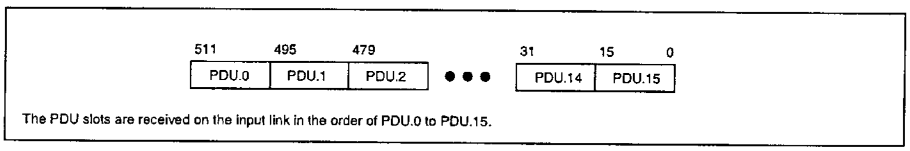

Figure 4-15: PDU Format

*Parity Chec k -*

RESERVED

4.3.1.2.5 Capture Register

There will be a single 32-bit register which can be used to capture any slot of data from the incoming link. The CPU will be able to read this register at any time. Whenever the capture register is written, the new value will be compared against the previous value and if any bit is different, a LinkCaptureReg IRQ will be generated.

It is expected that this will normally be used to read the Link Overhead Mailbox slot.

In addition to capturing the 32-bit LOH mailbox slot, this module will also have a 4-bit register to capture the LOH status slot. The only bits capture off this status slot are bits 28:24. As is done with the capture register, if any of the 4 bits is different than the previous values, a LinkSyncMsg IRQ will be generated. It is expected that this LOH status slot will contain status information fron the remote device connected to this incoming link.

4.3.1.3 Row Buffer Mapper

This module controls the writing of data from the input links to the row buffer. There are two types of data which are written to the row buffer, TDM slots and DATA PDUs. The TDM slot data must be written to the row buffer on a slot by slot basis, i.e., no dependencies between TDM slots is assumed. The DATA PDU is 16-slots wide and in order to keep up with the incoming data rate, must be capable of being written to the row buffer in a single clock cycle.

A high-level block diagram is shown in Figure 4-16.

*Design Considerations -*

RESERVED

*Proprietary and Confidential Information of Onex Communications Corporation*
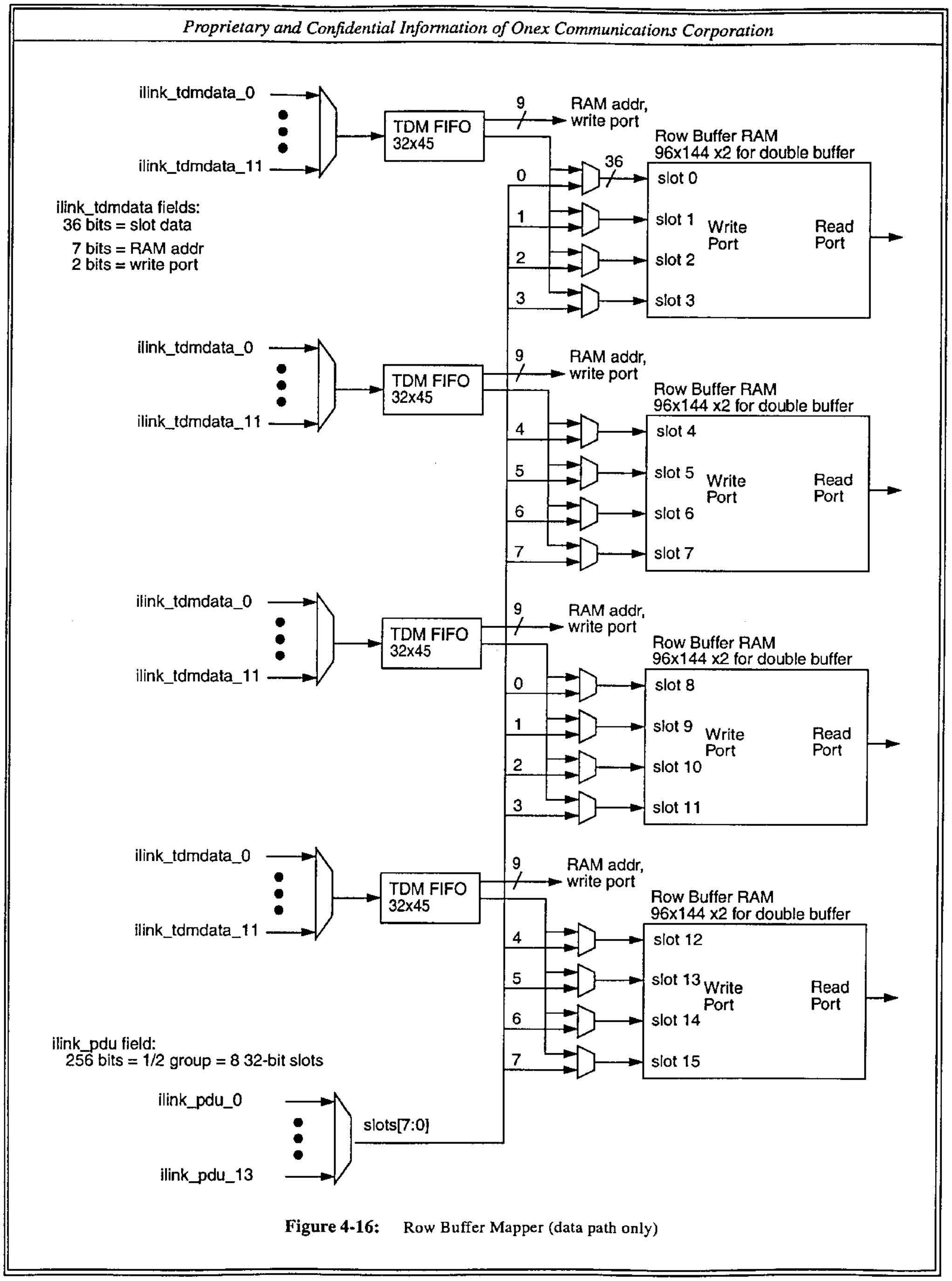
Figure 4-16: Row Buffer Mapper (data path only)

*Proprietary and Confidential Information of Onex Communications Corporation*

4.3.1.4 Row Buffer

The double-buffered row buffers are used to store the traffic for the output link on a row-by-row basis. This means traffic received on one of the 12 input links during row N will be stored in a row buffer and will then be transmitted on the output link during row N+1.

The row buffers are "double-buffered" in order to support the simultaneous reception and storage of traffic being received during the current row period and the transmission of traffic which was received during the previous row period. At the row boundary (as indicated by the row_toggle input signal) the row buffers will swap.

The row buffers are sized to be 96 PDUs deep. Since each PDU is 16 slots wide, the total storage capacity for a single row buffer is 1536 slots. The observant reader will realize this slot capacity is not large enough to hold an entire row of data from the input link. The input link has a capacity of 1700 slots, but we're sizing the row buffer to only hold 1536 slots. The reasoning for this is:

- 20 slots of the input link are the Link Overhead which doesn't need to be stored in the row buffer.
- If the link is configured to carry 96 PDUs of data traffic, then 144 input link slots will be required to carry the request elements. Request elements are not stored in the row buffers, they are forwarded directly to the arbitration logic by the Input Link Demapper module.

The block diagram of the row buffer is shown in Figure 4-18. The row buffer must be capable of writing an entire PDU (16 slots) of data in a single clock cycle, therefore multiple memory elements must be used in order to get this data bus width.

The address organization of the 96x576 row buffer is shown below:

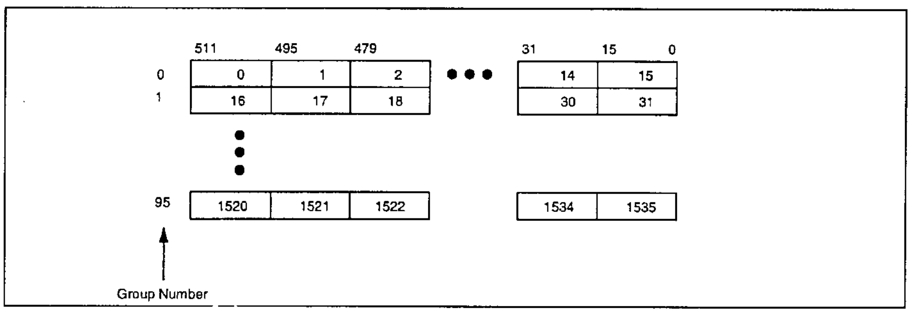

Figure 4-17: Row Buffer Memory Addressing

PDUs will always be stored on an address boundary which is a multiple of 16.

4.3.1.4.1 PDU Fill Status Logic

The function of this module is to monitor the reads from the row buffers by the Output Link Mapper module and indicate to whether or not the an address location being read contains valid PDU data. A location contains valid PDU data if it was written to during the previous row time.

When the Output Mapper logic reads a PDU location which does not contain a valid PDU, it will transmit the idle pattern in place of the PDU slots.

37

*Proprietary and Confidential Information of Onex Communications Corporation*
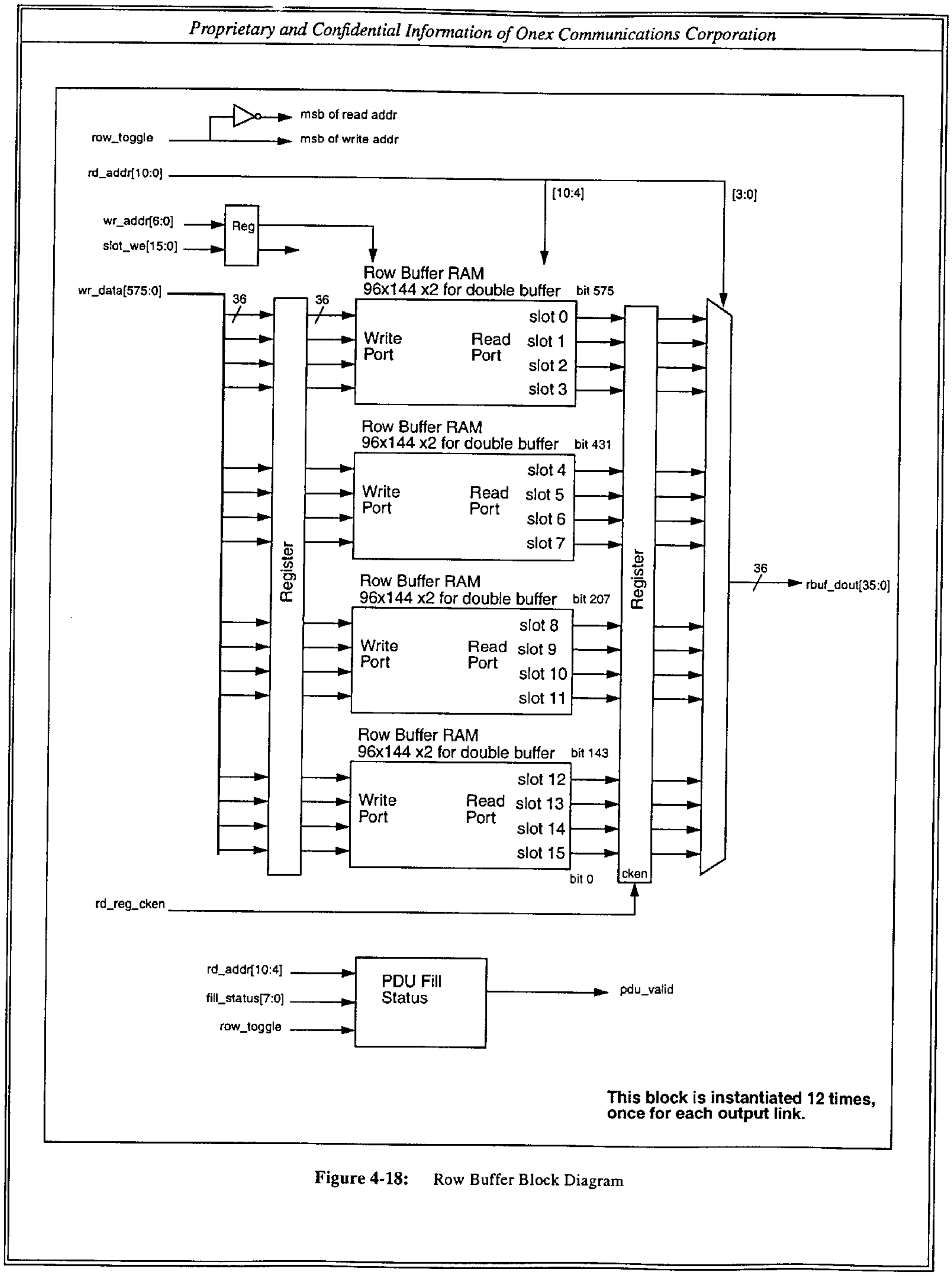
Figure 4-18: Row Buffer Block Diagram

4.3.1.5 Output Link Mapper

The Output Link Mapper module is responsible for mapping the transmit payloads onto the outgoing link slots. The sources of internal data which may be mapped onto an output link slot are:

- TDM or PDU data from the row buffer memory.
- Request Elements from the arbitration module.
- A copy the outgoing slot data from one of the other 11 links. This is the way multicasting of TDM data will accomplished.
- Idle patterns for unused slots.
- Test traffic from the I/O pins or internal test traffic generators.

This module is instantiated 12 times, once for each output link. A block diagram is shown in the figure below.

The module basically consists of two main functional blocks: (1) a Mapper RAM which identifies what data should be placed into each output link slot and (2) logic which multiplexes the various internal data sources onto the output link.

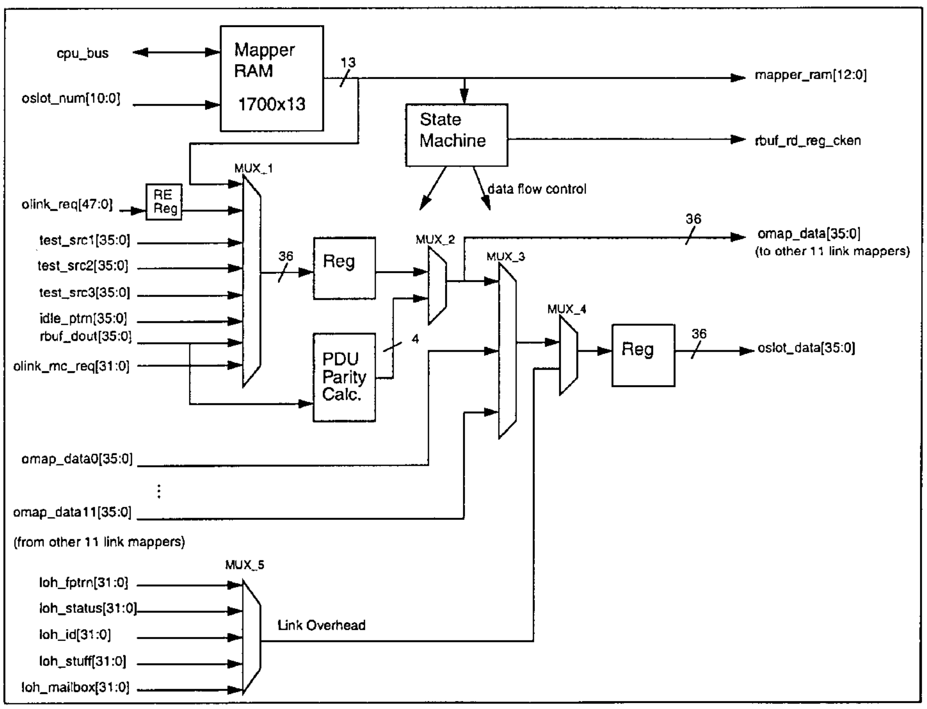

Figure 4-19: Output Link Mapper

*Implementation Notes -*

Loop back omap_data output to omap_data input so have all 12 links on omap_data in, this will make programming for TDM multicast in Mapper ram easier (will have a 12:1 mux vs an 11:1 mux).

*Egress Traffic Timing -*

Figure 4-20 illustrates the timing for outgoing data slots. The iTSE implementation will require cclk to be at least twice the outgoing slot rate. This will insure that the iTSE will have a minimum of two cclk cycles to process each outgoing slot of data. The two cclk cycles per slot are split into two phases in order to identify which cclk edge the oslot_num and oslot_data signals are changing.

The iTSE will allow cclk to be asynchronous to the serial link clocks, the only requirement is that cclk be chosen such that there are always a minimum of two cclk cycles per slot. Because cclk may be asynchronous to the outgoing link, there may more that 2 cclk cycles for any given output slot. In this case both oslot_phase0 and oslot_phase1 will both be deasserted for all but the first two clock cycles for each input data slot. This case is is shown during oslot_num = 2 in Figure 4-20. Whenever an extra timing adjust clock cycle is inserted, the signal oslot_phasez will be asserted.

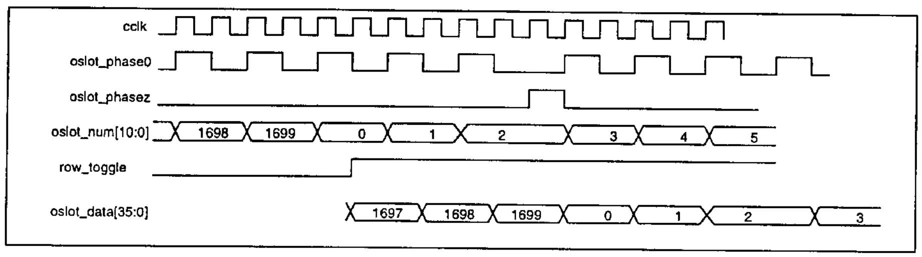

Figure 4-20: Egress Traffic Timing

4.3.1.5.1 Mapper RAM

RESERVED.

4.3.1.5.2 Output Link Request Element

When Mapper RAM indicates it is time to transmit a request element, the highest priority 52-bit request element is fetched from the arbitration module. Since only 36-bits of a RE may be transmitted in a single link slot, it will be necessary to add buffering within the Output Link Mapper module which will buffer the extra bits which cannot be sent in the current slot.

A 3-slot structure will be defined which will be used to transmit 2 52-bit REs and their associated 2-bit BIP2 parity. The contents of the 3 slot structure is shown in the Req Element Slot RAM structure in Figure 4-21.

The timing for fetching REs is shown below. In this example, the 3 slot RE structure is programmed to be transmitted on output link slots N, N+1, and N+2.

The Output Link Mapper module will be responsible for prepending the 2-bit BIP2 parity in bit positions 53 and 52 to create a 54-bit request element.

*Proprietary and Confidential Information of Onex Communications Corporation*

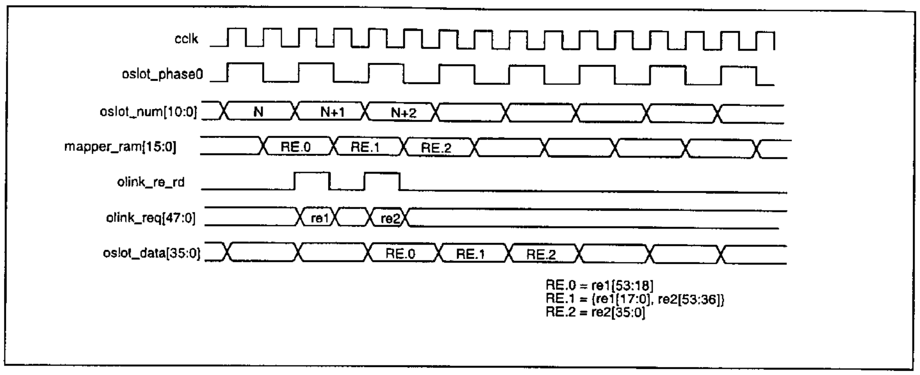

Figure 4-21: Request Element Timing

As we can see from this timing diagram, the RE (olink_req) must be available during the same cclk cycle as olink_re_rd is asserted. This means the Request Arbiter module will need to implement a "pre-fetch" mechanism for the outgoing request elements.

4.3.1.5.3 Output Link Overhead

There will normally be 20 slots used for Link Overhead (LOH). The mapper module will be responsible for inserting contents of these 20 LOH slots into the link data stream. There are 4 types of data which may be inserted into the LOH slots:

*LOH F raming P attern -*

This will be a 36-bit value which is common to all output links. It will be Configurable via a software programmable register. This pattern will be used in only 1 of the 20 LOH slots.

*LOH Status -*

This 32 bit status field will contain only a single bit of status information. In bit 24 the synchronization status of the Grant channel for this link will be carried. All other bits will be fixed at 0.

Note: the 4 tag bits are fixed to all 1's.

*LOH Identifi er -*

This 32-bit will contain an identifier for this switch & link. The field is made up as:

- loh_id[3:0] = link number that the output mapper is instantiated as.
- loh_id[27:4] = iTSE ID number which is SW configurable (via switch_id register in the RISC core).
- loh_id[31:28] = stage number the iTSE is programmed as.

Note: the 4 tag bits are fixed to all 1's.

*LOH Stuf f -*

This 32-bit pattern will be inserted in the LOH slots which aren't used for framing, status, or ID. This pattern will be Configurable via a software programmable register and is common to all output links.

Note: the 4 tag bits are fixed to all 1's

*LOH Mailbo x -*

This 32 bit mailbox will be configurable via a software programmable register. There will be a unique mailbox register for each output link. This mailbox register will provide a mechanism to allow the CPU in this iTSE to communicate with the CPUs attached to its output links. At the time this is being written, there is not any known applications for this mailbox.

Note: the 4 tag bits are fixed to all 1's.

*Proprietary and Confidential Information of Onex Communications Corporation*

4.3.1.6 Datapath Link CSR

This section summarizes the Control Status Registers (CSRs) used to configure and monitor the operation of an individual Datapath Link module. CSRs include all configurable memory devices within this module, these devices may be individual flip-flops, register arrays or memory arrays.

Note: there is an additional CSR module which contains global control information which is common to all Datapath Link module. This global CSR module is described in Section 4.3.2. Statistics information which is gathered by each individual Datapath Link Module is stored in a centralized Statistics module which is accessed bia the global CSR address space.

Unless otherwise noted, the reset value for programmable fields is 0.

Table 4-2: Datapath Link Module CSRs

| 31–24 | 23–16 | 15–8 | 7–0 | Address Offset |
|---|---|---|---|---|
| DemapperRam, location 0 | | all 0's | | 0x0000 |
| ... | | all 0's | | ... |
| DemapperRam, location 1699 | | all 0's | | 0x1A8C |
| unused address space | | | | |
| ReceivedPDUCount (don't clear on read) | | | | 0x1F80 |
| TransmittedPDUCount (don't clear on read) | | | | 0x1F84 |
| ErroredPDUCount (don't clear on read) | | | | 0x1F88 |
| ErroredReqCount (don't clear on read) | | | | 0x1F8C |
| BIP36ErrorCount (don't clear on read) | | | | 0x1F90 |
| PeakBIP36Errors (don't clear on read) | | | | 0x1F94 |
| unused address space | | | | |
| ReceivedPDUCount (clear on read) | | | | 0x1FA0 |
| TransmittedPDUCount (clear on read) | | | | 0x1FA4 |
| ErroredPDUCount (clear on read) | | | | 0x1FA8 |
| ErroredReqCount (clear on read) | | | | 0x1FAC |
| BIP36ErrorCount (clear on read) | | | | 0x1FB0 |
| PeakBIP36Errors (clear on read) | | | | 0x1FB4 |
| unused address space | | | | |
| all 0's | ErrorFlags | | | 0x1FD0 |
| all 0's | ErrorFlagsMask | | | 0x1FD4 |
| 0 RBufPduLimit | ILinkDemapperControl | LinkControl | OLinkMapperControl | 0x1FD8 |
| all 0's | | | RxLohSync | 0x1FDC |
| TxLohMailbox | | | | 0x1FE0 |
| RxCaptureReg | | | | 0x1FE4 |
| unused address space | | | | |
| 0 0 MapperRam, location 0 | | all 0's | | 0x2000 |
| ... | | all 0's | | ... |
| 0 0 MapperRam, location 1699 | | all 0's | | 0x3A8C |

*Notes on Stats Counter -*

Each statistic counter has 2 addresses which it may be read from. One address will automatically clear the counter after the read cycle, the other address will not clear the counter. The counters will saturate at all 1's if the max count value is reached.

ReceivedPDUCount

Cumulative count of the incoming valid PDUs received on this link and forwarded to the Row Buffers. This counter is 20-bits wide.

*Proprietary and Confidential Information of Onex Communications Corporation*

TransmittedPDUCount
Cumulative count of the outgoing valid (non-idle) PDUs transmitted on this link. This counter is 20-bits wide.

ErroredPDUCount
Cumulative count of the incoming PDUs discared due to a checksum parity error. This counter is 12-bits wide.

ErroredReqCount
Cumulative count of the incoming REs discared due to a BIP2 parity error. This counter is 12-bits wide.

BIP36ErrorCount
Cumulative count of the BIP36 errors detected each row time. This counter is 24-bits wide.

PeakBIP36Errors
Maximum BIP36 errors detected in a single row time. This counter is 12-bits wide.

*Notes on Error Flags -*

Error flags are classified into one of two types: (1) Configuration errors which are errors which are caused by a mis-configuration of the hardware, and (2) Traffic errors which are generated based on the incoming traffic stream. The "Type" column in the error flag description table belows indicates which type of error it is.

ErrorFlags
This 24-bit register contains several flags for error events which may be detected within the Datapath Link Module. Error flags are latched upon detection of the error event and remain latched until they are cleared by software. An error flag is cleared by writing a "1" to that bit position..

| Bit | Name | Type | Description | Source Module |
|---|---|---|---|---|
| 0 | re_seq_error | Config | Error in RE sequence in Demapper RAM. Sequence which is notRE 0, 1,then 2 has been detected. | Input Link Demapper |
| 1 | re_dist_error | Config | Error in RE distribution in the Demapper RAM. This occurs if REs are spaced too close together. Each group of 3 REs need to be spaced at least 16 cclk cycles apart. | Input Link Demapper |
| 2 | re_parity_error | Traffic | BIP2 parity error detected in a RE. A cumulative count of errored RE's is maintained in the statistics module. | Input Link Demapper |
| 3 | pdu_seq_error | Config | Error in PDU sequence in Demapper RAM. Sequence which is not PDU 0, 1, through 15 has been detected. | Input Link Demapper |
| 4 | pdu_parity_error | Traffic | Parity error detected in a PDU. A cumulative count of errored PDU's is maintained in the statistics module. | Input Link Demapper |
| 5 | slot_parity_error | Traffic | BIP36 slot parity error detected. A cumulative count of the BIP36 errors is maintained in the statistics module. | Input Link Demapper |
| 6 | - | Traffic | unused, always read as 0. | Input Link Demapper |
| 7 | - | Traffic | unused, always read as 0. | Input Link Demapper |
| 8 | tdm_flag_error_0 | Config | More that cclks_per_slot incoming TDM slots are valid for this FIFO in a single slot period. This TDM slots which excede cclks_per_slot are lost. cclks_per_slot parameter is configured in the Global CSRs.<br>This TDM FIFO services Row Buffer Addresses 0 through 4 (mod 16). | Row Buffer Mapper |
| 9 | tdm_flag_error_1 | Config | This TDM FIFO services Row Buffer Addresses 5 through 7 (mod 16). | Row Buffer Mapper |
| 10 | tdm_flag_error_2 | Config | This TDM FIFO services Row Buffer Addresses 8 through 11 (mod 16). | Row Buffer Mapper |
| 11 | tdm_flag_error_3 | Config | This TDM FIFO services Row Buffer Addresses 12 through 15 (mod 16). | Row Buffer Mapper |
| 12 | tdm_fifo_full_error_0 | Config | TDM FIFO overflow. This TDM FIFO services ROW Buffer Address 0 through 4 (mod 16). | Row Buffer Mapper |
| 13 | tdm_fifo_full_error_1 | Config | This TDM FIFO services Row Buffer Addresses 5 through 7 (mod 16). | Row Buffer Mapper |
| 14 | tdm_fifo_full_error_2 | Config | This TDM FIFO services Row Buffer Addresses 8 through 11 (mod 16). | Row Buffer Mapper |

Proprietary and Confidential Information of Onex Communications Corporation

| | | | | |
|---|---|---|---|---|
| 15 | tdm_fifo_full_error_3 | Config | This TDM FIFO services Row Buffer Addresses 12 through 15 (mod 16). | Row Buffer Mapper |
| 16 | tdm_fifo_ne_error_0 | Config | The TDM FIFO is not empty at the end of the row. This TDM FIFO services ROW Buffer Address 0 through 4 (mod 16). | Row Buffer Mapper |
| 17 | tdm_fifo_ne_error_1 | Config | This TDM FIFO services Row Buffer Addresses 5 through 7 (mod 16). | Row Buffer Mapper |
| 18 | tdm_fifo_ne_error_2 | Config | This TDM FIFO services Row Buffer Addresses 8 through 11 (mod 16). | Row Buffer Mapper |
| 19 | tdm_fifo_ne_error_3 | Config | This TDM FIFO services Row Buffer Addresses 12 through 15 (mod 16). | Row Buffer Mapper |
| 20 | pdu_limit_error | Config | Set if input PDUs are discarded because pdu_limit has been met. Normally this would be caused by: 1. The request arbitor is configured for more PDUs than pdu_limit. 2. The source device is sending more PDUs than it's been granted. 3. Mis-routed PDUs which are not detected by the PDU parity mechanism. | Row Buffer Mapper |
| 21 | pdu_start_error | Config | Set if a PDU start indicator is received for the next half of a PDU while the current half PDU is still being serviced. For example, if input link 0 Demapper RAM is configured for a PDU on slots 0 thru 15 and input link 1 is configured for a PDU on slots 4 thru 19, and both receive PDUs destined for the same output link, this error will be generated. | Row Buffer Mapper |
| 22 | - | Config | unused, always read as 0. | Row Buffer Mapper |
| 23 | - | Config | unused, always read as 0. | Row Buffer Mapper |

ErrorFlagsMask (reset state = 0xFFFFFF)

The ErrorFlags are passed through this mask and then logically OR'ed together to generate the dp_link_config_error and dp_link_traffic_error output signals. The mask bit must be a "1" to enable an error flag to be used in asserting the error output signals.

Even if an error flag is masked off, its status can still be read via the ErrorFlags register.

RBufPduLimit

This 7-bit field which specifies the maximum number of PDUs which may be stored in the row buffer in any single row period.

ILinkDemapperControl

This 8-bit register controls the operation of the Input Link Demapper module.

| Bit | Name | Description |
|---|---|---|
| 0 | slot_parity_sel | BIP36 parity select, 0 = even parity, 1 = odd parity. |
| 1 | re_parity_sel | Request Element BIP2 parity select, 0 = even parity, 1 = odd parity. |
| 2 | disable_re_par_check | If set, errored REs are not discarded. Error flag and statistic counters will still be incremented if parity errors are detected. |
| 3 | disable_pdu_par_check | If set, errored PDUs are not discarded. Error flag and statistic counters will still be incremented if parity errors are detected. |
| 4 | disable_rcv_tdm | If set, all TDM traffic received on this input link is ignored, regardless of the state of the Demapper RAM. |
| 5 | disable_rcv_pdu | If set, all PDU traffic received on this input link is ignored, regardless of the state of the Demapper RAM. |
| 6 | disable_rcv_re | If set, all RE traffic received on this input link is ignored, regardless of the state of the Demapper RAM. |
| 7 | - | |

OLinkMapperControl

This 8-bit register controls the operation of the Output Link Mapper module.

| Bit | Name | Description |
|---|---|---|
| 0 | slot_parity_sel | BIP36 parity select, 0 = even parity, 1 = odd parity. |
| 1 | re_parity_sel | Request Element BIP2 parity select, 0 = even parity, 1 = odd parity. |
| 2 | | |
| 3 | | |
| 4 | disable_xmt_test | If set, the Idle Pattern will be sent on all Test slots. |
| 5 | disable_xmt_tdm | If set, the Idle Pattern will be sent on all output TDM slots. |
| 6 | disable_xmt_pdu | If set, the Idle Pattern will be sent on all output PDU slots. |
| 7 | disable_xmt_re | If set, the Idle Pattern will be sent on all output RE slots. |

LinkControl

This 8-bit register supplies miscellaneous control bits for other modules within the Datapath Link.

| Bits | Name | Description |
|---|---|---|
| 0 | | |
| 1 | | |
| 2 | | |
| 3 | | |
| 4 | | |
| 5 | | |
| 6 | | |
| 7 | | |

TxLohMailbox 32-bit field which may be inserted into the transmit link overhead slots. The Output Link Mapper RAM must be configured to insert this field at the appropriate slot time.

RxCaptureReg (read only)

32-bit capture register. Any slot on the incoming may be captured and read by software via this address. The Input Link Demapper RAM must be programmed in the appropriate slot time to capture the slot data. Only one slot should be captured in any row time since the capture register will be overwritten for each slot which is programmed via the Demapper RAM for the capture register.

RxLohSync (read only)

Bits 28:24 of the received Link Overhead Status slot may be read from this location. This location is updated for each slot which the Input Link Demapper RAM defines as a LOH Status slot.

| Bits | Name | Description |
|---|---|---|
| 0 | gnt_sync | Bit 24 of LOH status. This bit indicates the synchronization statusof the Grant channel input of the device at the other end of this link. |
| 1 | sp_sync | Bit 25 of LOH status. This bit indicates the synchronization statusof the Service Process device at the other end of this link. If the other end of this link is another iTSE, then this bit will always be 0. |
| 2 | - | Bit 26 of LOH status. Reserved for future use. |
| 3 | - | Bit 27 of LOH status. Reserved for future use. |

The rx_loh_sync_mask in the DpGlobalControl register defines which RxLohSync bits are monitored for generating the RxMsgIrq. Even if a bit is masked off, its status can still be read via this RxLohSync register.

*Proprietary and Confidential Information of Onex Communications Corporation*

4.3.2 Datapath Control

This module implements functions which are either common to or shared by all 12 Datapath Link modules. These functions include:

- CPU bus address space decoding to support the CSRs for each link and the global CSR.
- Global Control/Status registers.
- Timing control memory which will allow for simultaneous support for two different link configurations (i.e., how each of the input link row slots are utilized). This will allow a single iTSE to be used in up to 2 stages of the switch fabric (folded network).
- Logically OR the error_flag from each of the 12 Datapath Link modules and output a single datapath_error_flag output signal.
- Statistics gathering of PDU traffic received in each row buffer.

4.3.2.1 Datapath Memory Map

The memory map for the entire Datapath module is as follows (the address offset is the address offset of that module from the base address of the Datapath module):

- Datapath Link #0 CSR - Address offset: 0x00000, size: 16Kbytes.
- Datapath Link #1 CSR - Address offset: 0x04000, size: 16Kbytes.
- Datapath Link #2 CSR - Address offset: 0x08000, size: 16Kbytes.
- Datapath Link #3 CSR - Address offset: 0x0C000, size: 16Kbytes.
- Datapath Link #4 CSR - Address offset: 0x10000, size: 16Kbytes.
- Datapath Link #5 CSR - Address offset: 0x14000, size: 16Kbytes.
- Datapath Link #6 CSR - Address offset: 0x18000, size: 16Kbytes.
- Datapath Link #7 CSR - Address offset: 0x1C000, size: 16Kbytes.
- Datapath Link #8 CSR - Address offset: 0x20000, size: 16Kbytes.
- Datapath Link #9 CSR - Address offset: 0x24000, size: 16Kbytes.
- Datapath Link #10 CSR - Address offset: 0x28000, size: 16Kbytes.
- Datapath Link #11 CSR - Address offset: 0x2C000, size: 16Kbytes.
- Datapath Global CSR - Address offset: 0x30000, size: 4Kbytes.

4.3.2.2 Datapath Global CSR

This section summarizes the Control Status Registers (CSRs) used to configure and monitor the operation of all Datapath Link module. These CSRs are for control which is common or shared by all Datapath Link modules.

Note: there is an additional CSR module which contains link control information which is instantiated in each Datapath Link module. This link CSR module is described in Section 4.3.1.6.

Unlike the CSR module inside the Datapath Link, the data bus interface to this module is 32-bits wide.

Unless otherwise noted, the reset value for programmable fields is 0.

Table 4-3: Datapath Global CSRs

| 31 – 24 | 23 – 16 | 15 – 8 | 7 – 0 | Address Offset |
|---|---|---|---|---|
| unused | | | IdlePtrn[35:32] | 0x0FB0 |
| IdlePtrn[31:0] | | | | 0x0FB4 |
| DpGlobalControl | | | | 0x0FB8 |
| LohFptrn[31:0] | | | | 0x0FBC |
| LohStuff[31:0] | | | | 0x0FC0 |
| all 0's | LinkTrafficErrorFlags | all 0's | LinkConfigErrorFlags | 0x0FC4 |
| all 0's | LinkTrafficErrorFlagsMask | all 0's | LinkConfigErrorFlagsMask | 0x0FC8 |
| all 0's | LinkMailboxMsgIrq | all 0's | LinkSyncMsgIrq | 0x0FCC |
| all 0's | LinkMailboxMsgIrqMask | all 0's | LinkSyncMsgIrqMask | 0x0FD0 |
| all 0's | | | ConfigErrorIslotNum | 0x0FD4 |

*Proprietary and Confidential Information of Onex Communications Corporation*

PDUcountLink 0..11

32-bit count of the number of PDUs written to each links Row Buffer. This counter is cleared on read. Note: if address minus 0x10 is used as the read address, the count value can be read without clearing the counter.

IdlePtrn

Idle Pattern, 36-bit pattern which is inserted into unused transmit slots. Insertion is controlled by the Output Link Mapper RAM.

DpGlobalControl

Datapath Global Control. 32-bit register which provides control settings common to all 12 Datapath Links.

| Bits | Name | Description | Reset Value |
|---|---|---|---|
| 3:0 | req_valid_time | Number of cclks minus 1 that the request element must be valid when being presented to the arbitration logic. This should never be modified. | 0x7 |
| 7:4 | cclks_per_slot | Minimum number of cclks per slot. This should never be modified. | 0x2 |
| 11:8 | rx_loh_sync_mask | This mask defines which RxLohSync bits will be monitored for generating the LinkSyncMsg interrupt request from each Datapath Link module. The interrupt is generated whenever any unmasked bit changes state from the previous row. A "1" will unmask the bit and enable it to be monitored for IRQ generation. This common mask value is used by all 12 Datapath Link modules. | 0xF |
| | | | |
| | | | |
| | | | |
| | | | |
| | | | |

LohFptrn

Link Framing Pattern. 32-bit field which may be inserted into the transmit link overhead slots. The Output Link Mapper RAM must be configured to insert this field at the appropriate slot time.

LohStuff

Link Stuff Pattern. 32-bit field which may be inserted into the transmit link overhead slots. The Output Link Mapper RAM must be configured to insert this field at the appropriate slot time.

LinkConfigErrorFlags (read only)

The 12 config error flag outputs of each Datapath Link module may be read from this location. The error flags can only be cleared by writing to the ErrorFlags CSR in each Datapath Link module.

LinkConfigErrorFlagsMask (reset state = 0xFFFFFF)

The 12 config error flags are passed through this mask and then logically OR'ed together to generate the Config Error IRQ. The mask bit must be a "1" to enable an error flag to be used in asserting the IRQ. Even if an error flag is masked off, its status can still be read via the LinkConfigErrorFlags register.

LinkTrafficErrorFlags (read only)

The 12 traffic error flag outputs of each Datapath Link module may be read from this location. The error flags can only be cleared by writing to the ErrorFlags CSR in each Datapath Link module.

LinkTrafficErrorFlagsMask (reset state = 0xFFFFFF)

Operates identically to LinkConfigErrorFlagsMask.

LinkMailboxMsgIrq

The 12 LinkMailboxMsg IRQ outputs of each Datapath Link module may be read from this location. The IRQ events are latched upon detection and remain latched until they are cleared by software. An IRQ is cleared by writing a "1" to that bit position.

LinkMailboxMsgIrqMask (reset state = 0xFFFFFF)

Operates identically to LinkConfigErrorFlagsMask.

*Proprietary and Confidential Information of Onex Communications Corporation*

LinkSyncMsgIrq
The 12 LinkSyncMsg IRQ outputs of each Datapath Link module may be read from this location. The IRQ events are latched upon detection and remain latched until they are cleared by software. An IRQ is cleared by writing a "1" to that bit position.

LinkMailboxMsgIrqMask (reset state = 0xFFFFFF)
Operates identically to LinkConfigErrorFlagsMask.

ConfigErrorSlotNum
When a LinkConfigError is generated, the current input link slot number is latched. The latched value is automatically cleared when it is read. Only when this latch is all 0's will the slot number be latched upon a LinkConfigError. This means only the first LinkConfigError which occurs during a row time will be captured. This is intended to help the wayward software engineer isolate where in the row the configuration error is.

Proprietary and Confidential Information of Onex Communications Corporation

5 Data Multicast Description

This section will describe how the data multicasting & broadcasting is implemented within an iTSE. This section covers the multicasting & broadcasting of data PDUs only, the concept of multicasting TDM traffic is covered elsewhere in this specification. Note: in this section the terms "PDU" and "packet" are synonomous. For the iTSE, "broadcast" can be viewed as simply another form multicast (with a lot of destinations). Therefore, this section will only speak of "multicast" but the reader should realize the this will also be how broadcast is implemented.

5.1 Design Objectives

- Support a one-to-many multicast scheme. Many-to-many multicasting will not be explicitly supported but may be possible depending on the complete system architecture.

Routing tables at the oTPP which will contain the new VPI/VCI for the outgoing cell. This table will be indexed by the *Multicast Flow Identifier.*

5.2 Multicast Operation

In order to support mulitast operation in switch fabrics which could be as small as 12x12 ports to as large as 1728x1728 ports, the iTSE will support several methods of multicast operation:

- multicast mask
- broadcast
- multicast ID
- iTPP-based multicast

The multicast controller within the iTSE implements a store and forward mechanism. This means that all PDUs which may be multicast from a given iTSE will be written to a buffer within the multicast controller (MC-CTLR), from there the iTSE will multicast the packet to various destinations. Note: the normal Req-Grant arbitration mechanism is used to get link bandwidth for transmitting the MC PDUs.

5.2.1 Multicast Modes

The multicast modes of operation will be briefly described here. The next section will provide some examples of multicast operation which may make understanding these operating modes a bit easier.

Depending on the size of the switch fabric, several of these multicast operating modes may be used in conjuction to provide an effective multicast solution.

*Multicast Mask*

5.2.2 Multicast Examples

The iTSE is designed to support a multi-stage packet duplication architecture as shown in Figure 5-1. In this example architecture, the input iTPP will unicast the multicast packets to a multicast controller in stage 1 (switch chip 1.0 in this figure), from there the multicast packet will be duplicated and sent to the multicast controllers in the third stage. The third stage multcast controllers will again duplicate the packet for each output link it is destined for.

The multicast controller implements a store and forward mechanism. This will be explained by using the multicast example in Figure 5-1. In this senlaro multicasting will operate as follows:

1. The iTPP will send the multicast packet to the multicast controller (MC-CTLR) in switch 1.0. The MC-CTLR will have buffers in which it will store the received multicast (MC) packet.
2. The MC-CTLR will then duplicate the packet 2 times so that it will now have a total of 3 copies Proprietary and Confidential Information of Onex Communications Corporation of the packet. Then for each packet it will replace the routing tag and MC forwarding tags (see the MC PDU format shown in TBD). The packets destined for switch 3.0 and 3.2 will be given the paths to those switch chips. The packet that is being routed through switch 3.1 doesn't need to be multicast from that switch chip, therefore it will be given the path to send it directly to the output iTPP.

3. The MC-CTLR will then forward the 3 MC packets to the 3 destinations (switches 3.0 and 3.2, and the iTPP off switch 3.1). This forwarding will again use the normal Req-Grant arbitration mechanism for obtaining bandwidth.
4. At switch chips 3.0 and 3.2, the MC packets will be duplicated and sent out on output ports which are specifed in the MC copy field of the MC packet. Since this is the last multicast stage, the MC packets do not need to be modified prior to transmission. The identical MC packet is sent on all the appropriate output links. Of couse, the normal Req-Grant arbitration mechanism will be used to get link bandwidth from the last MC stage to the iTPP.

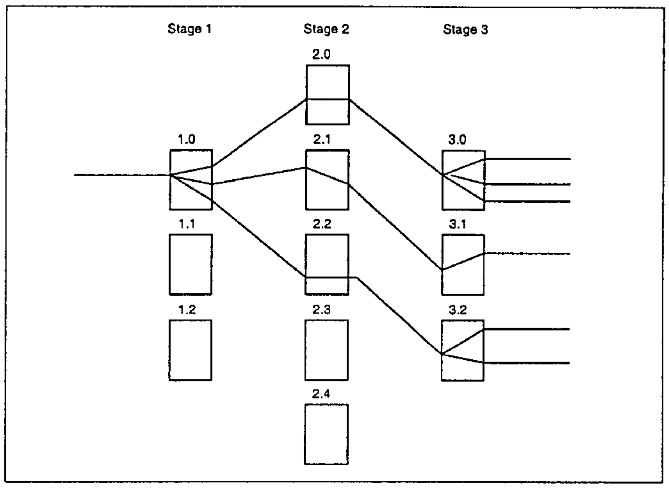

Figure 5-1: Multicasting within the iTAP Switch Fabric

For the MC-CTLR at the first stage (switch 1.0 in Figure 5-1), we see that it will need to modify the routing and MC copy tags within the MC packet prior to transmitting the duplicated packets. This means that the MC-CTLR will need to have information which is specific to each MC flow which may use the MC-CTLR as a copy forwarding stage. The following parameters will need to be stored in the iTSE MC-CTLR prior to the arrival of the MC packet:

*Per MC Flow -*

- 11 bits to identify the source iTPP of the MC packet.
- 14 bits to identify the MC Flow ID as assigned in the sourcing iTPP.
- 4 bits to identify the cache entry to use (this is discussed later).

*Per output destination to which the packet will be multicast to -*

These bits will be used to replace the fields currently in original multicast PDU.

- 28 bits for routing tag.
- 12 bits for MCcopy tag.
- 1 bit for the new broadcast field.
- 1 valid bit which defines whether this is a valid entry, if clear then ignore this entry.

*Proprietary and Confidential Information of Onex Communications Corporation*

These bits will be used in the creation of the request element used for link BW arbitration.

- 5 bits for VoqID.
- 3 bits for priority.
- 3 bits for res field.

The RouteTag will be the same one used above when copying the PDU. The ReqId will be a created by the iTSE multicast controller in order to identify the returning grant.

Thus, for each destination which the multicast PDU must be copied to we need a total of 53 bits of information.

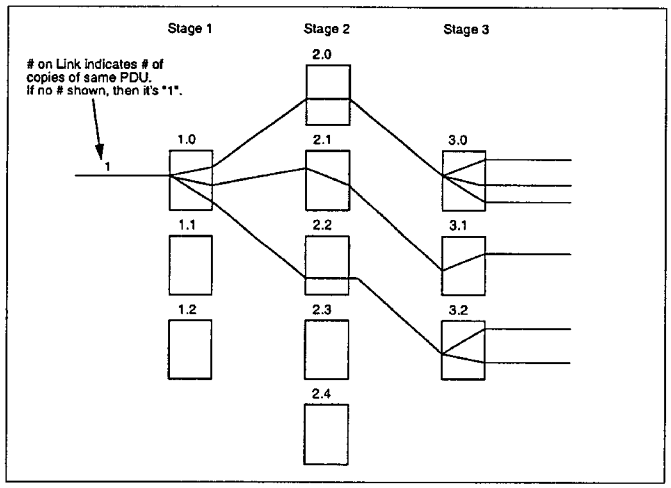

Figure 5-2: Multicasting w/ Multicast ID Mode

5.2.3 Single PDU

The figure below illustrates a typical arbitration and data passing sequence fora data PDU.

Proprietary and Confidential Information of Onex Communications Corporation
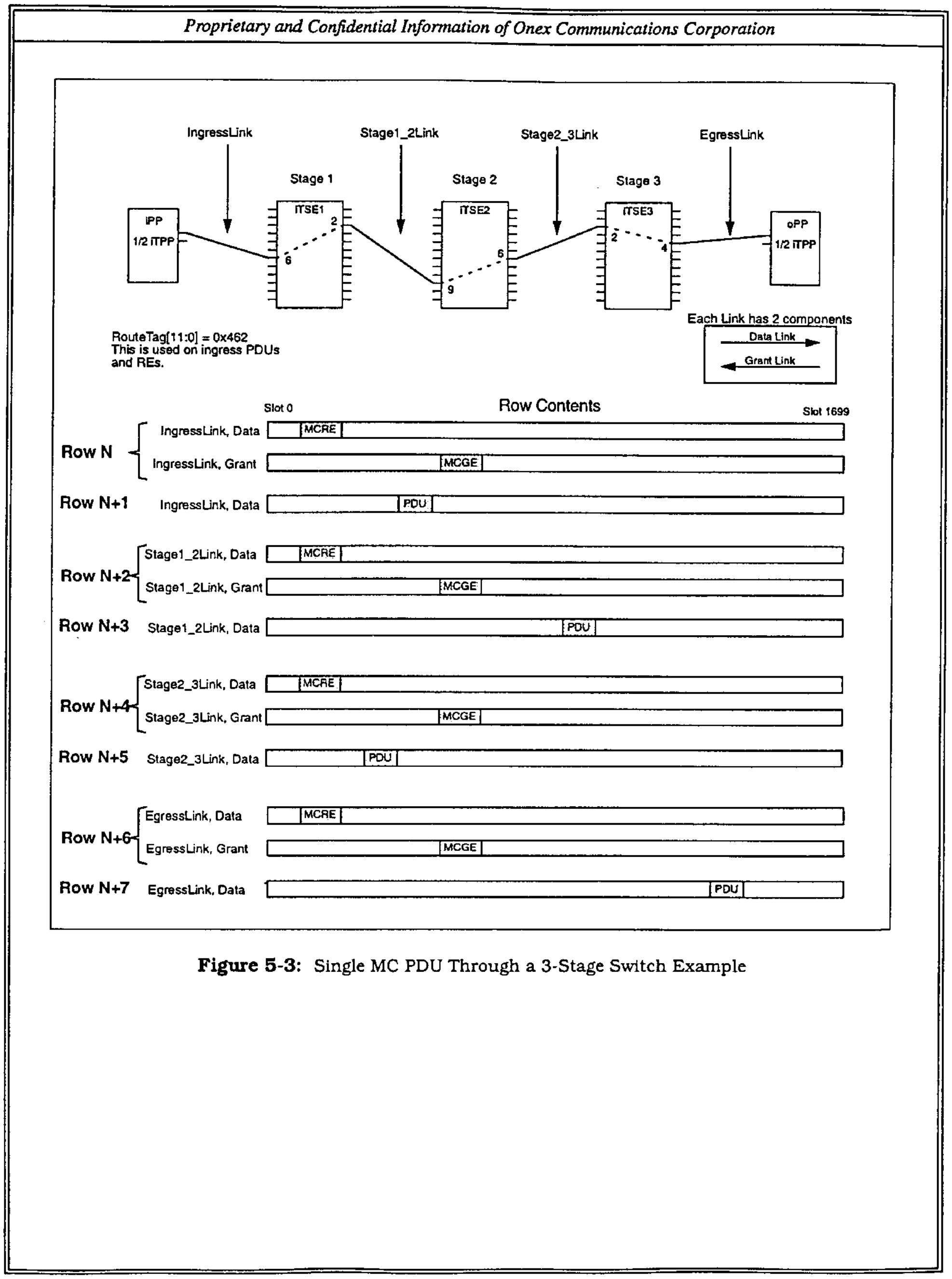
Figure 5-3: Single MC PDU Through a 3-Stage Switch Example Proprietary and Confidential Information of Onex Communications Corporation

5.3 Multicast PDU Structures

5.3.1 Multicast Data PDU Format

The format for the 16-slot multicast data PDU is shown below. The shaded fields are identical to the fields in the unicast data PDU format are are described in Section 2.2.4.1..

Table 5-1: Multicast Data PDU Format

| Slot | 35 | 31 | | | | | | 24 23 | | 16 15 | | 8 7 | 0 |
|---|---|---|---|---|---|---|---|---|---|---|---|---|---|
| 0 | Parity | PDU | BC | MC | RouteTag | | | | | | | | |
| 1 | Parity | Ver | ValidPlBytes | | | | | VOQID | Fragid | A | McCopy | | SeqNum |
| 2 | Parity | McCacheTag | - | - | - | SrcPortId | | | | | SrcMcFlowId | | |
| 3 | Parity | Payload_Byte_0 | | | | | | Payload_Byte_1 | | | Payload_Byte_2 | | Payload_Byte_3 |
| ... | Parity | payload bytes | | | | | | | | | | | |
| 15 | Parity | Payload_Byte_48 | | | | | | Payload_Byte_49 | | | Payload_Byte_50 | | Payload_Byte_51 |

Note: reserved bit positions are indicated with a "-". The default state for these bits is 0.

BC - Broadcast
This bit will be set if this is a broadcast PDU.

MC - Multicast
This bit will be set if this is a multicast PDU.

McCopy
12-bit Multicast Copy field. This field identifies which output link this multicast PDU must be multicst to. McCopy[0] is for output link #0, McCopy[1] is for output link #1, etc. If all 12 bits are cleared and the MC field = "01", then the multicast controller will use the multicast cache and perform packet duplication based on the contents of the cache.

SeqNum
SeqNum is the fragment sequence count, it will be incremented for each fragment. The SeqNum will start at 0 for the first fragment. If there are more than 16 fragments to the PDU, this SeqNum will roll over past 15 and continue counting.

McCacheTag
4-bit tag which identifies the multicast cache entry to use when duplicating this multicast PDU.

SrcPortId
This 11-bit field identifies the source port processor for this multicast PDU.

SrcMcFlowId
This 14-bit field identifies which multicast flow this PDU is associated with. This is the flow ID from the input Port Processor's multicast ID space.

5.3.1.1 Background on Multicast Data PDU Fields

This sections provides a bit of background on why the fields which are present in the multicast data PDU defined in Table 5-1 amd how they are used.

*BC & MC bits -*

The usage of these bits will depend on who is processing the packet.

Proprietary and Confidential Information of Onex Communications Corporation

For the iTSE multicast controller the algorithm shown in Figure 5-4 is used.

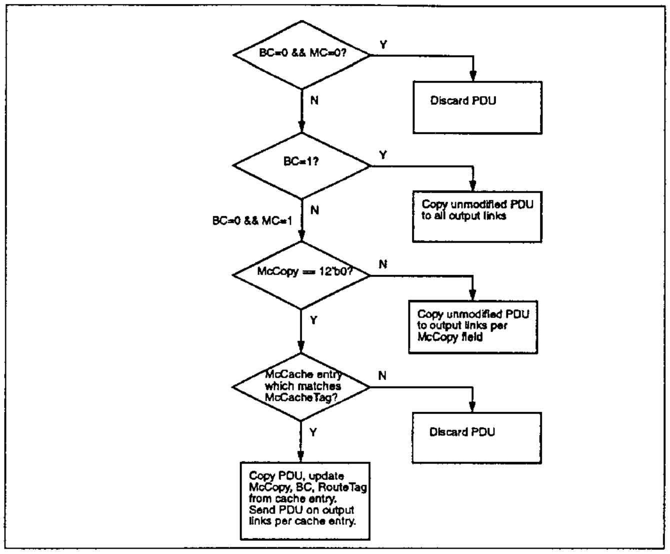

Figure 5-4: iTSE MC Controller Processing of BC & MC Bits

For the output Port Processor the algorithm shown in Figure 5-5 is used. This algorithm assume the iTPP already knows that it is dealing with a multicast packet. The current plan is that all multicast/broadcast PDUs will be sent a virtual output queue which is reserved for MC/BC packets.

*Proprietary and Confidential Information of Onex Communications Corporation*

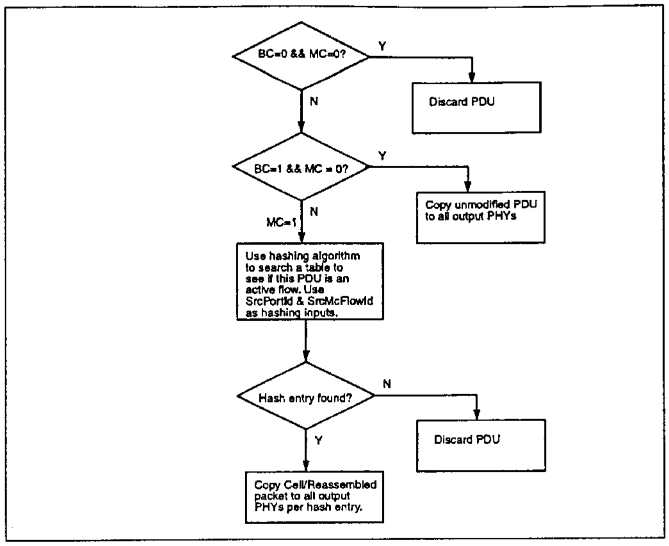

Figure 5-5: iTPP Processing of BC & MC Bits

McCopy -

This field is only used by the iTSE multicast controller. It is used to determine which output links the PDU should be copied to. See the flowchart in Figure 5-4 on how this field is used.

The port processor will always ignore this field.

McCacheTag -

Because we're implementing a store and forward technique within the iTSE multicast controller, we'll need some information (more than what can fit in the MC PDU header) which determines where to forward the MC packet to and the new parameters which need to be replaced for each forwarded copy. This information will be stored in a cache within the iTSE. The cache entries are loaded by having the input iTPP forward a "MC Parameter" PDU prior to each MC data PDU. Since a PDU is only 64 bytes the MC Parameter PDU will only be able to carry enough information to allow the MC data PDU to be copied to 7 unique destinations.

Since 7 destinations may not be enough for a multicast flow, a mechanism is needed to allow for more destinations. This mechanism will be the "Cache Tag" which will allow a single MC flow to have multiple valid cache entries.

*Proprietary and Confidential Information of Onex Communications Corporation*

5.3.2 Multicast Parameter PDU Format

The format for the 16-slot multicast parameter PDU is shown below.

Table 5-2: Multicast Parameter PDU Format

Bit positions: 35, 31, 24 23, 16 15, 8 7, 0

| Slot | | | | | | | | | | | | | | |
|---|---|---|---|---|---|---|---|---|---|---|---|---|---|---|
| 0 | Parity | 1 | 1 | 0 | 0 | RouteTag | | | | | | | | |
| 1 | Parity | McCacheTag | - | - | - | SrcPortId | SrcMcFlowId | | | | | | | |
| 2 | Parity | V | - | BC | - | RouteTag | | | | | | | | |
| 3 | Parity | - | - | - | VoqId | - | | res | Priority | McCopy | - | - | - | - |

Slots (addresses) 2 & 3 contains the cache entry parameters for 1 destination. Six more destinations may be defined in the same manner using slots 4 thru 15.

Note: reserved bit positions are indicated with a "-". The default state for these bits is 0.

*Slot 0 -*

This word is used to route the Multicast Parameter PDU from the input iTPP to the iTSE multicast controller. It's fields are those for a unicast packet as defined in Table 2-3.

*Slot 1 -*

This word identifies the MC session parameters for this cache entry. The fieds will match those from the multicast data PDU which will be following this parameter PDU.

*Slots 2 & 3 -*

Thise two words contain the cache entry parameters for 1 destination. When the MC PDU is duplicated the BC, RouteTag, and McCopy fields will be replaced with those in these slots.

The VoqID, res, and Priority fields are used (along with the RouteTag) for creating the request element which will be used to arbitrate for link bandwidth for sending the duplicated data PDU.

*Proprietary and Confidential Information of Onex Communications Corporation*

5.4 Port Processor's Role in Multicasting

5.4.1 Input Port Processor

5.4.2 Output Port Processor

The output iTPP will receive multicast packets from the switch fabric. For each MC packet it must determine (1) if the MC packet is a member of one of the potentially 16K active outgoing MC flows which the iTPP can support and (2) which Utopia PHYs the packet must be multicast to.

In order to determin if the MC packet is a member of an active MC flow, the iTPP will need to perform a hashing algorithim on the fields from the MC PDU which identify the MC flow. These fields are the SourcePort The Port Processor board may potentially be supporting up to 192is designed with multiple PHY ports attached to the iTPP's Utopia bus.

5.4.3 Multicast PDU Latency

Since the multicasting mechanism uses a store and forward approach, it will take longer to get multicast packets through the switch fabric. In the example of Figure 5-1, the best case time for sending a MC packet through this 3 stage switch fabric is calculated as follows:

1. 2 row times are need to get the MC packet from the iTPP to the

6 Multicast Implementation

Possible 2nd Tensilica which is used to handle the multicasting is here.

7 Link Bandwidth Arbitration

7.1 Theory of Operations

7.1.1 Overview

Each port processor operates without any knowledge of what the other port processors are doing. As a result, when they go to send their PDUs, they need to know 2 things:

- Does the output port processor have room in its queues for this PDU?
- Is there bandwidth in the choosen path to get the data from one end of the switch fabric to the other without packet loss?

The arbitration mechanism will check both of these two criteria and send back a grant to the requesting port processor on a PDU by PDU basis. When a port processor has been given a grant it knows for certain that the data will make it to the output port processor (barring system failture).

Each row time, the port processors will make a request for each group that it wishes to send data on in the next row. This request will be a message which is broken into 96 request elements, one element for each possible data group requested. These request elements will be multiplexed in with the data stream (see Overview & Datapath chapters). The requests stream through the switch and are 'knocked out' based on a priority field. Since the 12 inputs could all converge on a single output, the outgoing link will not be able to handle the traffic presented to it. The highest priority traffic should be allowed to go through the switch fabric. A small buffer pool exists in each output link to hold some of the requests when multiple requests come into the switch chip which are destined for the same output link. At the far end of the switch fabric, the port processor will make a decision to grant or deny a request based on its QOS queues. The port processor will then source a grant message which also travels through the switch fabric, but in an *out-of-band* overlay network which goes in the opposite direction of the switch fabric. The grants will be written without regard to priority into a fifo and read in order of arrival time.

7.1.2 Basic Algorithm

The arbitration mechanism will work as follows:

1. At the start of a row time the input port processor will begin outputting its request message, made from a stream of request elements. A request element is a request for a single group's worth of bandwidth in the switch fabric destined for a particular port processor. The format of the request elements are shown below.
2. The first stage in the switch fabric will look at each request from all 12 input links as well as the multicast and control message controller. The requests traverse the switch fabric by using a self routing tag which indicate the hop-by-hop output ports used at each stage of the switch fabric. At this time, the Stage 1 hop-by-hop field will be replaced with the input port number that the request entered on. This parser logic will be able to handle all the requests from all 14 request sources within a single request element time.
3. The requests for each output link will be stored in a buffer pool. As long as buffers are free, requests will be stored. As soon as there are no free buffers, lower priority requests will be overwritten with higher priority ones. The request buffers will be able to support 12 input links all converging on a single output, meaning that 12 request elements can be written to the buffer pool every 'request' time. Requests are evicted from the buffer pool based on priority and age. The youngest lowest priority requests will be dropped, and the highest priority oldest requests will be kept.
4. After a programmable amount of time, the request buffers will be read from by the switch Mapper. After a request is read the request element deleted from the buffer, making room for another request element. The output Mapper will only read 96 request elements- it will not over-request an output link. Any requests still in the buffers will be dropped.
5. This happens all the way to the end of the switch fabric and into the port processor. The port processor will make a decision to accept or reject the request based on the QOS field. Then, it will source a grant message. The grant message uses the modified self routing tag of the request element to traverse the switch fabric backwards using an overlay network.

Proprietary and Confidential Information of Onex Communications Corporation

6. The grant path in the switch uses another instantiation of the parser logic and a set of buffer fifos which get written to and read out of based on arrival time. (The links will be scanned in order and written into the fifos in that same order- link0 to link 11. In addition a mapper and demapper will be used to determine where in the link the grants should be placed. It is the intent that they are all adjacent to each other in the row.

7.1.3 Folded switch fabrics

RESERVED

7.1.4 Multicast Support

In addition to the the 12 input links, provisions need to be made for multicast traffic as well as request messages made by the local processor. Multicast request elements that flow into a switch will flow through the switch fabric the same as standard unicast request elements. At the point where the message needs to be multicast the hop-by-hop field's bit code for that switch stage will indicate that the request is multicast. The request will be forwarded to the multicast controller. On the grant path, the multicast controller will simply source a grant if there is room for the data in the multicast recirculating buffers. Once the data has been transmitted to the multicast buffer, the multicast controller will examine the data header and determine which output links it needs to be sent out on. At this point, it will source a number of request messages which will look to the request-controller as if the switch had 13 inputs, not 12. They will be handled the same as unicast requests from one of the input links.

The arbitration algorithm has been designed with the intents that each request message will request a single group. To aid the multicast manager, however, there is a bit in the request/grant element which indicates if the request is for 1 or 2 groups.

7.1.5 Arbitration Message Element Format

Below are the actual bit patterns of the request and grant elements. Each of these request elements requests for a single data group on the switch link. It takes 96 of these to request an entire ITAP row. Serialized versions of these stream between switch elements.

The request/grant messages will take the form of a self routing message with a 3 bit priority, 7 bit sequence number and either a 5 bit Virtual Output Queue ID or congestion indicators. The Request Element has 2 forms- one is for a 7 stage network, the other is for 5 or smaller stage networks. In these cases the 6 and 7th stage self routing tag is replaced with a QOS field. The switch should simply pass the bits which are set in these fields.

| 51 … 48 | 47 … 44 | 43 … 40 | 39 … 36 | 35 … 32 | 31 … 28 | 27 … 24 | 23 … 16 | 15 … 8 | 7 | 6 5 4 3 | 2 1 0 |
|---|---|---|---|---|---|---|---|---|---|---|---|
| Stage 1 | Stage 2 | Stage 3 | Stage 4 | Stage 5 | Stage 6 | Stage 7 | ReqID | Output Port ID | Num | unused | Pri-ority |
| Stage 1 | Stage 2 | Stage 3 | Stage 4 | Stage 5 | QOS | | ReqID | Output Port ID | Num | unused | Pri-ority |

Table 7-1: Request Message Element (7 Stage)

| 51 … 48 | 47 … 44 | 43 … 40 | 39 … 36 | 35 … 32 | 31 … 28 | 27 … 24 | 23 … 16 | 15 … 8 | 7 | 6 5 4 3 | 2 1 0 |
|---|---|---|---|---|---|---|---|---|---|---|---|
| Stage 1 | Stage 2 | Stage 3 | Stage 4 | Stage 5 | Stage 6 | Stage 7 | ReqID | Reserved | Num | unused | Pri-ority |

Table 7-2: Grant Message Element (7 Stage)

- Stage1...Stage7: The Stage fields indicate the output link number that the given switch chip should forward the message to. Valid request messages are those with output link numbers between 0 and 11. Other values are reserved for special commands. Each switch chip will need to know at which stage of the network it is located.

*Proprietary and Confidential Information of Onex Communications Corporation*

| Bit Field | Connects to... | Notes |
|---|---|---|
| 0000 | Output Link 0 | |
| 0001 | Output Link 1 | |
| 0010 | Output Link 2 | |
| 0011 | Output Link 3 | |
| 0100 | Output Link 4 | |
| 0101 | Output Link 5 | |
| 0110 | Output Link 6 | |
| 0111 | Output Link 7 | |
| 1000 | Output Link 8 | |
| 1001 | Output Link 9 | |
| 1010 | Output Link 10 | |
| 1011 | Output Link 11 | |
| 1100 | Multicast/Control Message | |
| 1101 | reserved | Spare |
| 1110 | reserved | Spare |
| 1111 | No Request - IDLE | Need to send something as a place-holder if no requests are pending for this group |

Figure 7-3: Stage X Bit Field Codes

- QOS: This 8 bit field refers to the queue which the data is destined for in the Output Port Processor. The Output port processor is expected to use this number to determine if it should grant or reject the request.
- OutputPortID: This is a 7 bit field used for the output port processor to know which virtual output queue to place the data.
- ReqID: As grants stream back to the input port processor which made the requests, the port processor needs to have a way to identify which grant goes with which request. By providing an identification number field, the port processor has a way to quickly associate the grant with a specific request. It is expected that the port processor will insert 0 into the sequence number for request 0 and 1 for request 1, all the way up to 93 for the request 93.
- Num: These 2 bits indicates if the request/grant is for 1,2,3 or 4 groups. Although it is expected that the normal port processor data flow will be on a group by group request basis, the multicast controller will operate more efficiently if it has the ability to easily arbitrate for multiple groups. This is needed to simply speed up the passing of the multicast control packets. The coding of these bits is as follows:

| Num (0b) | # of Groups |
|---|---|
| 00 | 1 |
| 01 | 2 |
| 10 | 3 |
| 11 | 4 |

- Priority: This is a 3 bit field to indicate the importance of a request. Highest priority is seven (0b111), lowest priority is zero (0b000). This priority is the priority of the request or grant element through the switch fabric.
- Res: These bits will be carried through the switch fabric by the fTAP Switch, the port processor may do what it wants to with these bits for passing additional signaling information across the switch fabric.

7.1.6 Calculating slot numbers of request element arrivals

The mapper and demapper rams on the data path will have entries in them for the request elements. The equations below are useful for calculating which entries in the rams will be setup for request elements.

These equations assume that the specified 3...8 slot timing is used, and that multiples of 16 slots will be used unbroken between programmable fill time of 4 is specified. 4 refers to the number of request element times to wait before outputting request elements from any switch stage. Since the request elements are sent in pairs, this is an even number. Due to the internal timing of the switch, there is always a fill time of 2- otherwise nothing would have been written into the buffers yet.

There are several equations below. The first equation generates the starting slot number which request elements will come in to a given switch stage at. The second equation generates the slot number which request elements will start leaving a switch stage at. The third equation is used to calculated the slot numbers which the row demapper ram should be programmed for.

Dependent Variables:

- StageNum - the stage number of this switch element. Values shall range from 1 to 7.
- PFT- programmable fill time, an even number which is the number of request elements that the input links are allowed to source before the output link starts up. Values range from 2 (minimum to XX (maximum) and are even numbers. It is expected that 2,4 and 6 are the values used by the switch fabric.
- PLD - Pipeline delay for output mapper. Nominally this is 18 clock cycles ~ 9 slots.
- RET - 11, the number of slots in the request...data...request...data pattern.
- PRET- 32, the number of slots used to offset th
- PPDelay - the number of slots that the port processor waits before sending any requests. This number should be zero.

Once the starting numbers have been calculated, the following equation is used to calculated the slot numbers that the demapper ram should be programmed to for a particular element. Since every request element spans 2 adjacent slots in the chosen timing, the equations below output the first slot number that the request appears on.

7.1.7 Request-Grant Arbitration Cycle Timing

The arbitration cycle timing for varying sized switch fabrics and fill times has been calculated. The following has been assumed in all of the calculations:

- Request Elements are mapped into the row as 3 slots carrying 2 request elements followed by 8 slots of data. This yields 1 request element every 45ns.
- Grant elements are mapped into a 2.2gbps serial stream as 3 slots carrying 2 grant elements.
- The time it takes an output port processor to accept or deny a request element is 125ns.
- The electrical delay between the port processors and switch fabric is set to 500ns. This delay occurs 4 times in 1 round trip.

The Request Elements travel at a rate of 1 every 45 ns, grant elements travel at a rate of 3 per 2 slots, with no padding between groups of 3 at a data rate of 2.2gbps, this is 1 every 25 ns. The grants can be sent faster than they will be received by the switch fabric. As a result, the last grant element timing will be based on the speed of the request message rather than grant speed since the request element is the limiting factor.

For each network, the following times are given:

- First RE in: the time that the first request element gets to the output port processor
- Last RE in: the time that the last request element in a message gets to the output port processor
- First GE in: the time that the first grant element gets back to the input port processor
- Last GE in : the time that the last grant element gets back to the input port processor

| | Fill Time | 4 | 5 | 6 |
|---|---|---|---|---|

62

Proprietary and Confidential Information of Onex Communications Corporation

| Size of Switch Fabric | | *All times are in ns | | |
|---|---|---|---|---|
| 1 Stage Switch Fabric | | | | |
| | 1st RE In | 1253 | 1298 | 1343 |
| | Last RE In | 5573 | 5618 | 5663 |
| | 1st GE In | 2570 | 2615 | 2660 |
| | Last GE In | 6890 | 6935 | 6980 |
| 2 Stage Switch Fabric | | | | |
| | 1st RE In | 1433 | 1523 | 1613 |
| | Last RE In | 5753 | 5843 | 5933 |
| | 1st GE In | 2865 | 2955 | 3045 |
| | Last GE In | 7185 | 7275 | 7365 |
| 3 Stage Switch Fabric | | | | |
| | 1st RE In | 1613 | 1748 | 1883 |
| | Last RE In | 5933 | 6068 | 6203 |
| | 1st GE In | 3159 | 3294 | 3429 |
| | Last GE In | 7480 | 7614 | 7749 |
| 4 Stage Switch Fabric | | | | |
| | 1st RE In | 1793 | 1973 | 2423 |
| | Last RE In | 6113 | 6518 | 6743 |
| | 1st GE In | 3454 | 3634 | 3814 |
| | Last GE In | 7774 | 7954 | 8134 |
| 5 Stage Switch Fabric | | | | |
| | 1st RE In | 1973 | 2198 | 2423 |
| | Last RE In | 6293 | 6518 | 6743 |
| | 1st GE In | 3748 | 3973 | 4198 |
| | Last GE In | 8068 | 8293 | 8518 |
| 6 Stage Switch Fabric | | | | |
| | 1st RE In | 2153 | 2198 | 2423 |
| | Last RE In | 6413 | 6518 | 6743 |
| | 1st GE In | 4043 | 4313 | 4583 |
| | Last GE In | 8363 | 8633 | 8903 |
| 7 Stage Switch Fabric | | | | |
| | 1st RE In | 2333 | 2648 | 2963 |
| | Last RE In | 6653 | 6968 | 7283 |
| | 1st GE In | 4337 | 4652 | 4967 |
| | Last GE In | 8657 | 8972 | 9288 |

The following calculations show the travelling of the request messages through the ITAP Switch Fabric. The following delays are encountered when a request element is sent by a port processor.

- Ted: Electrical delay. Start of Row is asserted, the entire request message has been assumed to be built already by the scheduler. The time to read the row and the electrical delay associated with getting the signal from the port processor to the switch fabric is 500ns (maximum).
- Trm: Request Message Transit Time. The transmission time of a single request element is bound up in the sending of 2 request elements in the 3 slot...8 slot timing. As a result it takes 11 slots to transmit 2 request elements. There will be 48 of these 3...8 timing groups. Therefore the width of a request message is over 48x11 slots = 528 slots. A slot is transmitted by the iTAP link in 8.17ns, so a request message will be 4.314us wide.

- Tgm: Grant Message Transit Time. The transmission time of a single grant element is bound up in the sending of 2 grant elements in 3 slots. The grants can be packed into the row as tightly as possible. Therefore the fastest grant message time is in 96 grants * 1.5slots per grant = 144 slots. Over the grant link, the bandwidth is 2.2gbps, so that a 36 bit slot takes 16.36ns. Therefore the grant transit time is 2.355us. But, since the request message is slower than the grant message, the size of the grant message will be the same as the request message since the request elements feed the grant stream. Tgm= Trm...
- Tpft: Programmable Fill Time. It is possible to allow the request buffers to start filling up before any requests are sent out. Although this adds time to the round trip timing of the request message, it helps ensure that the highest priority requests are fowarded at each stage of the switch fabric. This fill time would be manifested in the way that the mapper ram is programmed. The slots where the request elements would be programmed would be set deeper into the mapper RAM so that they occured later in the row. Although this setting could be anything, multiples of the 3-8-3-8 timing are used below as a practical example. The programmable fill time must be an even interger multiple with a minimum value of 2. The calculation from Tpft to slots is simply 11* 0.5 * Tpft. . In the examples a fill time of 4 has been choosen. This implies that (8+3) * 2 slots occur before the request elements are output; 22slots = 180ns.
- Tpl: The iTAP Switch chip has an internal request pipeline latency of 18 clock cycles (9 slots) for the request elements. 8.17 * 9 = 73ns
- Topp: Output Port Processing Time. This is given as 32 clock cycles, which @250MHz is 16 slots. 16 slots will be the metric used (which is a full group time). This is 130ns
- Tgdl: Grant Delay. 3 Slots needed to extract and switch grant elements, 1 slot to process, and 3 more to assemble the grant elements= 7 slots. 16.36ns * 7 = 114.52ns.

Below is a picture illustrating an arbitration cycle's request and grant messages flow through a 7 stage switch fabric with the fill time set to 4 request elements.

| Factor | Time | Cumulative Time | |
|---|---|---|---|
| IPP to SWF(ted) | 0.500us | 0.500us | |
| Switch Pipeline Delay (tpl) | 0.073us | 0.573us | |
| 7*Fill Time | 1.260us | 1.833us | |
| SWF to OPP (ted) | 0.500us | 2.333us | First Request gets to OPP. |
| Request Message Width | 4.314us | 6.647us | Last Request to OPP |
| OPP Processing Time | 0.130us | 2.463us | |
| OPP to SWF (ted) | 0.500us | 2.963us | |
| Switch Pipeline Delay | 0.073us | 3.036us | |
| 7* Grant Delay | 0.801us | 3.837us | |
| SWF to IPP (ted) | 0.500us | 4.337us | First Grant gets to IPP |
| Request Mesage Width | 4.314us | 8.651us | Last Grant gets to OPP |

*Proprietary and Confidential Information of Onex Communications Corporation*

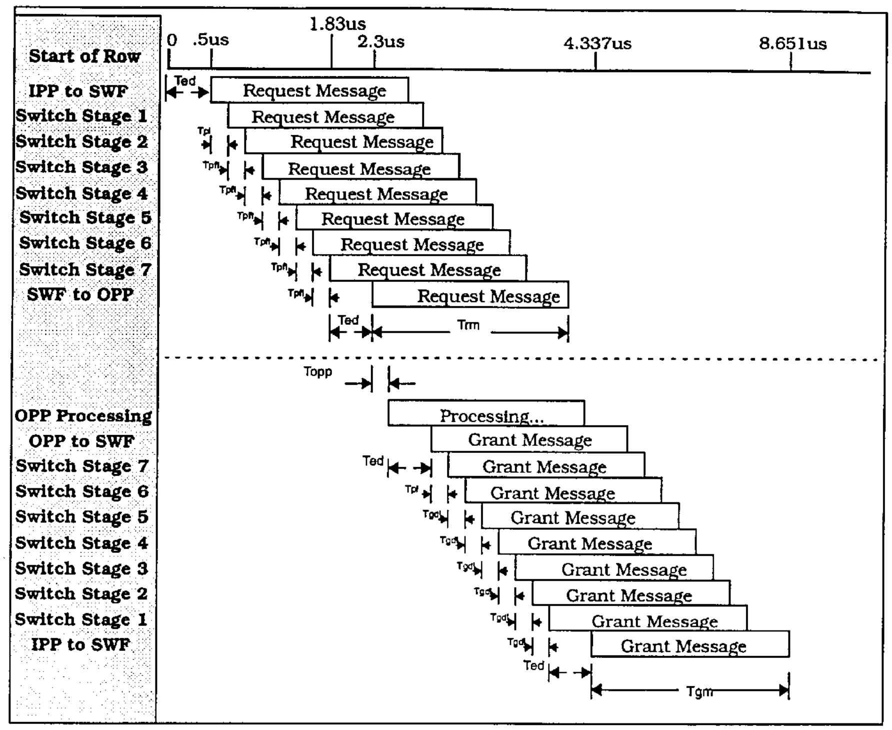

Figure 7-4: Arbitration Cycle In- Flight Timing

7.2 Link Bandwidth Arbitration Implementation

7.2.1 Request Implementation

The request path is implemented in 2 major functional units. These are the request parser and the request arbiter.

Below is a top level block diagram of the arbitration logic. The Request Parser examines the hop-by-hop self routing tag of the request elements and forwards the requests to the appropriate output link request logic. It needs to replace the 'current' stage number field with the input link number which the request came in on. This keeps a record of the reverse path so that the grant can get back to the input port processor. The output link logic will handle 2 requests every clock cycle, looking at the requests and writing them to the request buffer pool. The Output Buffer Logic reads the buffer pool and sends out the highest priority requests. The request parser is instantiated once in the design for the request elements, and the output link buffer logic is instanted once per output link (12 times total for the request elements).

*Proprietary and Confidential Information of Onex Communications Corporation*

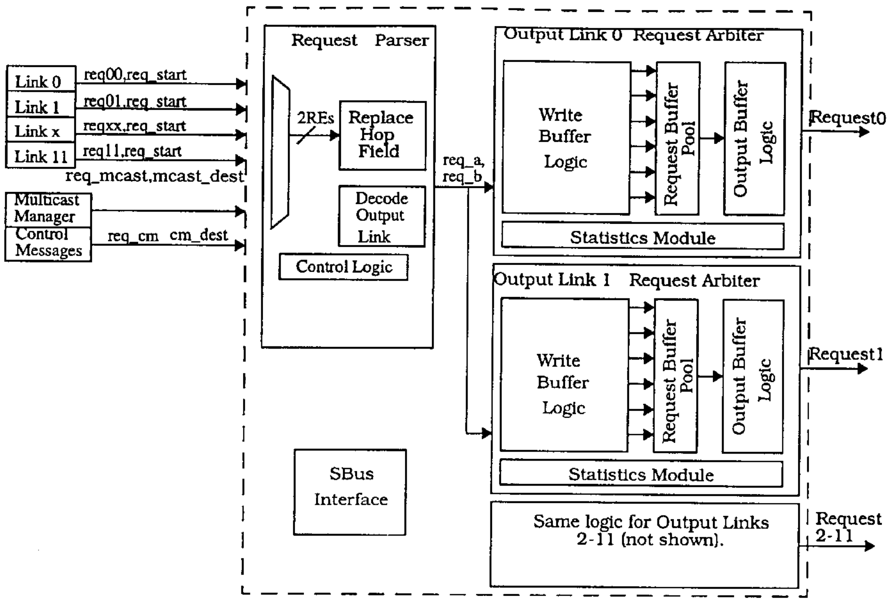

Figure 7-5: Request Arbitration Logic

At the top level the I/O for the request grant path will be the following

| Signal Name | Width | I/O | Note |
|---|---|---|---|
| cclk | 1 | I | Core clock -250MHz |
| reset_b | 1 | I | Active low module reset |
| SBus Ctrl Sigs | X | B | Slave Bus Interface |
| sor_en | 1 | I | Start of Row |
| req_mcast | 52 | I | Multicast request message. |
| req_uproc | 52 | I | Tensilica request message |
| mcast_link_en | 12 | I | 1 Bit per output link that the req should goto |
| uproc_link_en | 12 | I | 1 Bit per output link that the req should goto |
| req_in[11:00] | 52 | I | Request Element from input links #0-#11 |
| req_start[11:00] | 52 | I | Request Element Enable from links #0-#11 |
| req_out_en[11:00] | 12 | I | Pulse to read next request element of output link |
| req_out[11:00] | 52 | O | Request for output links #0-#11 |
| req_cm | 52 | O | Reqest for inband Control Messages |
| req_mcast | 52 | O | Request for the multicast buffers |

Table 7-6: Request Arbitration Top Level I/O

7.2.1.1 Request Parser

The request parser is responsible for taking the 12 input links, multicast controller and inband messaging controller request elements and determing which output links they need to goto. The parser needs to have the ability to process all of the request elements every 8 clock cycles (which is the maximum incoming request element rate). Since there are 14 inputs, 2 inputs will be processed every clock cycle with a spare clock cycle in case something can't make timing and needs to be Proprietary and Confidential Information of Onex Communications Corporation registered.

The request arbitration mechanism will receive request elements from the datapath. Below is a timing diagram of the interface.

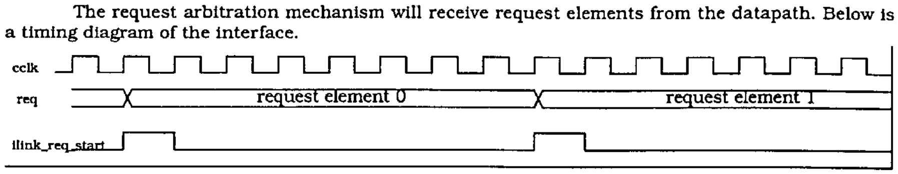

Figure 7-7: Request Parser Input Timing

Upon every ilink_req_start a new request element is ready. The req-start signal from all of the input links will be registered, and every 7 clock cycles will be tested to see if a request element is ready. The fastest that these req_start signals can come in is every 8 clocks, so the request parer is assured of getting to all of the input REs. This interface is duplicated 12 times on the input of the request parser (1 for each input link).

Below is a timing diagram showing the timing for the output of the parser:

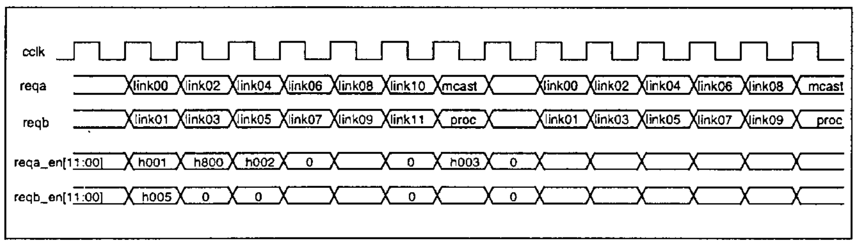

Figure 7-8: Request Parser output timing

Request Elements are valid for 1 clock cycle coming out of the parser. Along with the request elements there is a 12 bit vector which indicates which of the 12 output links the request element is destined for. In the figure above, req(a/b) bus holds the request elements, the notations indicate which input link they came from. The figure shows a strict encoding of the links, however due to design requirements of the request arbiter 'reqa' will always have the higher priority request. So, for timing on the first request element, link00 and link01 will always be written into the buffer pool first, but the parser may switch which link is output on reqa- if link01's request was a higher priority it would go out on reqa.

Request which come into the parser may be made available on the next clock cycle or as great as 7 clock cycles later. It depends on which input link they came in on, and the current input link pair that the parser is working on.

The top level signal I/O for the request parser is given below:

| Signal Name | Width | I/O | Note |
|---|---|---|---|
| cclk | 1 | I | Core clock -250MHz |
| resetx | 1 | I | Active low module reset |
| eor_en | 1 | I | End of Row |
| ilink_mask[11:00] | 12 | I | Input Link Wiring Configuration |
| stagenum[11:00] | 3 | I | Inpu t Link Stagenumbers |
| req[11:00] | 52 | I | Request Elements from input links #0-#11 |
| req_start[11:0] | 1 | I | Request Element Enable from input links |
| start_align_error, | 1 | O | Start Signals not aligned, or 1 non-existent. |
| start_min_error, | 1 | O | Start Signals violated minimum request element spacing |

*Proprietary and Confidential Information of Onex Communications Corporation*

| | | | |
|---|---|---|---|
| ilink_dest_error, | 1 | O | Element attempted to violate Ilink Wiring Configuration |
| dest_capture | 52 | O | The Element which violated the wiring configuration |
| req_mcast | 52 | I | Multicast request message. |
| req_uproc | 52 | I | Tensilica request message |
| mcast_link_en | 12 | I | 1 Bit per output link that the req should goto |
| uproc_link_en | 12 | I | 1 Bit per output link that the req should goto |
| reqa | 52 | O | Parsed Request Element |
| reqb | 52 | O | Parsed Request Element |
| reqa_en | 12 | O | Enable flags for the 12 output links for request a |
| reqb_en | 12 | O | Enable flags for the 12 output links for request b |

7.2.1.1.1 Request Parser Design Notes

The request parser latches the logical pulse of the 'request start' signal to indicate whether or not the input link has a valid request. The rate of these start signals is equal to or greater than the processing time needed to write the requests into the request buffers. Since the request logic can write the buffers into the buffer pool 2 at a time, on every clock cycle, a 3 bit free running counter will examine the 'request valid signals' and process the request.

1. Latch the logical 'request start' pulses which occur at a maximum rate of 1 every 8 clock cycles. This signal goes high for 1 clock to indicate that a new request element has been assembled.
2. Every clock cycle look at 2 of these latched request starts. Input link 0 and 1 will be processed first, then 2 and 3 and so on. If the request start latched signal is not set, this input link will be considered 'idle' and not be processed.
3. Pull out the 4 bit self routing tag which is 'valid' for this input's stage number. Replace with the input port it came in on. Do this for both elements. There shall be several programmable registers which indicate to the parser which stage of the switch that particular input link is a member of.
4. Sort the 2 request elements priority so that the 'a' request element output is the higher of the 2 priorities. (this is a requirement of the buffer pool).
5. Register the request elements along with the signals which indicate which output port it is destined for These are 'valid signals' for the 2 request elements.
6. Clear the latched Request Start signal.
7. Increment Counter.

- Each input stage needs to have a 3 bit field programmed which sets the stage number that the input link is located at. This allows the switch fabric to exist in multiple stages of the switch fabric.
- Multicast and In band control messages also input a 12 bit field which indicates which of the 12 output links it should go out on.
- At the beginning (or end of) every row CLEAR all of the latched signals so that the following row time doesn't have the previous rows request elements.

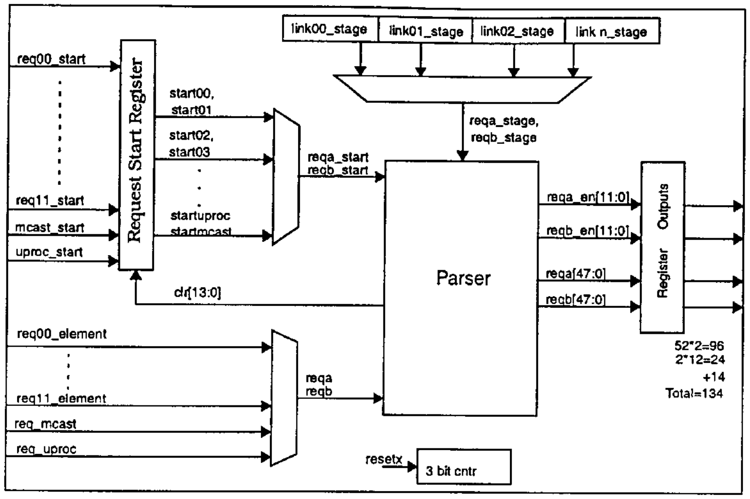

Figure 7-9: Request Parser Block Diagram

7.2.1.2 Request Arbiter

The request arbiter will be instantiated once per output link. It will connect to the request parser. The purpose of the request arbiter is to provide a small pool of requests (24) from which the highest priority oldest stored request will always be made available to the row mapper module. The input timing to the request arbiter matches that of the parser. The worst case output timing is given below:

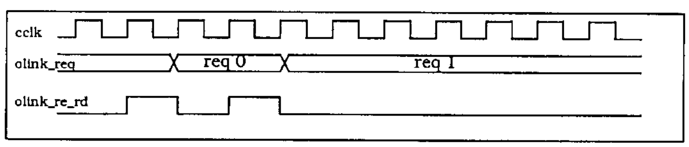

Figure 7-10: Request Arbiter Output Timing

The output logic must be able to supply a new request element every 2 clock cycles.

When a request becomes 'valid,' it is written to the buffers on the following clock cycle. After it has been written into the buffers, it is available to be output from this module on the next clock cycle.

Requests are written to the buffer pool by using the following rules (request A always has priority equal to or greater than B):

1. Request A always will have a priority equal to or greater than request B.
2. Request A will be resolved before Request B w.r.t. free buffers and evictions.
3. If there are any empty buffers, the requests are written into them before anything is evicted. Request A will be allocated to the first free buffer, if another free buffer exists request B will be granted it.
4. If there are not enough free buffers, the lowest priority youngest request which is in the buffer pool is evicted if its priority is less than that of the incoming request elements.
5. Situation: Request A is priority 5, request B is priority 3, there is 1 free buffer and the lowest

*Proprietary and Confidential Information of Onex Communications Corporation* priority request in the buffer pool is of priority 4. Request A will be written to the free buffer and request B will dropped. Therefore, the request buffer pool will always represent the highest priority requests that have come in at that time.

The top level I/O for this module is given below:

| Signal Name | Width | I/O | Note |
|---|---|---|---|
| cclk | 1 | I | Core clock -250MHz |
| resetx | 1 | I | Active low module reset |
| eor_en | 1 | I | Start of Row |
| MaxRequests | 7 | I | # of PDUs to arbitrate for |
| NumDropped[7:0] | 11 | O | Number of REs dropped for each priority |
| Num Received[7:0] | 11 | O | Number of REs Received for each priority |
| Num Requests | 11 | O | Total Number of Requests Received |
| buf_out | 54 | O | Request Elements from input links #0-#11 +internal time stamp |
| olink_req | 1 | I | Read Request - output a new request element. |
| reqa | 52 | I | Parsed Request Element |
| reqb | 52 | I | Parsed Request Element |
| reqa_en | 12 | I | Enable flags for the 12 output links for request a |
| reqb_en | 12 | I | Enable flags for the 12 output links for request b |

Table 7-11: Request Arbiter Top Level I/O

7.2.1.2.1 Request Arbiter Design Notes

The Buffer Pool will consist of buffering the actual request elements as well as a TimeStamp field which is unique per priority class. This allows the buffer pool manager to know which request elements can be overwritten (lowest priority, newest requests), and which request elements should be forwarded to the next switch element (highest priority, oldest requests) . Below is an illustration of the buffer:

| 59 | 58 52 | 51 48 | 47 44 | 43 40 | 39 36 | 35 32 | 31 28 | 27 24 | 19 12 | 11 8 | 7 6 | | 2 1 0 |
|---|---|---|---|---|---|---|---|---|---|---|---|---|---|
| F | TimeS-tamp | Stage 1 | Stage 2 | Stage 3 | Stage 4 | Stage 5 | Stage 6 | Stage 7 | ReqID | Output Port ID | num | un-used | Prior-ity |

Table 7-12: Buffer Pool Storage Element

As requests come streaming into each output link buffer pool, there will be a controller which determines if the request should be dropped, written to an unoccupied buffer or overwrite a particular buffer which contains a lower priority request. Each request will be given a timestamp unique to its priority class as well as a timestamp/priority pair which is used to search the buffer pool. This pair will be compare against the contents of each of the buffers in the buffer pool. The buffer searches are completely decoupled from one another so that this will not be a critical path which needs to ripple across all 24 buffers. In the event that a buffer is empty another set of signals will uniquely identify that buffer, and the request element will be written into it. For each request element here are the pieces of information which will be given to each request element:

- OverWrite TimeStamp - This is the timestamp which will be used to search the buffer pool
- Current TimeStamp - This is the timestamp which the request element has been assigned
- RequestWriteEnable - Active hi, indicates to search the buffer pool using the OverWrite Time Stamp
- Empty Buffer Enables[23:0] - A vector with only 1 of its bits active which assigns the request element to a particular buffer which is known to be empty.

This information will be used by the buffer pool 'write' logic which is shown below.

*Proprietary and Confidential Information of Onex Communications Corporation*

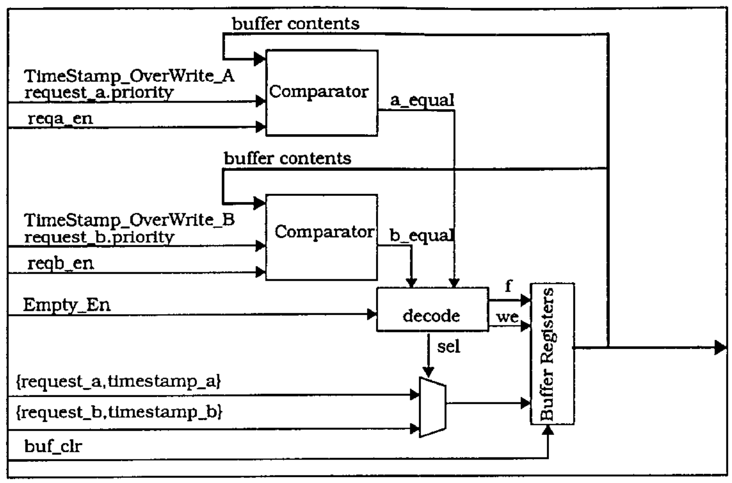

Figure 7-13: Buffer Pool 'Write' Logic

The buffer pool write logic will be controlled by a buffer pool manager. This buffer pool manager will need to keep track of the timestamps as well as which buffers are empty. The following counters will be kept:

- NextWrite TimeStamp (8 counters- 1 for each priority)
- NextRead TimeStamp (8 counters- 1 for each priority)

The updating of these counters and the assigning of timestamps will be governed by the following rules:

1. Whenever a new request comes, if a buffer is empty it is assigned to this request element. The Next-Write TimeStamp counter is assigned to this request and the counter is incremented.
2. If all the buffers are full and there is a lower priority request exists in the bufferpool (next read and next write timestamps for each priority are not-equal), the newest lowest priority request (NextWriteTimeStamp) will be used as the TimeStampOverWrite, and that counter will be decremented. The NextWriteTimeStamp for the request's priority will be assigned to the request element and incremented.
3. If there don't exist any free buffers and the lowest priority is greater than or equal to the current request element it will not be assigned to anything, its request enable signal will be inactive.

Timestamps will be for each request element which comes in. If it is a 2 group request element, only a single timestamp will be assigned.

Continuously, the following is re-evaluated:

- All of the NextWriteTimeStamps and the NextReadTimeStamps will be compared, if any are not equal the highest priority one will be chosen. The NextRead TimeStamp will be used along with the priority to seach the buffer pool. All of the buffers are compared against these values, and the one which matches will be output.
- When the slot mapper logic needs a request element this one will be output (registered) and the buffer cleared. When this happens the NextReadCounter will be incremented.

Each of these counters will have the ability to be cleared (at the start of a row) and be incremented or decremented by 1 or 2 every clock cycle. Since there are only 96 request (or grant) elements the NextRead Counter will never get larger than 96. Likewise, when a new request comes in the NextWrite counter gets incremented, but when a buffer pool request is overwritten, the counter is decremented. As a result, the worst case is all traffic of the same priority. The counter will go up to 96 and stay there since newer requests do not have preference over older requests at the same priority level. This is consistent with the oldest highest priority requests being forwarded to the next switch element in the fabric. The 'Next Read' timestamp is incremented each time a new buffer is played out of the buffer pool. This insures that the 'first-come-first-serve' principle remains in effect.

This module should be implemented using 2 counters for each priority (16 total counters @ 7 bits wide) for a total of 112 FFs.

Below is a block diagram showing the partitioning for the buffer pool logic.

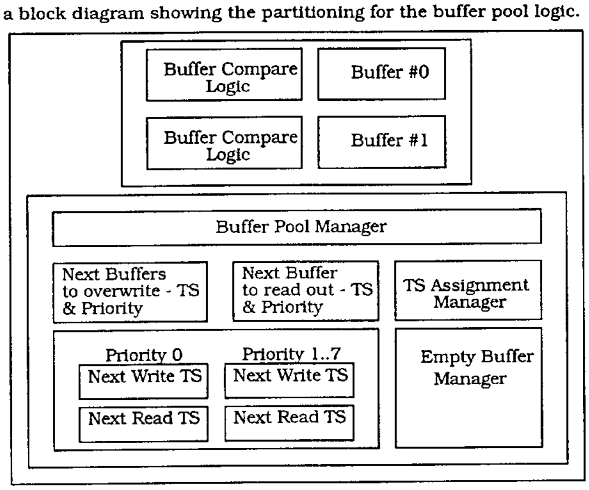

Figure 7-14: Buffer Pool Partitioning Block Diagram

7.2.2 Statistics Gathering

RESERVED

7.2.3 Grant Implementation

The grants flow through the switch in an out of band network. The grant processing is the same as the request processsing, so the 'parser' and 'buffer pool' logic will be re-instantiated on the grant path. The only difference will be that for the grant message, some logic needs to assemble the grant elements, just like in the datapath there is a request assembler. This logic will take slot data from the synchronizers and assemble grant elements. On the output end, there will be a mapping function which takes grant elements and maps them into the correct slots. Then, these slots will be

*Proprietary and Confidential Information of Onex Communications Corporation* converted into a serial stream.

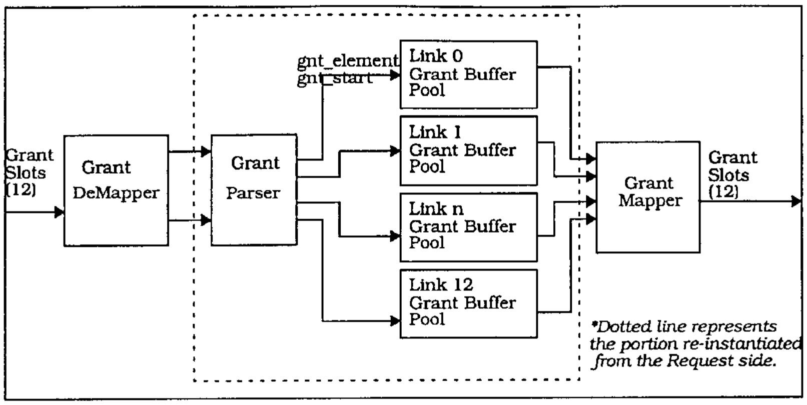

The Grant Serial link will be run at 2.2gbps, the same speed as the data path's serial links. The data path has 2 links which combine to source 1700 slots at a rate of 125M slots per second. Since the grant path has half the bandwidth it sources slots at a 75Mslot per second rate.

Grant Elements arrive at a rate of 2 per every 3 slots. In every slot time on the grant link there are 4 clocks. Therefore, for every Grant, 1.5 slots will have occured, and there will be be 6 clock cycles. Since there are 12 links, 2 grant elements need to be processed every clock cycle to keep up with the input data rate. A minimal amount of buffering will be needed to hold the assembled grants to allow them to played out at the correct rate.

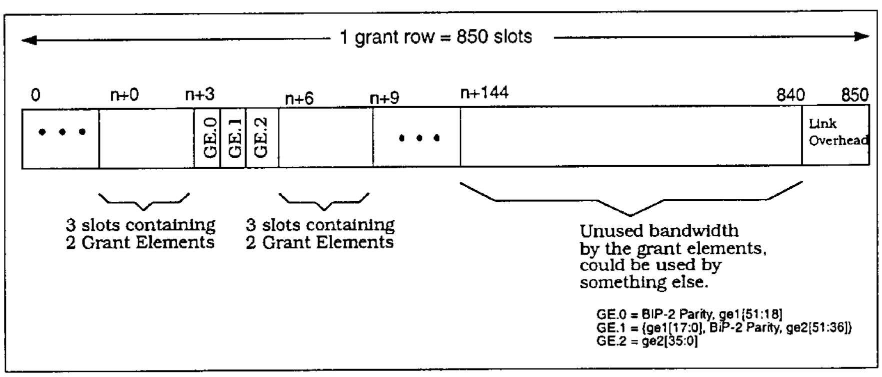

Figure 7-15: Grant Link Mapping/DeMapping Timing

The unused bandwidth between grant elements can be used to carry other traffic. Nothing is defined at the moment which uses this bandwidth (or can even have access to it), but it is nonetheless there.

A group of 3 slots comprises 2 request or grant elements. The following diagram describes the mapping as well as the parity generationof the slots to arbitration elements.

Figure 7-16: Grant/Request Element Slot Format

Proprietary and Confidential Information of Onex Communications Corporation

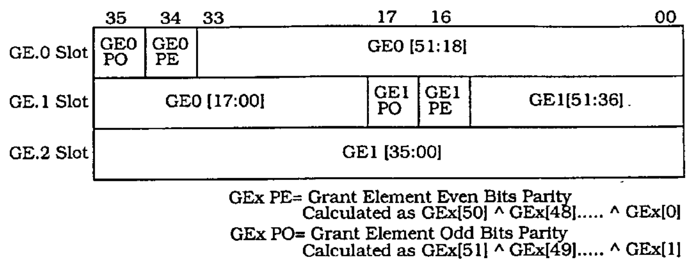

7.2.3.1 Grant Link Overhead

There will normally be 10 slots used for Link Overhead (LOH). The mapper module will be

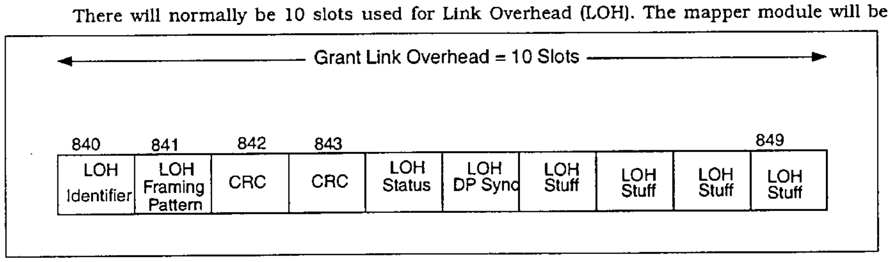

responsible for inserting contents of most of these LOH slots into the link data stream. these 10 LOH slots into the link data stream. There are 4 types of data which may be inserted into the LOH slots:

*LOH Framing Patter n -*

This will be a 36-bit value which is common to all output links. It will be Configurable via a software programmable register. This pattern will be used in only 1 of the 10 LOH slots.

*LOH Status -*

This 32 bit status field will be configurable via a software programmable register. There will be a unique status register for each output link.

Note: the 4 tag bits are fixed to all 1's.

*LOH Identifi er -*

This 32-bit will contain an identifier for this switch & link. The field is made up as:

- loh_id[3:0] = link number that the output mapper is instantiated as.
- loh_id[27:4] = fTSE ID number which is SW configurable.
- loh_id[31:28] = stage number the fTSE is programmed as.

Note: the 4 tag bits are fixed to all 1's.

*LOH Stuff -*

This 32-bit pattern will be inserted in the LOH slots which aren't used for framing, status, or ID. This pattern will be Configurable via a software programmable register and is common to all output links.

*Proprietary and Confidential Information of Onex Communications Corporation*

Note: the 4 tag bits are fixed to all 1's

*LOH Stuff -*

This is gotten from the deserializers on the datapath. The values are mapped into a 36 bit slot as follows. The actual decoding of these bits is reserved for the Synchronizers Specification. Please consult it for the use and interpretation of these bits.

loh_sync[31:26] = 0 loh_sync[25] = sync_data1_synced loh_sync[24] = sync_data0_synced loh_sync[23:17] = 0 loh_sync[16] = sync_offset_count_valid loh_sync[15:0] = sync_offset_count

Note: The 4 tag bits are fixed to all 1's

*CRC -*

This field is inserted by the serializer unit. This is fixed, and must be the 2 slots directly following the framing pattern. The grant mapper ram should be programmed as IDLE for these slots.

7.2.3.2 Grant DeMapper

The grant DeMapper will accept slots and assemble grant elements for the grant parser. The following is the top level I/O for this module.

RESERVED

Table 7-17: Grant DeMapper Top Level I/O

The grant demapper will utilize a Ram which is addressed by the current slot number. The output of the Ram will indicate if the current slot is a valid grant element. The grant demapper ram is 32 bits wide and has the following bits:

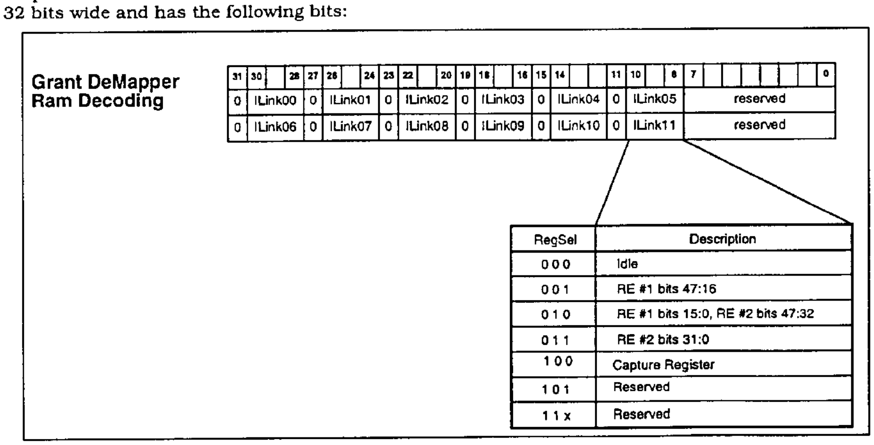

Figure 7-18: Grant DeMapper Ram

*Proprietary and Confidential Information of Onex Communications Corporation*

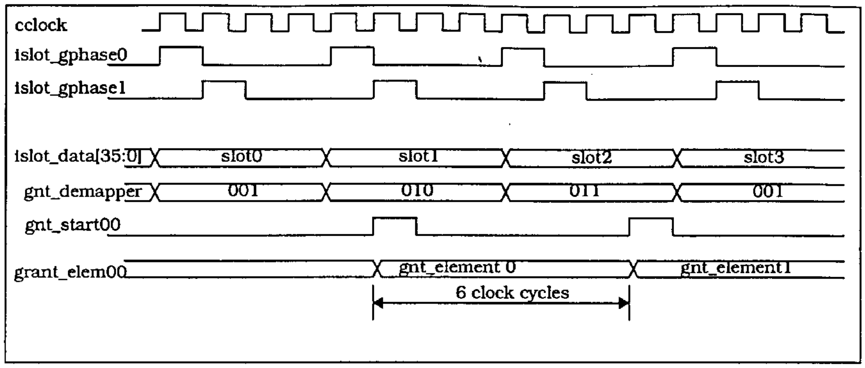

Figure 7-19: Grant DeMapper Timing

The grant demapper ram allows a switch chip to be located in more than 1 stage of a switch fabric by programming the DeMapper Ram accordingly. The ram slot counter will be the data path slot counter with the LSB dropped to account for the 50% decrease in the number of slots per row. The ram will be programmed so that different input links can have their requests valid at completely different times as long as the time between 2 incoming slots allows both to be processed by the grant logic (16 clock cycles). The demapper ram has 3 bits dedicated per input grant link so that future expansion is possible.

7.2.3.3 Mapper Ram

Here is the top level I/O for the Grant Mapper Module:

RESERVED

Table 7-20: Grant Mapper I/O
Table 7-21:

*Proprietary and Confidential Information of Onex Communications Corporation*

Grant Mapper Ram

| 31–28 | 27–24 | 23–20 | 19–16 | 15–11 | 10–8 | 7–0 |
|---|---|---|---|---|---|---|
| ILink00 | ILink01 | ILink02 | ILink03 | ILink04 | ILink05 | reserved |
| ILink06 | ILink07 | ILink08 | ILink09 | ILink10 | ILink11 | reserved |

| RegSel | Description |
|---|---|
| 0000 | GE IDLE |
| 0001 | GE #1 bits 47:16 |
| 0010 | RE #1 bits 15:0, GE #2 bits 47:32 |
| 0011 | GE # 2 bits 31:0 |
| 1000 | Framing Pattern |
| 1001 | Link Overhead Status Slot |
| 1010 | Link Overhead ID Slot |
| 1011 | Link Overhead 'Stuff' Slot |
| 1100 | Link Overhead Sync Slot |
| others | Reserved |

Figure 7-22: Grant Mapper Ram

When the Mapper RAM indicates it is time to transmit a grant element, the highest priority 52-bit request element is fetched from the arbitration module. Since only 32-bits of the GE may be tranmitted in a single link slot, it will be necessary to add buffering within the Output Grant Mapper module which will buffer the extra bits which cannot be sent in the current slot.

A 3-slot structure will be defined which will be used to transmit 2 52-bit GEs. The timing for fetching GEs is shown below. In this example, the 3 slot GE structure is programmed to be transmitted on output link slots N, N+1, and N+2.

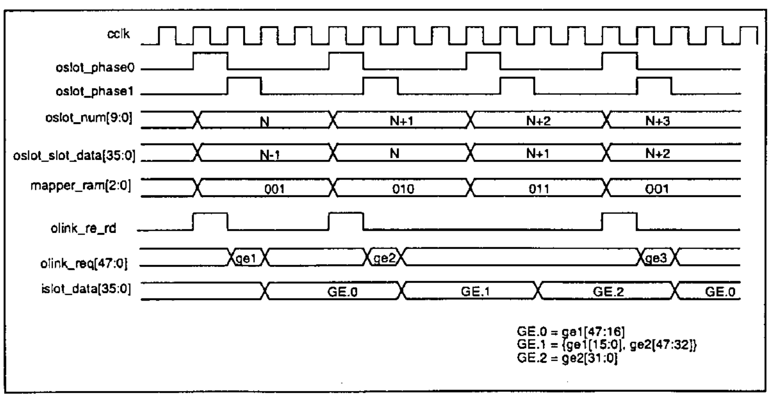

Figure 7-23: Grant Element Timing

There will be a programmable field which indicates the total number of requests or grants which can be made every row time. This value will be per output link and take into account the number of groups locked out for TDM traffic. After this value is reached, the output link will output idles. This is indepenedent of the configuration ram mapping. By doing this, software has an easy way to do performance testing and network congestion by setting this value to something small. It also allows a system to overrequest or over-grant a link since arbiters further on down the line will 'knock-out' a certain percentage of requests.

7.2.4 Request Arbitration Memory Map

| | | | | | | | | | | | | | | | | | | | | |
|---|---|---|---|---|---|---|---|---|---|---|---|---|---|---|---|---|---|---|---|---|
| Request Link 0 Priority 0 Statistics | | | | | | | | | | | | | | | | | | | | 0x9000 |
| Request Link 0 Priority 1 Statistics | | | | | | | | | | | | | | | | | | | | 0x9004 |
| Request Link 0 Priority 2 Statistics | | | | | | | | | | | | | | | | | | | | 0x9008 |
| Request Link 0 Priority 3 Statistics | | | | | | | | | | | | | | | | | | | | 0x900C |
| Request Link 0 Priority 4 Statistics | | | | | | | | | | | | | | | | | | | | 0x9010 |
| Request Link 0 Priority 5 Statistics | | | | | | | | | | | | | | | | | | | | 0x9014 |
| Request Link 0 Priority 6 Statistics | | | | | | | | | | | | | | | | | | | | 0x9018 |
| Request Link 0 Priority 7 Statistics | | | | | | | | | | | | | | | | | | | | 0x901C |
| Request Link 1 Priority 0 Statistics | | | | | | | | | | | | | | | | | | | | 0x9020 |
| Request Link 2 Priority 0 Statistics | | | | | | | | | | | | | | | | | | | | 0x9040 |
| Request Link 3 Priority 0 Statistics | | | | | | | | | | | | | | | | | | | | 0x9060 |
| Request Link 4 Priority 0 Statistics | | | | | | | | | | | | | | | | | | | | 0x9080 |
| Request Link 5 Priority 0 Statistics | | | | | | | | | | | | | | | | | | | | 0x90A0 |
| Request Link 6 Priority 0 Statistics | | | | | | | | | | | | | | | | | | | | 0x90C0 |
| Request Link 7 Priority 0 Statistics | | | | | | | | | | | | | | | | | | | | 0x90E0 |
| Request Link 8 Priority 0 Statistics | | | | | | | | | | | | | | | | | | | | 0x9100 |
| Request Link 9 Priority 0 Statistics | | | | | | | | | | | | | | | | | | | | 0x9120 |
| Request Link 10 Priority 0 Statistics | | | | | | | | | | | | | | | | | | | | 0x9140 |
| Request Link 11 Priority 0 Statistics | | | | | | | | | | | | | | | | | | | | 0x9160 |
| 0 | Max Request Link 00 | 0 | Num Requests Link 00 | 0 | 0 | 0 | 0 | 0 | 0 | 0 | 0 | 0 | 0 | | 0 | 0 | 0 | 0 | 0 | 0x9180 |
| 0 | Max Request Link 01 | 0 | Num Requests Link 01 | 0 | 0 | 0 | 0 | 0 | 0 | 0 | 0 | 0 | 0 | 0 | 0 | 0 | 0 | 0 | 0 | 0x9184 |
| 0 | Max Request Link 02 | 0 | Num Requests Link 02 | 0 | 0 | 0 | 0 | 0 | 0 | 0 | 0 | 0 | 0 | 0 | 0 | 0 | 0 | 0 | 0 | 0x9188 |
| 0 | Max Request Link 03 | 0 | Num Requests Link 03 | 0 | 0 | 0 | 0 | 0 | 0 | 0 | 0 | 0 | 0 | 0 | 0 | 0 | 0 | 0 | 0 | 0x918C |
| 0 | Max Request Link 04 | 0 | Num Requests Link 04 | 0 | 0 | 0 | 0 | 0 | 0 | 0 | 0 | 0 | 0 | 0 | 0 | 0 | 0 | 0 | 0 | 0x9190 |
| 0 | Max Request Link 05 | 0 | Num Requests Link 05 | 0 | 0 | 0 | 0 | 0 | 0 | 0 | 0 | 0 | 0 | 0 | 0 | 0 | 0 | 0 | 0 | 0x9194 |
| 0 | Max Request Link 06 | 0 | Num Requests Link 06 | 0 | 0 | 0 | 0 | 0 | 0 | 0 | 0 | 0 | 0 | 0 | 0 | 0 | 0 | 0 | 0 | 0x9198 |
| 0 | Max Request Link 07 | 0 | Num Requests Link 07 | 0 | 0 | 0 | 0 | 0 | 0 | 0 | 0 | 0 | 0 | 0 | 0 | 0 | 0 | 0 | 0 | 0x919C |
| 0 | Max Request Link 08 | 0 | Num Requests Link 08 | 0 | 0 | 0 | 0 | 0 | 0 | 0 | 0 | 0 | 0 | 0 | 0 | 0 | 0 | 0 | 0 | 0x91A0 |
| 0 | Max Request Link 09 | 0 | Num Requests Link 09 | 0 | 0 | 0 | 0 | 0 | 0 | 0 | 0 | 0 | 0 | 0 | 0 | 0 | 0 | 0 | 0 | 0x91A4 |
| 0 | Max Request Link 10 | 0 | Num Requests Link 10 | 0 | 0 | 0 | 0 | 0 | 0 | 0 | 0 | 0 | 0 | 0 | 0 | 0 | 0 | 0 | 0 | 0x91A8 |
| 0 | Max Request Link 11 | 0 | Num Requests Link 11 | 0 | 0 | 0 | 0 | 0 | 0 | 0 | 0 | 0 | 0 | 0 | 0 | 0 | 0 | 0 | 0 | 0x91AC |

*Proprieta.., and Confidential Information of Onex Communications Corporation*

7.2.4.1 Link X Request Element Priority Statistics Registers

| 31 – 27 | 26 – 16 (23) | 15 – 11 | 10 – 0 (7) | Address Offset |
|---|---|---|---|---|
| 0 | Link 00 Priority 0 Requests Droped | 0 | Link 00 Priority 0 Request Received | 0x9000 |
| 0 | Link 00 Priority 1 Requests Droped | 0 | Link 00 Priority 1 Request Received | 0x9004 |
| 0 | Link 00 Priority 2 Requests Droped | 0 | Link 00 Priority 2 Request Received | 0x9008 |
| 0 | Link 00 Priority 3 Requests Droped | 0 | Link 00 Priority 3 Request Received | 0x900C |
| 0 | Link 00 Priority 4 Requests Droped | 0 | Link 00 Priority 4 Request Received | 0x9010 |
| 0 | Link 00 Priority 5 Requests Droped | 0 | Link 00 Priority 5 Request Received | 0x9014 |
| 0 | Link 00 Priority 6 Requests Droped | 0 | Link 00 Priority 6 Request Received | 0x9018 |
| 0 | Link 00 Priority 7 Requests Droped | 0 | Link 00 Priority 7 Request Received | 0x901C |

This pattern repeats for each of the 12 links, the offset is 0x20 between different link's statistics registers. These registers are read - only.

7.2.4.2 Link X Request Element Counters

| 31 | 27 – 26 | 24 | 23 – 16 | 15 | | | | | | | | 7 | | | | | | | 0 | Address Offset |
|---|---|---|---|---|---|---|---|---|---|---|---|---|---|---|---|---|---|---|---|---|
| 0 | Link 00 Maximum Requests / Row | 0 | Link 00 Num Requests Forwarded | 0 | 0 | 0 | 0 | 0 | 0 | 0 | 0 | 0 | 0 | 0 | 0 | 0 | 0 | 0 | 0 | 0x9180 |

The Maximum Requests per row field has a reset value of 96 and is read-writeable. The number of requests forwarded refers to the previous row and is read-only.

7.2.5 Grant Arbitration Memory Map

The grant arbitration has a number of configurable registers which are used for configuration of the switch element, statistics gathering and performance monitoring, and testability. These registers are outlined below:

Base Address 0x00440000

| 31 24 23 16 15 8 7 0 | Address Offset |
|---|---|
| Grant Mapper Ram Slot 0 | 0x0000<br>0x0004 |
| Grant Mapper Ram Slot 1 | 0x0008<br>0x000C |
| Grant Mapper Ram Slot 849 | 0x1A88<br>0x1A8C |
| unmapped address space | 0x1A90 |
| Grant DeMapper Ram Slot 0 | 0x4000<br>0x4004 |
| Grant DeMapper Ram Slot 849 | 0x5A88<br>0x5A8C |

*Proprietary and Confidential Information of Onex Communications Corporation*

Base Address 0x00440000

| 31 … 24 | 23 … 16 | 15 … 8 | 7 … 0 | Address Offset |
|---|---|---|---|---|
| unmapped address space | | | | 0x5A90 |
| Grant Link 00-11 Status Reg | | | | 0x8000<br>0x802C |
| Grant Link Framing Pattern | | | | 0x8030 |
| Grant Link Framing Pattern (bits 27–24) | read only- all zeroes | | | 0x8034 |
| Grant Link Common 'Stuff' Reg | | | | 0x8038 |
| Grant Link 00 Line Overhead Status Reg | | | | 0x803C |
| Grant Link 11 Line Overhead Status Reg | | | | 0x8068 |
| Grant Max Grants | | | | 0x806C<br>0x8070<br>0x8074 |
| Grant Capture Interrupt Status Register | | | | 0x8078 |
| Grant Link 0-11 Capture Register Contents | | | | 0x807C<br>0x80A8 |
| Grant Link 0 - 11 Capture Register Masks | | | | 0x80AC<br>0x80D8 |
| Gnt Config | 0 0 0 0 0 0 0 0 0 0 0 0 | | Grant Parity Error Masks | 0x80DC |
| Grant Error Interrupt Mask | | | | 0x80E0 |
| Grant Error Interrupt Status Register | | | | 0x80E4 |
| | | | Grant Parity Error | 0x80E8 |
| | Grant Mapper Sequence Error | | Grant DeMapper Sequence Error | 0x80EC |
| Grant Dest Error Element[31:00] | | | | 0x80F0 |
| Grant Dest Error Element[47:32]] | | reserved | | 0x80F4 |

Table 7-24: Grant Memory Map (Shamelessly copied from Ch. 15)

7.2.5.1 Grant Mapper RAM

| 31–28 | 27–24 | 23–20 | 19–16 | 15–12 | 11–8 | 7 | | | | | | | 0 | Address Offset |
|---|---|---|---|---|---|---|---|---|---|---|---|---|---|---|
| Grant Link 00 | Grant Link 01 | Grant Link 02 | Grant Link 03 | Grant Link 04 | Grant Link 05 | 0 | 0 | 0 | 0 | 0 | 0 | 0 | 0 | 0x0000 |
| Grant Link 06 | Grant Link 07 | Grant Link 08 | Grant Link 09 | Grant Link 10 | Grant Link 11 | 0 | 0 | 0 | 0 | 0 | 0 | 0 | 0 | 0x0004 |
| Unknown | | | | | | | | | | | | | | Reset Value |

The Grant Mapper Ram specifies the outgoing slot numbers that grant elements will be put upon. It is critical that this ram be written before the switch fabric is made operational. The reset value of this register is unknown. Any location may be written to or read at any time by the master

*Proprietary and Confidential Information of Onex Communications Corporation* processor or the host interface. However, it is recommended that the processor update the values of this ram when traffic is either not going through the link, or during a slot location far away from the current slot number. Bits 7-0 will always read back a zero.

| Mapper Ram Bit Coding | |
|---|---|
| Value (0b) | |
| 0000 | Idle |
| 0001 | GE.0 |
| 0010 | GE.2 |
| 0011 | GE.3 |
| 1000 | LOH Framing Pattern |
| 1001 | LOH Status |
| 1010 | LOH ID |
| 1011 | LOH Stuff |
| 1100 | LOH Sync |

7.2.5.2 Grant DeMapper RAM

| 31 | 28 | 27 | 24 | 23 | 20 | 19 | 16 | 15 | 12 | 11 | 8 | 7 | | | | | | | 0 | Address Offset |
|---|---|---|---|---|---|---|---|---|---|---|---|---|---|---|---|---|---|---|---|---|
| 0 | Grant Link 00 | 0 | Grant Link 01 | 0 | Grant Link 02 | 0 | Grant Link 03 | 0 | Grant Link 04 | 0 | Grant Link 05 | 0 | 0 | 0 | 0 | 0 | 0 | 0 | 0 | 0x4000 |
| 0 | Grant Link 06 | 0 | Grant Link 07 | 0 | Grant Link 08 | 0 | Grant Link 09 | 0 | Grant Link 10 | 0 | Grant Link 11 | 0 | 0 | 0 | 0 | 0 | 0 | 0 | 0 | 0x4004 |
| Unknown | | | | | | | | | | | | | | | | | | | | Reset Value |

The Grant DeMapper Ram specifies the incoming slot numbers that grant elements will be coming in upon. It is critical that this ram be written before the switch fabric is made operational. The reset value of this register is unknown. Any location may be written to or read at any time by the master processor or the host interface. However, it is recommended that the processor update the values of this ram when traffic is either not going through the link, or during a slot location far away from the current slot number. Bits 7-0 will always read back a zero.

| Mapper Ram Bit Coding | |
|---|---|
| Value (0b) | |
| 000 | Idle |
| 001 | GE.0 |
| 010 | GE.2 |
| 011 | GE.3 |
| 1000 | Capture Register |

*Proprietary and Confidential Information of Onex Communications Corporation*

7.2.5.3 Grant Link Status Register

| Bits | 31 | 30 | 29–24 | 23 | 22–16 | 15 | 14–8 | 7 | 6–0 | Address Offset |
|---|---|---|---|---|---|---|---|---|---|---|
| Field | fifo fill | 0 | Current Fifo Watermark | 0 | Grants Received Last Row | 0 | Grants Dropped Last Row | 0 | Grants Forwarded Last Row | 0x8000-0x802C |
| Reset Value | 0 | 0 | 0 0 0 0 0 0 | 0 | 0 0 0 0 0 0 0 | 0 | 0 0 0 0 0 0 0 | 0 | 0 0 0 0 0 0 0 | |

There is a grant link status register for each of the 12 outgoing links. Addres offset 8000 is for link 0, while 802C is for link 11. The link status register is read only. Writes do not have an effect on these registers. The sub fields are defined as:

FifoFill: This bit shall be set if the grant fifo is currently filled.

Current Fifo Watermark: This shall read back the current number of grants that are buffered.

Grants Received Last Row: Total number of grants received during the last row. This is updated every row upon an EndOfRow. This is independent of the number of PDUs which the grant was supposed to reserve.

Grants Dropped Last Row: Total number of grants dropped during the last row. This is updated every row upon an EndOfRow. This is independent of the number of PDUs which the grant was supposed to reserve.

Grants Forwarded Last Row: Total number of grants which were forwarded during the last row. For GE's which reserve more than 1 PDU this is the total number of PDUs reserved.

7.2.5.4 Grant Link Framing Pattern

| Bits | 31–28 | 27–24 | 23–0 | Address Offset |
|---|---|---|---|---|
| | Frame0 | | | 0x8030 |
| | 0 0 0 0 | Frame1 | 0 0 0 0 0 0 0 0 0 0 0 0 0 0 0 0 0 0 0 0 0 0 0 0 | 0x8034 |

The grant link framing pattern is 36 bits wide and is made by concatonating frame0 with fram1 such that: FramingPattern[35:0] = Frame1[27:24],Frame0[31:0],. The reset value of Frame 0 is 0x0F628_0000 and Frame 1 is 0. So that the framing pattern is 0x0F628_0000.

7.2.5.5 Grant Link Common 'Stuff' Reg

| Bits | 31–0 | Address Offset |
|---|---|---|
| Field | Stuff Reg | 0x8038 |
| Reset Value | 0 0 0 0 0 0 0 0 0 0 0 0 0 0 0 0 0 0 0 0 0 0 0 0 0 0 0 0 0 0 0 0 | |

This register's contents will be inserted into the link overhead 'stuff' slot designated by the mapper ram. This register is read/writable at any time. Writes are effective immediatly.

*Proprietary and Confidential Information of Onex Communications Corporation*

7.2.5.6 Grant Link Line Overhead Status Register

| Bits 31–0 | Address Offset |
|---|---|
| Link 0-11 Overhead Status Register | 0x803C 0x8068 |
| 0 0 0 0 0 0 0 0 0 0 0 0 0 0 0 0 0 0 0 0 0 0 0 0 0 0 0 0 0 0 0 0 | Reset Value |

This register's contents will be inserted into the link overhead's status slot designated by the mapper ram. This register is read/writable at any time. Writes are effective immediatly.

7.2.5.7 Maximum Grants Register

| 31–24 | 23–16 | 15–8 | 7–0 | Address Offset |
|---|---|---|---|---|
| Link 00 Maximum Grants | Link 01 Maximum Grants | Link 02 Maximum Grants | Link 03 Maximum Grants | 0x806C |
| Link 04 Maximum Grants | Link 05 Maximum Grants | Link 06 Maximum Grants | Link 07 Maximum Grants | 0x8070 |
| Link 08 Maximum Grants | Link 09 Maximum Grants | Link 10 Maximum Grants | Link 11 Maximum Grants | 0x8074 |
| 0 1 1 0 0 0 0 0 | 0 1 1 0 0 0 0 0 | 0 1 1 0 0 0 0 0 | 0 1 1 0 0 0 0 0 | Reset Value |

The Maximum Grants Register may be written/read to at any time. It's reset value is 96 for each link (corresponding to the maximum number of grants which any of the links can accomodate). It is recommended that the number of groups available for PDU traffic at any given time be written into these positions to ensure that no mapper/demapper programming error or service processor error allow the introduction of more grants than PDUs that can be carried on the data link.

7.2.5.8 Grant Capture Interrupt Status Register

| Bits 31–12 | Bits 11–0 | Address Offset |
|---|---|---|
| 0 0 0 0 0 0 0 0 0 0 0 0 0 0 0 0 0 0 0 0 | Grant Capture Interrupt Status Register | 0x8078 |
| 0 0 0 0 0 0 0 0 0 0 0 0 0 0 0 0 0 0 0 0 | 0 0 0 0 0 0 0 0 0 0 0 0 | Reset Value |

If any of the grant capture registers change from one row time to the next, the corresponding link bit in this register will get set. Bit 0 is for link 0, bit 11 for link 11. The other bits are unused and should always read back zero. Once the bit has been set, software must write a logical 1 to it to clear the offending bit. Whenever any of these bits are set the capture interrupt will become active. To clear the interrupt, the processor must clear the offending bit in this register by writing a 1 to it. Writes of 'zero' have no effect.

7.2.5.8.1 Grant Link Capture Registers

| Bits 31–0 | Address Offset |
|---|---|
| Grank Link 0 - 11 Capture Registers | 0x807C 0x80D8 |
| 0 0 0 0 0 0 0 0 0 0 0 0 0 0 0 0 0 0 0 0 0 0 0 0 0 0 0 0 0 0 0 0 | Reset Value |

These are 12 read only registers which have reset values of zero. Each time the grant demapper encounters a 'Link Overhead Capture' Entry the slot data is stored in this register. These registers may be written to at any time, writes have no effect.

*Proprietary and Confidential Information of Onex Communications Corporation*

7.2.5.9 Grant Link Capture Mask Registers

| 31 | | | | 27 | | | 24 | 23 | | | | | | | 16 | 15 | | | | | | | 8 | 7 | | | | | | | 0 | Address Offset |
|---|---|---|---|---|---|---|---|---|---|---|---|---|---|---|---|---|---|---|---|---|---|---|---|---|---|---|---|---|---|---|---|---|
| Grank Link 0 - 11 Capture Registers | | | | | | | | | | | | | | | | | | | | | | | | | | | | | | | | 0x80AC 0x80D8 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | Reset Value |

These 12 registers provide bit masks for the capture interrupt register. If any bit is set to a 1, then the hardware will monitor that bit in the link's capture register from row to row. If that bit changes, the grant link capture change register will latch the link whose bit has changed and output an interrupt to the processor. Every bit in each of the 12 input links can be set or cleared individually to trigger the capture interrupt. This register's reset value is all zero's which inhibit the interrupt from occuring. The register may be written/read to at any time.

7.2.5.10 Grant Configuration / Grant Parity Error Mask Register

| 31 | | | | 27 | | | 24 | 23 | | | | | | | 16 | 15 | | | | | | | 8 | 7 | | | | | | | 0 | Address Offset |
|---|---|---|---|---|---|---|---|---|---|---|---|---|---|---|---|---|---|---|---|---|---|---|---|---|---|---|---|---|---|---|---|---|
| Grant Configuration Register | | | | | | | | | | | | | | | | | | | | Grant Parity Error Mask | | | | | | | | | | | | 0x80DC |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | Reset Value |

Grant Parity Error Masks - bit is active hi to enable parity conformance of incoming grants.

Bit 0: Link 00

Bit 1: Link 01

Bit 2: Link 02

...

Bit 11: Link 11

Grant Config

Bit 7: Grant Rotate Enable: Reset Value is 0, Set to a 1 to enable grant parser rotation.

Bit 6: Disable Num Field (grants are forced to single PDU reservation mode). Default enables grants to reserve more than 1 PDU.

7.2.5.11 Grant Error Interrupt Mask Register

| 31 | | | | | | | 24 | 23 | | | | | | | | | | | 12 | 11 | | | | | | | | | | | 0 | Address Offset |
|---|---|---|---|---|---|---|---|---|---|---|---|---|---|---|---|---|---|---|---|---|---|---|---|---|---|---|---|---|---|---|---|---|
| Grant Error Interrupt Mask | | | | | | | | | | | | | | | | | | | | | | | | | | | | | | | | 0x80E0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | Reset Value |

Bit 31: Grant Start Signals Unaligned Error Mask: Program to 1 to enable an interrupt to occur if link demappers are out of sync with respect to the start signals which they create. this type of error.

Bit 30: Grant Minimum Start Pulse Error Mask: Reset is 0, Program to 1 to enable this type of error. This error mask is ineffective for grants since there is no minimum pulse period (it is a holdover from the request parser).

*Proprietary and Confidential Information of Onex Communications Corporation*

Bit 29: Grant Remaining Mask: At the end of a row, if grants are remaining in the buffers, this will trigger an interrupt when set to a 1, reset value is 0.

Bit 28: Grant Fifo Filled Mask: If the grant fifo overflows for a link this will trigger when programmed to a 1, reset value is 0. Fifo watermarks need to be investigated for the link.

Bits 23-12: Grant Mapper Sequencing Mask: Set to a 1 to allow sequencing errors to generate an interrupt. Bit 23 refers to Link #11, bit 12 refers to Link #0.

Bits 11-0: Grant Demapper Sequencing Mask: Set to a 1 to allow sequencing errors to generate an interrupt. Bit11 refers to Link #11, Bit 0 to Link #0.

7.2.5.12 Grant Error Interrupt Status Register

| 31 – 24 | 23 – 0 (12 11 7) | Address Offset |
|---|---|---|
| Grant Error Interrupt Status Register | reserved | 0x80E4 |

Bit 31: Grant Start Align Error - signals alignment error, write a 1 to clear this interrupt source Bit 30: Grant Start Min Error - signals that grant elements have arrived too quickly. Write a 1 to clear this interrupt source.

Bit 29: Grants Remaining - signals grants are still in the fifo at the end of the row. Write a 1 to clear this interrupt source.

Bit 28: Grant Fifo Filled - signals that a grant fifo has overfilled. Write a 1 to clear this interrupt source.

Bit 27: Grant Destination Error - siganls that a grant element has attempted to goto an output it isn't supposed to. Write a 1 to clear this type of interrupt source.

Bit 26: Grant Parity Error - signals to read the grant parity error register

Bit 25: Grant Mapper Sequencing Error - signals to read grant sequencing error register Bit 24: Grant Demapper Sequencing Error - signals to read grant sequencing error register

7.2.5.13 Grant Parity Error Register

| 31 – 12 (24 23) | 11 – 0 (7) | Address Offset |
|---|---|---|
| reserved | Grant Link Parity Status | 0x80E8 |

Bit 11: Link 11

Bit 10: Link 10

....

Bit 0: Link 0

When a grant parity error is detected, the register should be read to determine which link had the error. Writing a 1 to the bit in this register which is causing the interrupt, will clear the interrupt as well as the bit.

7.2.5.14 Grant Sequencing Error Register

| 31 | | | | 24 23 – 16 12 | | | | | 11 – 0 (7) | Address Offset |
|---|---|---|---|---|---|---|---|---|---|---|
| 0 | 0 | 0 | 0 | Mapper Sequencing Status | 0 | 0 | 0 | 0 | DeMapper Sequencing Status | 0x80EC |

When a Sequencing Error is detected, this register should be read to determine the input or output link which has generated the error. Write a 1 to the offending bit to clear the interrupt.

Proprietary and Confidential Information of Onex Communications Corporation

Bit 24: Output Link 11

....

Bit 16: Output Link 0

Bit 11: Input Link 11

....

Bit 0: Input Link 0

7.2.5.15 Grant Destination Error Register

| 31 — 24 | 23 — 16 | 15 — 8 | 7 — 0 | Address Offset |
|---|---|---|---|---|
| Stored Grant[47:16] | | | | 0x80F0 |
| Stored Grant[15:0] | | reserved | | 0x80F4 |

This read only register allows the system to read back a grant which was caused by a wiring configuration error. Any grant which does not adhere to its input link 'imask' configuration will be latched in this register and cause an interrupt (if enabled to do so). If multiple links have errors on them, only the 'last link' (ie higher numbered) will be captured.

7.2.6 Software Notes

RESERVED

*Proprietary and Confidential Information of Onex Communications Corporation*

8 Control Protocol

RESERVED.

8.1 Host Interface

RESERVED.

8.2 In-Band

RESERVED.

8.2.1 Message Format

RESERVED.

8.2.2 Method of Operation - Transmitting ASIC

RESERVED.

8.2.3 Method of Operation - Receiving ASIC

RESERVED.

*Proprietary and Confidential Information of Onex Communications Corporation*

9 Clock Definitions

The Switch ASIC has four main functional clock domains: core_clk, global_byte_clk, link_byte_clk, and link_serial_clk (The Switch also supports JTAG and the associated TCLK domain). These clocks are generated from two primary input reference clocks: link_ref_clk and sw_ref_clk. A top level view of the clock domains is shown in Figure 9-1. The link_serial_clk clocks are generated within the receive core and transmit core. This are shown in Figure 9-2 and Figure 9-3.

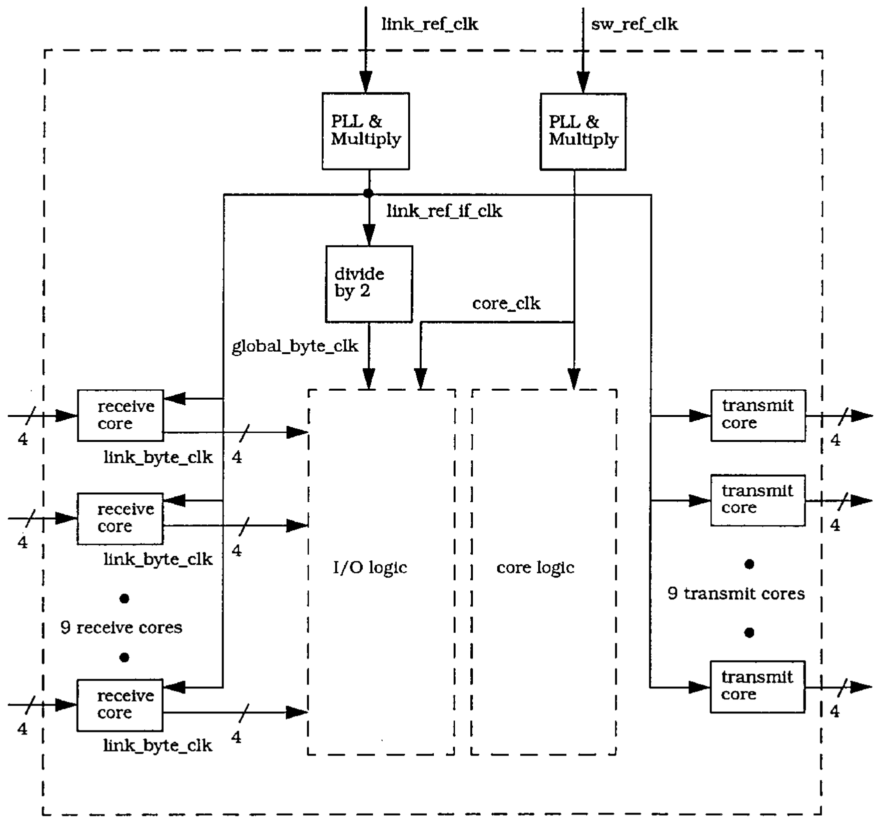

Figure 9-1: Switch ASIC Clock Domains

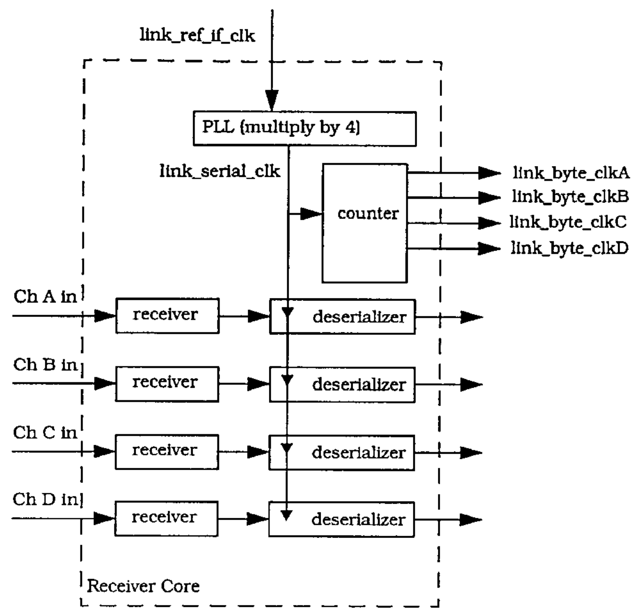
Figure 9-2: Receiver Core Clock Scheme

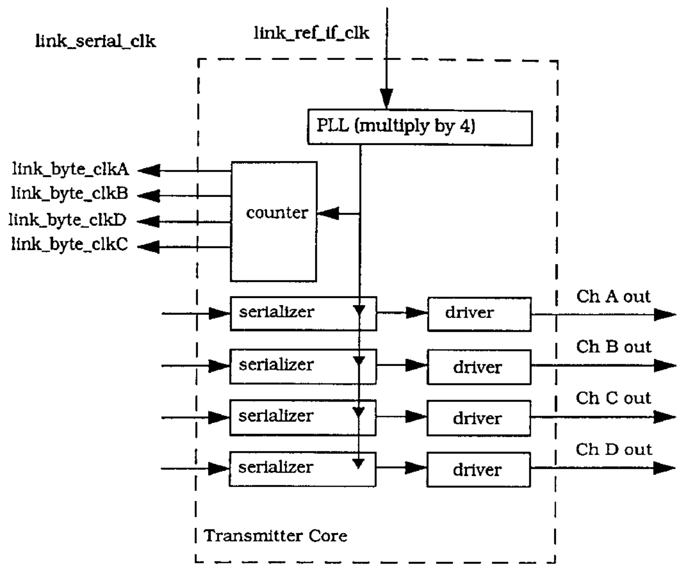

Figure 9-3: Transmitter Core Clock Scheme

9.1 Sw_ref_clk

This is the reference clock used to generate core_clk. This clock is multiplied by TBD to create core_clk.

9.2 Link_ref_clk

This is the reference clock used to generate link_ref_if_clk. This clock is multiplied by TBD to create link_ref_if_clk. The selection of this clock is based on the desired frequency for the link_serial_clk. There are, however, two additional requirements. The link_ref_clk must have a frequency that is an integer multiple of 72 KHz and must be frequency locked to the generation of the global synchronization signal sor_sync. The need for this requirement is discussed in Section 10.

9.3 Link_ref_if_clk

This clock is used as a reference clock by the transmitter and receiver cores to generate the serial clocks and the byte clocks. As is shown in Figure 9-2 and Figure 9-3, the transmitter and receiver cores contain a multiply by 4 of the incoming reference clock. Therefore, link_ref_if_clk must be operating at 1/4 the rate of the desired serial interface frequency. Assuming the following:

- 72 KHz row time
- 1700 slots (@36 bits per slot) per row
- row data is parsed across 2 serial lines With the above assumptions, the minimum serial frequency is 2.2032 GHz. This implies a link_ref_if_clk frequency of 2.2032/4 = 550.8 MHz.

9.4 Link_serial_clock

The link_serial_clock is generated within each transmitter and receiver core. As discussed Proprietary and Confidential Information of Onex Communications Corporation above, this clock must have a minimum frequency of 2.2032 GHz to support the data throughput requirements.

9.5 Link_byte_clk

The link_byte_clk is generated within each transmitter and receiver core. Each serial input or output channel generates a distinct link_byte_clk. This clock operates at 1/8 of the link_serial_clock and is used to latch the byte data to the transmitter core and from the receiver core. All link_byte_clk's are frequency locked, but there is no guaranteed phase relationship.

9.6 Global_byte_clk

The global_byte_clk is generated by dividing link_ref_if_clk by 2. Thus, it is the same frequency as the link_byte_clk's, but there is no phase relationship. However, because they are sourced from the same reference, global_byte_clk and all the link_byte_clk's are frequency locked.

9.7 Core_clk

RESERVED

*Proprietary and Confidential Information of Onex Communications Corporation*

10 Synchronization

Within the iTAP architecture, there are two levels of synchronization. The lower level is a point to point synchronization between serial channels. Each serial channel transmits a framing pattern at a user programmable rate (the default is 72 MHz). each receiving serial channel will then synchronize itself to the framing pattern. Once this occurs, the serial channel is considered synchronized. More specific details of this level of synchronization are provided in Section 11.2. A higher level of synchronization involves synchronizing multiple data links within the Switch itself, and at the highest level synchronizing all of the Switches and Port Processors. The methodology to do that is discussed in this section.

The iTAP architecture requires that row data move across the switch fabric in lock step fashion. During each row time (72 MHz), a Switch ASIC will be transmitting the previous row's data and receiving the next row's data. All switching within the Switch ASIC is based on the fact that the input row data is slot aligned prior to switching. To achieve global synchronization, a globally distributed synchronization pulse, sor_sync, is provided to all Switch ASICs. (The Port Processor ASICs are synchronized with the assistance of the Switch ASICs, see Section 10.5). Sor_sync is a 72 KHz signal with the following system requirements:

- Worst case delta between any Switch ASIC receiving the sor_sync pulse must not exceed 16 ns.
- The minimum high time and minimum low time of the sor_sync pulse must be greater than two global_byte_clk clock cycles.
- The generation of the sor_sync pulse must be sourced from the same reference clock that is used to generate the link_ref_clk to ensure a signal that is frequency locked to global_byte_clk.

As mentioned above, the sor_sync pulse is allowed some delta in its arrival time to each Switch ASIC. With this signal being used as a reference to start the transmission of row data, it is obvious that row data arriving at a destination switch will not be slot aligned. In addition, there are possible electrical deltas in the routing of the serial lines. Because the electrical delay delta between Switch input ports effects the overall delay to compensate for, the following system requirement is placed on the serial LVDS lines to/from the Switches:

- Between any two Switches, the worst case electrical delay from a transmitting device to a receiving device must not exceed 16 ns.

In addition, the global sor_sync signal must be synchronized to each Switch ASIC. This may result in an additional one global_byte_clk cycle of difference between Switch ASICs. All of these possible worst case deltas are summed up and illustrated in Figure 10-1. A pictorial interconnect is show in Figure 10-2.

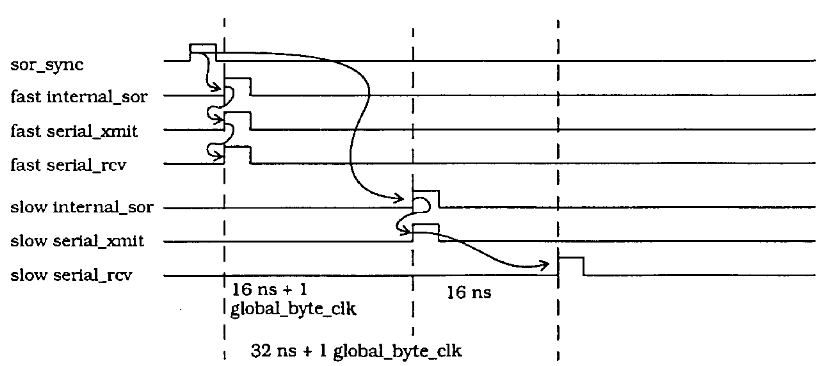

Figure 10-1: Worst Case Serial Data Arrival at Switch

Proprietary and Confidential Information of Onex Communications Corporation

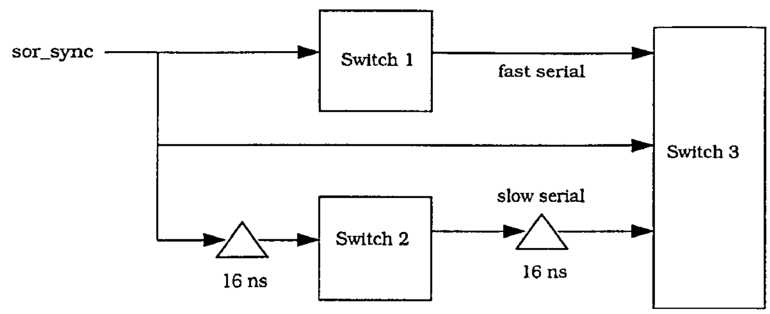

Figure 10-2: Worst Case Switch Layout Scenario

To compensate for the delta in the receipt of serial data, the Switch ASIC uses buffering logic to store data from each input port until it is guaranteed that all input ports have started to receive data. At this point in time, data can begin to be switched. This, however, creates an additional problem. By delaying the start of the switching relative to the start of row implies that an entire row of data cannot be switched by the end of the row time. The solution is that the link overhead field of the row is not switched. The link overhead field contains information that is used between connecting devices only and is generated by the output port logic.

10.1 Internal Synchronization

Once the Switch ASIC is operational (i.e. following PLL spin up, Tensilica boot, etc.), the input port control logic will be instructed from the core to initiate its synchronization. To do this, the Switch ASIC samples the sor_sync signal in the global_byte_clk domain. When the first rising edge is detected on the sor_sync signal, the Switch ASIC will start an internal counter, switch_sor_counter. Each row time, this counter counts from 1 to ROW_SIZE where ROW_SIZE is the number of bytes transfered on a serial channel during one row time. Several internal events are triggered based on the value of this counter. A summary of the programmable regsisters used to control these events can be found in Table 11-11.

Due to electrical changes at the system level (based on voltage, temperature, etc.) and the fact that the sor_sync signal is asynchronous to global_byte_clk, it is possible that the relative position of the rising edge of the registered version of sor_sync compared to the rising edge of switch_sor may vary from row to row. However, because the sor_sync signal is frequency locked to global_byte_clk, the delta should never exceed +/- 2 global_byte_clk cycles. Error logic within the port control logic will monitor the delta and set an error flag if the delta exceeds a user programmable value.

Once the Switch ASICs have started their respective switch_sor_counters, they are all synchronized to each other within a predictable worst case delta. This worst case delta is equal to 16 nS plus one global_byte_clk period. The 16 ns is from the maximum delta on the sor_sync line (see above). The global_byte_clk period is due to the fact that the Switch ASIC port clocks are asynchronous to each other and asynchronous to the sor_sync signal.

10.2 Data Channel Synchronization

To achieve the necessary bandwidth, the data link is split across two serial lines or channels. The first stage of synchronization within the Switch is to synchronize each pair of channels. This compensates for any electrical delta between the channels that make up a link. This also places a requirement on the electrical delta between the serial channels that make up a link:

- Between any two serial data channels that make up a data link, the worst case electrical delta must not exceed 2 ns.

The data alignment of two serial channels is accomplished using a ring buffer and is discussed further in Section 11.2.

10.3 Slot Data Synchronization

As mentioned previously, within the Switch ASIC all input ports must present synchronized slot data to the core. Each device (Switch and Port Processor) will transmit serial data based on its own internal sor signal. To compensate for the deltas in arrival time of incoming data as shown in Figure 10-1, each serial input channel has a data slot FIFO (see Section 11.2.2.1). As shown in Figure 10-1, the worst case delta between any input port is 32 ns plus 1 global_byte_clk. Thus, the slot data FIFO must be large enough to buffer the quantity of data that can be written in this time period.

To slot align the data inputs, all slot data FIFOs must be read simultaneously. To achieve this goal, a delayed version of the switch_sor signal is used to start the read. Based on the frequency of global_byte_clk and the information presented above, it is possible to determine a delay value relative to the switch_sor signal when slot data will be available from all input ports. For example, Figure 10-3 shows that for the worst case scenario if the receiving Switch ASIC waits "32 ns + 3 global_byte_clk's" from its switch_sor, then slot data from all ports will be available. The 32 ns value will translate into a certain number of global_byte_clk's once the frequency for global_byte_clk is selected. The offset will be programmable and the FIFO will be sized to accommodate the fastest possible global_byte_clk that will allowed.

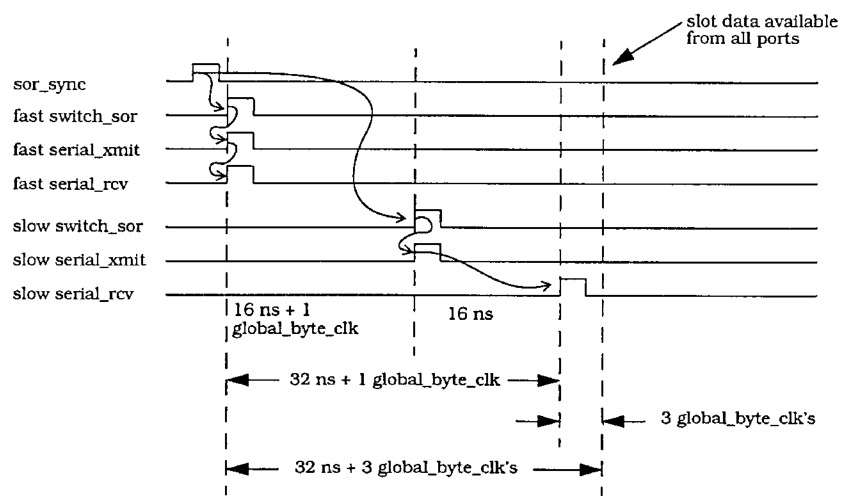

Figure 10-3: Worst Case Slot Data Available in Switch

There is also an additional consideration in determining the size of the slot data FIFO. Starting with the system layout shown in Figure 10-2, the sor_sync feeding the destination Switch is now the slow version as shown in Figure 10-4. Using the previous assumption that the Switch starts reading slot data at a time offset of "32 ns + 3 global_byte_clk's" from the switch_sor, then the slot data FIFO must be large enough to accommodate "48 ns + 4 global_byte_clk's" worth of data. This is shown in Figure 10-5. The reason for this addition requirement is because it is not know if the system

*Proprietary and Confidential Information of Onex Communications Corporation* has the layout/timing properties shown in Figure 10-2 or Figure 10-4. The switch must be designed to support both scenarios.

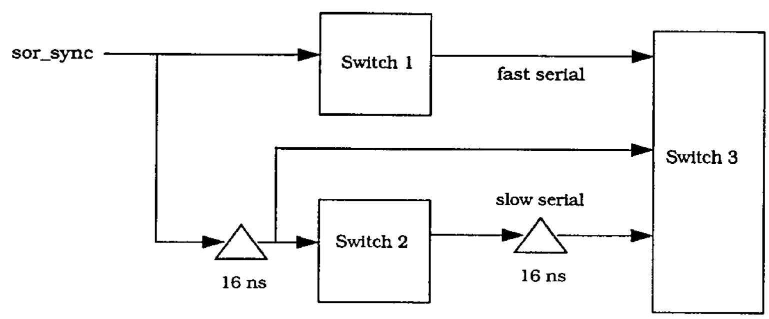

Figure 10-4: Alternate Worst Case Switch Layout Scenario

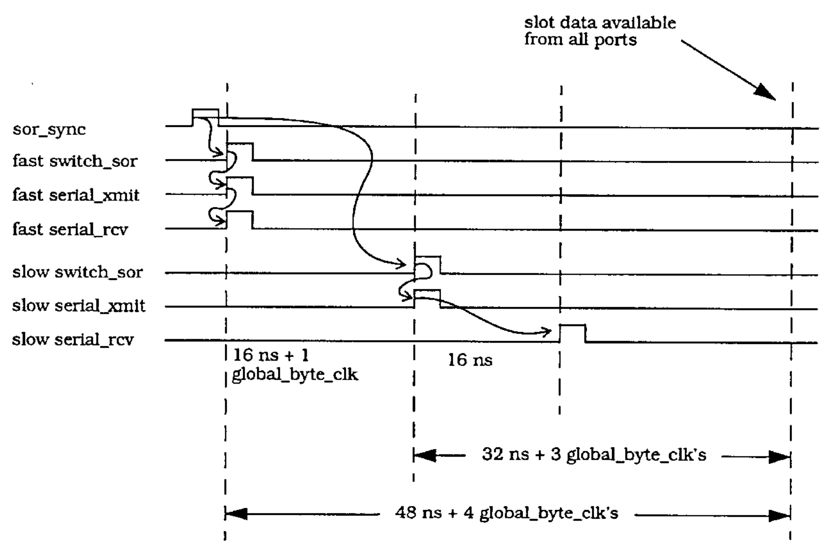

Figure 10-5: Worst Case Slot Data FIFO Requirement

To support the require slot count of 1700 slots/row, the global_byte_clk must operate at 275.4 MHz. This translates to a receive slot rate of 8.17 ns/slot. The global_byte_clk to slot ratio is 2.25 global_byte_clk's per slot. Therefore, assuming the 275.4 MHz global_byte_clk rate, the data slot FIFO needs to be 8 slots deep based on the following:

- 48 ns => 6 slots
- 4 global_byte_clk's => 2 slots

The slot numbers are rounded up to the nearest integer. With a FIFO depth of 8 slots, the Switch can support a maximum global_byte_clk rate of 291.6 MHz which translates to 1800 slots/row.

10.4 Grant Packet Synchronization

The grant lines will synchronize in a fashion very similar to the data lines. One difference is the fact that there is only one grant input per port and therefore there is no channel synchronization required. The grant line, however, does need to pass from the link_byte_clk domain to the global_byte_clk domain. Although a three stage ring buffer could do this, the grant channels will use the same four stage ring buffer being used by the data channels (for design simplification only). The grant lines are subject to the same constraints as the data lines and therefore the grant packet FIFO must be able to buffer the same amount of data. Therefore, the grant packet FIFO will also be sized at 8 slots.

10.5 Port Processor Synchronization

As described above, all Switch ASICs receive a globally distributed sor_sync signal. This is used to synchronize their start of row timing. The Port Processor ASICs do not receive such a signal. In the iTAP system, it is possible for the Port Processor to be remotely located from the switch fabric and it would be impossible to meet the 16 ns worst case delta on the sor_sync line and the 16 ns maximum electrical delay to the Switch ASICs. The Switch ASICs, however, must still receive row data from the Port Processors that is synchronized, within the limits discussed above, to the globally distributed sor_sync line.

10.5.1 Switch ASIC Requirements

Similar to the Switch, the Port Processor has an internal counter used to maintain a 72 KHz synchronization signal. Following initialization, the Port Processor will start its 72 KHz synchronization counter and begin transmitting idle frames on its data links. As part of its standard input channel synchronization (see Section 11.2.1), the Switch input logic will synchronize to the framing pattern on the data links. Once synchronization is complete, the Switch input link(s) are now synchronized to the Port Processor start of row. There is a valid region centered about the switch_sor signal in which it is acceptable for the Port Processor start of row to be located. This is shown in Figure 10-6. If the Switch is receiving a start of row from the Port Processor within the window shown in Figure 10-6, then the Port Processor is synchronized to the Switch within acceptable limits. If not, then the Port Processor needs to be adjusted.

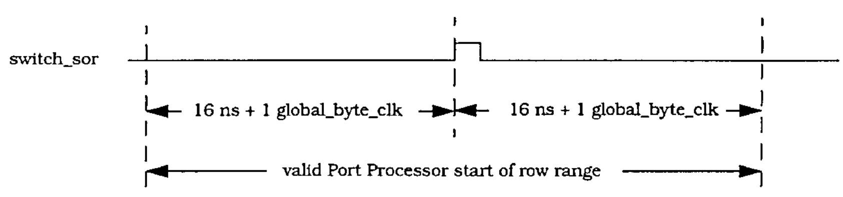

Figure 10-6: Valid Port Processor Start of Row Window

To adjust the Port Processor, the Switch must measure the difference between switch_sor and the received start of row from the Port Processor. The delta, in terms of global_byte_clk's, is always measured from the rising edge of switch_sor to the rising edge of the Port Processor start of row, as shown in Figure 10-7. The delta shown in Figure 10-7 is measured every row time. The measured delta is registered in the sync_offset_countN register (where 0<= N =< 11, one for each port) which is readable by the Tensilica processor.

*Proprietary and Confidential Information of Onex Communications Corporation*

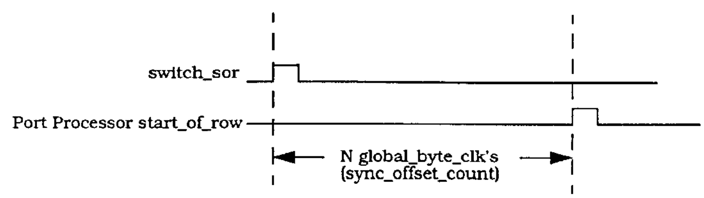

Figure 10-7: Determination of sync_offset_count

To aid with synchronizing the Port Processor, two bits are passed to the Port Processor in the link overhead field of the grant channel. These bits and their definition are summarized in Table 10-8.

Table 10-8: Port Processor Synchronization Bits

| pp_synced | pp_not_synced | Comments |
|---|---|---|
| 0 | 0 | Switch has not determined if Port Processor is synced to Switch. This case only occurs when the Switch has not synchronized (or lost sync) to the data link. |
| 0 | 1 | Port Processor start of row is not within acceptable limits of switch_sor. |
| 1 | 0 | Port Processor start of row is within acceptable limits of switch_sor. |
| 1 | 1 | Invalid. Hunt the designer down like a wild animal. |

Once the data link is synchronized, the Switch will check the position of the Port Processor start of row as shown in Figure 10-6. If the start of row falls within the allowable range, the pp_synced bit is set. Otherwise the pp_not_synced bit is set. In addition, the measured offset as shown in Figure 10-7 (sync_offset_count) is also inserted into the link overhead of the grant channel. (A complete definition of the link overhead field can be found in Table 11-12).

In the link overhead field of the data link, the Switch will monitor the pp_sync_done bit. This bit is set by the Port Processor once it has become synchronized to all Switches that it is connected to.

10.5.2 Port Processor Requirements

The Port Processor must be running an internal synchronization loop at a 72 KHz rate similar to what is being done in the Switch (see Section 10.1). Following a reset, the Port Processor will start its internal synchronization counter and begin transmitting idle packets with a valid framing pattern on its data links. If two ports are being used, then both ports must be transmitting the idle packets on their respective data links. The Port Processor will monitor the two bits of the link overhead section identified in Table 10-8.

If only one port is being used, then the Port Processor simply examines the pp_synced and pp_not_synced bits and determines a course of action. If the pp_synced bit is set, then the Port Processor will set the pp_sync_done bit in the link overhead field of the corresponding data link. After this, the Port Processor is good to go. If the pp_not_synced bit is set, then the Port Processor will adjust its internal synchronization based on the sync_offset_count value. This will cause the Switch to loose and then regain sync on the data link. Following this, the Port Processor should be synchronized to the Switch and the pp_synced bit should be set. If not, the adjustment procedure can be repeated. Once the Port Processor detects that the pp_synced bit is set, it must set the pp_sync_done bit.

If both ports are being used, the method to determine how to adjust the internal

*Proprietary and Confidential Information of Onex Communications Corporation* synchronization counter becomes more complicated. If both ports respond with the pp_synced bits set, then the Port Processor only has to set the pp_sync_done bit and is good to go. Otherwise, the Port Processor adjust its internal synchronization. When two ports are being used, the goal is to center the Port Processor's synchronization between the two offsets received. In general, this would imply averaging the two offset values received. This method works except for the scenario shown in Figure 10-9. Based on the figure, assume the row time to be 100 clocks. Based on a random start, the Port Processor's internal sor falls somewhere in between the sor for switch1 and switch2. In particular, the Port Processor's sor is two clocks after switch1_sor and 4 clocks before switch2_sor. Thus the perfect adjustment for the port_processor_sor is to delay it by one clock and therefore center it between switch1_sor and switch2_sor. However, based on the fact that the sync_offset_count value is always measured from the switch_sor to the port_processor_sor, the following values are obtained:

- switch1_sor to port_processor_sor = 2
- switch2_sor to port_processor_sor = 96

Averaging these two numbers gives a result of 49, which would be an incorrect adjustment. The correct method is as follows. Based on the information shown in Figure 10-1, the largest delta between sync_offset_count's from two Switch ASICs is "32 ns + 1 global_byte_clk". Based on the global_byte_clk frequency, the 32 ns will translate into some number of global_byte_clk's. If the delta between sync_offset_count's from two Switch ASICs is greater than "32 ns + 1 global_byte_clk", then the scenario shown in Figure 10-9 has occurred. To calculate the adjustment, the row time (in this case 100) needs to be subtracted from the larger value (in this case 96). This value is then added to the smaller value and the result is averaged. Thus the algorithm is:

```
if mag(sync_offset_count1 - sync_offset_count2) > TBD programmable value
 adjust = (row_time - max(sync_offset_count1 - sync_offset_count2) +
        (min(sync_offset_count1 - sync_offset_count2))/2
else
 adjust = ave(sync_offset_count1 + sync_offset_count2)
```

A positive adjust implies delaying the port_processor_sor and a negative adjust implies advancing the port_processor_sor.

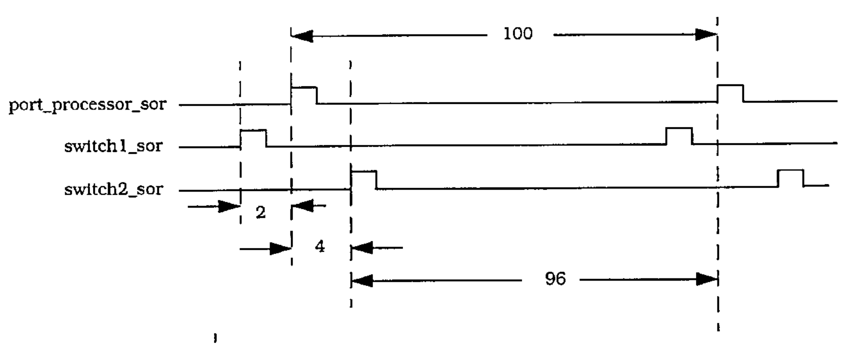

Figure 10-9: Special Case of Port Processor Synchronization Adjustment

Once the adjustment has been made, this will cause the Switch to loose and then regain sync on the data link. Following this, the Port Processor should be synchronized to both Switches and the pp_synced bit from both Switches should be set. If not, the adjustment procedure can be repeated. Once the Port Processor detects that the both pp_synced bits are set, it must set the pp_sync_done bit.

Proprietary and Confidential Information of Onex Communications Corporation

10.6 Error Monitoring

The iTAP architecture requires that all ASICs (Switches and Port Processors) remain synchronized, within the limits previously defined. Based on the fact that all ASICs are frequency locked, once the system is synchronized it should not drift out of synchronization. Provided that the individual serial channels remain synchronized (i.e. consistent framing pattern), the only way for the devices to drift out of sync with respect to each other is if their link_ref_clk's (see Section 9) are not truly frequency locked. This is a design requirement of the iTAP system and this type of problem should only arise due to some type of hardware problem. The methods to detect these types of errors are discussed below.

As mentioned in Section 10.1, once the Switch ASIC has its internal synchronization counter running, it constantly monitors the rising edge of the incoming sor_sync signal and compares it to its own switch_sor. Due to clock jitter and crossing clock boundaries, it is possible for the sor_sync signal to move slightly with respect to switch_sor. A window of +/- 2 global_byte_clk's is considered acceptable. If the rising edges of the signals vary more than this, an interrupt will be sent to the Tensilica.

The synchronization between the Port Processor and the Switch is also constantly monitored by the Port Processor. Once the Port Processor is synchronized to the Switch(es), it should never see the pp_not_synced bit set. If this occurs, it implies that the Port Processor and the Switch are not frequency locked.

Proprietary and Confidential Information of Onex Communications Corporation

11 Switch Ports

The Switch ASIC has 12 input ports and 12 output ports. Each input port to the Switch consists of 3 serial lines: 2 for data with request and one for grant. Each output port from the Switch also consists of 3 serial lines: 2 for data with request and one for grant. These lines are implemented as LVDS, Low Voltage Differential Signaling.

11.1 Serial Data Stream Format

The structure of a data/request row is shown in Figure 2-2. Splitting the row across two serial channels results in the serial data stream shown in Figure 11-1. The payload section contains 840 slots. The link overhead contains 10 slots (the contents of the link overhead field are listed in Section 11.6). Added to the end of the serial stream is a discard field containing a user programmable number of bytes that are always discarded. The required row time is 72 KHz (see Section 10) and therefore the size (in bits) of the entire serial stream will determine the clock frequency for the serial interface. The discard field allows some flexibility in the selection of the serial clock frequency.

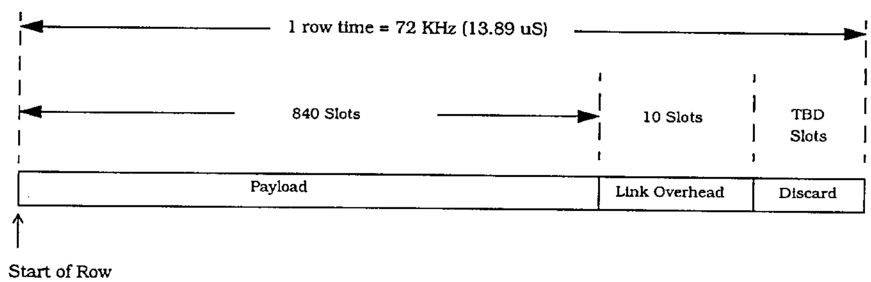

Figure 11-1: Data/Request Serial Stream Partitioning

11.2 Input Port

A top level view of the input ports is shown in Figure 11-2. A description of the signals is provided in Table 11-3. Several of the output buses are replicate N times, where 0<N<11, one for each link.

*Proprietary and Confidential Information of Onex Communications Corporation*

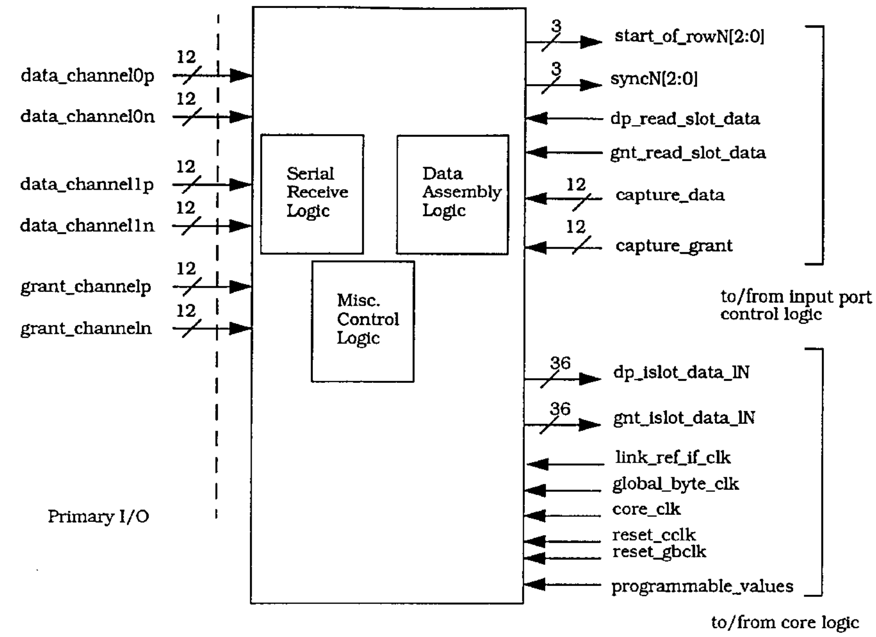

Figure 11-2: Switch Input Ports

Table 11-3: Input Port Signal Descriptions

| Signal Name | Width | Direction | Description/Comments | Source/ Dest | Active State |
|---|---|---|---|---|---|
| data_channel0-1p(n) | | input | Differential serial lines used for data. Data and request are parsed across two channels to achieve the necessary 3.8 Gbps bandwidth. | | NA |
| grant_channelp(n) | | input | Differential serial line used for the incoming grant information. | | NA |
| start_of_row[2:0] | | output | When active, indicates the receipt of the start of row on the corresponding serial channel. | | High |
| sync[2:0] | | output | When active, indicates that the corresponding serial channel is synchronized. | | High |
| read_slot_data | | input | A data slot will be read from the input port for every core_clock in which read_slot_data is high. | | High |
| read_grant_data | | input | A grant packet will be read from the input port for every core_clock in which read_grant_data is high. | | High |
| capture_data | | input | When this signal is active, at the start of the next frame all data channel input FIFOs (associated with the respective port) will start writing data and continue to write data until the signal is inactive. | | High |

*Proprietary and Confidential Information of Onex Communications Corporation*

Table 11-3: Input Port Signal Descriptions

| Signal Name | Width | Direction | Description/Comments | Source/ Dest | Active State |
|---|---|---|---|---|---|
| capture_grant | | input | When this signal is active, at the start of the next frame the grant channel input FIFO will start writing data and continue to write data until the signal is inactive. | | High |
| link_ref_if_clk | 1 | input | Clock used by the deserializer/clock recovery logic (see Section 9). | | NA |
| global_byte_clk | 1 | input | Clock used by the port logic (see Section 9). | | NA |
| core_clk | 1 | input | Clock used by the core logic (see Section 10). | | NA |
| reset_cclk | 1 | input | ASIC reset, synchronized to the core clock. When active, all registers are synchronously placed into a know state. Reset must remain active for a minimum of TBD byte clocks. | | Low |
| reset_gbclk | 1 | input | ASIC reset, synchronized to the global byte clock. When active, all registers are synchronously placed into a know state. Reset must remain active for a minimum of TBD byte clocks. | | Low |
| programmable_values | | input/ output | The input port has several programmable registers as defined in Table 11-11. | | NA |

11.2.1 High Speed Serial Input Logic Blocks

All high speed serial inputs have a common front end as shown in Figure 11-4. Basic operation is as follows. Serial data is converted to byte wide data and then passed through a descrambler to a four stage ring buffer. The ring buffer is used to compensate for differential arrival times of the serial data across two serial lines and to provide the ability to transfer across clock domains. The byte data is also passed to frame detection logic that finds a framing pattern and provides bit shift information to the deserializer. Prior to being used to communicate data, each line must be bit aligned at the receiver. Once this is done, the receiving logic must be synchronized to a framing pattern. After completing this, the serial link is considered synchronized.

There are four different clock domains that are associated with the port logic: core_clk, global_byte_clk, link_byte_clk, and link_serial_clk. Detailed information about these clocks can be found in Section 9. Referring to Figure 11-4, the link_serial_clk is used in the deserialzer and clock recovery logic. The output side of the ring buffer is operated in the global_byte_clk domain. All other logic shown in Figure 11-4 is operated in the link_byte_clk domain.

*Proprietary and Confidential Information of Onex Communications Corporation*

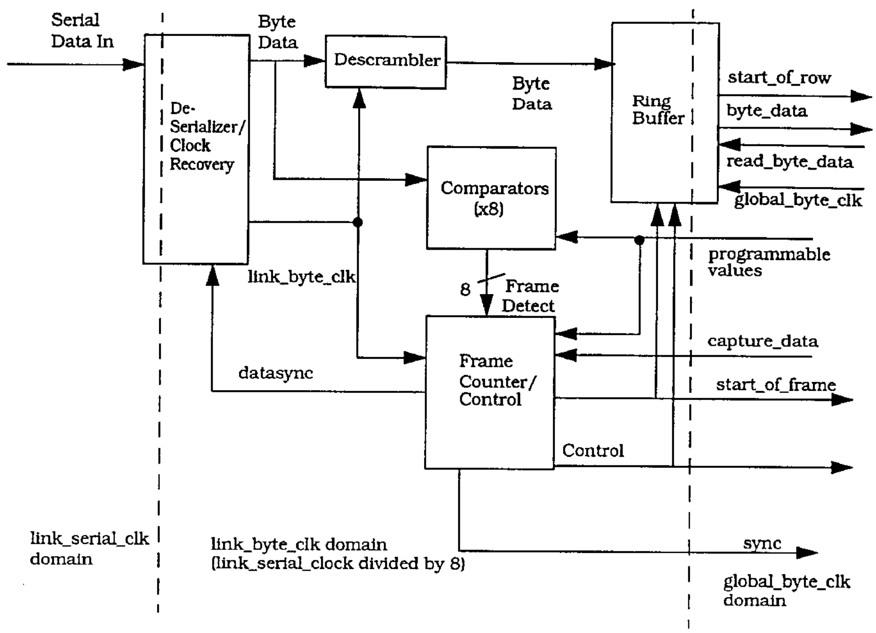

Figure 11-4: High Speed Serial Input Functional Block Diagram

11.2.1.1 Deserializer

Serial data enters a high speed deserializer. In this logic, a clock recovery of the transmitting clock is made and the serial data is converted to a byte wide output. The byte wide data is made available as well as link_byte_clk (/8 of the recovered clock). The logic also has an input, datasync, that allows a one bit shift of the output byte data every time the bit_shift line is toggled. This logic will be provided as IP by the ASIC vendor.

11.2.1.2 Descrambler

The descrambler uses a 1+x^6+x^7 polynomial identical to the one used for SONET. All serial data is scrambled using a corresponding scrambler before being transmitted. The descrambler is reset to it's initial seed value of all 1's at the start of every frame. As is shown in Figure 11-4, data is taken directly from the deserializer block to the Comparators block (used to detect the framing pattern). The two byte framing pattern is not scrambled on the transmit side and therefore it is not required to be de-scrambled on the receiving side. All other data is scrambled and must be descrambled before being written to the FIFO.

11.2.1.3 Comparators

The comparators compare the byte data to a programmable two byte framing pattern and provide a frame_detect output. To improve the speed at which framing synchronization can be made or re-established when lost, there are actually 8 parallel comparators. Each comparator is comparing the framing pattern to one of 8 possible shifted versions of the input data. Based on the comparator that detects the framing pattern, the deserializer can be instructed to shift the appropriate number of bits.

*Proprietary and Confidential Information of Onex Communications Corporation*

11.2.1.4 Frame Counters and Control

The frame counter is used in conjunction with the frame detect to detect and ensure a correct framing pattern. Once a framing pattern has been detected, the frame counter will check to ensure that the framing pattern is detected in the same position of each incoming row of data. After receiving a programmable number of consecutive correctly placed framing patterns, the sync line will be set indicating that the interface is synchronized. Once the interface is considered synchronized, the start_of_row output will be pulsed at the start of each row of data. Any frame of data in which the framing pattern is not correctly detected will result in the generation of a framing_error. After a programmable number of consecutive framing errors, the sync line is reset and the interface is now considered not synchronized. At this time, the interface will attempt to re-establish sync.

In addition to data, a start_of_row bit is also written to the ring buffer. The start_of_row bit will be set high to coincide with the first byte of data in each row.

11.2.1.5 Ring Buffer

The ring buffer serves two purposes. First, it allows the two data serial lines to be synchronized at the byte level. The necessity for this is discussed below. Second, it provides a method to cleanly transfer data across clock boundaries. The write side frequency is operating from a link_byte_clk clock. The read side is operating at the same frequency, but from the global_byte_clk clock. There is no phase relationships between the clocks, but they are frequency locked such that overrun/underrun conditions will not occur within the ring buffer.

The ring buffer is implemented using four stages. Two stages are required to cleanly transfer data from the link_byte_clk domain to the global_byte_clk domain. A third stage provides buffering to allow a one link_byte_clk clock difference between the receipt of serial data on the two serial lines comprising the data link. This is required because on the transmitting side, the link_byte_clk's are frequency locked but not phase locked. A fourth stage is added to compensate for electrical deltas between the two serial lines comprising the data link. Assuming a byte rate of 275.4 MHz, an electrical delta of 3.6 ns can be compensated for with the additional buffer stage.

11.2.2 Input Data Line Grouping

To support its maximum capability, the iTAP architecture requires a bandwidth of 3.8 Gbps on each data/request port.

Data/request is always presented to the core as a 36 bit data slot plus an islot_start_of_row control bit. The islot_start_of_row control bit will be high when the corresponding slot is the first slot of the row. Otherwise, islot_start_of_row will be low. To assemble the byte data from the two serial channels, one byte is read from each ring buffer and concatenated into an 16 bit wide word with serial channel 0 always as the MSB. Reading from the ring buffer continues in this manner with the new 16 bit word being concatenated to the LSB of the previous word. The concatenated data is then parsed into 36 bit slots and stored in a FIFO. A separate top level control module (see Section 11.3) will control the reading of the slot data.

The start of row control bit from all data channels is compared to ensure that all channels are aligned. If there is a discrepancy, an error flag is set and the misalignment counter for the corresponding data channel is incremented. The data misalignment counter is three bits and will stop incrementing once it has reached its maximum value. An error counter size of only three bits is based on the fact that a start of row misalignment can only be caused by the data channel loosing sync or a spurious glitch in the data assembly logic. In the first case, loosing sync implies that the channel is down, all data is voided, and the channel will be reset once sync is re-established. In the latter case, a single error over an extended period might be in the realm of possibilities. However, several errors in a row probably indicates that the data assembly logic is out of sync and needs to be reset.

As was shown in Figure 11-4, the write side of the ring buffer is in the link_byte_clk domain. The read side of the data channel assembly logic operates in the core_clk domain. All other logic associated with Figure 11-5 operates in the global_byte_clk domain.

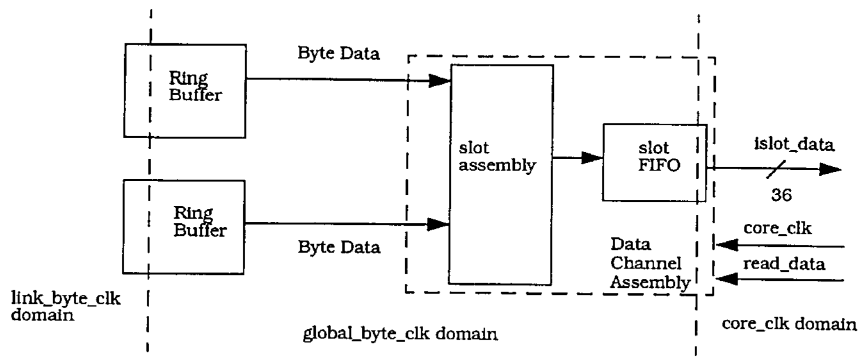

Figure 11-5: Channel Assembly for Serial Data Channels

11.2.2.1 Data Slot FIFO

The slot FIFO serves two functions: transferring slot data from the global_byte_clk domain to the core_clk domain and provide buffering to allow slot alignment of all input ports. As documented in Section 10.3, the slot FIFO should be sized at a minimum of 8 slots. The read and write domains of the slot FIFO are totally asynchronous and have no relationship to each other. Based on the clocking requirements (see Section 9) it is guaranteed that the read rate is faster than the write rate. Therefore, the FIFO logic does not need to support a "full" condition. To ensure correct operation, Johnston counters will be used to monitor read and write pointers.

11.2.3 Grant Packets

The grant channel is handled in a similar manner to the data channels. The main difference is that the grant interface consists of only one serial channel. Therefore, the slot assembly only requires assembling and partitioning data from one serial stream. As a result of this, the grant slot FIFO needs to only be 4 slots deep (see Section 10.4). The read and write domains of the slot FIFO are totally asynchronous and have no relationship to each other. Based on the clocking requirements (see Section 9) it is guaranteed that the read rate is faster than the write rate. Therefore, the FIFO logic does not need to support a "full" condition. To ensure correct operation, Johnston counters will be used to monitor read and write pointers.

11.3 Input Port Control

To support the iTAP architecture, the core logic must receive input data that is synchronized across all 12 input ports (data and grant). To achieve this, a top level input port controller is used to synchronize events across all input ports (the synchronization methodology is described in detail in Section 10). A top level view of the input port control is shown in Figure 11-6. A description of the signals that interface to the core is provided in Table 11-7. A description of the signals that interface to the input port logic is provided in Table 11-3.

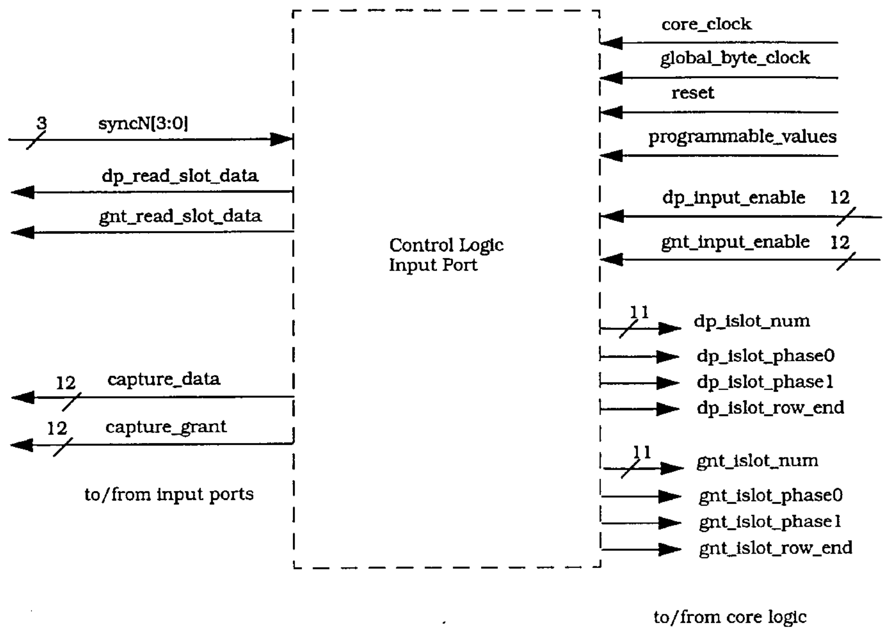

Figure 11-6: Top Level View of the Input Port Control Logic

Table 11-7: Input Port Control Logic Signal Descriptions

| Signal Name | Width | Direction | Description/Comments | Source/ Dest | Active State |
|---|---|---|---|---|---|
| port_clock | | | Clock used by the port logic (see Section 9). | | NA |
| core_clock | | | Clock used by the core logic (see Section 9). | | NA |
| reset | | | ASIC reset. When active, all registers are synchronously placed into a know state. Reset must remain active for a minimum of TBD byte clocks. | | Low |
| idslot_num | 11 | output | Indicates the current input data slot number. | | |
| idslot_phase0 | 1 | output | This signal is asserted during the first cclk cycle for each new incoming data slot period. | | High |
| idslot_phase1 | 1 | output | This signal is asserted during the second cclk cycle for each new incoming data slot period. | | High |
| idslot_data | 36 | output | Current input data slot contents | | NA |

Table 11-7: Input Port Control Logic Signal Descriptions

| Signal Name | Width | Direction | Description/Comments | Source/ Dest | Active State |
|---|---|---|---|---|---|
| idslot_row_end | 1 | output | This input is asserted during the last data slot of the row. If the serial input links are configured to carry more than 1700 slots per row, then this input will be asserted for slots 1699 and higher. Speeding up the input links will only be done as part of the IC characterization, not intended for normal operation. | | High |
| igslot_num | 11 | output | Indicates the current input grant slot number. | | |
| igslot_phase0 | 1 | output | This signal is asserted during the first cclk cycle for each new incoming grant slot period. | | High |
| igslot_phase1 | 1 | output | This signal is asserted during the second cclk cycle for each new incoming grant slot period. | | High |
| igslot_data | 36 | output | Current input grant slot contents | | NA |
| igslot_row_end | 1 | output | This input is asserted during the last grant slot of the row. If the serial input links are configured to carry more than 850 slots per row, then this input will be asserted for slots 849 and higher. Speeding up the input links will only be done as part of the IC characterization, not intended for normal operation. | | High |
| sor_sync | | | Primary input sor_sync. | | NA |
| switch_sor | | | Internal synchronization signal (see Section 10.1). | | NA |
| programmable_values | | | The input port has several programmable registers as defined in Table 11-11. | | NA |
| valid_data | | | For every core_clock in which valid_data is high, the output slot_data contains valid slot data and must be latched in the current core_clock cycle. | | High |
| valid_grant | | | For every core_clock in which valid_grant is high, the output grant_data contains a valid grant packet and must be latched in the current core_clock cycle. | | High |
| core_ready_for_data | | | When active, this signal indicates that the core is ready to receive slot data. | | High |
| core_ready_for_grant | | | When active, this signal indicates that the core is ready to receive grant packets. | | High |
| error_information | | | Error information available to the core as described in | | NA |
| select_error_information | | | Selects which error information is made available to the core. | | NA |

11.4 Output Ports

A top level view of the output ports is shown in Figure 11-8. A description of the signals is provided in Table 11-9.

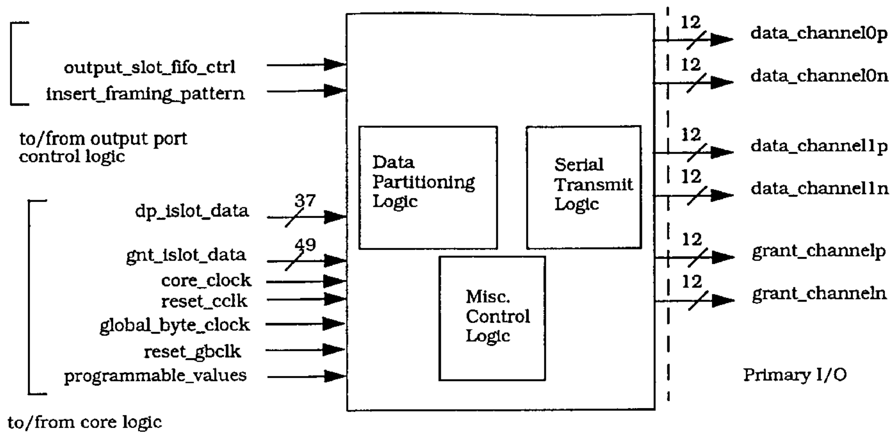

Figure 11-8: Switch Output Port

Table 11-9: Output Port Signal Descriptions

| Signal Name | Description/Comments | Active State |
|---|---|---|
| data_channel0-1 | Differential serial lines used for data. Data and request are parsed across both channels to achieve the necessary 3.8 Gbps bandwidth. | NA |
| grant | Differential serial line used for the out going grant information. | NA |
| data_source | Selects if the data transmitted on the serial data/request channels will be slot data (=1) or the idle pattern (=0). | NA |
| grant_source | Selects if the data transmitted on the grant channel will be grant data (=1) or the idle pattern (=0). | NA |
| insert_framing_pattern | When this signal is active, the user programmable framing pattern will be inserted into all the output serial channels. | High |
| load_data | When this signal is active, the output port logic will latch in the current value on the slot_data lines. | High |
| load_grant | When this signal is active, the output port logic will latch in the current value on the grant_data lines. | High |
| serial_clock | Clock used by the deserializer/clock recovery logic (see Section 9). | NA |
| port_clock | Clock used by the port logic (see Section 9). | |
| core_clock | Clock used by the core logic (see Section 9). | |
| reset | ASIC reset. When active, all registers are synchronously placed into a know state. Reset must remain active for a minimum of TBD byte clocks. | Low |
| slot_data[37:0] | The 36 LSBs ([35:0]) contain the out going slot data. The MSB ([35]) is high when the corresponding slot data contains the start of row. | NA |
| grant_data[48:0] | The 48 LSBs ([47:0]) contain an out going grant packet. The MSB ([48]) is high when the corresponding grant packet contains the start of row. | NA |
| programmable_values | The input port has several programmable registers as defined in Table 11-11. | NA |

11.4.1 High Speed Serial Output Logic Blocks

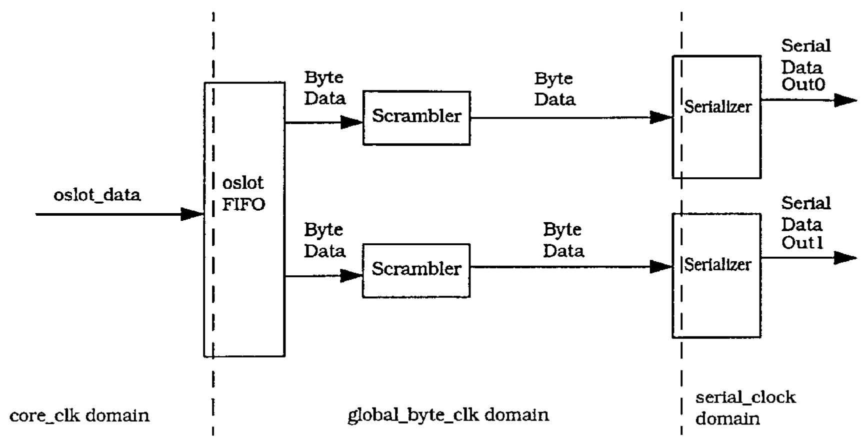

Figure 11-10: High Speed Serial Output Functional Block Diagram

11.4.1.1 Serializer

This logic will be provided as IP by the ASIC vendor.

11.4.1.2 Scrambler

The scrambler uses a 1+x^6+x^7 polynomial identical to the one used for SONET. The scrambler is reset to it's initial seed value of all 1's at the start of every row. The scrambler function is bypassed for the two bytes containing the framing pattern (i.e. the framing pattern is not scrambled).

11.4.1.3 Link Overhead Buffer

The link overhead buffer provides the source for the link overhead section of the serial data stream (see Section 11.1). The buffer can be sized at a maximum of 19 slot which are all accessible to the Tensilica processor. Currently the buffer is sized at TBD slots. Table 11-11 and Table 11-12 identify the currently defined usage of the link overhead.

11.5 Output Port Control

11.6 Link Overhead Information

As shown in Figure 11-1, all serial channels have an associated link overhead section. This information is discussed in Section 4.3.1.5.3. Because the link overhead data is not switched, it can only be used as a method to communicate between neighboring devices. The I/O logic makes available the synchronization status of each input serial line to be placed into the link overhead. This allows neighboring ASICs to know the synchronization status of their respective out going serial channels.

In addition, the sync_offset_count and sync_offset_count_valid values are made available to be inserted into the grant channel link overhead. More information about these fields can be found in Section 10.5.

11.7 Programmable Registers

*Proprieta: l Confidential Information of Onex Communica Corporation*

Each Switch port has associated with it the user programmable registers identified in Table 11-11. The Port/Chip column indicates if there is one register per port (P) or one register per chip (C).

Table 11-11: Switch Port Programmable Registers

| Name | Size (bits) | Default | Description |
|---|---|---|---|
| frame_size | 11 | | Size of a row in bytes for the serial data channels |
| frame_pattern | 16 | 0xF628 | The value to be used as the framing pattern |
| lostsync_loop_limit | 4 | 0xa | The number of consecutive framing errors required before a synchronized serial channel is considered out of sync |
| pre_sync_count | 4 | 0x3 | The number of consecutive correct framing patterns required before a serial channel is considered synchronized |
| gate_capture_data_position | 13 | 0x30 | Set to a value that ensures that the start of row from all inputs has been received |
| total_data_slot_limit | 11 | | Set to one less than the total number of data slots in a row |
| valid_data_slot_limit | 11 | | Set to two less that the total number of valid data slots in a row |
| data_row_toggle_position | 11 | | Set to one less than the slot number in which dp_data_row_toggle should toggle |
| total_grant_slot_limit | 11 | | Set to one less than the total number of grant slots in a row |
| valid_grant_slot_limit | 11 | | Set to two less that the total number of valid grant slots in a row |
| grant_row_toggle_position | 11 | | Set to one less than the slot number in which gnt_data_row_toggle should toggle |
| data_framing_pattern_position | 13 | | Set = (position of the first byte of the framing pattern in the out going byte stream + start_output_position + 4). |
| grant_framing_pattern_position | 13 | | Set = (position of the first byte of the framing pattern in the out going byte stream + start_output_position + 4). |
| data_sor_offset | 13 | | Set = (frame_size - data_framing_pattern_position + 2) |
| grant_sor_offset | 13 | | Set = (frame_size - grant_framing_pattern_position + 2) |
| start_output_position | 13 | 0x1 | Instructs the switch when to start outputing data. The default value of one should be used unless lab testing is being done. |
| start_oslot_position | 13 | | Set = (frame_size - 10) for normal operation. This value must be changed if the core clock and byte clock ratio are changed for testing. |
| data_link_input_enable | 12 | 0x0 | Active high to enable input data links. One bit per link. |
| grant_link_input_enable | 12 | 0x0 | Active high to enable input grant links. One bit per link. |
| data_link_output_enable | 12 | 0x0 | Active high to enable output data links. One bit per link. |
| grant_link_output_enable | 12 | 0x0 | Active high to enable output grant links. One bit per link. |
| disable_scrambler | 1 | 0 | Active high to disable the scrambling function. Should only be used for Verilog simulations. |
| disable_descrambler | 1 | 0 | Active high to disable the descrambling function. Should only be used for Verilog simulations. |
| bypass_sync | 1 | 0 | Active high to bypass the synchronization loop counters. A serial channel will be synchronized as soon as it detects the framing pattern. Should only be used for Verilog simulations. |
| switch_sor_reset | 1 | 0 | Active high to cause the internal synchronization engine to re-synchronize (see Section 10.1). |

Table 11-11: Switch Port Programmable Registers

| Name | Size (bits) | Default | Description |
|---|---|---|---|
| slot_size_select | 2 | 0x0 | Sets the slot size for the serial links. Only used for testing with different serial frequencies.<br>00 - 36 bits<br>01 - 40 bits<br>10 - 44 bits<br>11 - 48 bits |

11.8 Core Interface Timing

The interface timing between the core and the input logic is documented in Section 4.3.1.2.

12 RISC Controller

SUBJECT TO TENSILICA NDA

13 Sbus Modules

13.1 SPI Interface

The SPI interface is a 4 wire serial interface developped by Motorola for low speed synchronous serial communications. For the iTAP chipset, the SPI interface will be used to connect a serial eprom to the system for purposes of loading the local microprocessors as well as for storing certain state information in non-volatile memory.

The iTAP SPI module supports the following features:

- Configurable Speed settings- 500KHz, 1MHz, 2MHz and 4MHz (w/ nominal 250MHz clock)
- Automatic Page Buffer Management
- Configurable Page Buffer Size
- 2 SPI Devices (i.e. 2 chip selects)
- Interrupt Driven 'Request' Based mode.
- 16 and 24 Bit Address Mode Compatible The SPI bus developed by Motorola allows for 4 different modes of operation. They are distinguished by when the clock starts to toggle with respect to a peripheral's chip select and which edge of the clock to transmit/receive data on. In the Motorola SPI these are governed by the CPHA and CPOL bits. Out of these 4 modes, vendors (Atmel, Xicor, Microchip) for serial eeprom devices support modes 0 and 3 (0,0 & 1,1). In both of these modes, data is transmitted on the negative edge of the clock and received on the positive edge. The difference in the modes is that the clock in mode 0 should be low when cs is active before the transfer begins, mode 3 allows for a negative edge transition of the clock. A mode 0 compatible boot loader will be sufficient. If a mode 1 or 2 device needs to be hooked up, an external inverter will be needed on the clock line. In addition, vendors of the proms have developped faster versions of the chips which aren't bound to the original 2MHz specification.

13.1.1 Theory of Operations

The iTAP SPI has 2 modes of operation, normal and interrupt driven. Both are discussed below.

13.1.1.1 Normal Mode

In 'Normal Mode' of operation the SBUS master can perform reads and writes on the SBUS by accessing memory from 0x4000 to 0x400000. This allows for a 4 megabyte external device to be supported. In this mode, the SPI looks like a chunk of memory which is just very slow. Behind the scenes, the SPI controller takes care of enabling the EEPROM for writes and reading the SPI status register. Because of this, the Tensilica can have its reset vector in the SPI space, and boot out of it just as it would from any memory.

When a Read is performed, the SPI controller will check to see if it has an open page, and if so close it. Then it will check the Status register to see if it is possible to perform a read. When the status register acknowledge the device is ready for an access, the read is performed, and the data transfered to the SBUS master. The time that it takes for this access could be as great as 12 ms, which is the time it takes for an SPI program cycle.

When a Write is performed, the SPI controller will check to see if a 'page' is currently being written, and to see if the address matches that of the current page. If it is, the data is written and the cycle terminates. Otherwise, the page needs to be closed, program initiated, the status register polled, and then the data written to the SPI. This could be as long as 12ms. The bus cycle ends as soon as the data is written into the SPI, but before a programming cycle is initiated to speed up transactions.

13.1.1.2 Interrupt Driven Mode

In this mode, the SBUS master will write to an address register, a data register (if a write) and a command register. This will initiate an SPI access. When the access is complete an interrupt will be signaled on. It is also possible to poll a Done bit to see if the transaction has been completed.

The purpose of this mode is for the host interface to program the SPI and not need to have an impossibly long bus time-out value. Otherwise, each individual bus access would have a minimum time of several microseconds to 'dittle' the SPI bus and 12 ms to actually program a page into the SPI. In an iTAP system, the bus timeout will be much shorter (on the order of several dozen clock ticks ~100ns).

13.1.1.3 SPI Settings

- SPI Serial Clock Speed- a 2 bit field to control the speed of the clock as a function of the core clock. With a nominal 250MHz core clock speed combinations from 500KHz to 4MHz are possible.
- SPI Addressing Mode- a single bit to control whether or not 16 or 24 bit addressing is used for the SPI prom. For the 64Kbyte and under devices, they need to have 16 bits written into them as address. For the larger devices, they need to have 24 bits written into their address buffers. The reset state of the register is determined by bootmode[2].
- SPI Page Register Size- an 8 bit field to determine the number of consecutive addressed bytes that can be written into the SPI before the page has to be closed for writing. The reset value of this register is zero, since some small devices do not have a page register at all.
- SPI CS- a single bit to determine which of the SPI chip selects will be active. The reset state of this register is determined by the bootmode[0] pin.

13.1.2 SPI Memory Map and Registers

| Address | Name | R/.w | Size |
|---|---|---|---|
| 0x0000 | SPI Status Register | R/W | 8 |
| 0x0004 | SPI Write Enable Latch | W | 8 |
| 0x0008 | SPI Write DI Latch | W | 8 |
| 0x000C | SPI Address | R/W | 32 |
| 0x0010 | SPI Data | R/W | 32 |
| 0x0014 | SPI Stat | R/W | 32 |
| 0x4000- | SPI Memory | R/W | 32 |

13.1.2.1 SPI Status Register

| Bit | 7 | 6 | 5 | 4 | 3 | 2 | 1 | 0 |
|---|---|---|---|---|---|---|---|---|
| Field | WPEN | 0 | 0 | 0 | BPI1 | BPI0 | WEN | RDYx |

Consult SPI data sheet for a more complete description, as the BPI fields are part-specific.

13.1.2.2 SPI Write Enable Latch

| Bit | 7 | 6 | 5 | 4 | 3 | 2 | 1 | 0 |
|---|---|---|---|---|---|---|---|---|
| Field | x | x | x | x | x | x | x | x |

Acceses to this address will generate a Write Enable Command on the SPI.

13.1.2.3 SPI Reset Write Enable Latch

| Bit | 7 | 6 | 5 | 4 | 3 | 2 | 1 | 0 |
|---|---|---|---|---|---|---|---|---|
| Field | x | x | x | x | x | x | x | x |

Accesses to this address will generate a write disable command on the SPI.

13.1.2.4 SPI Address (Interrupt Mode)

This is a read/write 32 bit register. The upper 4 bits control whether or not its a read or write. Setting

| Bit | 31 | 30 | 29 | 28 | 27 | 26 | 25 | 24 | 23 | 0 |
|---|---|---|---|---|---|---|---|---|---|---|

Proprietar . Confidential Information of Onex Communicat. Corporation

| Field | BWE3 | BWE2 | BWE1 | BWE0 | 0 | 0 | 0 | 0 | Address |
|---|---|---|---|---|---|---|---|---|---|

To perform a read, program BWE[3:0] = 0, for a write operation set the bits which should be programmed. The following settings are allowed:

| BWE3 | BWE2 | BWE1 | BWE0 | Access |
|---|---|---|---|---|
| 0 | 0 | 0 | 0 | Read |
| 1 | 0 | 0 | 0 | Write bits [31:24] |
| 0 | 1 | 0 | 0 | Write bits [23:16] |
| 0 | 0 | 1 | 0 | Write bits [15:8] |
| 0 | 0 | 0 | 1 | Write bits [7:0] |
| 1 | 1 | 0 | 0 | Write bits [31:16] |
| 0 | 0 | 1 | 1 | Write bits [15:0] |
| 1 | 1 | 1 | 1 | Write bits [31:0] |

13.1.2.5 SPI Data (Interrupt Mode)

This is a read/write 32 bit register. Data which is to be written to the SPI should be written into here. Data which is to be read will be read here.

13.1.2.6 SPI Stat (Interrupt Mode)

This register controls the interrupt based mode transfers to the SPI.

| Bit | 7 | 6 | 5 | 4 | 3 | 2 | 1 | 0 |
|---|---|---|---|---|---|---|---|---|
| Field | Go | 0 | 0 | 0 | 0 | 0 | 0 | 0 |

Writes to the GO bit will intiate a SPI bus cycle. During read cycles, if this bit is set, the SPI access is in progress. An interrupt will be generated on the hi to low transition of this bit. This interrupt may be masked via the interrupt controller. The interrupt bit number is TBD.

13.1.2.7 MReset Register Applicable Bits

The control bits for the spi register are located in one of the bytes of the MRESET register. (Master Reset Register), which is located at 0x45038.

| Bits | Field | Reset Value |
|---|---|---|
| 31:24 | Module Resets | 0 0 0 0 0 0 0 0 |
| 23:16 | SPI Page Size | |
| 15 | SPI A | BootMode[2] |
| 14 | SPI_CS | BootMode[0] |
| 13:12 | SPI Mode | 0 0 |
| 11:8 | reserved | |
| 7:4 | BootMode | 0 0 0 0 |
| 3 | | 0 |
| 2 | | 0 |
| 1 | XT CLK | 0 |
| 0 | WRST | 1 |

Address Offset: 0

SPI_A: Set hi for 24 bit addressing, low for 16 bit addressing. Consult individual SPI EEPROM data sheet for the correct mode.

SPI_CS: Set hi for CS0, low for CS1.

SPI_MODE: Controls the SPI toggle clock speed (assuming 250MHz nominal core clock).

00 - 500KHz

01 - 1MHz

10 - 2MHz

11 - 4MHz

13.1.2.8 Interface Notes

- RESERVED

13.1.3 Alternative Synchronous Serial Bus Protocols

Several synchronous serial buses were considered, here are the pros and cons of each.

*SPI*

Originally developed by Motorola, SPI requires four pins on the microcontroller for communication between memory and CPU. This is more wires than either I2C or Microwire. However, SPI is the fastest protocol (up to 3 MHz). Also, because the processor handles all the communication, you don't have to lose precious application memory to serial communications algorithms.

*$I_2C$*

Developed by Philips, I2C requires only two wires between CPU and memory device, consuming fewer traces than SPI or Microwire. Also, because the data transfer is latched, rather than edge-sensitive, I2C has high noise immunity. (It has been popular in automotive applications.) Its real disadvantage is speed. Though some I2C implementations can run at 1 MHz, its spec tops out at 400 kHz.

*Microwire*

Developed by National Semiconductor, Microwire treads a middle ground between SPI and I2C, both in transfer speed (2MHz) and required lines between processor and memory (three). The format in which the processor sends an address to the memory device is both a strength and a weakness. Specifically, the Microwire protocol requires that the processor send only the address bits needed (rather than sending a fixed 16 bits). That's good, because time isn't wasted in transferring unneeded bits. It's also bad, because some programmer has to wrestle with bit-twiddling address-generation code.

13.2 UART

There will exist an RS-232 compatible UART interface. An external level shifter will be used to interface it to a standard PC serial port. External IP should be gotten which implements this function. Some possible vendors of a UART:

http://www.synopsys.com/products/designware/dw_fl_ds.html (DesignWare)

The IP will interface to the Peripheral bus by a simple bus translator. If it does not support a loopback mode, one will be added.

13.2.1 Synopsys DesignWare UART

The synopsys designware uart has the capabilitity to function as a 16550 which have small receive and transmit fifos to minimize processor overhead, as well as a lower performance mode where it emulates a 16540 which does not have these fifos. This design assumes that the 16550 mode will be used. The 2 fifos each need to be bytew eide, single port (1R,1W) rams which are 16 entries deep. Internally it has 12 registers to control it. Please consult the DesignWare documentation for a full data sheet on this part.

☞

13.2.2 Daisy Chainable Mode

Since many switch chips may be populated on a single circuit board, it would be difficult to put a separate connector on the board for each switch chip. External circuitry could be designed to allow for this, or this functionality can be designed into the switch device. The latter has been choosen.

Each iTAP Switch will support a daisy chainable RS-232 compatible serial port. There will be a command language that can be used to talk to the chips (which is not described in this document). This command language will issue commands along with Switch ID numbers such that each switch chip is individually addressable. There will also exist a 'shunt mode' so that this chain can be broken for diagnostical or debug reasons.

The loopback and daisychain shunt will each have a bit to control whether or not the uart is in a particular mode.

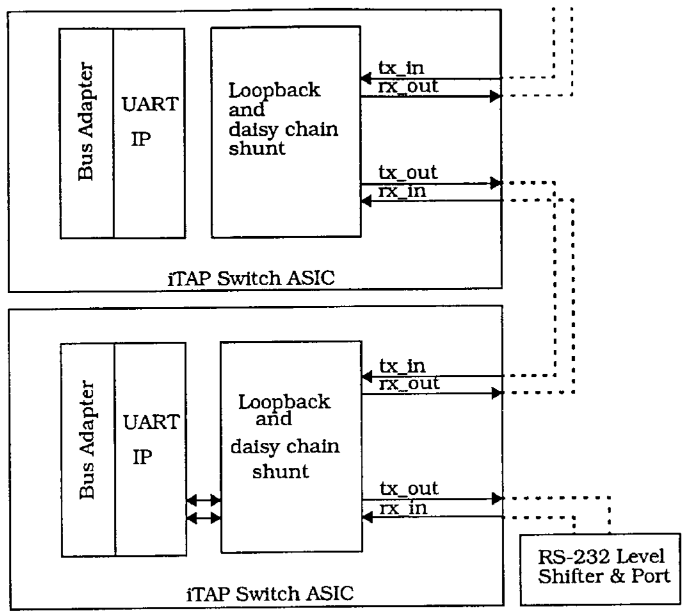

Figure 13-1: Daisy Chained Serial Interface

13.3 iTAP Switch Configuration Registers

In addition to these peripherals there will be many configuration registers which are also accessible through the SBus. These are described below.

Base Address 0x00440000

| 31 … 24 23 … 16 15 … 8 7 … 0 | Address Offset |
|---|---|
| iLink Control 00 | 0x0000 |
| iLink Control 01 | |
| iLink Control 02 | |
| iLink Control 03 | |
| iLink Control 04 | |
| iLink Control 05 | |
| iLink Control 06 | |
| iLink Control 07 | |
| iLink Control 08 | |

*Proprietary and Confidential Information of Onex Communications Corporation*

Base Address 0x00440000

| 31 … 24 | 23 … 16 | 15 … 8 | 7 … 0 | Address Offset |
|---|---|---|---|---|
| iLink Control 09 | | | | |
| iLink Control 10 | | | | |
| iLink Control 11 | | | | |
| Switch ID | | | | |
| Switch Part Number | | | | |
| MReset | | | | |
| Bus Timer | | | | |
| Host Mailbox Flags | | | | |
| Core MailBox Flags | | | | |
| Watchdog Control | | | | |
| WatchDog Timeout | | | | |
| Watchdog Service | | | | |
| Interrupt Type | | | | |
| Interrupt Mask | | | | |
| Interrupt #0 Status | | | | |
| Interrupt #1 Status | | | | |
| Interrupt #2 Status | | | | |
| Interrupt #3 Status | | | | |
| Interrupt Level Register | | | | |
| SSRAM Configuration | | | | |
| Uart | | | | |

13.3.1 iLink Control Registers

| Bits | 31–28 | 27–16 | 15–8 | 7–3 | 2–0 | Address Offset |
|---|---|---|---|---|---|---|
| Field | reserved | iLink Mask | Spares | reserved | Stage Number | 0 |
| Reset Value | 0 0 0 0 | 1 1 1 1 1 1 1 1 1 1 1 1 | 0 0 0 0 0 0 0 0 | 0 0 0 0 0 | 0 0 0 | |

iLink Mask: Setting a bit enables an allowable switching configuration from this input link to the 12 output links. Bit 27 refers to Link 11, Bit 16 refers to Link 0. The reset value is all 1's so that any input is allowed to goto every output without generating an error condition.

Stage Number: This 3 bit field sets the stage number for the iTAP Switch Element Link. The reset value is 0.

13.3.2 iTAP Switch ID Register

| 31 … 8 | 7 … 0 | Address Offset |
|---|---|---|
| Switch ID | reserved | 0 |
| 0 0 0 0 0 0 0 0 0 0 0 0 0 0 0 0 0 0 0 0 0 0 0 0 | 0 0 0 0 0 0 0 0 | Reset Value |

This register will hold the individual switch identification number. This number shall be unique to the switch matrix, and programmable by the internal master processor or through the host interface. This ID number is transmitted in one of the Link Overhead fields.

13.3.3 iTAP Switch Part Number

| 31 … 8 | 7 … 0 | Address Offset |
|---|---|---|
| Switch Part Number | Switch Revision | 0 |
| TBD | 0 0 0 0 0 0 0 1 | Reset Value |

This is a 32 bit read only register which contains the switch revision and part number. This will allow multiple generations of devices to share the common code base.

☞ <u>This value is TBD</u>

13.3.4 iTAP Switch Reset Register

| 31 … 24 | 23 … 16 | 15 | 14 | 13 … 12 | 11 … 8 | 7 … 4 | 3 | 2 | 1 | 0 | Address Offset |
|---|---|---|---|---|---|---|---|---|---|---|---|
| Module Resets | SPI Page Size | SPI A | SPI_CS | SPI Mode | reserved | BootMode | | | XT CLK | WRST | 0 |
| 0 0 0 0 0 0 0 0 | | | | | | 0 0 0 0 | 0 | 0 | 0 | 1 | Reset Value |

Module Resets: Write a logical 1 to any of these bits to bring that module out of reset.

Bit 31: Master Processor

Bit 30: DataPath

Bit 29: Arbitration

Bit 28: MultiCast

Bit 27: Serial / Deserialzer

Bit 26: unassigned

Bit 25: unassigned

Bit 24: unassigned

SPI Page Size, SPI_A, SPI_CS,SPI_MODE: All of these bits are described in the SPI section of this document.

*Proprietary Confidential Information of Onex Communications Corporation*

13.3.5 iTAP Bus Control

| Bit | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | Address Offset |
|---|---|---|---|---|---|---|---|---|---|---|---|---|---|---|---|---|---|---|---|---|---|---|---|---|---|---|---|---|---|---|---|---|---|
| Field | Full Decode | | | | | | | | Bus Timer | | | | | | | | | | | | | | | | | | | | | | | | 0 |
| Reset Value | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 1 | 0 | 0 | 0 | 0 | 0 | |

Full Decode: Setting these bits force the target module to fully decode the address bus. Otherwise, the decoded module should never bus error during unmapped accesses.

Bit 31: MultiCast Controller

Bit 30: SSRAM, Shared Ram

Bit 29: Arbitration

Bit 28: Serial / Deserializer

Bit 27: Data Path

Bit 26: SPI Address Space

Bit 25: Switch Mailbox RAM

Bit 24: Switch Risc Core Registers- DMA, IRQ, Switch Configuration Regs,etc.

Bus Timer: A bus timer exists in the BIF which forces a termination after a presetable amount of time. All 24 bits are used when the SPI is being addressed, only the lower 8 bits are used when any other module is being addressed. The units for the timer are in core-clock ticks. For a nominal 250MHz core clock frequency, use 4 ns per tick. The reset value is 0x40020.

13.3.6 Host to Core Mailbox Interrupts

| Bit | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | Address Offset |
|---|---|---|---|---|---|---|---|---|---|---|---|---|---|---|---|---|---|---|---|---|---|---|---|---|---|---|---|---|---|---|---|---|---|
| Field | Host 2 Core Irq #0 | | | | | | | | Host 2 Core Irq #1 | | | | | | | | reserved | | | | | | | | | | | | | | | | 0 |
| Reset Value | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 1 | 0 | 0 | 0 | 0 | 0 | |

When the host writes to the mailbox interrupt bits, an interrupt will be signaled to the internal Tensilica master processor. The Tensilica shall be able to clear the interrupt via writing a 1 to the offending bit. There are 2 interrupts that these bits are wired to, eight for each interrupt. In this way there will be a method to create a high and a low priority interrupt for mailbox message requests and acknowledgements.

13.3.7 Core to Host Push Mailbox Interrupts

| Bit | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | Address Offset |
|---|---|---|---|---|---|---|---|---|---|---|---|---|---|---|---|---|---|---|---|---|---|---|---|---|---|---|---|---|---|---|---|---|---|
| Field | Core 2 Host Irq #0 | | | | | | | | Core 2 Host Irq #1 | | | | | | | | reserved | | | | | | | | | | | | | | | | 0 |
| Reset Value | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 1 | 0 | 0 | 0 | 0 | 0 | |

The Tensilica can program any of these bits, which will generate a host interface interrupt. There are 2 groups of signals, each connected to a seperate interrupt. In this way there will be a method to create a high and a low priority interrupt for mailbox requests and acknowledgements.

The bits are cleared, in general by the host inteface writing to its core 2 host interrupt register.

13.3.8 SSRAM Configuration

See Risc Chapter on SSRAM

13.3.9 Interrupt Configuration, Status Registers

See Risc Chapter on Interrupt Controller

13.3.10 Watchdog Timer

See Risc Chapter on Watchdog Timer

13.3.11 UART Registers

See Uart Chapter 11

The switch chip will have 2 reset pins. One is for hardware reset, the other for software reset. The hardware reset will be used for power- up reset, power glitches and to re-initialize the entire system. Every register shall be cleared or set to its default value when the hardware reset is toggled. The software reset will actually cause an interrupt to the micrprocessor, which can then go and decide which subsystems should be reset. Upon a software reset, the local processor can do some housekeeping and saving certain state information as well as decide to warm boot or cold boot.

The Tensilica can write to and reset any one of the bits in the reset register. The bits in this register need to be toggle bits... Writing a zero to them has no effect, writing a 1 to them will either set or clear it, depending on its state.

13.3.12 Tensilica Reset Register

There will exist a register which is only cleared upon a cold (hreset). This register will allow the Tensilica to know why it reset itself or was reset in the event of a watchdog timer time-out.

| Bits | 31 | 30 | 29 | 28 | 27 | 26 | 25 | 24 | 23 | 0 |
|---|---|---|---|---|---|---|---|---|---|---|
| Field | Software Defined | | | | Host Processor Reset | Tensilica Internal Reset (other than NMI) | Tensilica NMI caused Reset | Watchdog Timer Warm Reset | reserved | |
| reset | Default Values TBD | | | | | | | | 0 | |
| r/w | r/w | r/w | r/w | r/w | r/w | r/w | r/w | r/w | r | |

Table 13-2: Microprocessor Software Reset Register

14 Host Interface

14.1 Overview

The host interface is a parallel external interface to the iTAP Switch chip. This interface will be used to do the following:

- Exchange messages with the iTAP Switch Tensilica Processor
- Download boot code for the Tensilica Processor
- Read and Write Configuration Registers
- Fully operate the switch in applications where the iTAP Switch Tensilica Processor is not used.

The host interface is designed to be a glueless interface with a Motorla 68360 operating in asynchronous mode with a 16 bit port size, it is, however, and asynchronous interface so any speed device could be used as long as the signals were compatible. Since there are literally hundreds of RAMs in the iTAP Switch, this interface will support a page mode to access these registers. The host interface will support a 16Kbyte memory space (13 address lines). This address space will be divided into 2 regions, a paged region which allows access to the internal switch registers and a 'fixed' address region which contains host interface configuration registers and 4 mailboxes to exchange data with the iTAP Switch Tensilica.

- Page Size is 15.5K bytes.
- Fixed Contents is 512 bytes.

| Address | Memory Space |
|---|---|
| 0x0000 | Paged Memory |
| 0x3E00 | Fixed Contents |

| Address | Memory Space |
|---|---|
| 0x3E00 | Page Register |
| | Other 'Fixed' Registers |
| 0x3100 | Hi Priority Mailbox (IN) |
| 0x2140 | Low Priority Mailbox (IN) |
| 0x2180 | Hi Priority Mailbox (OUT) |
| 0x21C0 | Low Priority Mailbox (OUT) |

Table 14-1: Host Interface Address Map

For normal use, it is expected that the host will communicate to the Switch via several mailboxes. These mailboxes will allow for the passing of low and high priority control messages to the local processor inside of the Switch. There is also a mode where the processor may not be used which gives the host full access to all of the iTAP Switch's registers. In fact, the host could run the switch and act as a surrogate local processor.

This document outlines the register map of the host interface, then follows with a description of the interfaces which it will need need, followed by some implementation notes.

14.2 Programmable Page Memory Map

The following table is a summary of the valid page numbers, and what they page in. For the complete list, please consult the Appendix.

| Page Number | Contents |
|---|---|
| 000 | Undefined (mirror of page 1) |
| 001 | SPI |
| 255 | |
| 256 | Data Path Link 0 CSR |
| 257 | Data Path Link 1 CSR |

| | |
|---|---|
| 258 | Data Path Link 2 CSR |
| 259 | Data Path Link 3 CSR |
| 260 | Data Path Link 4 CSR |
| 261 | Data Path Link 5 CSR |
| 262 | Data Path Link 6 CSR |
| 263 | Data Path Link 7 CSR |
| 264 | Data Path Link 8 CSR |
| 265 | Data Path Link 9 CSR |
| 266 | Data Path Link 10 CSR |
| 267 | Data Path Link 11 CSR |
| 268 | Data Path Global CSR |
| 269 | not currently assigned |
| 270 | not currently assigned |
| 271 | not currently assigned |
| 272 | Grant Mapper |
| 273 | Grant Demapper |
| 274 | Arbitration Stats & Regs |
| 275 | DMA |
| 276 | Misc Registers |
| 277 | MailBox Ram |
| 278 | UART |
| ... | ... |
| 512 | External Ram Start |
| 767 | External Ram End |
| 768 | Shared RAM Start |

Table 14-2: Page Number Decoding

14.2.1 Paged Memory Accesses

The paged memory space will perform writes just as expected, but reads are more complex due to the nature of the data being read. Many of the iTAP switch registers will be counters, which may need to be bigger than 16 bits. To perform 32 bit reads without double buffering every counter, the following will occur:

- Reads to the Paged Memory Address space. will load 32 bits into a set of registers.
- The address +2 will also be stored.
- The 'correct' 16 bits will be output on the host interface data bus.
- If the next host access matches the stored address then the other data word will be read out on to the host interface data bus. If the next host access does not have an address match another full read is performed.

14.3 Fixed Page Memory Map

The following memory map describes the 'Fixed Contents' part of the host interface address map.

| Page Number | Contents |
|---|---|
| 0x3E00 | Page Register |
| 0x3E04 | Interrupt Mask Register |
| 0x3E08 | Interrupt 0 Control Register |

| | |
|---|---|
| 0x3E0C | Interrupt 0 Control Register |
| 0x3E10 | reserved |
| 0x3E14 | reserved |
| 0x3E18 | Programmable Interrupt Level Reg 0 |
| 0x3E1C | Programmable Interrupt Level Reg 1 |
| 0x3E20 | Programmable Interrupt Level Reg 2 |
| 0x3E24 | Miscellaneous Register |
| 0x3E28 | Message Status Registers |
| 0x3E28-0x3EFC | reserved |
| 0x3F00 | Low Priority Mailbox (In) |
| 0x3F40 | Hi Priority Mailbox (In) |
| 0x3F80 | Low Priority Mailbox (Out) |
| 0x3FC0 | Hi Priority Mailbox (Out) |

Table 14-3: Fixed Contents Address Map

14.3.1 Page Register

This is a 32 bit read/write register. Writes have an immediate effect of what the lower host interface address space contents are.

14.3.2 Interrupt Registers

The host interface will need access to all of the same interrupt sources as the Tensilica. It must have the ability to receive the same interrupts as the Tensilica as well as have the ability to program different interrupts at different priorities. To facilitate this, the same Interrupt Controller that the Tensilica will be using will be instantiated here. This will give the host the greatest flexibility.

The following registers are local to the Host Interface. The interrupt mapping will be the same as that given in Chapter 9, Interrupt Controller. Although each interrupt source is given 4 bits of priority encoding, only the lsb of each of the nibble fields will be used.

| Address | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| 0x3E04 | Interrupt Mask Register | | | | | | | | | | | | | | | | | | | | | | | | | | | | | | | |
| 0x3E08 | Interrupt 0 Register | | | | | | | | | | | | | | | | | | | | | | | | | | | | | | | |
| 0x3E0C | Interrupt 1 Register | | | | | | | | | | | | | | | | | | | | | | | | | | | | | | | |
| 0x3E10 | reserved | | | | | | | | | | | | | | | | | | | | | | | | | | | | | | | |
| 0x3E14 | reserved | | | | | | | | | | | | | | | | | | | | | | | | | | | | | | | |
| 0x3E18 | PI00 | | | | PI01 | | | | PI02 | | | | PI03 | | | | PI04 | | | | PI05 | | | | PI06 | | | | PI07 | | | |
| 0x3E1C | PI08 | | | | PI09 | | | | PI10 | | | | PI11 | | | | PI12 | | | | PI13 | | | | PI14 | | | | PI15 | | | |
| 0x3E20 | PI16 | | | | PI17 | | | | PI18 | | | | PI19 | | | | PI20 | | | | PI21 | | | | PI22 | | | | PI023 | | | |

There will be 2 added interrupts (#22-23):

- Hi Priority Mailbox Interrupt
- Low Priority Mailbox Interrupt

14.3.3 Misc Register

The miscellaneous register controls the bus error modes for the switch.

| Address | 31 | 30 | 29 | 28 | 27 | 26 | 25 | 24 |
|---|---|---|---|---|---|---|---|---|
| 0x3E24 | Misc Register | | | | | | | |

Proprietary Confidential Information of Onex Communications Corporation

| | | | | | | | | |
|---|---|---|---|---|---|---|---|---|
| | 0 | 0 | PMWL | PMRL | 0 | 0 | CRST | PRST |

All of these bits are 'toggle' bits, meaning writes of 0 have no effect on them. To clear or set any of these bits, write a logical 1 to them.

PMWL - Page Memory Write Lockout

If this bit is set, any writes to the paged memory will not return a dsack. This is to prevent the host from setting bits while in message-passing mode. In fabrics that do not use the iTAP Switch local microprocessor, this bit would be cleared. This bit powers up to a zero.

PMRL - Page Memory Read Lockout

If this bit is set, any reads to the paged memory will not return a dsack. This is to prevent the host from getting any status information while in message-passing mode. During debug, even in message passing mode this bit will generally be cleared to ensure that random diagnostics reads do not bus error the system. However, application software may want to set this bit to debug a system where a bad pointer may be reading an errant location.

The reset register gives the host the ability to reset the iTAP switch chip, or the Switch chip microprocessor sub-system.

CRST - Chip Reset

Writing a 1 to this register will reset the entire chip, including the host interface when the access is complete.

PRST - Processor Reset

Writing a 1 to this register will place the Switch microprocessor into reset. To take the processor out of reset the host interface will need to toggle this bit to zero by writing a 1 to it. The power up status of this register will be the value on the BootMode[1] pin (which is used to enable or disable initial booting of the internal Master Processor.

14.3.3.1 Host Interface BootStrap Mechanism

When the iTAP Switch Processor is in reset (PRST is set) code may be safely downloaded to the boot ram. This is done by setting the page register to 'BootCode' and writing the boot image in. The image may be read back at any time to ensure that it was delivered successfully. When the host has correctly put the boot image into the BootCode space, it will then clear the PRST bit. At this time, the local switch processor will begin executing code from its reset vector.

14.3.4 Message Status Registers

The control structures for these mailboxes are located below in the fixed contents area:

| Address | 31 | | 23 | 16 | 15 | | 7 | 0 |
|---|---|---|---|---|---|---|---|---|
| 0x3E28 | High Priority Message In | | High Priority Message Out | | Low Priority Message In | | Low Priority Message Out | |
| | Host to Master | Master to Host | Host to Master | Master to Host | Host to Master | Master to Host | Host to Master | Master to Host |

This register is divided into 4 sections, one for each mailbox- High Priority Message In, Message Out, and Low Priority Message In and Message Out. Each one of the mailbox status registers has 4 bits which the host can set that causes an interrupt on the master processor. There are also 4 bits which the master processor can set which cause an interrupt on the host processor. The 2 High Priority Mailboxes are on interrupt #X and the 2 Low Priority Mailboxes are on interrupt #Y. It is expected that the host and master processor will program the high priority mailboxes on a different (and higher) interrupt than the low priority mailboxes to facilitate 2 classes of messages. To clear any of these bits, the host processor must write a logical 1 to them. This will ensure that if during the processor of clearing a bit the master processor attempts to set another bit, it is not overwritten. The hardware makes no restrictions or assumptions other than connecting one interrrupt to the High Priority Response bits, and other to the Low Priority Response bits. The bits are aligned such that the 16 bit host interface can set and clear a mailbox status register in a single write cycle- i.e. clearing the interrupt condition as well as giving its response if software desires.

Please consult the software documentation concerning the usuage of these bits.

Proprietary Confidential Information of Onex Communications Corporation

14.3.5 Host Interface Mailboxes

For messages in and out of the switch there are high and low priority mailboxes. The format of these mailboxes is as follows:

| Address | 31 … 23 … 15 … 7 … 0 |
|---|---|
| 0x3F00 | In Mailbox, Low Priority- 64 bytes |
| 0x3F04 | |
| 0x3F08 | |
| 0x3F3C | |
| 0x3F40 | In Mailbox, High Priority- 64 bytes |
| 0x3F80 | Out Mailbox, Low Priority- 64 bytes |
| 0x3FC0 | Out Mailbox, High Priority- 64 bytes |

14.4 Interfaces

The host interface has 3 ports- the 68360 external bus, the mailbox bus and the HIF interface. Each are described below. In the block diagram the address, data and byte enable control signals have been omitted for clarity.

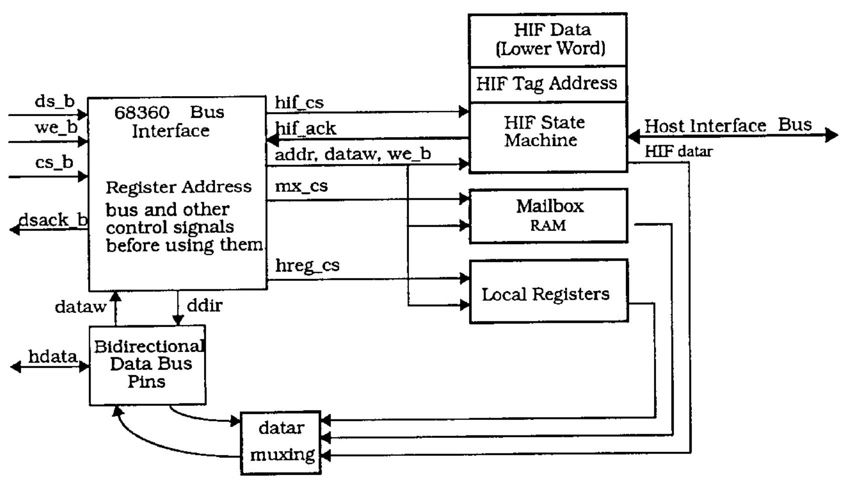

Figure 14-4: Host Interface Block Diagram

14.4.1 Motorola 68360 Bus Interface

The host bus interface will have the following pins:

| Pin Name | Width | I/O | Description |
|---|---|---|---|
| hcs_b | 1 | I | Chip Select (Active low) |
| hds_b | 1 | I | Data Strobe(Active low) |
| hwe_b[1:0] | 2 | I | Read=1, Write=0<br>hwe_b[1] --> dbus bits[31:24]<br>hwe_b[0] --> dbus bits[23:16] |

| | | | |
|---|---|---|---|
| haddr | 14 | I | Address Pins |
| hdata | 16 | B | Data Bus |
| irq0_b | 1 | O | Interrupt 0 |
| irq1_b | 1 | O | Interrupt 1 |
| hdsack_b | 1 | O | Transfer Ack (Active low)-opendrain |

The 68360 needs to be programmed to output individual byte write-enables, as well as accept external data transfer acknowledges. Since the 68360 has a 32 bit data bus, the bus needs to be connected as follows:

| 68360 Pin | ITAP Switch Pin |
|---|---|
| addr[13:1] | haddr[12:0] |
| data[31:16] | hdata[15:0] |
| ds_b | hds_b |
| we_b[1] | hwe_b[1] |
| we_b[0] | hwe_b[0] |
| dsack_b[1] | hdsack_b |
| dsack_b[0] | - |
| irq[x]_b | irq0_b |
| irq[y]_b | irq1_b |

*This will always signal a 16 bit port size to the 68360. Refer to 68360 User's Manual Table 4-2 'DSACKx Encoding'. The 68360's dsack0 pin should be pulled up.*

14.4.1.1 68360 Device Settings

- The following registers will need to be set in it:

PEPAR -> Bit 7, set to 1. Set this to '1' so that WE_b[3:0] are driven. Out of reset, the 68360 tri-states these pins, so they will need pull-up resistors.

SPS[1:0]-> In the Option Register, need to be set to '11' for external dsack generation.

14.4.1.2 Timing Diagrams

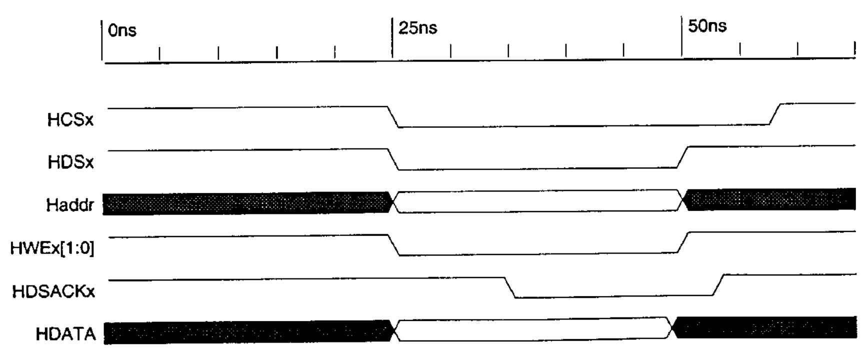

Figure 14-5: Host Interface Write Timing Diagram

*Proprietary* *Confidential Information of Onex Communicati* *orporation*

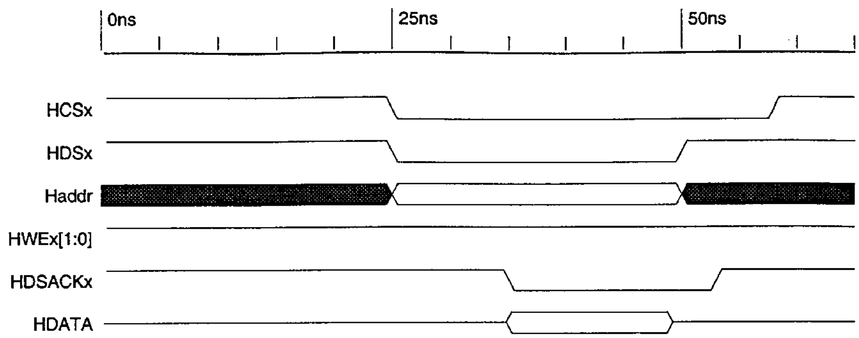

Figure 14-6: Host Interface Read Timing Diagram

Note: Since this is an asynchronous interface, the absolute timing is unimportant.

14.4.1.3 Bus Calculations

The time the 68360 spends waiting on the host interface can be calculated as follows:

Worst Case Interface:

- Local Registers- 0 ws
- Mailbox Ram- 0 ws
- SBus Interface- 2 interfaces w/ longword xfers ahead of host interface
- FBus Interface- 1 lw, 1 line xfer ahead of the host interface Accesses to the FBus need to take into account the following delays:

- Bring DSx into ITAP Switch Clock Domain (2clks)
- Sample, assert HIF Request (2 clks)
- Arbitrate for FBus.
  - DMA Line Access to external SSRAM =13clks
  - Processor LW Access to external SSRAM = 8clks
  - Host IF LW Access to external SSRAM = 8 clks
- Handskaking to Dsack assertion = 3clks Total latency is 36 internal 250MHz clock cycles. This will incur ~ 150ns of latency on the bus, which at 50MHz is 8 clock cycles and at 33MHz is 5 clock cycles.

The 2 typical cases are when the Tensilica is operating and the host inteface is using the mailboxes(which has 0 ws) and when the Tensilica is not operating and the host inteface is controlling the switch via the SBus. Sbus latency will be 2 long word acceses. Assuming the Sbus runs at 1 ws, the latency from DSx to DSackx will be 15 core clock cycles. At 250MHz this 60ns, and translates to 2/3 (33/50 MHz) host interface wait states to write a 16 bit word. For reads to the 32 bit internal registers, 1 read cycle with the wait states will pre-load the second part of the word, so that it may be accessed with 0 wait states.

14.4.2 HIF Bus Interface

The HIF bus will have the capability of performing 32 bit read/write transfers to both the SBus and the FBus. It will not support any of the FBus bursting modes. This is because there is little buffering in the Host Interface and the 68360 bus interface can't keep up. The HIF will allow the external host to control the ITAP Switch chip just as the embedded Tensilica processor can. All of the same memory mapped registers and interrupts are available to it. This state machine will take the transactions from the 68360 bus and perform a bus conversion to a simplified Tensilica PIF bus. This bus will not support block reads since more buffering would be needed, and the expected interface speed (PCI translated to 68360 async i/f) does not have the bandwidth adequate to support block reads at 250MHz.

14.4.3 Mailbox Ram Bus Interface

The Mailbox ram interface gives the host fast access to a small dual port ram which it can communicate to the local Tensilica processor via a messaging scheme which is TBD. This is a single cycle RAM so there are no latency or acknowledge signals which need to be passed back to the controller. It will merely pass along the address,data and byte enable control signals. Since the 68360 does not suport unaligned transfers the the host interface's 16 bit data bus will be replicated as it goes into the Mailbox Ram.

This interface tightly couples onto an SRAM, there will be byte writes. The size of this ram will be a true dual port RAM that is 64 entries x 32bits wide.

14.5 Host Interface Top Level I/O

| Pin Name | Width | I/O | Description |
|---|---|---|---|
| *Host Interface Pins* | | | |
| hcs_b | 1 | I | Chip Select (Active low) |
| hds_b | 1 | I | Data Strobe(Active low) |
| hwe_b[1:0] | 2 | I | Read=1, Write=0 |
| haddr[12:0] | 13 | I | Address Pins |
| hdata | 16 | B | Data Bus |
| irq0_b | 1 | O | Interrupt 0 |
| irq1_b | 1 | O | Interrupt 1 |
| hdsack_b | 1 | O | Transfer Ack (Active low)-opendrain |
| *Mailbox RAM Interface* | | | |
| maddr | 6 | O | Mailbox address-longword aligned |
| mdataw | 32 | O | Mailbox Write data bus |
| mdatar | 32 | I | Mailbox Read data bus |
| mwe | 4 | O | Mailbox Write Enable |
| mcs | 1 | O | Mailbox CS |
| *HIF interface* | | | |
| HIFCnt | 1 | O | HIF Control Bits |
| HIFValid | 1 | O | HIF Valid |
| BIFCntl | 2 | I | BIF Module Control Bits |
| BIFValid | 1 | I | BIF Valid |
| BIFReqRdy | 1 | I | BIF Module Ready |
| HIFAddr | x | O | HIF Address |
| HIFdataW | 32 | O | HIF Write Data bus |
| HIFdataR | 32 | I | HIF Read Data bus |
| HIFBe | 4 | O | HIF Byte Enables |
| *Misc* | | | |
| sysclock | 1 | I | System Clock |
| reset_b | 1 | I | Reset (Active Low) |
| pirq | 8 | I | Processor Interrupts |

Proprietary ( 'onfidential Information of Onex Communicatic ırporation

| | | | |
|---|---|---|---|
| sleep | 1 | I | Processor Sleep |

14.6 Notes 1. 68360 can abort the bus cycle, make sure we can handle this correctly.
2. Double buffer the control inputs, they're asynchronous.
3. The 68360 16 bit port size will cause the following to be decoding:

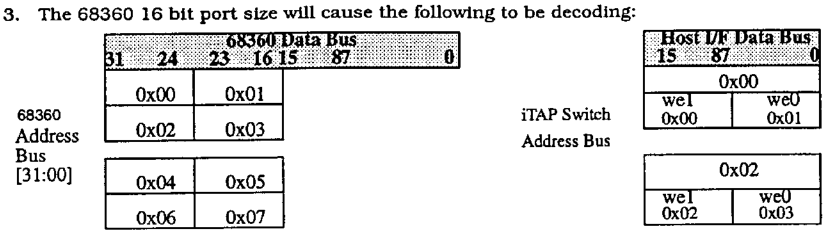

Figure 14-7: Big Endian 16 bit 68360 Port Addressing

4. The size of the host interface will be
   - 64x32bit Dual Port Ram
   - 32 bit read buffers
   - 13 bit address tag buffer
   - Local Registers- 10 page bits, Irq~80, 10 misc, 25 for FSMs and output registering
   - Metastability - 34 FFs, (need to sample data bus at the correct time, so we don't need to register it).

Total Flip Flops~ 210 + Dual Port RAM of 2048 bits.

15 Configuration/Status Register List

This section summarizes the Control Status Registers (CSRs) used to configure and monitor the operation of the iTSE. CSRs include all configurable memory devices within the iTSE, these devices may be individual flip-flops, register arrays or memory arrays.

Table 15-1: Datapath CSRs

| 31 ... 24 | 23 ... 16 | 15 ... 8 | 7 ... 0 | Address Offset |
|---|---|---|---|---|
| | | | | 0x0000 |
| | | | | 0x0004 |

15.1 Memory Map:

The memory map of the chip is 32 megabytes. All registers are accessible via the host interface by setting the page register accordingly.

| Bus Mapping | Block Description | Address Range | Host Interface Page Range | Size (MB) |
|---|---|---|---|---|
| SBus | SPI Memory Space | 0x0000 0000 | 0x000 | 4 |
| | | 0x003F FFFF | 0x0FF | |
| SBus | DataPath CSRs | 0x0040 0000 | 0x100 | 4 |
| | | 0x0043 0000 | 0x10C | |
| SBus | Synchronizers | 0x0043 4000 | 0x10D | |
| SBus | Arbitration | 0x0044 0000 | 0x110 | |
| | | 0x0044 8000 | 0x112 | |
| SBus | DMA | 0x0044 C000 | 0x113 | |
| SBus | Misc Registers | 0x0045 0000 | 0x114 | |
| SBus | MailBox Ram | 0x0045 4000 | 0x115 | |
| SBus | UART | 0x0045 8000 | 0x116 | |
| FBus | External RAM | 0x0080 0000 | 0x200 | 4 |
| | | 0x007F FFFF | 0x2FF | |
| FBus | Internal Shared Ram | 0x00C0 0000 | 0x300 | 0.032 |
| | | 0x00C04000 | 0x301 | |

15.1.1 Synchronizer Memory Map

Base Address 0x00434000

| Bits 31–16 | Bits 15–0 | Address Offset |
|---|---|---|
| 0 0 0 frame_size | 0 0 0 0 0 0 0 0 0 0 0 0 0 0 0 0 | 0x0000 |
| 0 0 0 0 lostsync_loop_limit 0 0 0 0 presync_loop_limit | 0 0 0 0 0 0 0 0 0 0 0 0 0 0 0 0 | 0x0004 |
| 0 0 0 gate_capture_data_position | 0 0 0 eor_enable_position | 0x0008 |
| 0 0 0 0 0 total_data_slot_limit | 0 0 0 0 0 valid_data_slot_limit | 0x000C |
| 0 0 0 0 0 data_row_toggle_position | 0 0 0 0 0 0 0 0 0 0 0 0 0 0 0 0 | 0x0010 |
| 0 0 0 0 0 total_grant_slot_limit | 0 0 0 0 0 valid_grant_slot_limit | 0x0014 |
| 0 0 0 0 0 grant_row_toggle_position | 0 0 0 0 0 0 0 0 0 0 0 0 0 0 0 0 | 0x0018 |
| 0 0 0 data_framing_pattern_position | 0 0 0 grant_framing_pattern_position | 0x001C |
| 0 0 0 data_sor_offset | 0 0 0 grant_sor_offset | 0x0020 |
| 0 0 0 0 0 data_oslot_num_start_position | 0 0 0 0 0 grant_oslot_num_start_position | 0x0024 |
| 0 0 0 0 data_link_input_enable | 0 0 0 0 grant_link_input_enable | 0x0028 |
| 0 0 0 0 data_link_output_enable | 0 0 0 0 grant_link_output_enable | 0x002C |
| 0 0 0 start_oslot_position | 0 0 0 0 0 0 0 0 0 0 misc_control | 0x0030 |
| 0 0 0 0 sync_changed_dc1_int_mask | 0 0 0 0 sync_changed_dc0_int_mask | 0x0034 |
| 0 0 0 0 sync_changed_gc_int_mask | 0 0 0 0 0 0 0 0 0 0 0 0 0 0 0 0 | 0x0038 |
| 0 0 0 0 sync_error_limit_dc1_int_mask | 0 0 0 0 sync_error_limit_dc0_int_mask | 0x003C |
| 0 0 0 0 sync_error_limit_gc_int_mask | 0 0 0 0 0 0 0 0 0 0 0 0 0 0 0 0 | 0x0040 |
| 0 0 0 0 crc_error_limit_dc1_int_mask | 0 0 0 0 crc_error_limit_dc0_int_mask | 0x0044 |
| 0 0 0 0 crc_error_limit_gc_int_mask | 0 0 0 0 0 0 0 0 0 0 0 0 0 0 0 0 | 0x0048 |
| 0 0 0 0 data_slot_sync_error_int_mask | 0 0 0 0 grant_slot_sync_error_int_mask | 0x004C |
| 0 0 0 0 sync_status_dc1 | 0 0 0 0 sync_status_dc0 | 0x0050 |
| 0 0 0 0 sync_status_gc | 0 0 0 0 0 0 0 0 0 0 0 0 0 0 0 0 | 0x0054 |
| 0 0 0 0 data_slot_sync_error | 0 0 0 0 grant_slot_sync_error | 0x0058 |
| 0 0 0 0 sync_error_limit_dc1 | 0 0 0 0 sync_error_limit_dc0 | 0x005C |
| 0 0 0 0 sync_error_limit_gc | 0 0 0 0 0 0 0 0 0 0 0 0 0 0 0 0 | 0x0060 |
| 0 0 0 0 crc_error_limit_dc1 | 0 0 0 0 crc_error_limit_dc0 | 0x0064 |
| 0 0 0 0 crc_error_limit_gc | 0 0 0 0 0 0 0 0 0 0 0 0 0 0 0 0 | 0x0068 |
| 0 0 0 pp_sync_offset_count_l0 | 0 0 0 pp_sync_offset_count_l1 | 0x006C |
| 0 0 0 pp_sync_offset_count_l2 | 0 0 0 pp_sync_offset_count_l3 | 0x0070 |
| 0 0 0 pp_sync_offset_count_l4 | 0 0 0 pp_sync_offset_count_l5 | 0x0074 |
| 0 0 0 pp_sync_offset_count_l6 | 0 0 0 pp_sync_offset_count_l7 | 0x0078 |

*Proprietary ... Confidential Information of Onex Communications Corporation*

Base Address 0x00434000

| Bits 31 – 16 | Bits 15 – 0 | Address Offset |
|---|---|---|
| 0 0 0 pp_sync_offset_count_l8 | 0 0 0 pp_sync_offset_count_l9 | 0x007c |
| 0 0 0 pp_sync_offset_count_l10 | 0 0 0 pp_sync_offset_count_l11 | 0x0080 |
| 0 0 0 0 0 0 0 0 0 0 0 int_masks | 0 0 0 0 0 0 0 0 0 0 0 int_status | 0x0084 |
| 0 0 0 0 0 dp_islot_cmp | 0 0 0 0 0 gnt_islot_cmp | 0x0088 |
| 0 0 0 0 0 0 0 0 0 0 0 0 lost_sync_error_count_dc0_l0 | | 0x0100 |
| 0 0 0 0 0 0 0 0 0 0 0 0 lost_sync_error_count_dc0_l1 | | 0x0104 |
| 0 0 0 0 0 0 0 0 0 0 0 0 lost_sync_error_count_dc0_l2 | | 0x0108 |
| 0 0 0 0 0 0 0 0 0 0 0 0 lost_sync_error_count_dc0_l3 | | 0x010c |
| 0 0 0 0 0 0 0 0 0 0 0 0 lost_sync_error_count_dc0_l4 | | 0x0110 |
| 0 0 0 0 0 0 0 0 0 0 0 0 lost_sync_error_count_dc0_l5 | | 0x0114 |
| 0 0 0 0 0 0 0 0 0 0 0 0 lost_sync_error_count_dc0_l6 | | 0x0118 |
| 0 0 0 0 0 0 0 0 0 0 0 0 lost_sync_error_count_dc0_l7 | | 0x011c |
| 0 0 0 0 0 0 0 0 0 0 0 0 lost_sync_error_count_dc0_l8 | | 0x0120 |
| 0 0 0 0 0 0 0 0 0 0 0 0 lost_sync_error_count_dc0_l9 | | 0x0124 |
| 0 0 0 0 0 0 0 0 0 0 0 0 lost_sync_error_count_dc0_l10 | | 0x0128 |
| 0 0 0 0 0 0 0 0 0 0 0 0 lost_sync_error_count_dc0_l11 | | 0x012c |
| 0 0 0 0 0 0 0 0 0 0 0 0 lost_sync_error_count_dc1_l0 | | 0x0130 |
| 0 0 0 0 0 0 0 0 0 0 0 0 lost_sync_error_count_dc1_l1 | | 0x0134 |
| 0 0 0 0 0 0 0 0 0 0 0 0 lost_sync_error_count_dc1_l2 | | 0x0138 |
| 0 0 0 0 0 0 0 0 0 0 0 0 lost_sync_error_count_dc1_l3 | | 0x013c |
| 0 0 0 0 0 0 0 0 0 0 0 0 lost_sync_error_count_dc1_l4 | | 0x0140 |
| 0 0 0 0 0 0 0 0 0 0 0 0 lost_sync_error_count_dc1_l5 | | 0x0144 |
| 0 0 0 0 0 0 0 0 0 0 0 0 lost_sync_error_count_dc1_l6 | | 0x0148 |
| 0 0 0 0 0 0 0 0 0 0 0 0 lost_sync_error_count_dc1_l7 | | 0x014c |
| 0 0 0 0 0 0 0 0 0 0 0 0 lost_sync_error_count_dc1_l8 | | 0x0150 |
| 0 0 0 0 0 0 0 0 0 0 0 0 lost_sync_error_count_dc1_l9 | | 0x0154 |
| 0 0 0 0 0 0 0 0 0 0 0 0 lost_sync_error_count_dc1_l10 | | 0x0158 |
| 0 0 0 0 0 0 0 0 0 0 0 0 lost_sync_error_count_dc1_l11 | | 0x015c |
| 0 0 0 0 0 0 0 0 0 0 0 0 lost_sync_error_count_gc_l0 | | 0x0160 |
| 0 0 0 0 0 0 0 0 0 0 0 0 lost_sync_error_count_gc_l1 | | 0x0164 |
| 0 0 0 0 0 0 0 0 0 0 0 0 lost_sync_error_count_gc_l2 | | 0x0168 |
| 0 0 0 0 0 0 0 0 0 0 0 0 lost_sync_error_count_gc_l3 | | 0x016c |
| 0 0 0 0 0 0 0 0 0 0 0 0 lost_sync_error_count_gc_l4 | | 0x0170 |
| 0 0 0 0 0 0 0 0 0 0 0 0 lost_sync_error_count_gc_l5 | | 0x0174 |

Bit positions marked: 31, 24 23, 16 15, 8 7, 0. In the lost_sync_error_count rows, the twelve 0 bits occupy bits 31–20 and the field spans bits 19–0.

*Proprietary Confidential Information of Onex Communicati ~orporation*

Base Address 0x00434000

| 31 | | | | | | | 24 | 23 | | | | 16 15 8 7 0 | Address Offset |
|---|---|---|---|---|---|---|---|---|---|---|---|---|---|
| 0 | 0 | 0 | 0 | 0 | 0 | 0 | 0 | 0 | 0 | 0 | 0 | lost_sync_error_count_gc_l6 | 0x0178 |
| 0 | 0 | 0 | 0 | 0 | 0 | 0 | 0 | 0 | 0 | 0 | 0 | lost_sync_error_count_gc_l7 | 0x017c |
| 0 | 0 | 0 | 0 | 0 | 0 | 0 | 0 | 0 | 0 | 0 | 0 | lost_sync_error_count_gc_l8 | 0x0180 |
| 0 | 0 | 0 | 0 | 0 | 0 | 0 | 0 | 0 | 0 | 0 | 0 | lost_sync_error_count_gc_l9 | 0x0184 |
| 0 | 0 | 0 | 0 | 0 | 0 | 0 | 0 | 0 | 0 | 0 | 0 | lost_sync_error_count_gc_l10 | 0x0188 |
| 0 | 0 | 0 | 0 | 0 | 0 | 0 | 0 | 0 | 0 | 0 | 0 | lost_sync_error_count_gc_l11 | 0x018c |
| 0 | 0 | 0 | 0 | 0 | 0 | 0 | 0 | 0 | 0 | 0 | 0 | crc_error_count_dc0_l0 | 0x0190 |
| 0 | 0 | 0 | 0 | 0 | 0 | 0 | 0 | 0 | 0 | 0 | 0 | crc_error_count_dc0_l1 | 0x0194 |
| 0 | 0 | 0 | 0 | 0 | 0 | 0 | 0 | 0 | 0 | 0 | 0 | crc_error_count_dc0_l2 | 0x0198 |
| 0 | 0 | 0 | 0 | 0 | 0 | 0 | 0 | 0 | 0 | 0 | 0 | crc_error_count_dc0_l3 | 0x019c |
| 0 | 0 | 0 | 0 | 0 | 0 | 0 | 0 | 0 | 0 | 0 | 0 | crc_error_count_dc0_l4 | 0x01a0 |
| 0 | 0 | 0 | 0 | 0 | 0 | 0 | 0 | 0 | 0 | 0 | 0 | crc_error_count_dc0_l5 | 0x01a4 |
| 0 | 0 | 0 | 0 | 0 | 0 | 0 | 0 | 0 | 0 | 0 | 0 | crc_error_count_dc0_l6 | 0x01a8 |
| 0 | 0 | 0 | 0 | 0 | 0 | 0 | 0 | 0 | 0 | 0 | 0 | crc_error_count_dc0_l7 | 0x01ac |
| 0 | 0 | 0 | 0 | 0 | 0 | 0 | 0 | 0 | 0 | 0 | 0 | crc_error_count_dc0_l8 | 0x01b0 |
| 0 | 0 | 0 | 0 | 0 | 0 | 0 | 0 | 0 | 0 | 0 | 0 | crc_error_count_dc0_l9 | 0x01b4 |
| 0 | 0 | 0 | 0 | 0 | 0 | 0 | 0 | 0 | 0 | 0 | 0 | crc_error_count_dc0_l10 | 0x01b8 |
| 0 | 0 | 0 | 0 | 0 | 0 | 0 | 0 | 0 | 0 | 0 | 0 | crc_error_count_dc0_l11 | 0x01bc |
| 0 | 0 | 0 | 0 | 0 | 0 | 0 | 0 | 0 | 0 | 0 | 0 | crc_error_count_dc1_l0 | 0x01c0 |
| 0 | 0 | 0 | 0 | 0 | 0 | 0 | 0 | 0 | 0 | 0 | 0 | crc_error_count_dc1_l1 | 0x01c4 |
| 0 | 0 | 0 | 0 | 0 | 0 | 0 | 0 | 0 | 0 | 0 | 0 | crc_error_count_dc1_l2 | 0x01c8 |
| 0 | 0 | 0 | 0 | 0 | 0 | 0 | 0 | 0 | 0 | 0 | 0 | crc_error_count_dc1_l3 | 0x01cc |
| 0 | 0 | 0 | 0 | 0 | 0 | 0 | 0 | 0 | 0 | 0 | 0 | crc_error_count_dc1_l4 | 0x01d0 |
| 0 | 0 | 0 | 0 | 0 | 0 | 0 | 0 | 0 | 0 | 0 | 0 | crc_error_count_dc1_l5 | 0x01d4 |
| 0 | 0 | 0 | 0 | 0 | 0 | 0 | 0 | 0 | 0 | 0 | 0 | crc_error_count_dc1_l6 | 0x01d8 |
| 0 | 0 | 0 | 0 | 0 | 0 | 0 | 0 | 0 | 0 | 0 | 0 | crc_error_count_dc1_l7 | 0x01dc |
| 0 | 0 | 0 | 0 | 0 | 0 | 0 | 0 | 0 | 0 | 0 | 0 | crc_error_count_dc1_l8 | 0x01e0 |
| 0 | 0 | 0 | 0 | 0 | 0 | 0 | 0 | 0 | 0 | 0 | 0 | crc_error_count_dc1_l9 | 0x01e4 |
| 0 | 0 | 0 | 0 | 0 | 0 | 0 | 0 | 0 | 0 | 0 | 0 | crc_error_count_dc1_l10 | 0x01e8 |
| 0 | 0 | 0 | 0 | 0 | 0 | 0 | 0 | 0 | 0 | 0 | 0 | crc_error_count_dc1_l11 | 0x01ec |
| 0 | 0 | 0 | 0 | 0 | 0 | 0 | 0 | 0 | 0 | 0 | 0 | crc_error_count_dc0_l0 | 0x01f0 |
| 0 | 0 | 0 | 0 | 0 | 0 | 0 | 0 | 0 | 0 | 0 | 0 | crc_error_count_gc_l1 | 0x01f4 |
| 0 | 0 | 0 | 0 | 0 | 0 | 0 | 0 | 0 | 0 | 0 | 0 | crc_error_count_gc_l2 | 0x01f8 |
| 0 | 0 | 0 | 0 | 0 | 0 | 0 | 0 | 0 | 0 | 0 | 0 | crc_error_count_gc_l3 | 0x01fc |

Base Address 0x00434000

| 31 | | | | | | | 24 | 23 | | | | 16 15 … 8 7 … 0 | Address Offset |
|---|---|---|---|---|---|---|---|---|---|---|---|---|---|
| 0 | 0 | 0 | 0 | 0 | 0 | 0 | 0 | 0 | 0 | 0 | 0 | crc_error_count_gc_l4 | 0x0200 |
| 0 | 0 | 0 | 0 | 0 | 0 | 0 | 0 | 0 | 0 | 0 | 0 | crc_error_count_gc_l5 | 0x0204 |
| 0 | 0 | 0 | 0 | 0 | 0 | 0 | 0 | 0 | 0 | 0 | 0 | crc_error_count_gc_l6 | 0x0208 |
| 0 | 0 | 0 | 0 | 0 | 0 | 0 | 0 | 0 | 0 | 0 | 0 | crc_error_count_gc_l7 | 0x020c |
| 0 | 0 | 0 | 0 | 0 | 0 | 0 | 0 | 0 | 0 | 0 | 0 | crc_error_count_gc_l8 | 0x0210 |
| 0 | 0 | 0 | 0 | 0 | 0 | 0 | 0 | 0 | 0 | 0 | 0 | crc_error_count_gc_l9 | 0x0214 |
| 0 | 0 | 0 | 0 | 0 | 0 | 0 | 0 | 0 | 0 | 0 | 0 | crc_error_count_gc_l10 | 0x0218 |
| 0 | 0 | 0 | 0 | 0 | 0 | 0 | 0 | 0 | 0 | 0 | 0 | crc_error_count_gc_l11 | 0x021c |

The Address Offset range 0x0300 - 0x041c has the same read values as the range 0x0100 - 0x021c except that upon a read, the register is cleared. A write to the range 0x0300 - 0x041c is not allowed and will result in a bus error.

Table 15-2: Synchronizer Misc Contol Bit Fields

| Bit# | Field |
|---|---|
| 0 | disable_scrambler |
| 1 | disable_descrambler |
| 2 | bypass_sync |
| 3 | switch_sor_reset |
| 5:4 | slot_size_select |

15.1.2 Arbitration Memory Map

Base Address 0x00440000

| 31 … 24 23 … 16 15 … 8 7 … 0 | Address Offset |
|---|---|
| Grant Mapper Ram Slot 0 | 0x0000 |
| | 0x0004 |
| Grant Mapper Ram Slot 1 | 0x0008 |
| | 0x000C |
| Grant Mapper Ram Slot 849 | 0x1A88 |
| | 0x1A8C |
| unmapped address space | 0x1A90 |
| Grant DeMapper Ram Slot 0 | 0x4000 |
| | 0x4004 |

*Proprietary Confidential Information of Onex Communicati orporation*

Base Address 0x00440000

| Bits 31–24 | Bits 23–16 | Bits 15–8 | Bits 7–0 | Address Offset |
|---|---|---|---|---|
| Grant DeMapper Ram Slot 1 | | | | 0x4008 |
| | | | | 0x400C |
| Grant DeMapper Ram Slot 849 | | | | 0x5A88 |
| | | | | 0x5A8C |
| unmapped address space | | | | 0x5A90 |
| Grant Link 00 Status Reg | | | | 0x8000 |
| Grant Link 01 Status Reg | | | | 0x8004 |
| Grant Link 02 Status Reg | | | | 0x8008 |
| Grant Link 03 Status Reg | | | | 0x800C |
| Grant Link 04 Status Reg | | | | 0x8010 |
| Grant Link 05 Status Reg | | | | 0x8014 |
| Grant Link 06 Status Reg | | | | 0x8018 |
| Grant Link 07 Status Reg | | | | 0x801C |
| Grant Link 08 Status Reg | | | | 0x8020 |
| Grant Link 09 Status Reg | | | | 0x8024 |
| Grant Link 10 Status Reg | | | | 0x8028 |
| Grant Link 11 Status Reg | | | | 0x802C |
| Grant Link Framing Pattern | | | | 0x8030 |
| | Grant Link Framing Pattern | read only- all zeroes | | 0x8034 |
| Grant Link Common 'Stuff' Reg | | | | 0x8038 |
| Grant Link 00 Line Overhead Status Reg | | | | 0x803C |
| Grant Link 01 Line Overhead Status Reg | | | | 0x8040 |
| Grant Link 02 Line Overhead Status Reg | | | | 0x8044 |
| Grant Link 03 Line Overhead Status Reg | | | | 0x8048 |
| Grant Link 04 Line Overhead Status Reg | | | | 0x804C |
| Grant Link 05 Line Overhead Status Reg | | | | 0x8050 |
| Grant Link 06 Line Overhead Status Reg | | | | 0x8054 |
| Grant Link 07 Line Overhead Status Reg | | | | 0x8058 |
| Grant Link 08 Line Overhead Status Reg | | | | 0x805C |
| Grant Link 09 Line Overhead Status Reg | | | | 0x8060 |
| Grant Link 10 Line Overhead Status Reg | | | | 0x8064 |
| Grant Link 11 Line Overhead Status Reg | | | | 0x8068 |

*Proprietary Confidential Information of Onex Communications Corporation*

Base Address 0x00440000

| 31 … 24 | 23 … 16 | 15 … 8 | 7 … 0 | Address Offset |
|---|---|---|---|---|
| Grant Max Grants | | | | 0x806C |
| | | | | 0x8070 |
| | | | | 0x8074 |
| Grant Capture Interrupt Status Register | | | | 0x8078 |
| Grant Link 0 Capture Register Contents | | | | 0x807C |
| Grant Link 1 Capture Register Contents | | | | 0x8080 |
| Grant Link 2 Capture Register Contents | | | | 0x8084 |
| Grant Link 3 Capture Register Contents | | | | 0x8088 |
| Grant Link 4 Capture Register Contents | | | | 0x808C |
| Grant Link 5 Capture Register Contents | | | | 0x8090 |
| Grant Link 6 Capture Register Contents | | | | 0x8094 |
| Grant Link 7 Capture Register Contents | | | | 0x8098 |
| Grant Link 8 Capture Register Contents | | | | 0x809C |
| Grant Link 9 Capture Register Contents | | | | 0x80A0 |
| Grant Link 10 Capture Register Contents | | | | 0x80A4 |
| Grant Link 11 Capture Register Contents | | | | 0x80A8 |
| Grant Link 0 Capture Register Bit Mask | | | | 0x80AC |
| Grant Link 1 Capture Register Bit Mask | | | | 0x80B0 |
| Grant Link 2 Capture Register Bit Mask | | | | 0x80B4 |
| Grant Link 3 Capture Register Bit Mask | | | | 0x80B8 |
| Grant Link 4 Capture Register Bit Mask | | | | 0x80BC |
| Grant Link 5 Capture Register Bit Mask | | | | 0x80C0 |
| Grant Link 6 Capture Register Bit Mask | | | | 0x80C4 |
| Grant Link 7 Capture Register Bit Mask | | | | 0x80C8 |
| Grant Link 8 Capture Register Bit Mask | | | | 0x80CC |
| Grant Link 9 Capture Register Bit Mask | | | | 0x80D0 |
| Grant Link 10 Capture Register Bit Mask | | | | 0x80D4 |
| Grant Link 11 Capture Register Bit Mask | | | | 0x80D8 |
| Gnt Config | 0 0 0 0 0 0 0 0 0 0 0 0 | | Grant Parity Error Masks | 0x80DC |
| Grant Error Interrupt Mask | | | | 0x80E0 |
| Grant Error Interrupt Status Register | | | | 0x80E4 |
| | | | Grant Parity Error | 0x80E8 |
| | Grant Mapper Sequence Error | | Grant DeMapper Sequence Error | 0x80EC |

*Proprietary . 'onfidential Information of Onex Communicatic 'rporation*

Base Address 0x00440000

| 31 | 30–24 | 23 | 22–16 | 15 | 14 | 13 | 12 | 11 | 10 | 9 | 8 | 7 | 6 | 5 | 4 | 3 | 2 | 1 | 0 | Address Offset |
|---|---|---|---|---|---|---|---|---|---|---|---|---|---|---|---|---|---|---|---|---|
| Grant Dest Error Element[31:00] | | | | | | | | | | | | | | | | | | | | 0x80F0 |
| Grant Dest Error Element[47:32]] | | | | reserved | | | | | | | | | | | | | | | | 0x80F4 |
| unmapped memory space | | | | | | | | | | | | | | | | | | | | |
| Request Link 0 Priority 0 Statistics | | | | | | | | | | | | | | | | | | | | 0x9000 |
| Request Link 0 Priority 1 Statistics | | | | | | | | | | | | | | | | | | | | 0x9004 |
| Request Link 0 Priority 2 Statistics | | | | | | | | | | | | | | | | | | | | 0x9008 |
| Request Link 0 Priority 3 Statistics | | | | | | | | | | | | | | | | | | | | 0x900C |
| Request Link 0 Priority 4 Statistics | | | | | | | | | | | | | | | | | | | | 0x9010 |
| Request Link 0 Priority 5 Statistics | | | | | | | | | | | | | | | | | | | | 0x9014 |
| Request Link 0 Priority 6 Statistics | | | | | | | | | | | | | | | | | | | | 0x9018 |
| Request Link 0 Priority 7 Statistics | | | | | | | | | | | | | | | | | | | | 0x901C |
| Request Link 1 Priority 0 Statistics | | | | | | | | | | | | | | | | | | | | 0x9020 |
| Request Link 2 Priority 0 Statistics | | | | | | | | | | | | | | | | | | | | 0x9040 |
| Request Link 3 Priority 0 Statistics | | | | | | | | | | | | | | | | | | | | 0x9060 |
| Request Link 4 Priority 0 Statistics | | | | | | | | | | | | | | | | | | | | 0x9080 |
| Request Link 5 Priority 0 Statistics | | | | | | | | | | | | | | | | | | | | 0x90A0 |
| Request Link 6 Priority 0 Statistics | | | | | | | | | | | | | | | | | | | | 0x90C0 |
| Request Link 7 Priority 0 Statistics | | | | | | | | | | | | | | | | | | | | 0x90E0 |
| Request Link 8 Priority 0 Statistics | | | | | | | | | | | | | | | | | | | | 0x9100 |
| Request Link 9 Priority 0 Statistics | | | | | | | | | | | | | | | | | | | | 0x9120 |
| Request Link 10 Priority 0 Statistics | | | | | | | | | | | | | | | | | | | | 0x9140 |
| Request Link 11 Priority 0 Statistics | | | | | | | | | | | | | | | | | | | | 0x9160 |
| 0 | Max Request Link 00 | 0 | Num Requests Link 00 | 0 | 0 | 0 | 0 | 0 | 0 | 0 | 0 | 0 | 0 | | 0 | 0 | 0 | 0 | 0 | 0x9180 |
| 0 | Max Request Link 01 | 0 | Num Requests Link 01 | 0 | 0 | 0 | 0 | 0 | 0 | 0 | 0 | 0 | 0 | 0 | 0 | 0 | 0 | 0 | 0 | 0x9184 |
| 0 | Max Request Link 02 | 0 | Num Requests Link 02 | 0 | 0 | 0 | 0 | 0 | 0 | 0 | 0 | 0 | 0 | 0 | 0 | 0 | 0 | 0 | 0 | 0x9188 |
| 0 | Max Request Link 03 | 0 | Num Requests Link 03 | 0 | 0 | 0 | 0 | 0 | 0 | 0 | 0 | 0 | 0 | 0 | 0 | 0 | 0 | 0 | 0 | 0x918C |
| 0 | Max Request Link 04 | 0 | Num Requests Link 04 | 0 | 0 | 0 | 0 | 0 | 0 | 0 | 0 | 0 | 0 | 0 | 0 | 0 | 0 | 0 | 0 | 0x9190 |
| 0 | Max Request Link 05 | 0 | Num Requests Link 05 | 0 | 0 | 0 | 0 | 0 | 0 | 0 | 0 | 0 | 0 | 0 | 0 | 0 | 0 | 0 | 0 | 0x9194 |
| 0 | Max Request Link 06 | 0 | Num Requests Link 06 | 0 | 0 | 0 | 0 | 0 | 0 | 0 | 0 | 0 | 0 | 0 | 0 | 0 | 0 | 0 | 0 | 0x9198 |
| 0 | Max Request Link 07 | 0 | Num Requests Link 07 | 0 | 0 | 0 | 0 | 0 | 0 | 0 | 0 | 0 | 0 | 0 | 0 | 0 | 0 | 0 | 0 | 0x919C |
| 0 | Max Request Link 08 | 0 | Num Requests Link 08 | 0 | 0 | 0 | 0 | 0 | 0 | 0 | 0 | 0 | 0 | 0 | 0 | 0 | 0 | 0 | 0 | 0x91A0 |
| 0 | Max Request Link 09 | 0 | Num Requests Link 09 | 0 | 0 | 0 | 0 | 0 | 0 | 0 | 0 | 0 | 0 | 0 | 0 | 0 | 0 | 0 | 0 | 0x91A4 |
| 0 | Max Request Link 10 | 0 | Num Requests Link 10 | 0 | 0 | 0 | 0 | 0 | 0 | 0 | 0 | 0 | 0 | 0 | 0 | 0 | 0 | 0 | 0 | 0x91A8 |
| 0 | Max Request Link 11 | 0 | Num Requests Link 11 | 0 | 0 | 0 | 0 | 0 | 0 | 0 | 0 | 0 | 0 | 0 | 0 | 0 | 0 | 0 | 0 | 0x91AC |

15.1.2.1 Grant Mapper Ram

| 31–28 | 27–24 | 23–20 | 19–16 | 15–12 | 11–8 | 7 | | | | | | | 0 | Address Offset |
|---|---|---|---|---|---|---|---|---|---|---|---|---|---|---|
| Grant Link 00 | Grant Link 01 | Grant Link 02 | Grant Link 03 | Grant Link 04 | Grant Link 05 | 0 | 0 | 0 | 0 | 0 | 0 | 0 | 0 | 0x0000 |
| Grant Link 06 | Grant Link 07 | Grant Link 08 | Grant Link 09 | Grant Link 10 | Grant Link 11 | 0 | 0 | 0 | 0 | 0 | 0 | 0 | 0 | 0x0004 |

Bits 31-8 are read/writable, bits 7-0 read back zero always. Upon reset the registers will contain random patterns and must be written to.

Bit Coding is:

0000 - Idle
0001 - GE0
0010 - GE2
0011 - GE3
1000 - LOH Framing Pattern
1001 - LOH Status
1010 - LOH ID
1011 - LOH Stuff
1100 - LOH Sync

15.1.2.2 Grant DeMapper Ram

| 31 | 30–28 | 27 | 26–24 | 23 | 22–20 | 19 | 18–16 | 15 | 14–12 | 11 | 10–8 | 7 | | | | | | | 0 | Address Offset |
|---|---|---|---|---|---|---|---|---|---|---|---|---|---|---|---|---|---|---|---|---|
| 0 | Grant Link 00 | 0 | Grant Link 01 | 0 | Grant Link 02 | 0 | Grant Link 03 | 0 | Grant Link 04 | 0 | Grant Link 05 | 0 | 0 | 0 | 0 | 0 | 0 | 0 | 0 | 0x4000 |
| 0 | Grant Link 06 | 0 | Grant Link 07 | 0 | Grant Link 08 | 0 | Grant Link 09 | 0 | Grant Link 10 | 0 | Grant Link 11 | 0 | 0 | 0 | 0 | 0 | 0 | 0 | 0 | 0x4004 |

Reset value is random, they must be programmed before use.

Bit Coding is:

000 - Idle
001 - GE0
010 - GE2
011 - GE3
100 - LOH Capture

15.1.2.3 Grant Link Status Register

| 31 | 30 | 29–24 | 23 | 22–16 | 15 | 14–8 | 7 | 6–0 | Address Offset |
|---|---|---|---|---|---|---|---|---|---|
| fifo fill | 0 | Current Fifo Watermark | 0 | Grants Received Last Row | 0 | Grants Dropped Last Row | 0 | Grants Forwarded Last Row | 0x8000-0x802C |

This is a read only register, updated at the end of every row.

15.1.3 Grant Link Framing Pattern

| 31–28 | | | | 27–24 | 23–0 | Address Offset |
|---|---|---|---|---|---|---|
| Frame0 | | | | | | 0x8030 |
| 0 | 0 | 0 | 0 | Frame1 | 0 0 0 0 0 0 0 0 0 0 0 0 0 0 0 0 0 0 0 0 0 0 0 0 | 0x8034 |

The grant link framing pattern is 36 bits wide and is made by concatonating frame0 with fram1 such that: FramingPattern[35:0] = Frame1[27:24],Frame0[31:0],. The reset value of Frame 0 is 0x0000F628 and Frame 1 is 0. So that the framing pattern is 0x0F628.

15.1.3.1 Grant Link Stuff Register

| 31–0 | Address Offset |
|---|---|
| Grant Stuff Register | 0x8038 |

This is a 32 bit read/write register. Reset value is all zeros.

15.1.3.2 Grant Link Overhead Status Register

| 31–0 | Address Offset |
|---|---|
| Grank Link Overhead Status Programmable Register | 0x803C-0x8068 |

This is a 32 bit read/write register. All bits are writeable. The reset value is 0. The use of this register is still undefined.

15.1.3.3 Maximum Grants Register

| 31–24 | 23–16 | 15–8 | 7–0 | Address Offset |
|---|---|---|---|---|
| Link 00 | Link | | | 0x806C |
| | | | | 0x8070 |
| | | | | 0x8074 |

The reset value of these registers allows grants up to 96 PDUs for the following row. Writes to this register are effective immediatly.

15.1.3.4 Grant Capture Interrupt Status Register

| 31–12 | 11–0 | Address Offset |
|---|---|---|
| reserved | Link Interrupt Source | 0x8078 |

Link Interrupt Source - bit is active hi if contents of capture slot are different than previous rows.

Bit 0: Link 00

Bit 1: Link 01

Bit 2: Link 02

...

Bit 11: Link 11

15.1.3.5 Grant Parity Error Masks/ Grant Config

| 31 – 24 | 23 – 12 | 11 – 0 | Address Offset |
|---|---|---|---|
| Grant Config | reserved | Grant Parity Error Masks | 0x80DC |

Grant Parity Error Masks - bit is active hi to enable parity conformance. Reset value is 0.

Bit 0: Link 00

Bit 1: Link 01

Bit 2: Link 02

...

Bit 11: Link 11

Grant Config

Bit 7: Grant Rotate Enable: Reset Value is 0, Set to a 1 to enable grant parser rotation.

Bit 6: Disable Num Field (grants are forced to single PDU reservation mode). Default is 0.

15.1.3.6 Grant Error Interrupt Mask

| 31 – 0 | Address Offset |
|---|---|
| Grant Error Interrupt Mask | 0x80E0 |

Bit 31: Grant Start Signals Unaligned Error Mask: Reset is 0, Program to 1 to enable this type of error.

Bit 30: Grant Minimum Start Pulse Error Mask: Reset is 0, Program to 1 to enable this type of error. This error mask is ineffective for grants since there is no minimum pulse period (it is a holdover from the request parser).

Bit 29: Grant Remaining Mask: At the end of a row, if grants are remaining in the buffers, this will trigger an interrupt when set to a 1, reset value is 0.

Bit 28: Grant Fifo Filled Mask: If the grant fifo overflows for a link this will trigger when programmed to a 1, reset value is 0. Fifo watermarks need to be investigated for the link.

Bits 23-12: Grant Mapper Sequencing Mask: Set to a 1 to allow sequencing errors to generate an interrupt.

Bits 11-0: Grant Demapper Sequencing Mask: Set to a 1 to allow sequencing errors to generate an interrupt.

15.1.3.7 Grant Error Interrupt Status Register

| 31 – 24 | 23 – 0 | Address Offset |
|---|---|---|
| Grant Error Interrupt Status Register | reserved | 0x80E4 |

Bit 31: gnt_dest_error_int - siganls that a grant element has attempted to goto an output it isn't supposed to. Write a 1 to clear this type of interrupt source.

Bit 30: gnt_remaining_int - signals grants are still in the fifo at the end of the row. Write a 1 to clear this interrupt source.

Bit 29: gnt_fifo_fill_int - signals that a grant fifo has overfilled. Write a 1 to clear this interrupt source.

Bit 28: gnt_start_min_error_int - signals that grant elements have arrived too quickly. Write a 1 to clear this interrupt source.

Bit 27: gnt_start_align_error_int - signals alignment error, write a 1 to clear this interrupt source Bit 26: gnt_mapper_int - signals to read grant sequencing error register Bit 25: gnt_demapper_int - signals to read grant sequencing error register Bit 24: gnt_parity_int - signals to read the grant parity error register

15.1.3.8 Grant Parity Error

| 31 – 12 | 11 – 0 | Address Offset |
|---|---|---|
| | Grant Link Parity Status | 0x80E8 |

Bit 11: Link 11

Bit 10: Link 10

....

Bit 0: Link 0

When a grant parity error is detected, writing a 1 to the bit in this register which is causing the interrupt, will clear the interrupt.

15.1.3.9 Grant Sequence Error

| 31 | 30 | 29 | 28 | 27 – 16 | 15 | 14 | 13 | 12 | 11 – 0 | Address Offset |
|---|---|---|---|---|---|---|---|---|---|---|
| 0 | 0 | 0 | 0 | Mapper Sequencing Status | 0 | 0 | 0 | 0 | DeMapper Sequencing Status | 0x80EC |

When a Sequencing Error is detected, this register should be read to determine the input or output link which has generated the error. Write a 1 to the offending bit to clear the interrupt.

Bit 24: Output Link 11

....

Bit 16: Output Link 0

Bit 11: Input Link 11

....

Bit 0: Input Link 0

15.1.3.10 Grant Destination Error Element

| 31 – 16 | 15 – 0 | Address Offset |
|---|---|---|
| Grant Element Bits 47 - 16 | | 0x80F0 |
| Grant Element Bits 15 - 0 | reserved | 0x80F4 |

When a grant link wiring error is detected, the grant element is captured into a register and is made accessible here. This is a ready only register.

*Proprietary Confidential Information of Onex Communications Corporation*

15.1.3.11 Link X Request Element Priority Statistics Registers

| 31 27 | 26 23 16 | 15 11 | 10 7 0 | Address Offset |
|---|---|---|---|---|
| 0 | Link 00 Priority 0 Requests Droped | 0 | Link 00 Priority 0 Request Received | 0x9000 |
| 0 | Link 00 Priority 1 Requests Droped | 0 | Link 00 Priority 1 Request Received | 0x9004 |
| 0 | Link 00 Priority 2 Requests Droped | 0 | Link 00 Priority 2 Request Received | 0x9008 |
| 0 | Link 00 Priority 3 Requests Droped | 0 | Link 00 Priority 3 Request Received | 0x900C |
| 0 | Link 00 Priority 4 Requests Droped | 0 | Link 00 Priority 4 Request Received | 0x9010 |
| 0 | Link 00 Priority 5 Requests Droped | 0 | Link 00 Priority 5 Request Received | 0x9014 |
| 0 | Link 00 Priority 6 Requests Droped | 0 | Link 00 Priority 6 Request Received | 0x9018 |
| 0 | Link 00 Priority 7 Requests Droped | 0 | Link 00 Priority 7 Request Received | 0x901C |

This pattern repeats for each of the 12 links, the offset is 0x20 between different link's statistics registers. These registers are read - only.

15.1.3.12 Link X Request Element Counters

| 31 | 27 26 24 | 23 | 16 | 15 | | | | | | | | 7 | | | | | | | 0 | Address Offset |
|---|---|---|---|---|---|---|---|---|---|---|---|---|---|---|---|---|---|---|---|---|
| 0 | Link 00 Maximum Requests / Row | 0 | Link 00 Num Requests Forwarded | 0 | 0 | 0 | 0 | 0 | 0 | 0 | 0 | 0 | 0 | 0 | 0 | 0 | 0 | 0 | 0 | 0x9180 |

The Maximum Requests per row field has a reset value of 96 and is read-writeable. The number of requests forwarded refers to the previous row and is read-only.

15.1.4 Miscellaneous Registers

Base Address: 0x450000

| 31 | | | | 24 23 | 16 15 | 8 | 7 | | | | | 0 | Address Offset |
|---|---|---|---|---|---|---|---|---|---|---|---|---|
| 0 | 0 | 0 | 0 | ilink_mask00 | ilink_spare00 | 0 | 0 | 0 | 0 | 0 | stage num00 | 0x0000 |
| 0 | 0 | 0 | 0 | ilink_mask01 | ilink_spare01 | 0 | 0 | 0 | 0 | 0 | stage num01 | 0x0004 |
| 0 | 0 | 0 | 0 | ilink_mask02 | ilink_spare02 | 0 | 0 | 0 | 0 | 0 | stage num02 | 0x0008 |
| 0 | 0 | 0 | 0 | ilink_mask03 | ilink_spare03 | 0 | 0 | 0 | 0 | 0 | stage num03 | 0x000C |
| 0 | 0 | 0 | 0 | ilink_mask04 | ilink_spare04 | 0 | 0 | 0 | 0 | 0 | stage num04 | 0x0010 |
| 0 | 0 | 0 | 0 | ilink_mask05 | ilink_spare05 | 0 | 0 | 0 | 0 | 0 | stage num05 | 0x0014 |
| 0 | 0 | 0 | 0 | ilink_mask06 | ilink_spare06 | 0 | 0 | 0 | 0 | 0 | stage num06 | 0x0018 |
| 0 | 0 | 0 | 0 | ilink_mask07 | ilink_spare07 | 0 | 0 | 0 | 0 | 0 | stage num07 | 0x001C |
| 0 | 0 | 0 | 0 | ilink_mask08 | ilink_spare08 | 0 | 0 | 0 | 0 | 0 | stage num08 | 0x0020 |

Base Address: 0x450000

| 31–24 | 23–16 | 15–8 | 7–0 | Address Offset |
|---|---|---|---|---|
| 0 0 0 0 ilink_mask09 | ilink_mask09 | ilink_spare09 | 0 0 0 0 0 stage num09 | 0x0024 |
| 0 0 0 0 ilink_mask10 | ilink_mask10 | ilink_spare10 | 0 0 0 0 0 stage num10 | 0x0028 |
| 0 0 0 0 ilink_mask11 | ilink_mask11 | ilink_spare11 | 0 0 0 0 0 stage num11 | 0x002C |
| Programmable Switch ID Number (r/w) | | | | 0x0030 |
| iTAP Switch Part Number (read only) | | | Switch Revision (read only) | 0x0034 |
| iTAP Switch Module Reset Register | SPI Page Register Size | spi_a, spi_sel, SPI_MODE, 0 0 0 0 | BootMode, 0 0, CLK_SEL, WRST | 0x0038 |
| SBus Module Full Decode | SBUS Timer | | | 0x003C |
| Host to Core Push Button Interrupts | | 0 0 0 0 0 0 0 0 | 0 0 0 0 0 0 0 0 | 0x0040 |
| Core to Host Push Button Interrupts | | 0 0 0 0 0 0 0 0 | 0 0 0 0 0 0 0 0 | 0x0044 |
| Watchdog Control Register | | | | 0x0048 |
| Watchdog Timeout Register | | | | 0x004C |
| Watchdog Timer Value | | | | 0x0050 |
| Watchdog Service Register | | | | 0x0054 |
| Interrupt Mask Register | | | | 0x0058 |
| Interrupt 0 Register | | | | 0x005C |
| Interrupt 1 Register | | | | 0x0060 |
| Interrupt 2 Register | | | | 0x0064 |
| Interrupt 3 Register | | | | 0x0068 |
| PI00 PI01 | PI02 PI03 | PI04 PI05 | PI06 PI07 | 0x006C |
| PI08 PI09 | PI10 PI11 | PI12 PI13 | PI14 PI15 | 0x0070 |
| PI16 PI17 | PI18 PI19 | PI20 PI21 | PI22 PI023 | 0x0074 |
| PI24 | TBD- if we need more interrupts | | | 0x0078 |
| | | | | |
| iTAP Switch Test Mode | | | | |
| | | | | |
| | | | | |

15.1.4.1 Switch Stage Numbers

| 31–27 | 26–16 | 15–8 | 7–0 | Address Offset |
|---|---|---|---|---|
| 0 0 0 0 | ilink_mask00 | ilink_spare00 | 0 0 0 0 0 stage num00 | 0x0000 |

Bit positions: 31, 27 26, 24 23, 16 15, 11 10, 8 7, 0

16 iTAP Debug/Trace Interfaces

The iTAP Switch will have 2 different visibility points of the local Tensilica processor. The first visibility point is a trace port. The trace port allows one to monitor program flow by outputting information about the program counter. This is a non-intrusive interface that only monitors information. The second port is the JTAG debug port. This is a bi-directional communications pathway that allows a programmer to set breakpoints, single step through code, and peek/poke at processor state bits as well as memory locations.

In this document a brief overview of the debug interfaces on commerically available microprocessors is given, followed by the iTAP implementation of each.

16.1 Program Trace / Debug Support of other Processors

Most processors on the market today have some sort of JTAG on-chip debug support. This allows a programmer to interface to the chip and single step through his or her code. Breakpoints can be, memory modified and individual processor registers can be set or cleared. Fewer processors have a 'trace' port which allows the monitoring of a program. Often, software bugs only crop up when they have been running 'at speed' and the insertion of special debug code, or slowing down the system by single stepping through code mask the problem. Here is a brief list of what other processor vendors provide.

Motorola - Special 8 bit Debug trace port + on chip debug via JTAG

ARM - Embedded ICE. This provides JTAG control. |

Intel StrongArm - JTAG single step, etc.

SuperH - JTAG only

TI DSP - JTAG only

Analog Devices DSP - JTAG

MIPS - JTAG. (Some licensed vendors may support more, couldn't find any info).

Motorola is the only vendor that had debug module which provides for a program trace. This is used in their coldfire microprocessors. This is a byte wide interface which is divided into 2 nibbles. These two nibbles are the PST and DDATA.

| PST[3:0] | Definition |
|---|---|
| 0000 | Continue Execution |
| 0001 | Begin Execution of an instruction |
| 0010 | Reserved |
| 0011 | Entry into user-mode |
| 0100 | Begin Execution of Pulse or WDATA |
| 0101 | Begin execution of a taken branch |
| 0110 | Reserved |
| 0111 | Begin execution of RTE inst. |
| 1000 | Begin 1 byte DDATA xfer |
| 1001 | Begin 2 byte DDATA xfer |
| 1010 | Begin 3 byte DDATA xfer |
| 1011 | Begin 4 byte DDATA xfer |
| 1100 | Exception Processing |
| 1101 | Emulator mode entry exception processing |
| 1110 | Processor is stopped, wait for irq |
| 1111 | Processor is halted |

The shortfalls of this interface are that it uses an extra cycle to start sending program counter relative branch information and offers little insight as to why the processor has stalled. On the 'plus' side it has a special PULSE mode which can be set by the processor for performance mode. The Proprietary ... Confidential Information of Onex Communicatic ... orporation Tensilica debug interface gives extensive processor stall information. When it has more information to send than there is time to send it, the trace port will halt the processor. The iTAP debug interface borrows heavily from the Motorola family of processors, with some modifications.

16.2 iTAP Trace Port

This trace interface is used to follow a program trace of a Tensilica microprocessor. On the Tensilica processor, one of the configuration options is to create a Trace Port. This port gives a great deal of information regarding the processor's internal state and when it encounters pipeline bubbles, etc. Using it, one can determine the execution flow of a program in real time. Unfortunately, it is a 41 bit interface.

The iTAP Debug port is completely non-intrusive to the Tensilica core. It will never halt the processor. The debug port has the abilility to allow tracing of the program counter, as well as load/ store address or data words. The amount of data output is configurable by the programmer. It is output in real time at the internal core rate of the Tensilica processor.

Since the port is non-intrusive and has little buffering if too many jumps or load/stores occur in a row the data will be lost. Judicious use of which data to output will be necessary.

16.2.1 Tensilica Trace Port Interface

SUBJECT TO TENSILICA NDA

17 Miscellaneous Modules

17.1 Test Pattern Generator & Analyzer

RESERVED

17.2 Test Interface Bus Multiplexer

RESERVED

17.3 System Control

RESERVED

17.4 JTAG

RESERVED

Proprietary Confidential Information of Onex Communicati orporation

18 Clocking, Reset, and Initialization

18.1 Clocking

TBD

18.2 Initialization

Initialization of the master processor is described here, after its initialization is complete the switch datapath, high speed serial links and several other sub modules need to be initialized. Please consult their individual design specifcations for correct sequence and initialization registers.

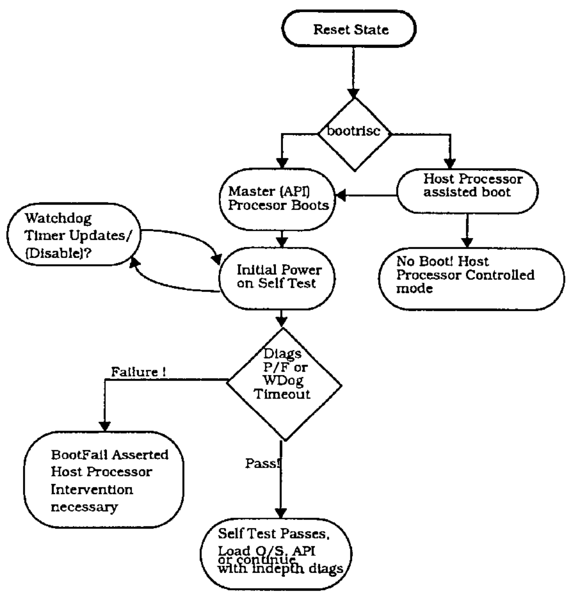

Figure 18-1: iTSE Initialization & Reset Sequence

- Reset State

Power has been applied to the iTSE, hresetx is asserted (active low). The BootDev, BootCfg, RiscClkSel and BootRisc pins are driven to the correct values. (See pin description for appropriate values). The choices allow for booting out of the SPI, Flash, FCRAM or Internal Ram. Hresetx is deasserted.

- Master (API) Processor Boots

Either the SPI has been selected OR the host has downloaded code to the external Host Expansion Ram / internal Ram and then wrote to the Master API Processor Reset bit. In either cas the master processor now goes to its reset vector and begins executing code. This vector is fixed at processor generation time. Therefore several instructions will be hardcoded into the iTSE memory map at the processor's reset vector which perform a branch to the selected memory segment- ie flash, spi, host expansion ram or internal ram.

- Initial Power on Self Test

Coming out of reset the watchdog timer will be enabled with a default timeout of X ms. This will give the master processor enough time to execute several intstructions and update the watchdog timer.

- Initial Power on Self Test Failure

This state is reached by either of 2 conditions:

The master API processor never executes any good code due to either a severe chip manufacturing bug or a circuit board problem- open/shorts, etc. When this occurs the watchdog timer has never been cleared by software and expires.

The master API procesor begins booting and during one of its tests discovers an error- for example during testing its Instruction RAM it detects a stuck bit- it can write to the BootFail bit and immediatly assert it or it can let the watchdog expire.

- Host Processor Assisted Boot

The Host processor will access the internal memory or Host Expansion FCRam and download code to the API processor. It can then set the BootDev and BootCFG pins accordingly and set the RiscBoot pin.

- No Boot

No code is ever downloaded to the API processor, the iTSE is run in host-only mode.

19 I/O Definitions and Timing

20 Packaging and Pinout

20.1 Chiron Packaging

The following chart is taken from the IBM SA-27E databook.

| 1.27 mm pitch Laminate BGA | Max Signal I/O for Die-Package Combination | | | | |
|---|---|---|---|---|---|
| | still looking for this info. | | | | |
| 42.5 x 42.5 mm: 1088 total balls | | 640 | 748 | 748 | 748 |
| 40 x 40 mm: 960 total balls | | 640 | 664 | 664 | 664 |
| 37.5 x 37.5 mm: 840 total balls | | 576 | 576 | 576 | 576 |
| 35 x 35 mm: 728 total balls | | 500 | 500 | 500 | 500 |
| 33 x 33 mm: 624 total balls | 412 | 456 | 456 | 456 | 456 |
| | | | | | |
| **Metal layers** | **Wirable Gates (Millions) for Die-Size Metal Layer Combinations** | | | | |
| 6lm | 5.66 | 6.73 | 7.86 | 9.08 | 10.39 |

Table 20-1: SA-27E Organic Die-Package Menu: Single Density Footprint Laminate BGA The iTAP Switch is initially targeted at the 624 ball 1.27mm pitch BGA package.

A preliminary pin list for the iTAP switch is given below:

20.2 Chiron I/O Summary

| Functional Group | Signals | Number |
|---|---|---|
| Input Links | LINK_IN00_D00_P, _N, LINK_IN00_D01_P,_N, LINK_IN00_GNTOUT_P,_N -12 of these- | 72 |

| | | |
|---|---|---|
| Output Links | LINK_OUT00_D00_P_N, LINK_OUT00_D01_P_N, LINK_OUT00_GNTIN_P_N -12 of these- | 72 |
| Host Interface Address and Data | HADDR12-00, HDATA15-00 | 29 |
| Host Interface Control | H_DSx,H_CSx,H_WEx1-0, H_DSACKx,H_IRQ1-0x | 7 |
| Host Expansion FCRAM | HEXP_ADDR (15),HEXP_DATA (16) ,HEXP_CNTRL (10),HEXP_VREF (2) | 43 |
| SPI Bus | SPICLK,SPIMOSI,SPIMISO,SPICS0,SPICS1 | 5 |
| UART | TX,RX,D_TX,D_RX | 4 |
| Trace Port | TPSTAT[3:0],TPDATA[3:0],TPCLK | 9 |
| JTAG | TCK,TMS,TRSx,TDI,TDO | 5 |
| System Control | Ref Clock 1 (2), Ref Clock 2 (2), RiscClock (1) PLLA(4), PLLB(4), PLLC (4) HRESETx, SRESETx, SOR_SYNC (2), CTM[3:0] | 25 |
| Misc | BOOTRISC,BOOTDEV(2), BOOTCFG(2), RISC_CLK_SEL, Thermal(2), BOOTFAILx (1) | 9 |
| Test Access Port | TIB | 64 |
| Test Pins | TE,Z | 2 |
| Total I/O Pins Assigned | | 346 |
| Total I/O Pins Unassigned | | 38 |
| **Total I/O Pins** | Assigned I/O Pins + Unassigned I/O Pins | **384** |
| Dedicated Power (*1) | VCC (SSTL), VCC (Core), VCC(I/O), GND | 168 |
| Unilink Power | VCC & VSS for Unilink(1.8V), Unilink(2.5V), | 72 |
| **Total Power Pins** | Dedicate Power + Unilink Power | **240** |
| **Total Package Pins** | Total I/O Pins + Total Power Pins | **624** |

Table 20-2: iTAP Switch Chip I/O

*1: These are dedicated power pins on the chip as defined by IBM document #SA14-2180-01 Laminate Ball Grid Array p.97 Fig. 38

20.3 Signal Description

This sections describes the iTAP Switch pinout. Active low signals have an 'x' suffix.

20.3.1 Host Interface

| Signal Name | Mnemonic | Direction | I/O Pad | Description |
|---|---|---|---|---|
| Address Bus | HADDR[12:00] | I | BT3335 | Host Interface Address bus, word addressable, byte writable. It can address16K bytes of internal memory |
| Data Bus | HDATA[15:00] | B | BT3335 | Host Interface 16 bit data bus |
| Chip Select | HCSx | I | BT3335_PU | Host Interface Chip Select |
| Data Strobe | HDSx | I | BT3335 | Host Interface Data Strobe |
| Data Acknowledge | DSACKx | O | BT3335_PU | Host Interface |
| Write Enable | HWEx[1:0] | I | BT3335 | Host Write Enable |
| Interrupts | HIRQx[1:0] | O | BT3335_PU | Host Interrupts |

Total number of pins: 36

20.3.2 Host Expansion FCRAM Interface

| Signal Name | Mnemonic | Direction | | Description |
|---|---|---|---|---|

| | | | | |
|---|---|---|---|---|
| Reference Voltage | HEXP_VRef | O | VSSTL2R1 | Voltage References (2) |
| Address Bus[14:00] | HEXP_ADDR | O | BSSTL2C2 | Address Bus (15 bits) |
| Data Bus[15:00] | HEXP_DATA | B | BSSTL2C2 | Data Bus (16 bits) |
| Function Select | HEXP_FN | O | BSSTL2C2 | Address / Data Function Pin |
| Chip Select | HEXP_CSx | O | BSSTL2C2 | Active low chip select |
| Bank Address | HEXP_BA[1:0] | O | BSSTL2C2 | 2 Bit Bank Address |
| CLK(+/-) | HEXP_CLK | O | BSSTL2C2 | Differential Clock |
| Data Mask (Lower Byte) | HEXP_DML | O | BSSTL2C2 | Write Mask (Data Bits 7-0) |
| Data Mask (Upper Byte) | HEXP_DMU | O | BSSTL2C2 | Write Mask (Data Bits 15-8) |
| Lower Byte Data Strobe | HEXP_LDQS | B | BSSTL2C2 | Data Strobe (Bits 7-0) |
| Upper Byte Data Strobe | HEXP_UDQS | B | BSSTL2C2 | Data Strobe (Bits 15-8) |

Total number of pins: 43

☞ *We have 2 Reference Voltage pins for 42 I/O. Is this enough?*

20.3.3 SPI Bus

| Signal Name | Mnemonic | Direction | I/O Pad | Description |
|---|---|---|---|---|
| SPI Clock | SPICLK | O | BT3335 | SPI Clock. |
| SPI Master Out Slave In | SPIMOSI | O | BT3335 | SPI Data Write |
| SPI Master In Slave Out | SPIMISO | I | BT3335_PD | SPI Data Read |
| SPI Chip Select | SPICSx[1:0] | O | BT3335 | SPI Chip Selects |

Total Number of pins: 5

20.3.4 UART

| Signal Name | Mnemonic | Direction | I/O Pad | Description |
|---|---|---|---|---|
| Uart TX | TX | O | BT3335 | Transmit |
| Uart RX | RX | I | BT3335_PD | Recive |
| Uart Daisy TX | DTX | I | BT3335_PD | Daisy Chained Transmit |
| Uart Daisy RX | DRX | O | BT3335 | Daisy Chained Receive |

Total Number of pins: 4

20.3.5 JTAG

| Signal Name | Mnemonic | Direction | I/O Pad | Description |
|---|---|---|---|---|
| JTAG Clock | TCK | I | BT3335 | JTAG Clock |
| JTAG Command | TMS | I | BT3335 | JTAG Command |
| JTAG Reset | TRSx | I | BT3335 | JTAG Reset (Active Low) |
| JTAG Data In | TDI | I | BT3335 | JTAG Serial Data in |
| JTAG Data Out | TDO | O | BT3335 | JTAG Serial Data out |

Total number of pins: 5

20.3.6 Trace Port

| Signal Name | Mnemonic | Direction | I/O Pad | Description |
|---|---|---|---|---|
| Trace Port Status | TPSTAT[3:0] | O | BT3335 | Tensilica Program Counter Change Status |
| Trace Port Data | TPDATA[3:0] | O | BT3335 | Tensilica Program Counter Relative Change |

*Proprietar ' Confidential Information of Onex Communicat 'orporation*

| | | | | |
|---|---|---|---|---|
| Trace Port Clock | TPCLK | O | BT3335 | This is the core clock. |

The speed of these pins = cclk, 250MHz nominal. An investigation is needed to determine what drivers should be used for these pins. Initially LVTTL.

Total number of pins: 9

20.3.7 Miscellaneous

| Signal Name | Mnemonic | Direction | I/O Pad | Description |
|---|---|---|---|---|
| Boot Risc Processor | BOOTRISC | I | BT3335_PD | Upon hreset, this bit is latched to determine if the risc core should boot.<br>0= No Boot<br>1= Boot. |
| Boot Device Select | BOOTDEV[1:0] | I | BT3335_PD | Upon reset, these bits are read to determine the method the processor should be bootstrapped<br>00 = Serial Prom (SPI)<br>01 = Internal Shared Ram<br>11 = External FCRAM |
| Boot Device Config | BOOTCFG[1:0] | I | BT3335_PD | Depending upon the boot device selected, these bits will take on different meanings. These are listed below: |
| | | | | **BOOTDEV=00=Serial Prom**<br>BOOTCFG[1] = Mem Size<br>0=16 bit addressing<br>1 = 24 bit addressing<br>BOOTCFG[0] = SPI Device<br>0 = SPI CS 0<br>1 = SPI CS 1 |
| | | | | **BOOTDEV=01=Internal Shared RAM**<br>BootCFG= unused |
| | | | | |
| | | | | **BOOTDEV=11=FCRAM**<br>BOOTCFG = unused |
| Master Processor Clock Select | RISC_CLK_SEL | I | BT3335_PD | Upon reset, this bit is latched to determine the clock source of the embedded risc core.<br>0= Core Clock<br>1= Risc Clock |
| Power-On Boot Failure | BOOTFAILx | O | BT3335 | Upon a Power On Boot Failure this pin will go active hi until reset |
| Thermal Diode | THERMALi | I | THERMAL | Thermal Diode on the iTAP Switch specified @ xxxxxxx |
| Thermal Diode | THERMALo | O | THERMAL | Thermal Diode on the iTAP Switch specified @ xxxxxxx |

Total number of pins: 9

20.3.8 Switch Fabric Serial Links

| Signal Name | Mnemonic | Direction | I/O Pad | Description |
|---|---|---|---|---|
| *Serial Data Links (Inbound Traffic)* | | | | |
| Link_IN[11:00]_D[1:0]_P,_N | LINK_IN00_D0_P | I | unilink pad name ??? | Input Link Data (Unilink) |
| Link_IN[11:00]_GNT_P,_N | LINK_IN00_GNT_P | O | | Input Link Grant (Unilink) |
| *Serial Data Links (Outbound Traffic)* | | | | |

| | | | | |
|---|---|---|---|---|
| Link_OUT[11:00]_D[1:0]_P_N | LINK_OUT00_D0_P | O | | Output Link Data (Unilink) |
| Link_OUT[11:00]_GNT_P_N | LINK_OUT00_GNT_P | I | | Output Link Grant (Unilink) |

Total number of pins: 144

20.3.9 System Control

| Signal Name | Mnemonic | Direction | | Description |
|---|---|---|---|---|
| Ref Clock 1 Input | PLLA_CLK(+/-) | I | IPECLD | PLL A Clock Input -primary input-** |
| Ref Clock 2 Input | PLLA_CLK(+/-) | I | IPECLD | PLL A Clock Input -primary input-** |
| RISC CLK | RISC_CLK | I | LVTTL | Embedded Processor Clock |
| PLL A Feedback | PLLA_FB | O | BT3335 | Look at ibm's pll data book spec. |
| PLL A Test Enable | PLLA_TST | I | BT3335PD | Test Input |
| PLL A Analog Power | PLLA_VDD | PWR | | |
| PLL A Analog Ground | PLLA_GND | GND | | |
| PLL B Feedback | PLLB_FB | O | BT3335 | Look at ibm's pll data book spec. |
| PLL B Test Enable | PLLB_TST | I | BT3335PD | Test Input |
| PLL B Analog Power | PLLB_VDD | PWR | | |
| PLL B Analog Ground | PLLB_GND | GND | | |
| PLL C Feedback | PLLC_FB | O | BT3335 | Look at ibm's pll data book spec. |
| PLL C Test Enable | PLLC_TST | I | BT3335PD | Test Input |
| PLL C Analog Power | PLLC_VDD | PWR | | |
| PLL C Analog Ground | PLLC_GND | GND | | |
| Clock Test Mode Pins | CTM[3:0] | O | BT3335 | Clock Test Pins |
| Hardware Reset | HRESETx | I | BT3335 | Hardware Reset - resets everything in the chip |
| Software Reset | SRESETx | I | BT3335 | Software Reset- controlled reset, processor, only certain registers are reset |
| Start of Row | SOR_SYNC(+/-) | I | IPECLD | System-wide Start of Row Pulse |

Total Number of pins: 25

20.3.10 Test Access Port

| Signal Name | Mnemonic | Direction | I/O Pad | Description |
|---|---|---|---|---|
| General Purpose Test | TIB[63:00] | I/O | BT3335PDT | General Purpose Test I/Os They wil also be the dedicated IBM test pins. |
| Test Enable | TE | I | IT33TEPDT | IBM LSSD Dedicated Test Enable Pin |
| High Z | Z | I | BT3335 | Tie hi to tri-state all I/Os for ATPG Testing |

Total Number of pins: 66

20.3.11 Power Supplies

| Signal Name | Mnemonic | # of Pins |
|---|---|---|
| VCC (Core - 1.8V) | DVCC18 | 48 |
| VCC (3.3V) | DVCC33 | 40 |
| VSS (3.3) & (1.8) | DVSS | 80 |
| UniLink VCC18 | LVCC18 | 18 |

*Proprietary Confidential Information of Onex Communications Corporation*

| | | |
|---|---|---|
| UniLink VCC25 | LVCC25 | 18 |
| UniLink VSS18 | LVSS18 | 18 |
| UniLinik VSS25 | LVSS25 | 18 |

20.3.12 Reference Documents

IBM SA14-2180-01 Laminate Ball Grid Array

IBM SA14-2208-02 ASIC SA-27E Databook

20.4 Package Outline

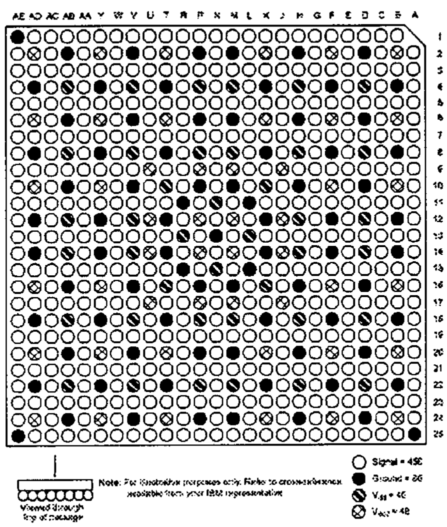

Figure 20-3: Laminate BGA 624 ball, 1.27 mm pitch, dual/single power zone

21 Electrical Characteristics

RESERVED

21.1 I/O Drivers

RESERVED

21.1.1 UniLink

RESERVED

21.1.2 LVTTL (5V Tolerant I/O)

RESERVED

21.1.3 LVTTL

RESERVED

22 Application Guidelines

RESERVED

APPENDIX C

*Proprietary and Confidential Information of Onex Communications Corporation*

5 Data Multicast Description

This section will describe how the data multicasting & broadcasting is implemented within an iTAP Switch Element (iTSE). This section covers the multicasting & broadcasting of data PDUs only, the concept of multicasting TDM traffic is covered elsewhere in this specification. Note: in this section the terms "PDU" and "packet" are synonomous. For the iTSE, "broadcast" can be viewed as simply another form multicast (with a lot of destinations). Therefore, this section will only speak of "multicast" but the reader should realize the this will also be how broadcast is implemented.

5.1 Multicast Operation

In order to support mulitast operation in switch fabrics which could be as small as 12x12 ports to as large as 1728x1728 ports, the iTSE will support several methods of multicast operation:

- multicast mask
- broadcast
- multicast ID
- iTPP-based multicast

The multicast controller within the iTSE implements a bandwidth pre-allocation mechanism. This means we pre-allocate a path from the ingress iTPP to the various egress iTPPs for a number of row times. After this number of row times, this path is aged out

5.1.1 Multicast Examples

The iTSE is designed to support a multi-stage packet duplication architecture as shown in Figure 5-1. In this example architecture, the input iTPP will unicast the multicast packets to a multicast controller in stage 1 (switch chip 1.0 in this figure), from there the multicast packet will be duplicated and sent to the multicast controllers in the third stage. The third stage multcast controllers will again duplicate the packet for each output link it is destined for.

1. The iTPP will send the multicast packet to the multicast controller (MC-CTLR) in switch 1.0. The MC-CTLR will have buffers in which it will store the received multicast (MC) packet.
2. The MC-CTLR will then duplicate the packet 2 times so that it will now have a total of 3 copies of the packet. Then for each packet it will replace the routing tag and MC forwarding tags (see the MC PDU format shown in TBD). The packets destined for switch 3.0 and 3.2 will be given the paths to those switch chips. The packet that is being routed through switch 3.1 doesn't need to be multicast from that switch chip, therefore it will be given the path to send it directly to the output iTPP.
3. The MC-CTLR will then forward the 3 MC packets to the 3 destinations (switches 3.0 and 3.2, and the iTPP off switch 3.1).
4. At switch chips 3.0 and 3.2, the MC packets will be duplicated and sent out on output ports which are specifed in the MC copy field of the MC packet. Since this is the last multicast stage, the MC packets do not need to be modified prior to transmission. The identical MC packet is sent on all the appropriate output links.

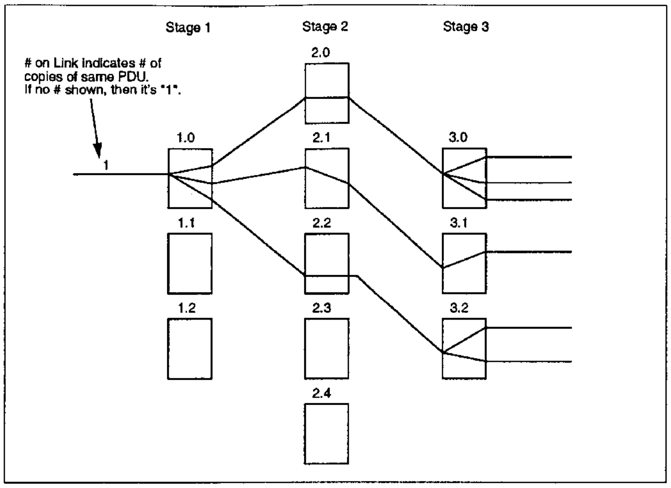
Figure 5-1: Multicasting w/ Multicast ID Mode
5.1.2 Multi- PDU
The figure below illustrates a typical arbitration and data passing sequence fora data PDU.

*Proprietary and Confidential Information of Onex Communications Corporation*
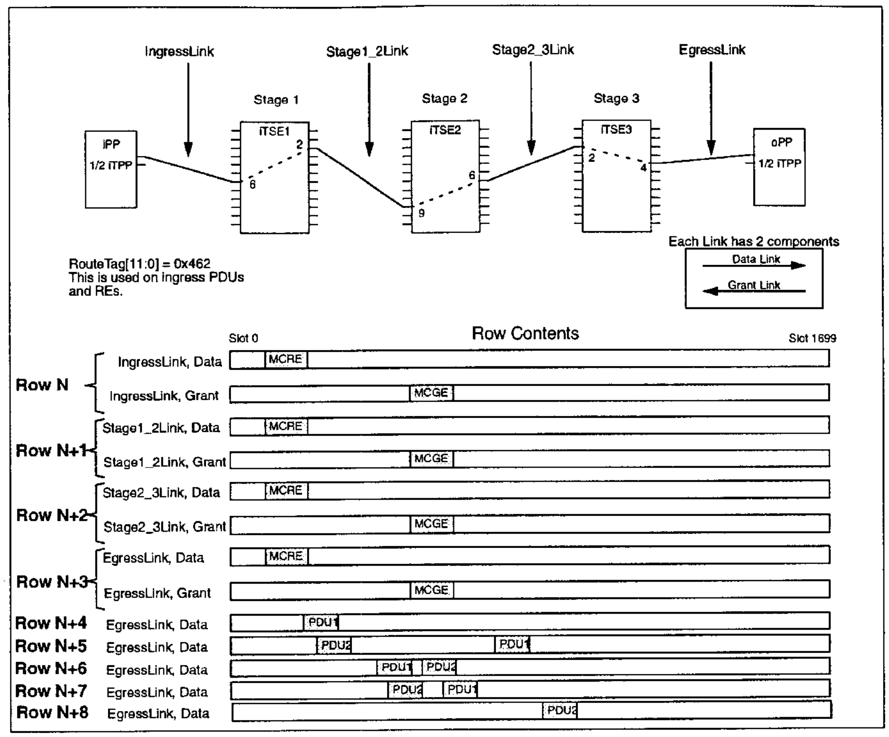
Figure 5-2: Single MC Arbitration and 2 PDUs Through a 3-Stage Switch Example

*Proprietary and Confidential Information of Onex Communications Corporation*

5.2 Multicast PDU Structures

5.2.1 Multicast Data PDU Format

The format for the 16-slot multicast data PDU is shown below. The shaded fields are identical to the fields in the unicast data PDU format are are described in Section 2.2.4.1..

Table 5-1: Multicast Data PDU Format

| Slot | 35 | 31 | | | 24 23 | 16 15 | 8 7 | 0 |
|---|---|---|---|---|---|---|---|---|
| 0 | Parity | PDU | BC | MC | RouteTag | | | |
| 1 | Parity | Ver | ValidPlBytes | VOQID | FragId | A | McCopy | SeqNum |
| 2 | Parity | | | SrcPortId | SrcMcFlowId | | | |
| 3 | Parity | Payload_Byte_0 | Payload_Byte_1 | Payload_Byte_2 | Payload_Byte_3 | | | |
| ... | Parity | payload bytes | | | | | | |
| 15 | Parity | Payload_Byte_48 | Payload_Byte_49 | Payload_Byte_50 | Payload_Byte_51 | | | |

Note: reserved bit positions are indicated with a "-". The default state for these bits is 0.

<u>BC - Broadcast</u>
This bit will be set if this is a broadcast PDU.

<u>MC - Multicast</u>
This bit will be set if this is a multicast PDU.

<u>McCopy</u>
12-bit Multicast Copy field. This field identifies which output link this multicast PDU must be multicst to. McCopy[0] is for output link #0, McCopy[1] is for output link #1, etc. If all 12 bits are cleared and the MC field = "01", then the multicast controller will use the multicast cache and perform packet duplication based on the contents of the cache.

<u>SeqNum</u>
SeqNum is the fragment sequence count, it will be incremented for each fragment. The SeqNum will start at 0 for the first fragment. If there are more than 16 fragments to the PDU, this SeqNum will roll over past 15 and continue counting.

<u>SrcPortId</u>
This 11-bit field identifies the source port processor for this multicast PDU.

<u>SrcMcFlowId</u>
This 21-bit field identifies which multicast flow this PDU is associated with. This is the flow ID from the input Port Processor's multicast ID space.

5.2.1.1 Background on Multicast Data PDU Fields

This sections provides a bit of background on why the fields which are present in the multicast data PDU defined in Table 5-1 amd how they are used.

*<u>BC & MC bits -</u>*

The usage of these bits will depend on who is processing the packet.

5

*Proprietary and Confidential Information of Onex Communications Corporation*

For the iTSE multicast controller the algorithm shown in Figure 5-3 is used.

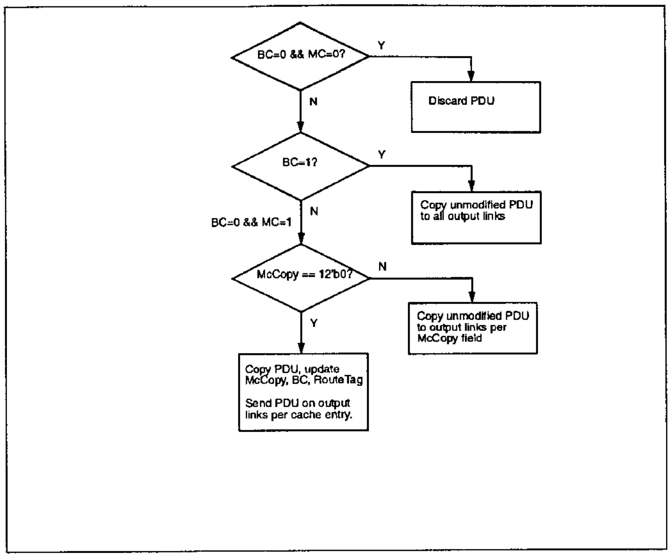

Figure 5-3: iTSE MC Controller Processing of BC & MC Bits

For the output Port Processor the algorithm shown in Figure 5-4 is used. This algorithm assume the iTPP already knows that it is dealing with a multicast packet. The current plan is that all multicast/broadcast PDUs will be sent a virtual output queue which is reserved for MC/BC packets.

*Proprietary and Confidential Information of Onex Communications Corporation*
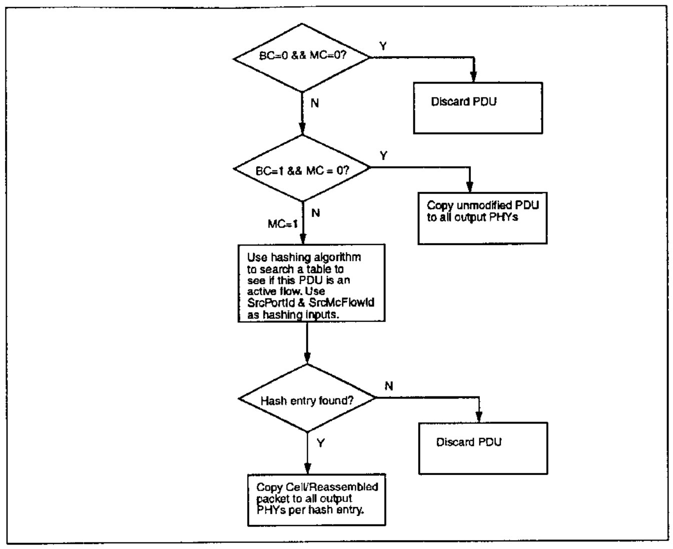
Figure 5-4: iTPP Processing of BC & MC Bits
*McCopy -*
This field is only used by the iTSE multicast controller. It is used to determine which output links the PDU should be copied to. See the flowchart in Figure 5-3 on how this field is used.
The port processor will always ignore this field.

5.2.2 Multicast Parameter PDU Format

The format for the 16-slot multicast parameter PDU is shown below.

Table 5-2: Multicast Parameter PDU Format

| Slot | 35 Parity | 31 | | | | 24 23 | | | | 16 15 | 8 7 | | | | 0 |
|---|---|---|---|---|---|---|---|---|---|---|---|---|---|---|---|
| 0 | Parity | 1 | 1 | 0 | 0 | RouteTag | | | | | | | | | |
| 1 | Parity | V | - | BC | - | RouteTag | | | | | | | | | |
| 2 | Parity | - | - | - | | VoqId | - | | res | Priority | McCopy | - | - | - | - |
| 3 | | | | | | | | | | | Duration of Mullticast Session | | | | |

Slots (addresses) 2 & 3 contains the cache entry parameters for 1 destination. Six more destinations may be defined in the same manner using slots 4 thru 15.

Note: reserved bit positions are indicated with a "-". The default state for these bits is 0.

*Slot 0 -*

This word is used to route the Multicast Parameter PDU from the input iTPP to the iTSE multicast controller. It's fields are those for a unicast packet as defined in Table 2-3.

*Slots 1& 2 -*

Thise two words contain the parameters for 1 destination. When the MC PDU is duplicated the BC, RouteTag, and McCopy fields will be replaced with those in these slots.

The VoqID, res, and Priority fields are used (along with the RouteTag) for creating the request element which will be used to arbitrate for link bandwidth for sending the duplicated data PDU.

*Slot 3 -*

This word is used to set the duration of the multicast session, each bit represents a single row-time (13.39 micro-seconds).

*Proprietary ana Confidential Information of Onex Communications Corporation*

5.3 Port Processor's Role in Multicasting

5.3.1 Input Port Processor

5.3.2 Output Port Processor

The output iTPP will receive multicast packets from the switch fabric. For each MC packet it must determine (1) if the MC packet is a member of one of the potentially 128K active outgoing MC flows which the iTPP can support and (2) which Utopia PHYs the packet must be multicast to.

In order to determin if the MC packet is a member of an active MC flow, the iTPP will need to perform a hashing algorithim on the fields from the MC PDU which identify the MC flow. These fields are the SourcePort

5.3.3 Multicast PDU Latency

Since the multicast method uses a pre-allocation of bandwidth, there is latency in setting up the multicast session. Once the multicast session is setup, the data PDUs experience no more latency than a unicast PDU. In the example of Figure 5-1, the best case time for sending a MC packet through this 3 stage switch fabric is calculated as follows:

1. N+1 row times are needed to setup the multicast flow
2. N row times are needed to pass data through.

What is claimed is:

1. A method of multicasting data through a multistage communications switch, comprising:

a) generating bandwidth request elements, each request element including through-the-switch routing information and an indication of at which stage in the switch multicasting begins;

b) granting requests based on the availability of bandwidth;

c) transmitting a packet of data with a routing tag to the switch stage where multicasting begins;

d) making copies of the packet of data at the switch stage where multicasting begins; and e) replacing the routing tags in the copies of the packet of data.

2. A method according to claim 1, further comprising:

f) buffering request elements at each stage of the switch; and g) replicating request elements at the switch stage where multicasting begins.

3. A method according to claim 2, wherein:

each request element includes an indication of priority.

4. A method according to claim 3, further comprising:

h) discarding low priority request elements from a buffer which has reached a threshold fullness.

5. A method according to claim 4, further comprising:

i) returning request elements which have not been discarded via an out-of-band link, wherein returned request elements are considered to be grants.

6. A method according to claim 1, wherein:

request elements are transmitted in-band.

7. A method according to claim 1, wherein:

each request element includes an indication of priority.

8. A method according to claim 1, further comprising:

f) generating a repeating data frame having a first plurality of rows.

9. A method according to claim 8, further comprising:

g) making requests during row N for space in row N+1; and h) granting requests through an out-of-band link.

10. A method according to claim 8, wherein:

said step of generating a repeating data frame includes repeating the frame every 125 microseconds.

11. A method according to claim 8, wherein:

each row has a second plurality of slots.

12. A method according to claim 11, wherein:

each slot has a bandwidth large enough to accommodate an E-1 or DS-1 signal.

13. A method according to claim 11, wherein:

the frame includes 9 rows, each row containing 1700 slots.

14. A method according to claim 11, wherein:

each slot includes a four-byte payload.

15. A method according to claim 8, wherein:

requests made during row N are granted during row N.

16. A method according to claim 1, wherein:

said step of generating bandwidth request elements includes generating a request element for each hop in a multicast session through the switch.

17. A method according to claim 16, wherein:

each request element includes a specified duration of bandwidth to be pre-allocated.

18. A method according to claim 17, wherein:

said step of transmitting a packet is not performed until all bandwidth for the multicast session is pre-allocated.

19. An apparatus for multicasting data through a multistage communications switch, comprising:

a) means for generating bandwidth request elements, each request element including through-the-switch routing information and an indication of at which stage in the switch multicasting begins;

b) means for granting requests based on the availability of bandwidth;

c) means for transmitting a packet of data with a routing tag to the switch stage where multicasting begins;

d) means for making copies of the packet of data at the switch stage where multicasting begins; and e) means for replacing the routing tags in the copies of the packet of data.

20. An apparatus according to claim 19, further comprising:

f) means for buffering request elements at each stage of the switch; and g) means for replicating request elements at the switch stage where multicasting begins.

21. An apparatus according to claim 20, wherein:

each request element includes an indication of priority.

22. An apparatus according to claim 21, further comprising:

h) means for discarding low priority request elements from a buffer which has reached a threshold fullness.

23. An apparatus according to claim 22, further comprising:

i) means for returning request elements which have not been discarded via an out-of-band link, wherein returned request elements are considered to be grants.

24. An apparatus according to claim 19, wherein:

request elements are transmitted in-band.

25. An apparatus according to claim 19, wherein:

each request element includes an indication of priority.

26. An apparatus according to claim 19, further comprising:

f) means for generating a repeating data frame having a first plurality of rows.

27. An apparatus according to claim 26, further comprising:

g) means for making requests during row N for space in row N+1; and h) means for granting requests through an out-of-band link.

28. An apparatus according to claim 26, wherein:

said means for generating a repeating data frame includes means for repeating the frame every 125 microseconds.

29. An apparatus according to claim 26, wherein:

each row has a second plurality of slots.

30. An apparatus according to claim 29, wherein:

each slot has a bandwidth large enough to accommodate an E-1 or DS-1 signal.

31. An apparatus according to claim 29, wherein:

the frame includes 9 rows, each row containing 1700 slots.

32. An apparatus according to claim 29, wherein:

each slot includes a four-byte payload.

33. An apparatus according to claim 26, wherein:

requests made during row N are granted during row N.

34. An apparatus according to claim 19, wherein:

said means for generating bandwidth request elements includes means for generating a request element for each hop in a multicast session through the switch.

35. An apparatus according to claim 34, wherein:

each request element includes a specified duration of bandwidth to be pre-allocated.

36. An apparatus according to claim 35, wherein:

said means for transmitting a packet does not transmit until all bandwidth for the multicast session is pre-allocated.

* * * * *